United States Patent [19]

Stembridge et al.

[11] Patent Number: 4,883,100
[45] Date of Patent: Nov. 28, 1989

[54] AUTOMATIC CONTROL SYSTEM FOR FILLING BEVERAGE CONTAINERS

[76] Inventors: William F. Stembridge, 618 Camelot Dr., College Park, Ga. 30349; James C. Sturrock, Rte. 1, Box 389, Espanola, N. Mex. 87532; W. Frank Stembridge, 1821 Farris St., East Point, Ga. 30344

[21] Appl. No.: 128,117

[22] Filed: Nov. 30, 1987

Related U.S. Application Data

[60] Division of Ser. No. 48,111, May 8, 1987, which is a continuation-in-part of Ser. No. 684,215, Dec. 20, 1984, abandoned, which is a continuation-in-part of Ser. No. 629,397, Jul. 10, 1984, abandoned.

[51] Int. Cl.$^4$ ........................ B65B 57/14; G01F 23/00
[52] U.S. Cl. .......................................... 141/1; 141/198; 73/290 V; 367/90
[58] Field of Search .................... 141/83, 94, 95, 192, 141/198, 1; 73/290 V; 367/908; 222/56, 129.1–129.4

[56] References Cited

U.S. PATENT DOCUMENTS

| | | | |
|---|---|---|---|
| 2,960,678 | 11/1960 | Beard et al. | 73/290 V |
| 3,448,778 | 6/1969 | Ramsay | 141/83 |
| 3,536,925 | 10/1970 | Schmidt | 250/564 |
| 3,638,392 | 2/1972 | Welker, Jr. et al. | 53/503 |
| 3,814,146 | 6/1974 | Mesh | 141/1 |
| 3,847,016 | 11/1974 | Ziedonis | 128/660 |
| 3,916,963 | 11/1975 | McIntosh | 141/198 |
| 4,083,387 | 4/1978 | Steiber et al. | 141/95 |
| 4,121,094 | 10/1978 | DiVito et al. | 377/24 |
| 4,183,007 | 1/1980 | Baird | 367/119 |
| 4,210,969 | 7/1980 | Massa | 367/108 |
| 4,221,004 | 9/1980 | Combs et al. | 73/290 V X |
| 4,236,553 | 12/1980 | Reichenberger | 141/198 |
| 4,261,397 | 4/1981 | Guy | 141/1 |
| 4,325,416 | 4/1982 | Hermann | 141/95 |
| 4,437,497 | 3/1984 | Enander | 141/198 |
| 4,559,979 | 12/1985 | Koblasz et al. | 141/9 |
| 4,572,253 | 2/1986 | Farmer et al. | 141/95 |

FOREIGN PATENT DOCUMENTS

| | | |
|---|---|---|
| 0075492 | 9/1982 | European Pat. Off. . |
| 1074281 | 1/1960 | Fed. Rep. of Germany ...... 367/908 |
| 571777 | 10/1977 | U.S.S.R. ........................... 73/290 V |
| 1494699 | 10/1974 | United Kingdom . |
| 1587617 | 3/1977 | United Kingdom . |
| 1600079 | 5/1978 | United Kingdom . |
| 2015296 | 2/1979 | United Kingdom . |
| 2099791 | 5/1982 | United Kingdom . |

OTHER PUBLICATIONS

Acoustica Associates, Inc., Ultrasonic Liquid Level Switches, 1959, pp. 1–4.

Primary Examiner—Henry J. Recla
Assistant Examiner—J. Casimer Jacyna
Attorney, Agent, or Firm—Thomas R. Boston; W. Dexter Brooks

[57] ABSTRACT

An automatic, ultrasonic system for controlling the filling of different sizes of beverage containers which may or may not contain various quantities of ice. The system includes a transducer assembly and a control module, both preferably connected to a beverage dispenser valve assembly. The transducer assembly includes at least two piezo-electric crystals for separately transmitting and receiving ultrasonic wave energy from the grate, the cup lip, the top of any ice in the cup, and the rising liquid level, and for generating signals corresponding to the travel time of the ultrasonic energy. The control module includes a microcomputer and associated circuitry. The system can include two separate transmitter and receiver crystals, or in a preferred embodiment two transmitter-receiver pairs of crystals.

26 Claims, 94 Drawing Sheets

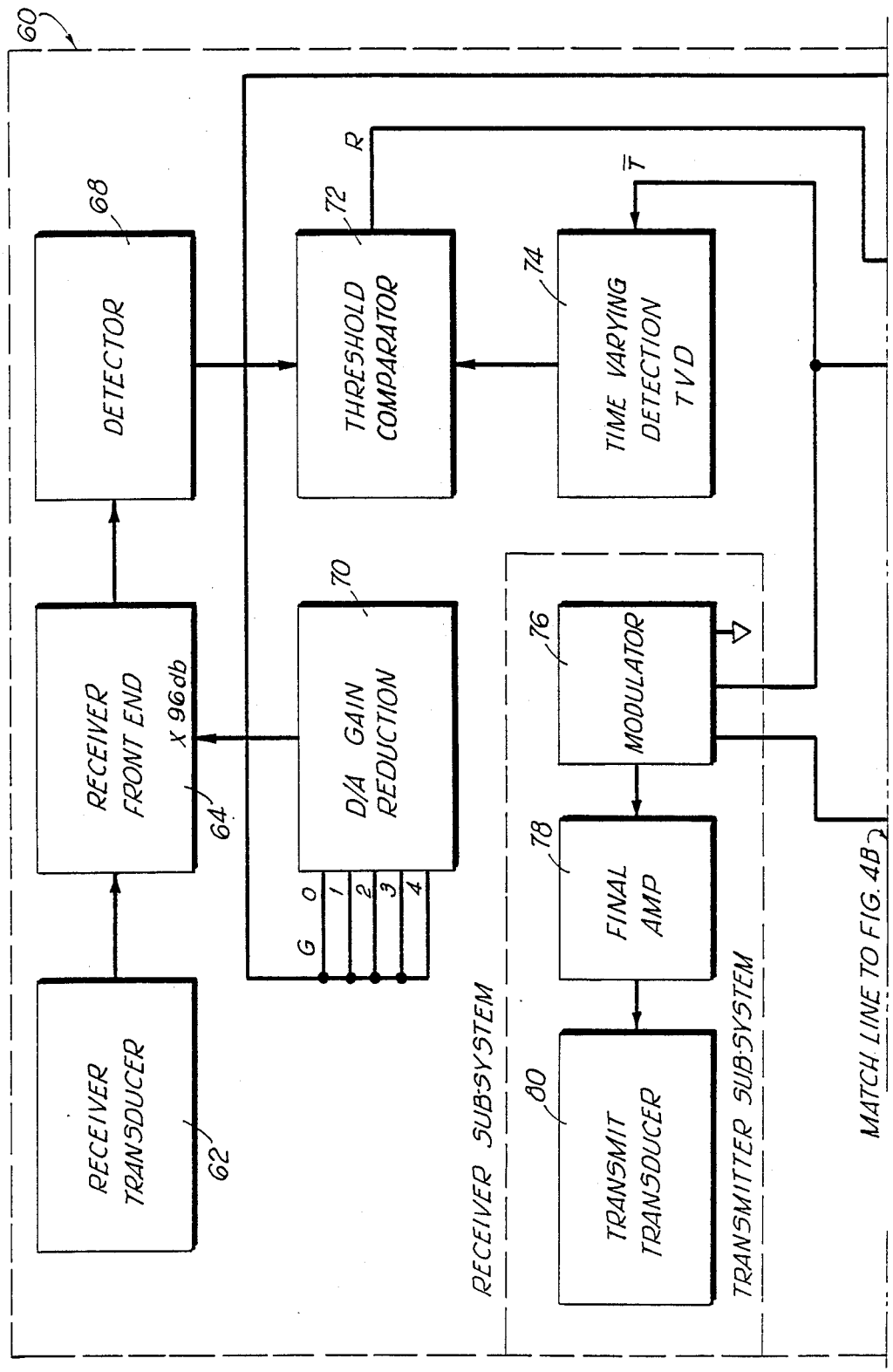

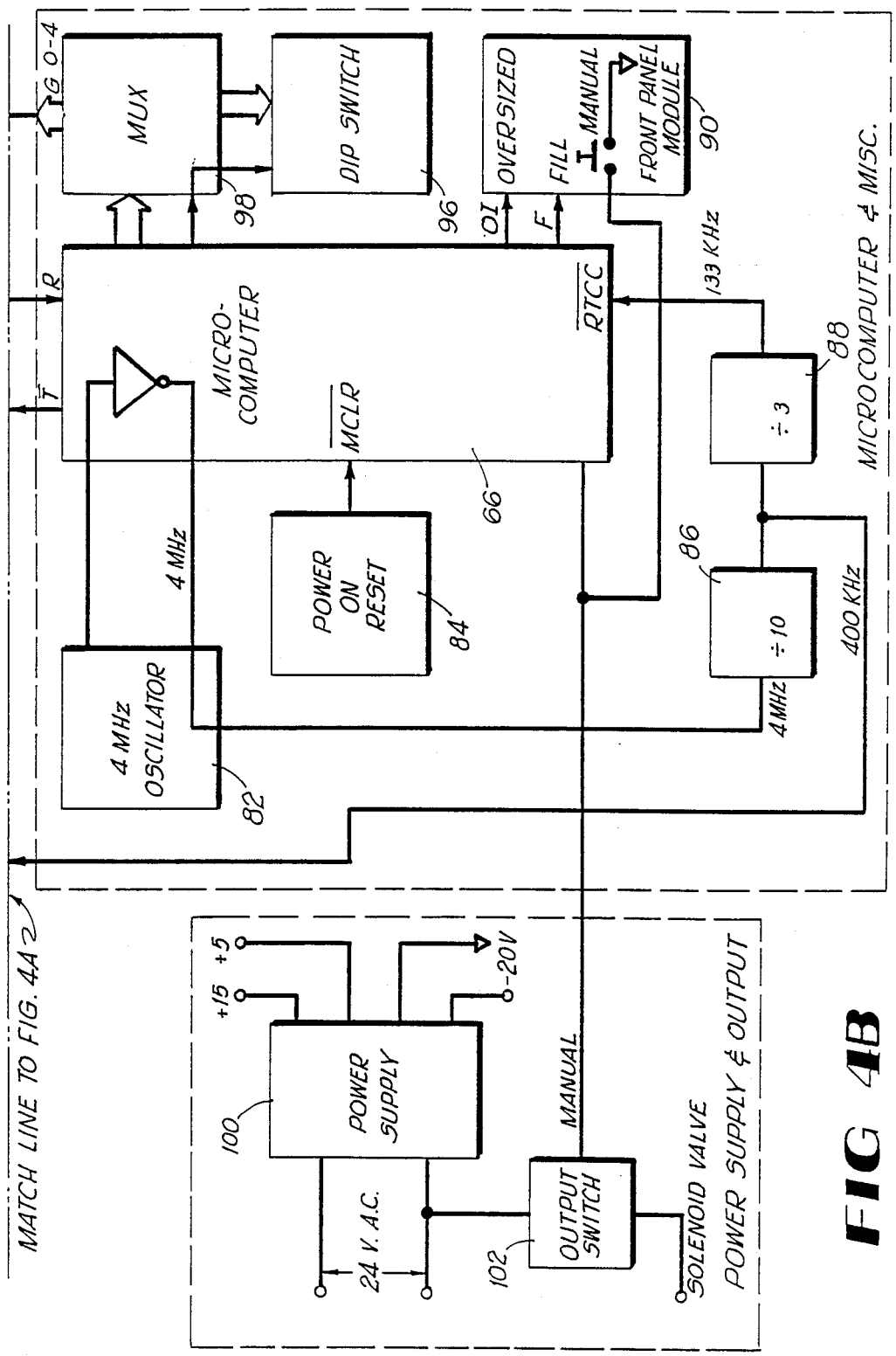

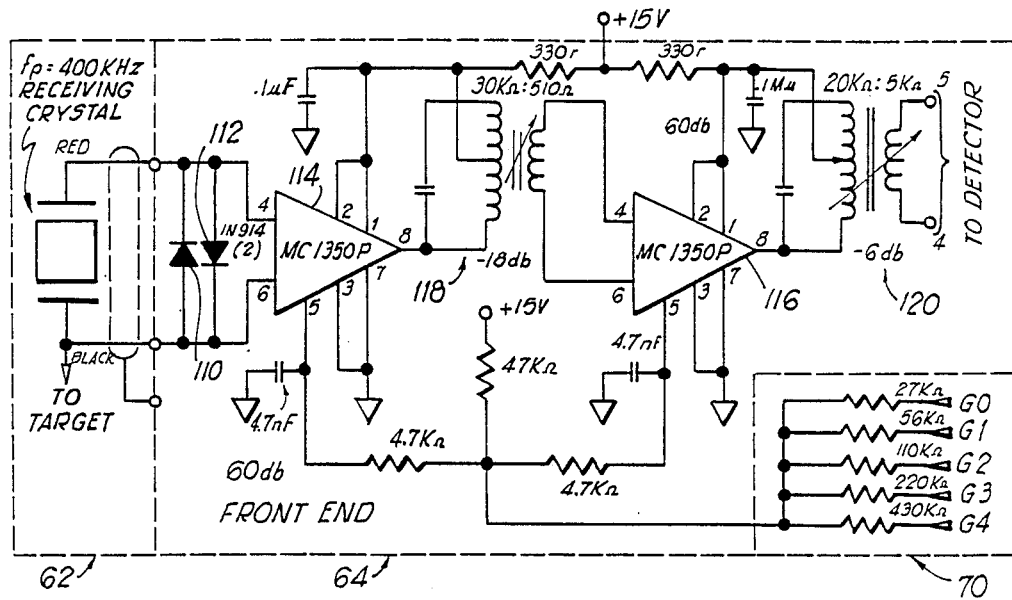
FIG 6
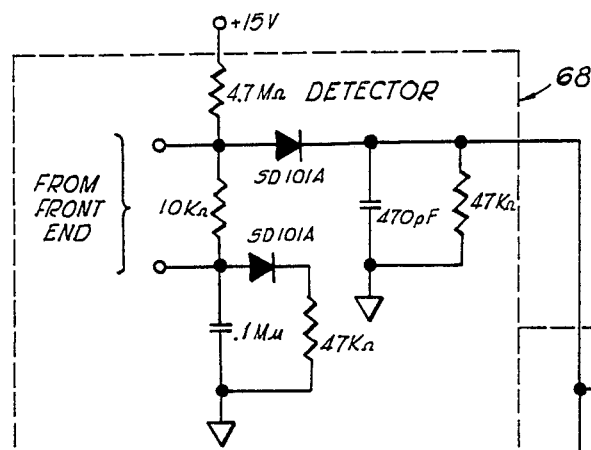
FIG 7
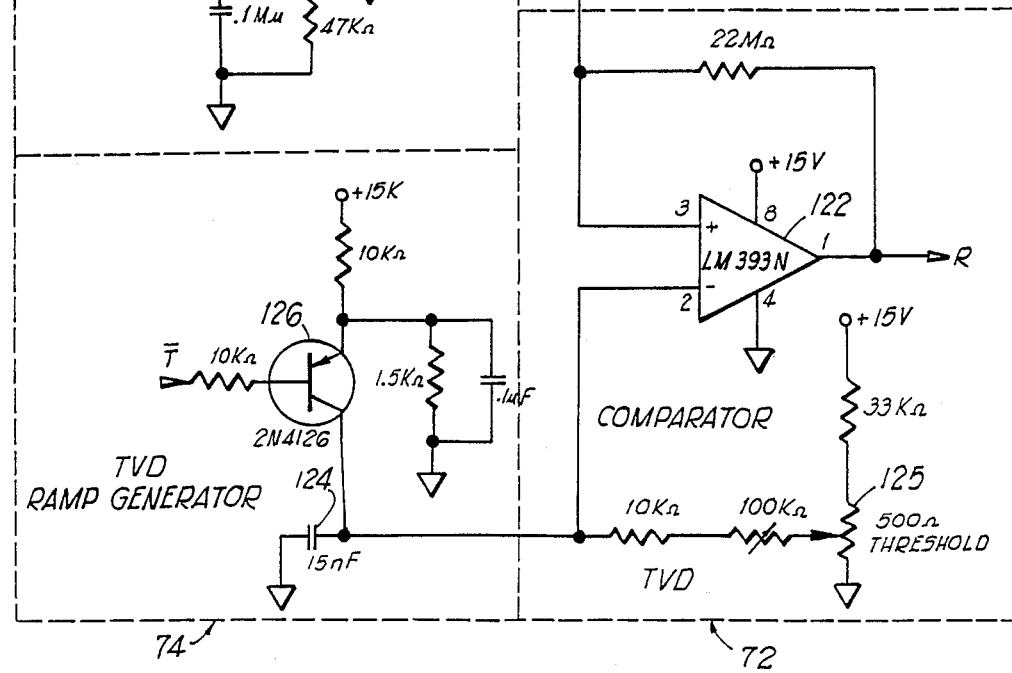

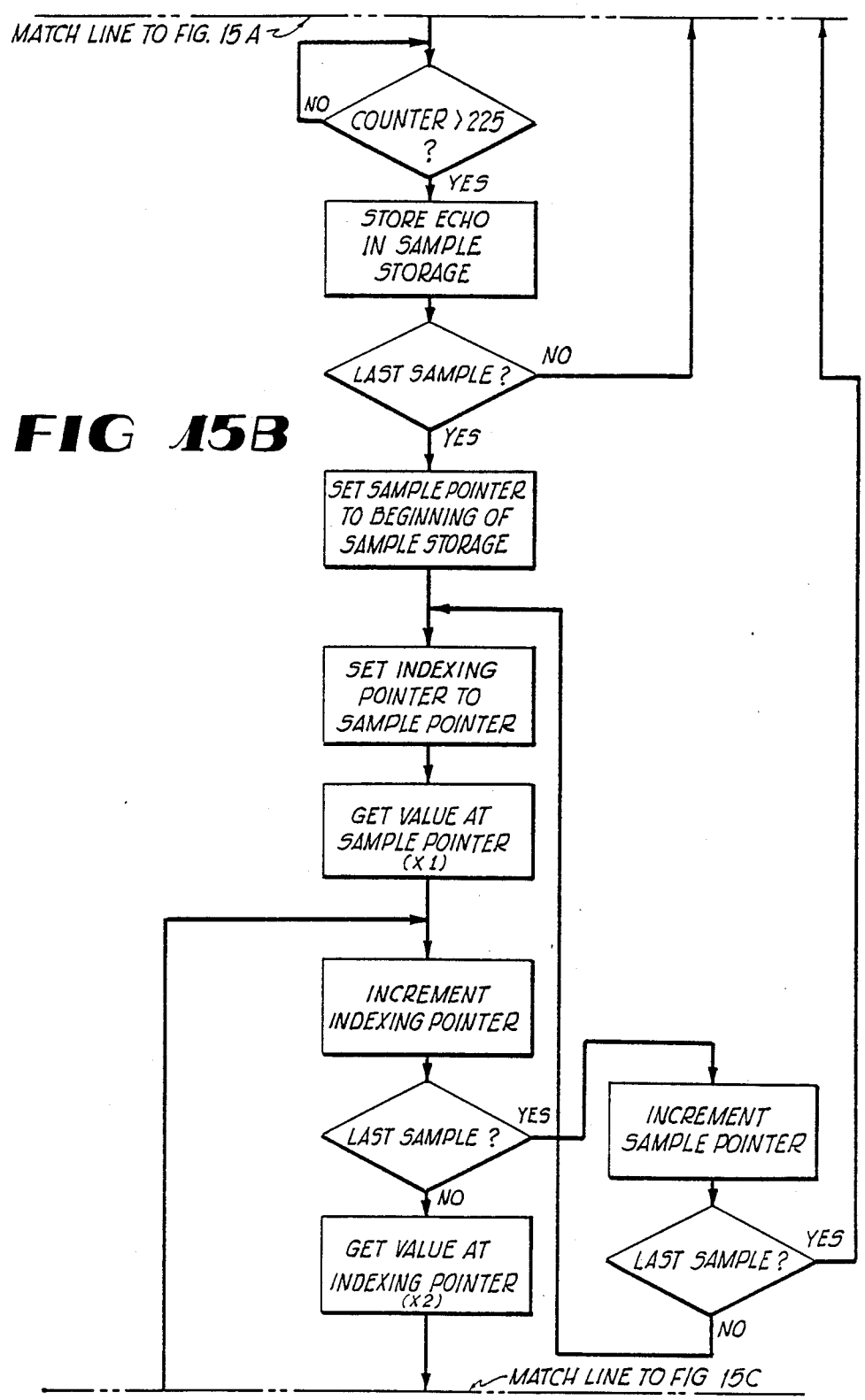

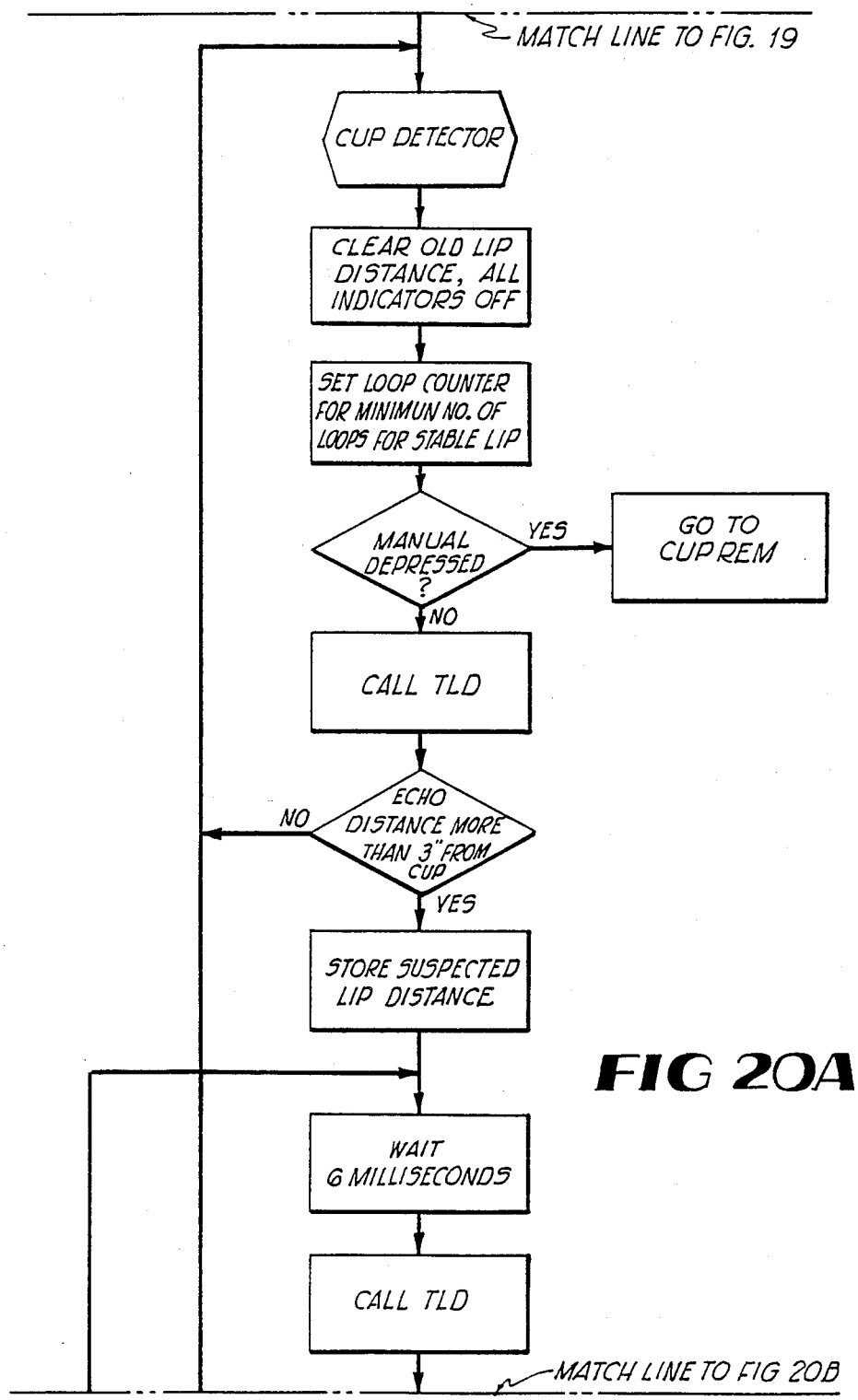

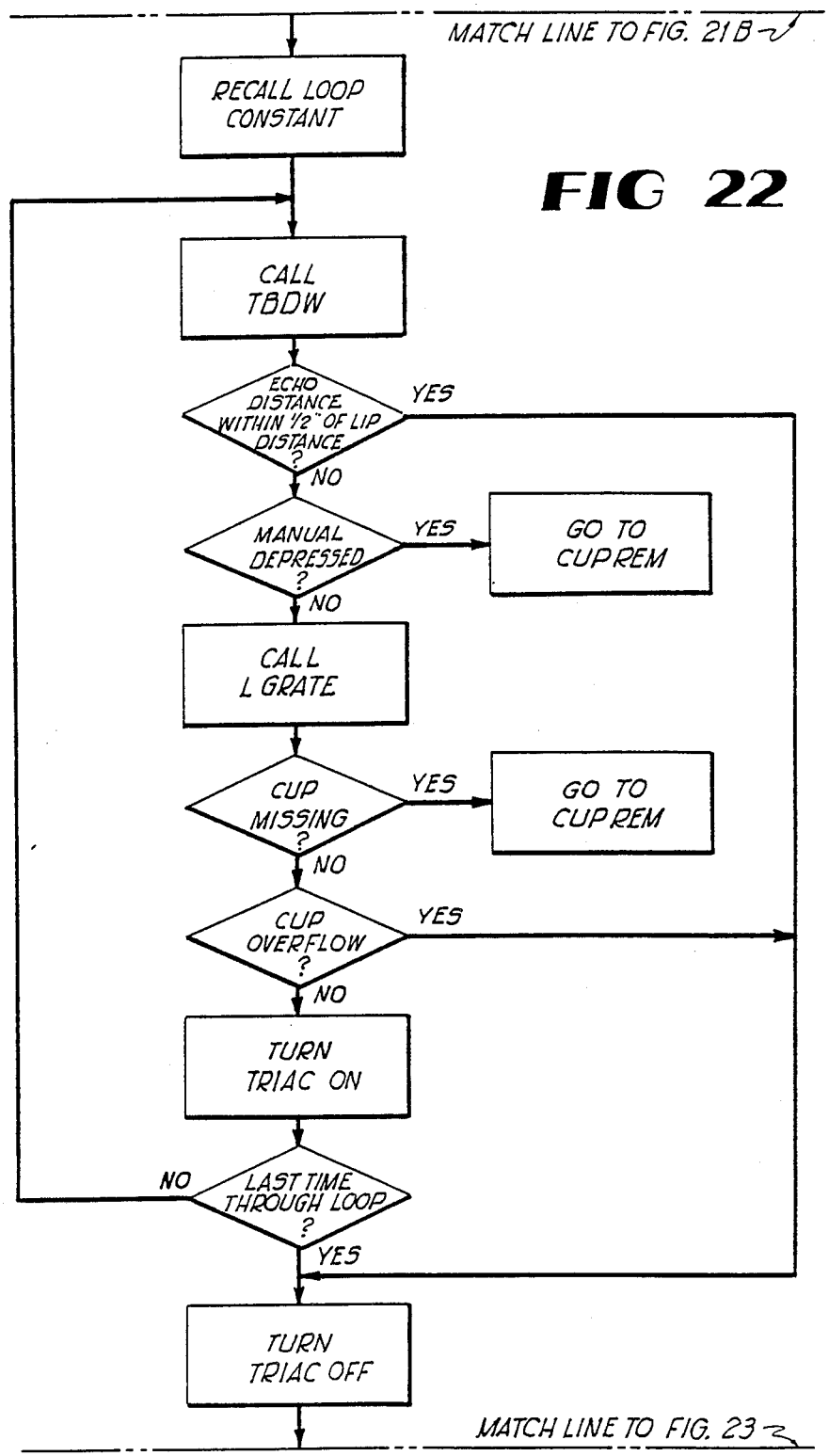

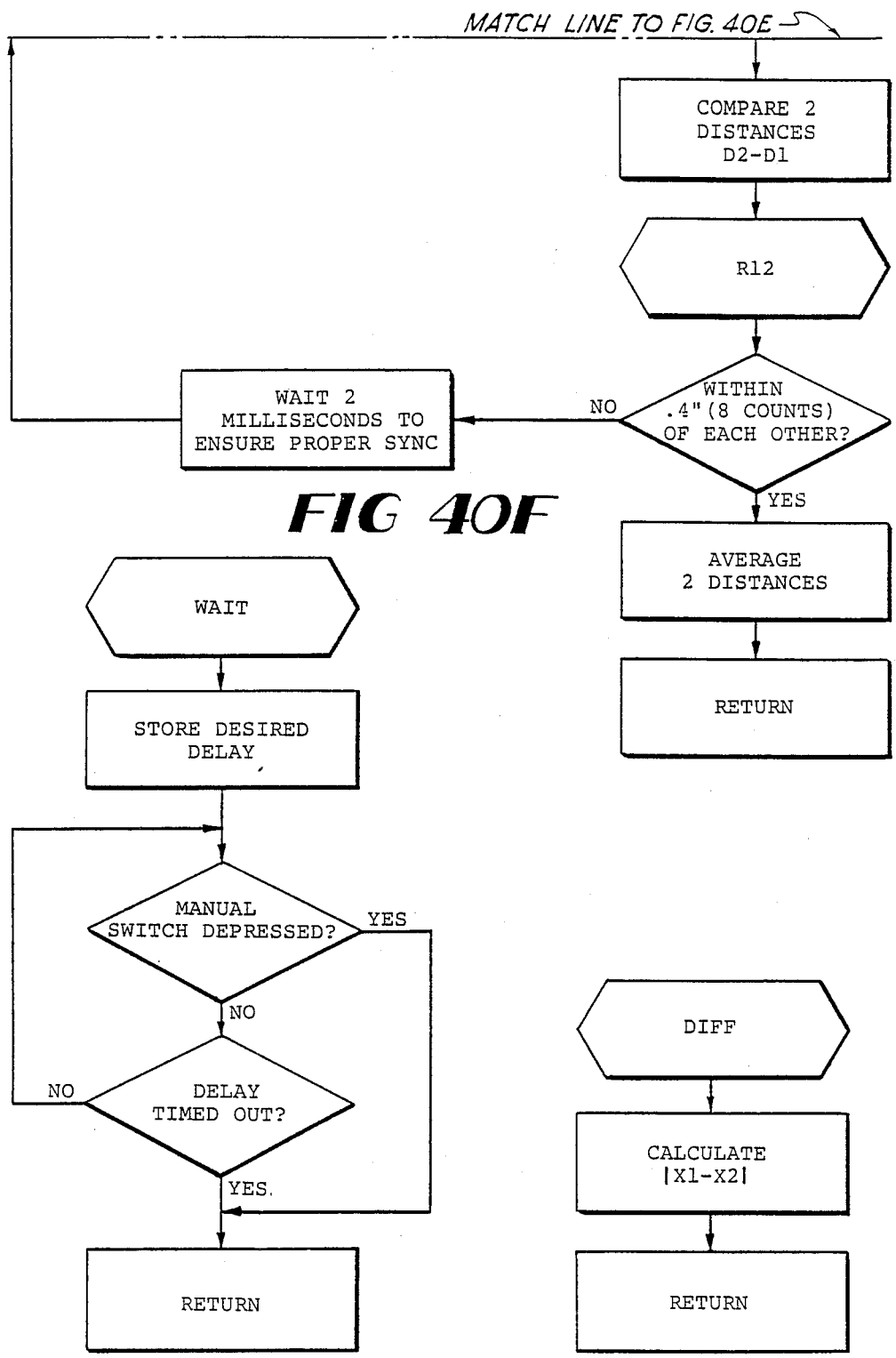

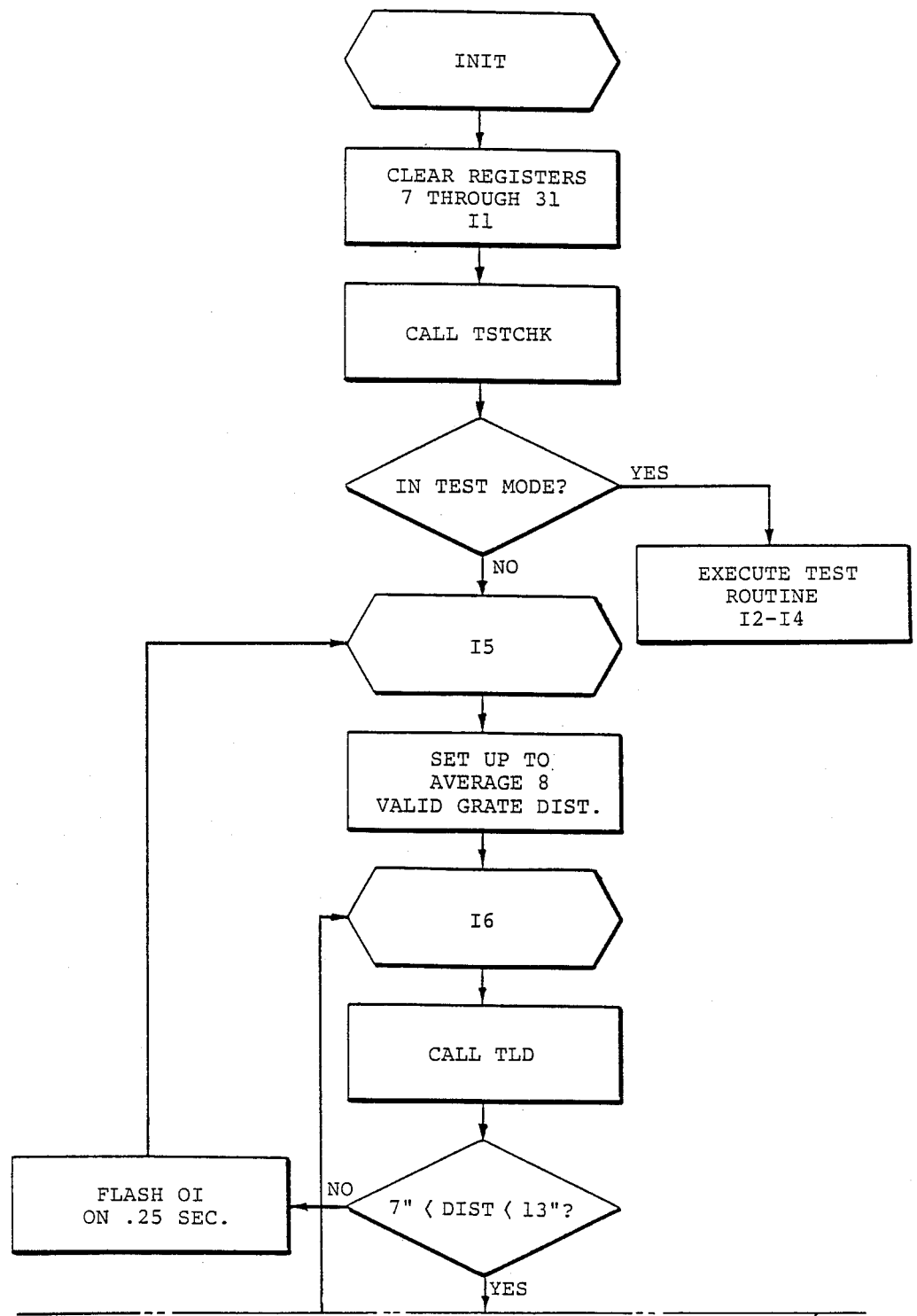
FIG 45A  MATCH LINE TO FIG. 45B

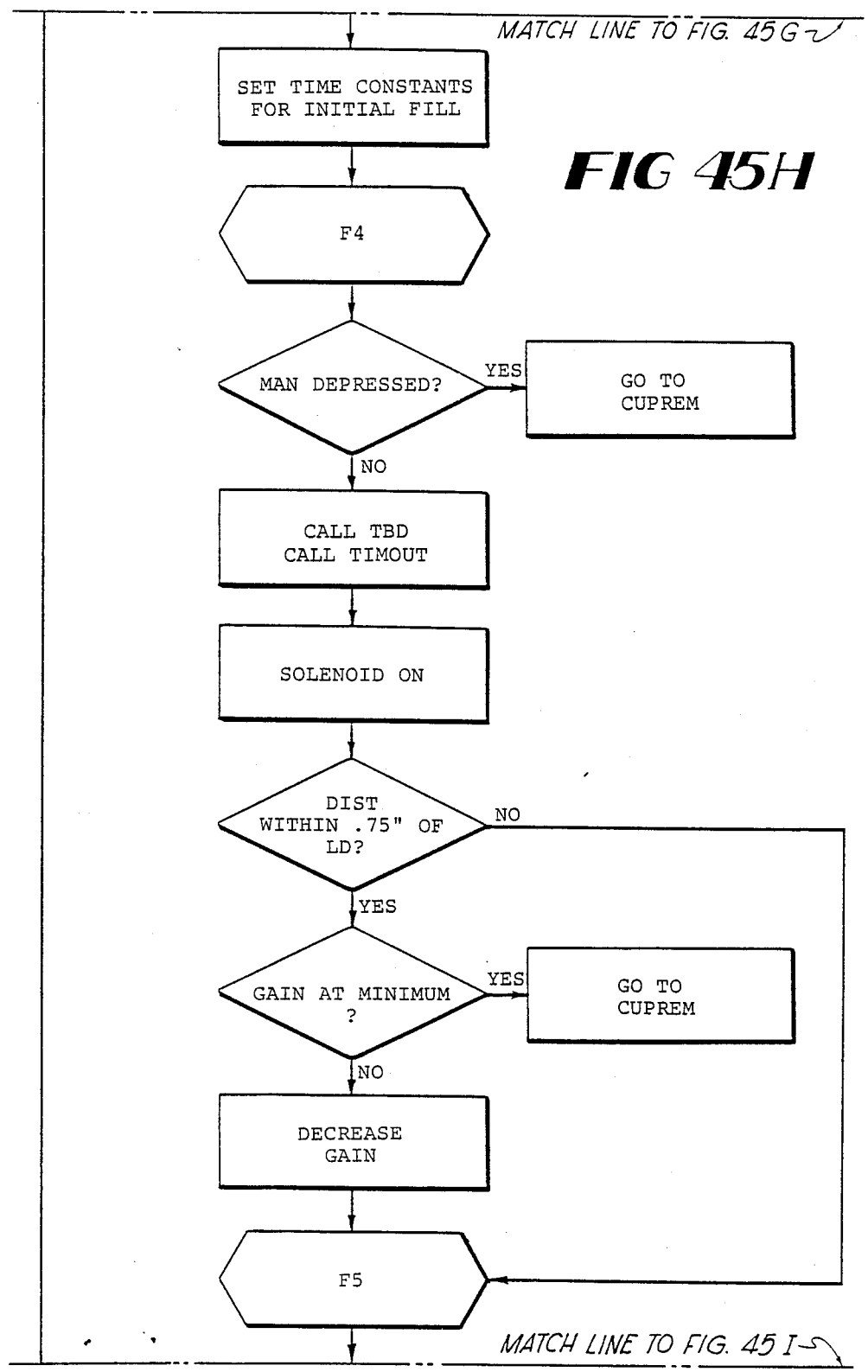

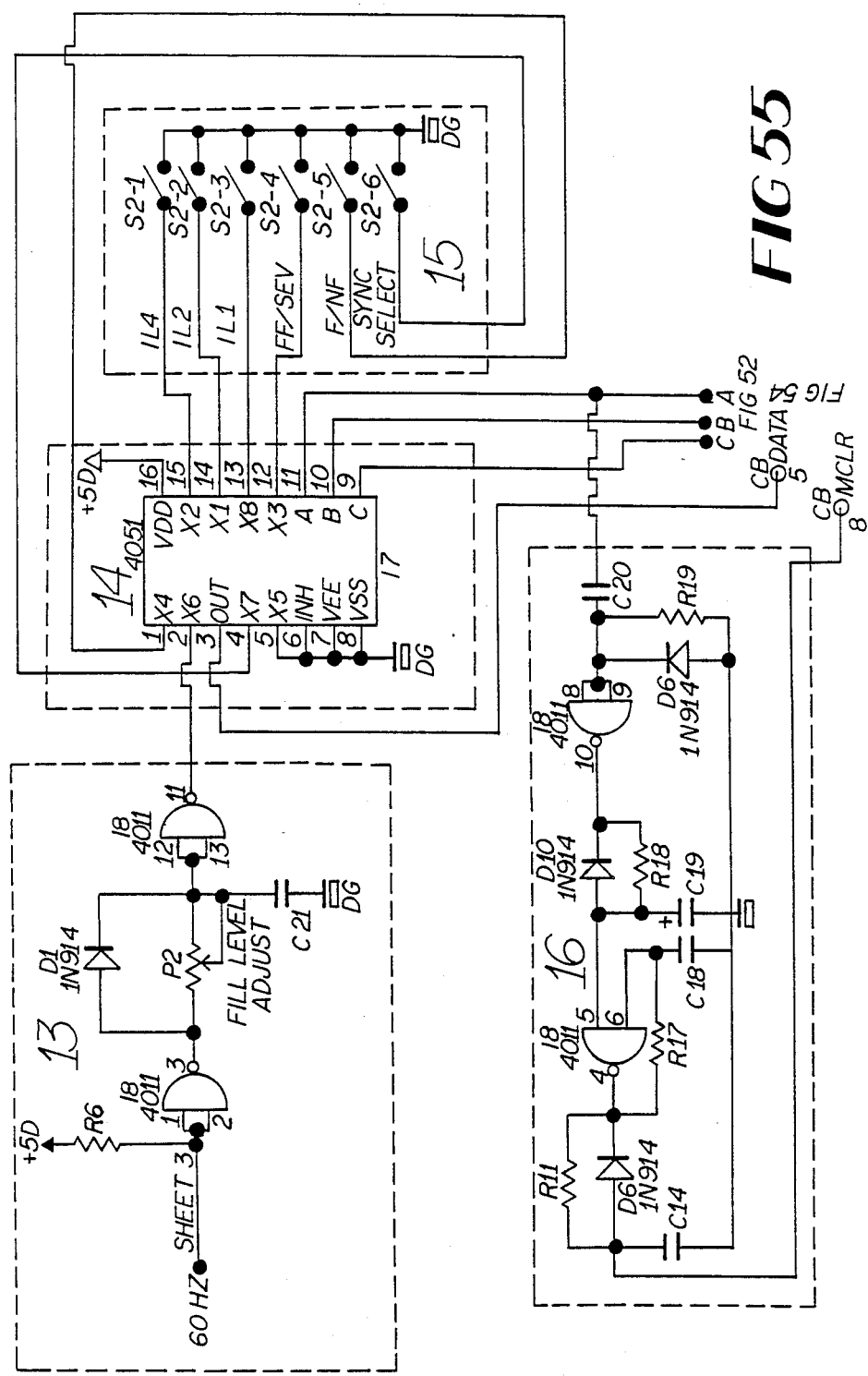

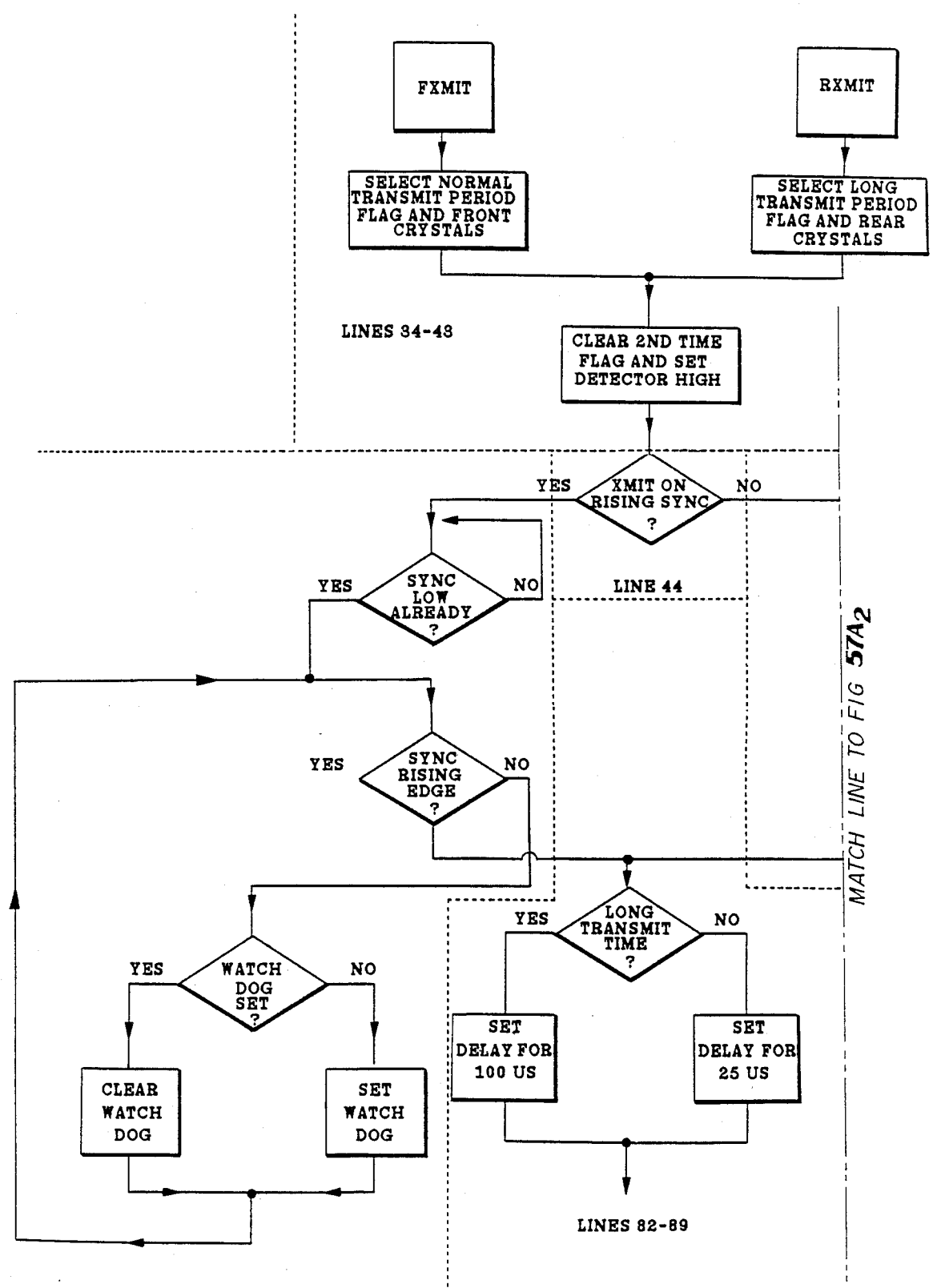
FIG 57A₁

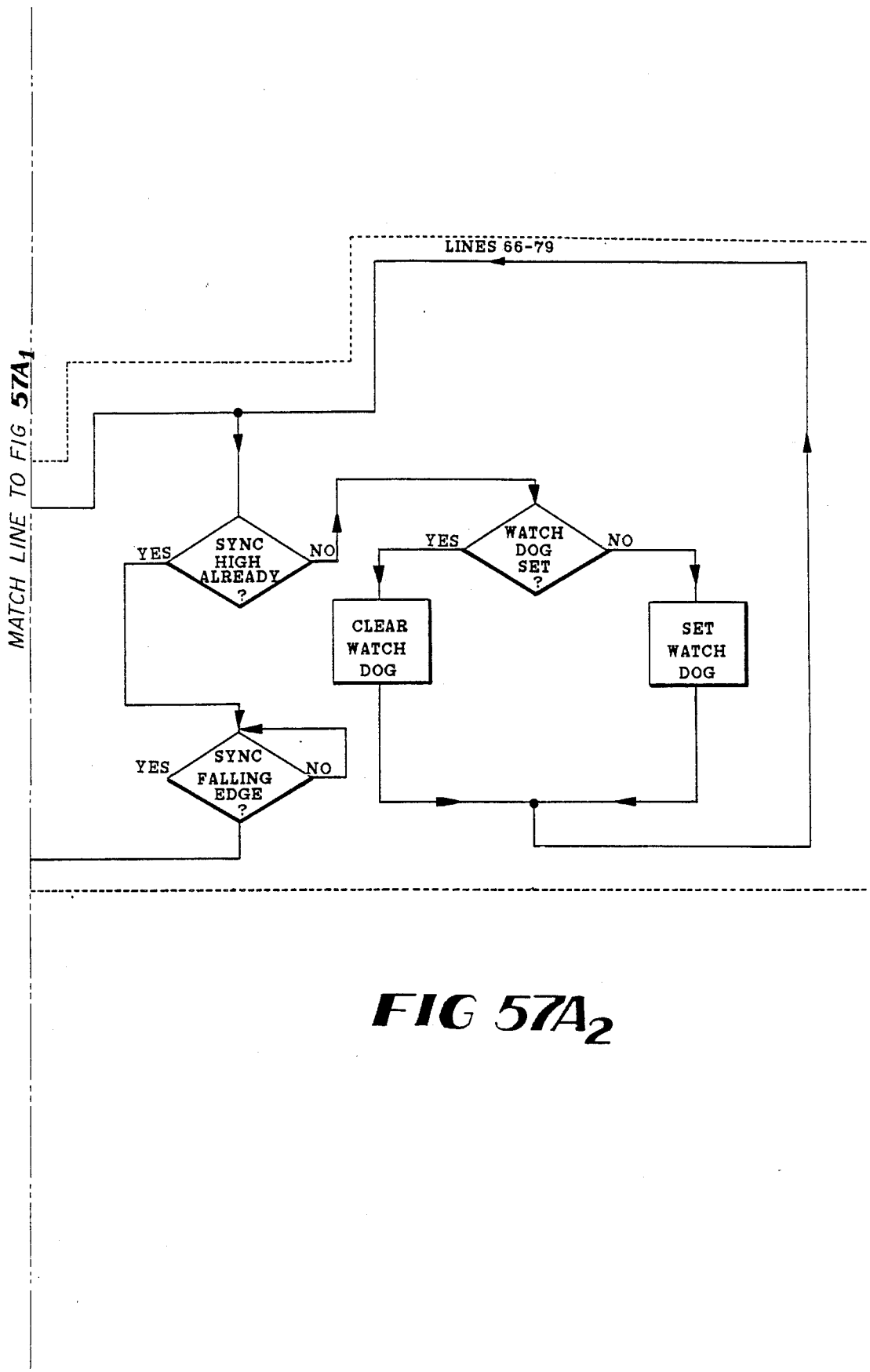
FIG 57A₂

LINES 83-88

LINES 94-99

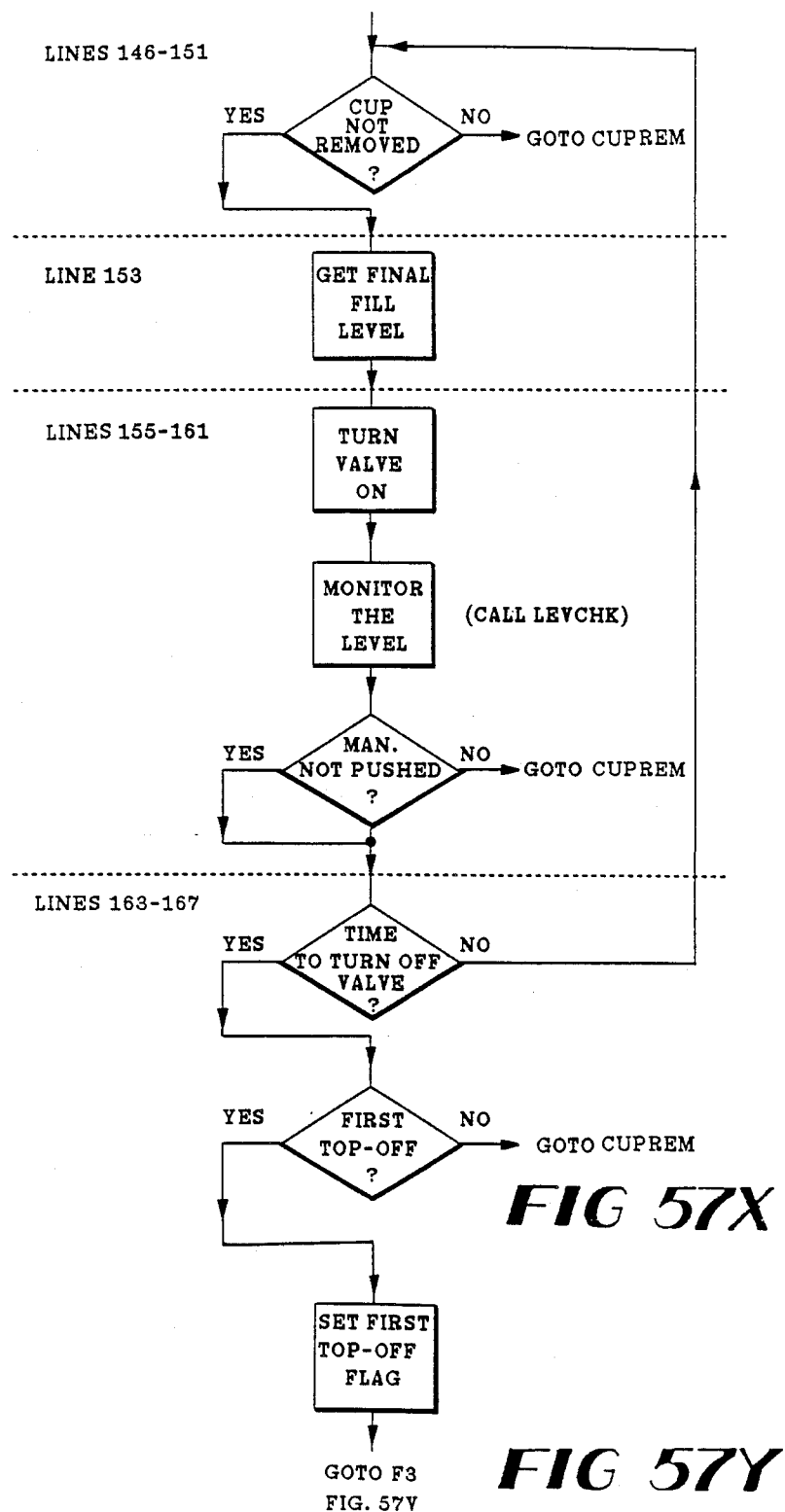

AUTOMATIC CONTROL SYSTEM FOR FILLING BEVERAGE CONTAINERS

This is a Divisional of co-pending application Ser. No. 048, 111 filed on May 8, 1987, which is a CIP of co-pending application Serial No. 684,215 filed on Dec. 20, 1984, now abandoned which is a CIP of abandoned application Serial No. 629,397, 7-10-84.

BACKGROUND OF THE INVENTION

1. Field of the Invention

This invention relates to beverage dispensing and more particularly to an ultrasonic system for automatically controlling the filling of beverage containers, such as with post-mix carbonated soft drinks.

2. Description of the Prior Art

Heretofore, attempts have been made to provide apparatus to automatically fill beverage containers, such as cups, in response to the proper positioning of a cup under a nozzle of a dispensing valve assembly of a beverage dispenser. Such apparatus used, for example, liquid level detectors such as either conductive or capacitive electrical probes to measure the liquid level.

It is also known to measure various liquid levels within containers using ultrasonic energy and associated circuitry.

SUMMARY OF THE INVENTION

An automatic system for controlling the filling of different sizes of beverage containers or cups, which cups may contain various quantities of ice, with a beverage which may or may not foam during filling. The system includes a transducer assembly and a control module, both preferably connected to a beverage dispenser valve assembly. The transducer assembly is mounted adjacent to the nozzle and uses a first crystal to transmit ultrasonic energy (ultrasound wave energy) and a second crystal to receive reflected ultrasonic energy. Both crystals have lenses for providing coupling of the beam between the crystal and the air, and for either producing a shaped beam (the transmitter crystal) or for receiving a beam from a defined area (the receiver crystal). The control module includes a microcomputer and associated circuitry for controlling the filling operation, including determining that a cup is present below the nozzle of the valve assembly, determining that the cup does not have too much ice, filling the cup, waiting for any foaming to subside, topping off the cup to completely fill it, and producing a signal to an operator that the filling is completed.

The control system can use a single pair of crystals (one transmitter and one receiver) or two pairs. In the embodiment using two pairs, one pair looks at just the grate and cup lip and the other pair looks at just the rising liquid level, and each pair employs a different beam shape.

The control system includes at least one ultrasonic transmitter, at least one separate ultrasonic receiver, and control circuit means for generating signals corresponding to the travel time of the ultrasonic energy and for using such signals to automatically detect the presence of a cup and to fill it.

It is an object of the present invention to provide a system to automatically control the filling of beverage cups.

It is another object to provide a bi-static ultrasonic system to automatically fill beverage cups.

It is a further object to provide such a system that employs signals received from the grate, the cup lip, and the liquid level in the cup.

It is another object to provide a high resolution bi-static ultrasonic filling system in which the container and liquid level are in air and are very close to the crystals.

It is another object to provide such an ultrasonic system in which the receiver gain is maintained at a constant gain during each transmission period for the separate receiver crystal, but the detection level or scheme is changed; in particular the detection scheme is turned down very low until the transmitted beam is about one-half inch below the nozzle, and then the detection scheme is turned on at a constant ramp to compensate for signal loss.

It is still another object to lens the crystals using ABS or polycarbonate plastic.

It is another object of the present invention to provide an ultrasonic system for automatically controlling the filling of a beverage cup, which system: (1) uses a frequency of about 400 KHz, (2) uses a bi-static transducer system, (3) looks at the leading edge of the reflected ultrasonic energy pulses rather than at the trailing edge, (4) masks the cup lip during certain routines, (5) lenses the transducer, (6) uses a lens material that both shapes the ultrasonic beam and also couples it to the air, (7) uses a timed fill for the initial fill because of cup vibration and therefore lip vibration, (8) uses a low gain to see the liquid level (which is a better reflector than the lip) but not the lip during certain parts of the routine, (9) looks above the lip (the LGRATE subroutine) and shut off the filling if a signal above the lip (showing overfilling) is received, and (10) measures the filling time and shuts off the filling if the fill time exceeds a maximum time period (to prevent continued filling of a cup with a hole in it, for example).

It is another object of the present invention to provide a system for use on adjacent beverage dispensing valve assemblies to automatically control the filling of beverage cups from such valve assemblies without interference therebetween.

It is a still further object of the present invention to allow placement of ultrasonically controlled valve assemblies in close proximity to each other without interference therebetween.

It is a further object of this invention to prevent unwanted interference from adjacent ultrasonically controlled valve assemblies by synchronizing the operation of adjacent valve assemblies to different half cycles of the a.c. power supply.

It is another object of this invention to use four crystals in an automatic, ultrasonic, filling system, divided into pairs, each having a separate transmitter and receiver.

It is a further object of this invention to employ channelizer tubes to help minimize side lobes.

It is another object of this invention to provide two separate transmitter circuits, one for each of two separate transmitter crystals, and to also provide different transmit periods therefor.

It is a further object of this invention to provide an automatic ultrasonic control system for a beverage dispenser using two transmitter-receiver pairs, and to use different beam shapes with each pair, and to have each pair look at different areas.

BRIEF DESCRIPTION OF THE DRAWINGS

The present invention will be more fully understood from the detailed description below when read in connection with the accompanying drawings wherein like reference numerals refer to like elements and wherein:

FIGS. 4A and 4B are a master block diagram of the automatic control system of one embodiment of the present invention;

FIG. 6 is a schematic circuit diagram of part of the receiver subassembly including the receiver, the receiver front end, and the D/A gain reduction of FIG. 4;

FIG. 7 is a schematic circuit diagram of another part of the receiver subassembly including the detector threshold comparator and the time varying detection generator of FIG. 4;

FIGS. 14–26 are flow charts illustrating the main routine and the sub-routines of the software for operating the microcomputer 66 in the block diagram of FIG. 4;

FIGS. 31A and 31B are a master block diagram of the automatic control system of the preferred embodiment of the present invention;

FIGS. 40–46 are flow charts illustrating the main routine and the subroutines of the software for operating the microcomputer in the block diagram of FIG. 31;

FIG. 55 is an electric schematic of the digital multiplexer watch dog timer shown in FIG. 50;

FIGS. 58A–58D are edge, front, side and rear views respectively of the rear lenses; and FIGS. 59A–59D are edge, front, side and rear views respectively of the front lenses.

DETAILED DESCRIPTION OF THE PREFERRED EMBODIMENTS

With reference now to the drawings, a first embodiment of the present invention will first be described with reference to FIGS. 1–26, and then a second embodiment will be described with reference to FIGS. 27–46.

Figure 1:
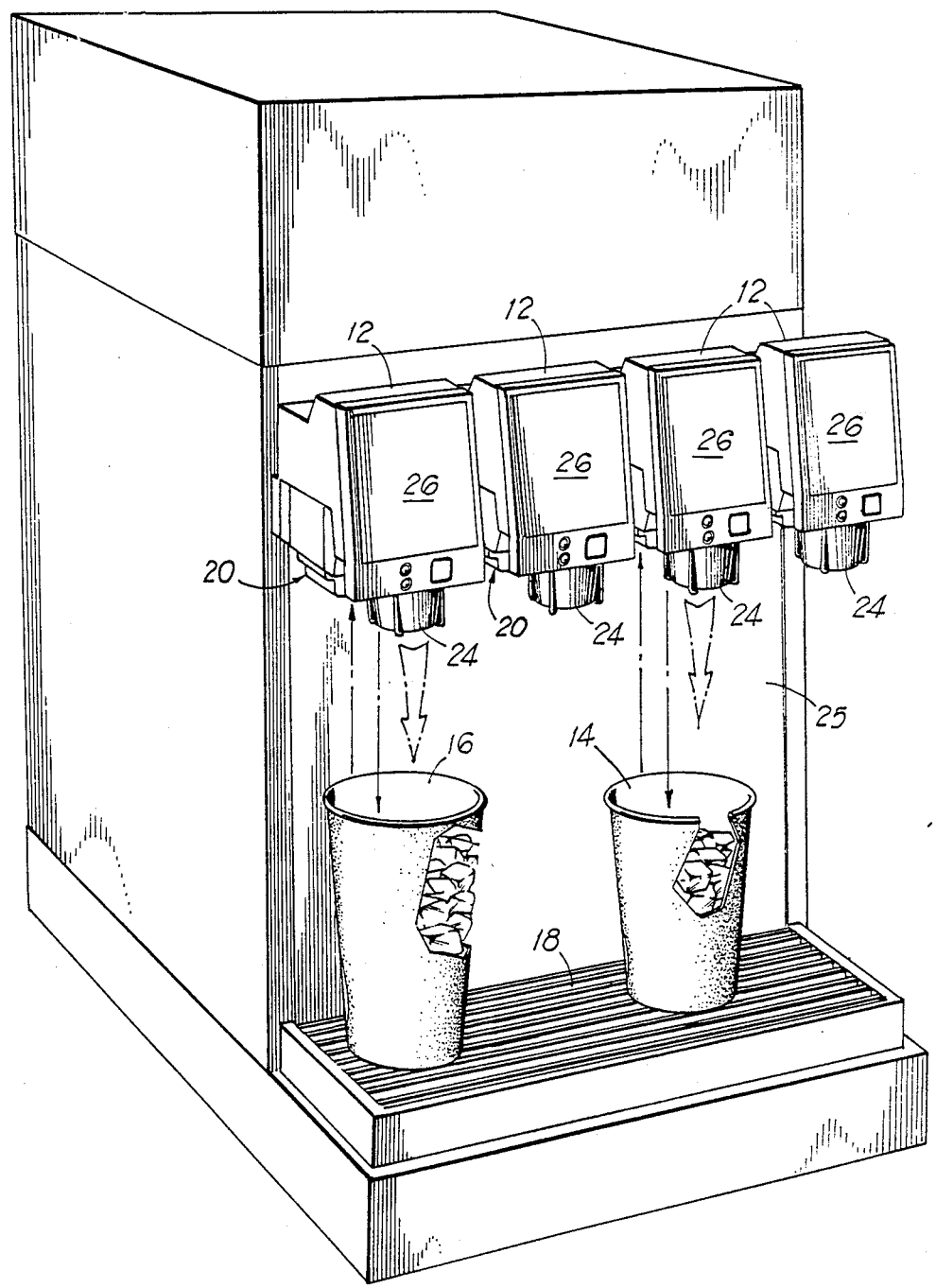
FIG. 1 is a perspective view of a beverage dispenser having four valve assemblies each using the automatic filling system of the present invention.

FIG. 1 shows a post-mix beverage dispenser 10 having four identical beverage dispensing valve assemblies 12, each of which has been modified to include the automatic filling apparatus of one embodiment of the present invention in place of the usual cup actuated mechanical lever that normally extends below each valve assembly 12 for operating the two solenoids of the valve assembly (one being for syrup and one for carbonated water). Each of the valve assemblies 12 is used for dispensing soft drink beverages (usually a different beverage from each valve assembly) into various sizes of cups 14 and 16, supported on a cup supporting surface or grate 18. One particular beverage dispenser 10 and one particular valve assembly 12 is shown, however, any valve assemblies and any beverage dispenser can be used. Beverage dispensers and beverage dispensing valve assemblies, such as those shown at 10 and 12 respectively in FIG. 1, are well-known and thus no detailed description thereof is needed.

Figure 2:
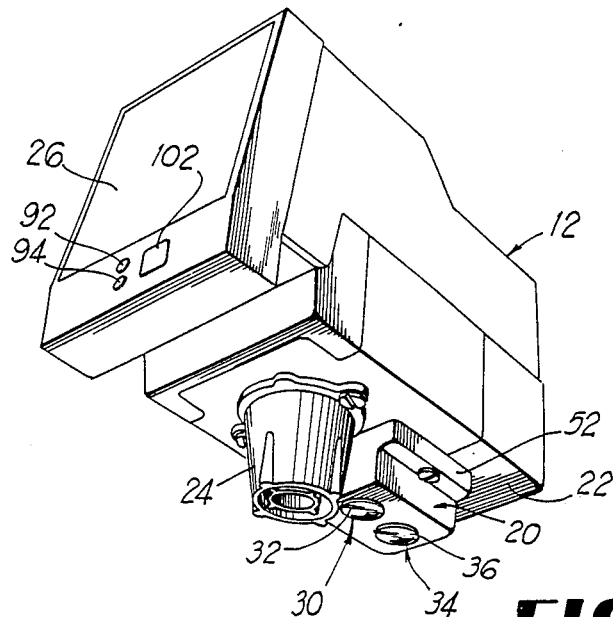
FIG. 2 is a perspective view of one of the valve assemblies of FIG. 1.

With reference to FIGS. 1 and 2, the automatic filling apparatus of the first embodiment of the present invention includes a transducer assembly 20 located on the bottom surface 22 of the valve assembly 12 and behind the nozzle 24, and a control module 26 attached to the front of the valve assembly 12.

Figure 3:
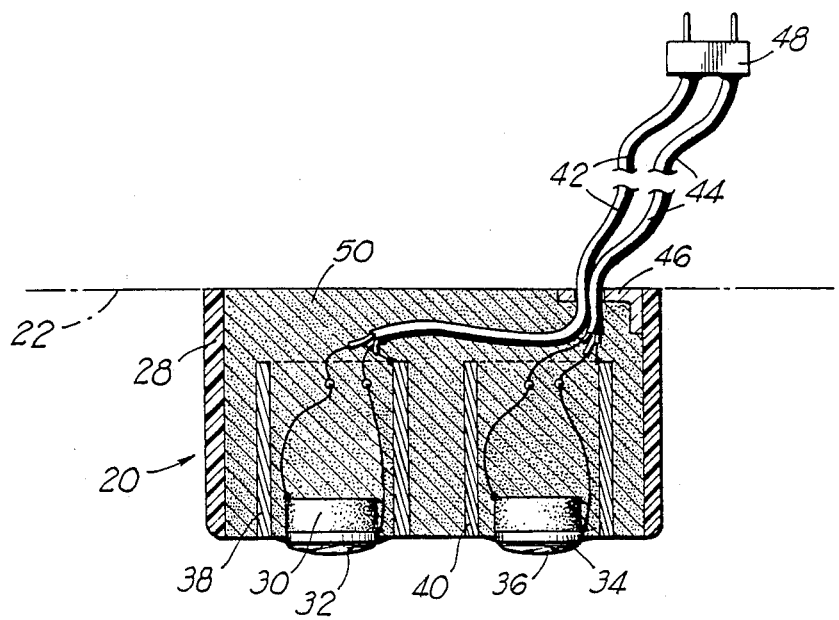
FIG. 3 is a cross-sectional side view of the transducer assembly shown in FIG. 2.
Figure 5:
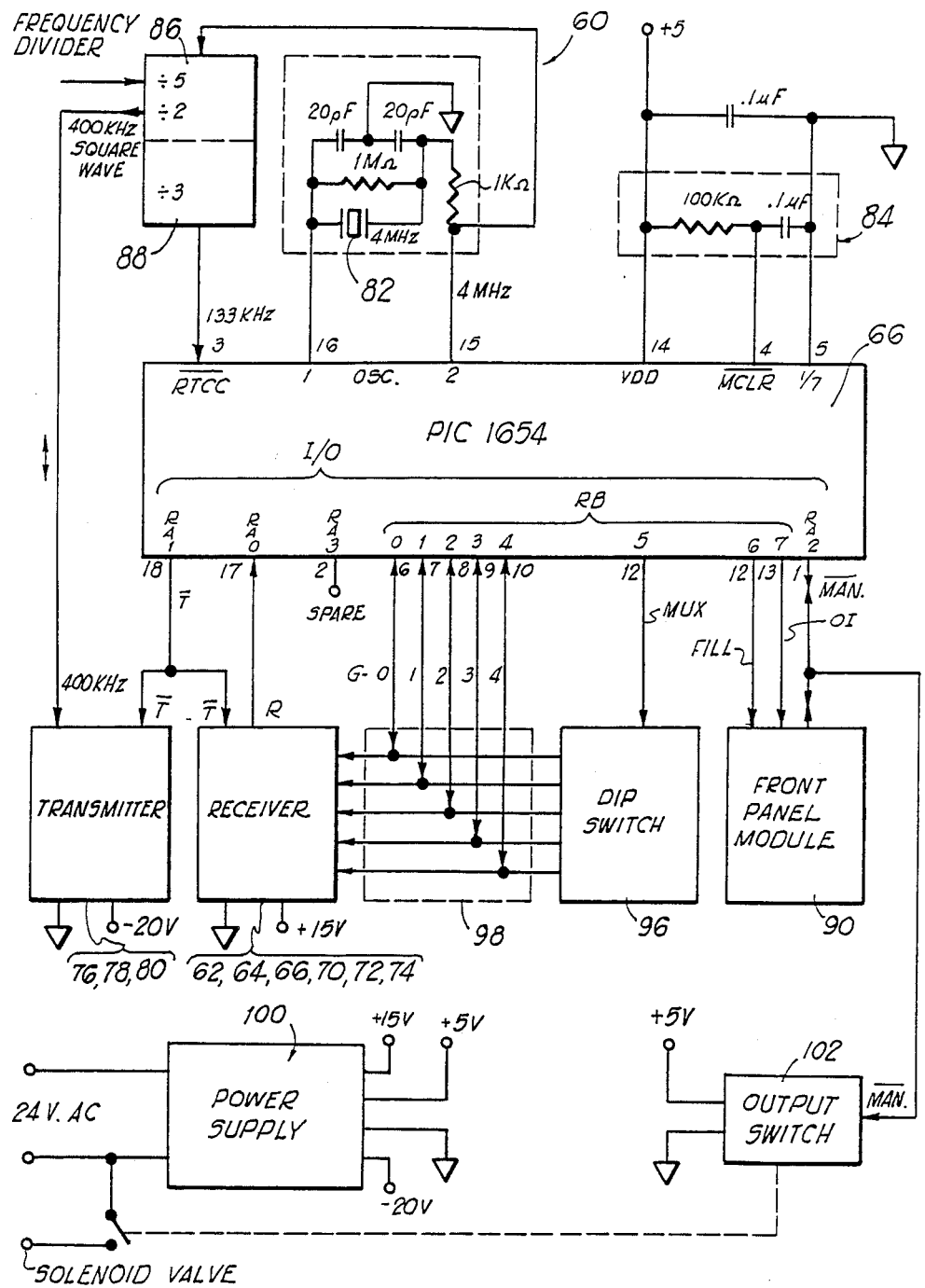
FIG. 5 is a microprocessor block diagram.
Figure 8:
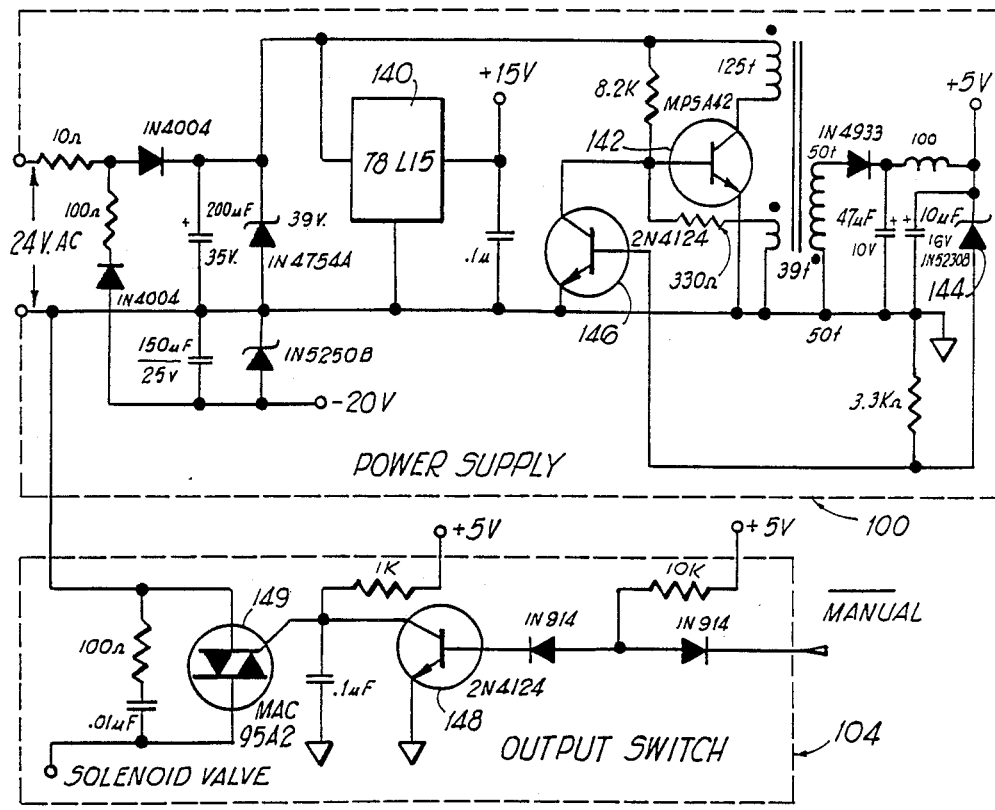
FIG. 8 is a schematic circuit diagram of the power supply and output switch of FIG. 4.
Figure 9:
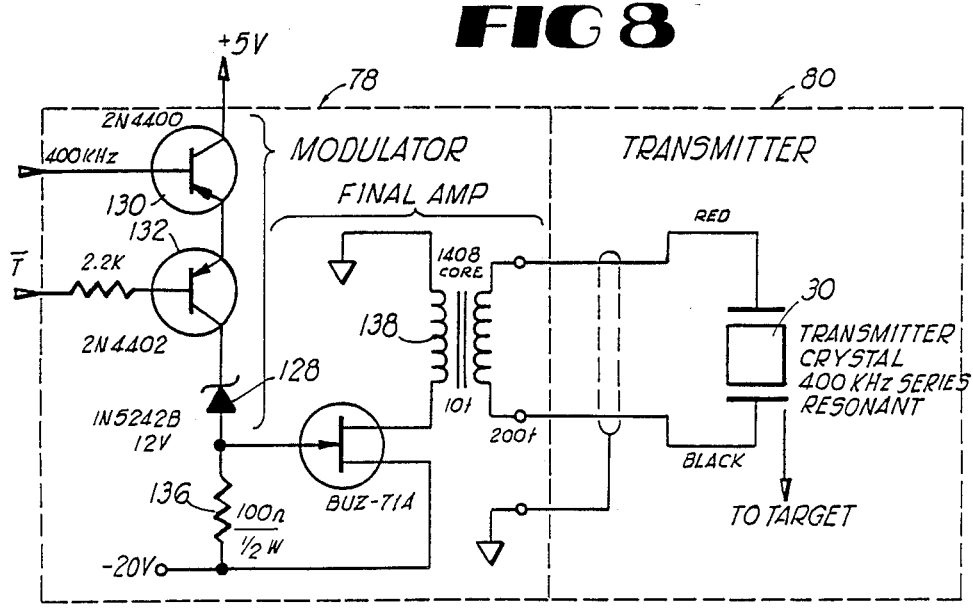
FIG. 9 is a schematic circuit diagram of the transmitter subsystem of FIG. 4.
Figure 10:
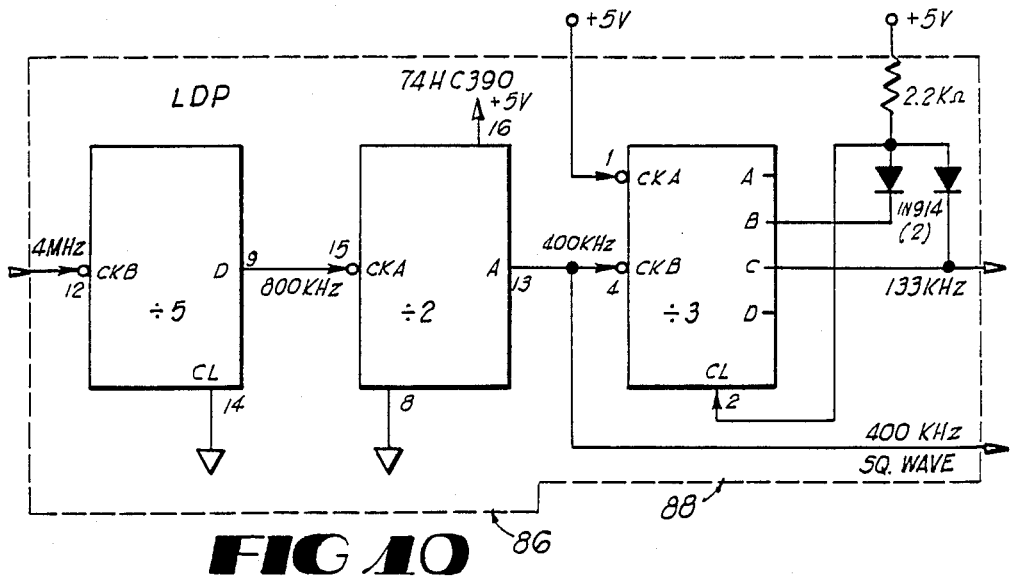
FIG. 10 is a schematic circuit diagram of the frequency divider of FIG. 4.

The transducer assembly 20 is best shown in FIG. 3 and includes a plastic housing 28 in which is contained a transmitter crystal 30 having a plastic lens 32, and a receiver crystal 34 having a plastic lens 36. The transmitter and receiver crystals are located inside of brass tubes 38 and 40, respectively. A pair of shielded cables 42 and 44 are connected by a clamp 46 to the housing 28. Each cable has a shield wire connected to a respective one of the brass tubes and also a pair of wires connected to a respective one of the crystals at opposite locations thereon, as shown in FIG. 3. Each of the crystals has a metal plating on each of its upper and lower surfaces. The wire connections to the crystals include a pair of 34 gauge wires soldered one each to one of the metal platings on the crystal and then in turn soldered to two 22 gauge wires in the cables 42 and 44. The cables 42 and 44 are about six inches long and terminate in a single MTA connector 48, for connection to the control module 26. All of the space within the housing 28 is filled with urethane foam 50.

The crystals 30 and 34 are preferably PZT-4 ceramic crystals (a generic trade designation for a particular crystal material), which are a combination of lead titanate and lead zirconate. Each of the crystals 30 and 34 is attached to its respective lens 32 and 36 preferably by using about ½ drop of glue such as that sold under the trademark Eastman 910. The plastic lens is preferably made of ABS, polycarbonate, acrylic or polystyrene plastic.

The plastic housing 28 has a pair of flanges (flange 52 is shown in FIG. 2) each having a screw hole for attaching the transducer assembly 20 to the valve assembly 12.

The brass tubes 38 and 40 have the functions of electrically shielding or isolating the crystals, of sound isolating the crystals, and of mechanically holding the crystals (along with the urethane foam which is poured into a mold or fixture used to hold all of the elements of the assembly 20 in place, and which is then allowed to harden).

The selection of the most desirable frequency to use was made as follows. Regarding the upper limit, the attenuation of ultrasonic sound in the air becomes too great to use for more than a few inches at above approximately 600 KHz. In addition, it was desired to avoid the 455 KHz broadcast band IF frequency, and the 550 KHz to 1.65 MHz AM broadcast band. By staying away from FCC assigned frequencies, and by using a transmission that is not too strong in relation to radio stations, interference on radio receivers that are operated in close proximity to the automatic control system of the present invention is precluded.

Regarding the lower limit, because the beam pattern is constricted by the close proximity of other valve assemblies, a 2 inch spread at 14 inches at the 3 db point was assumed for the beam pattern. This 2 inch spread yields n angle of approximately 8 degrees total. Due to the spacing considerations, a ½ inch diameter crystal was selected. A 400 KHz frequency was selected as the preferred frequency. Other frequencies in the range of 200 KHz to 450 KHz could alternatively be used Regarding the beam shape, at 14 inches the total maximum beam pattern needs to be less than 3 inches wide at the limits of detectability (−40 db) in the side to side direction, and approximately 3 inches front to back at the −3 db points. The gain at these points would need to be as flat as reasonable. The crystal pattern was chosen empirically as the one giving the best level gain from front to back with the crystals 30 and 34 aligned from front to back between the nozzle 24 and the splash plate 25. The resulting overall gain pattern with a 3 db gain at 12 inches had a resulting spread sideways of 3.5 degrees, and a resulting spread front to rear of 12 degrees.

To achieve the desired beam pattern, it was necessary to lens the crystals. A 2 inch concave radius produced the 8 degrees to 3.5 degrees narrowing from side to side, and a 4 inch convex radius produced the 8 degrees to 12 degrees spreading from front to rear which formed a fan shaped beam pattern with an elongated footprint having a width of approximately ¾ inch and having a length of about 2½ inches at 3 db gain and 12 inches away from the transducer assembly 20. This beam shape footprint has its long dimension extending front to back relative to the dispenser.

Coupling from the crystals 30 and 34 to the air was calculated as follows:

Characteristic impedance of PZT-4 is equal to $66 \times 10E6$ rayls (E=exponent throughout the following description).

$$Tp = \frac{(N2/N1)}{(N2/N1) + 1} \times Pc$$

N2=The characteristic impedance of air.
N1=The characteristic impedance of PZT-4.
Pc=Power output of crystal.
Tp=$12.6 \times 10E-6$ for 1 watt in, or 0.00126% goes to the air.

If a third material is introduced between the air and the material we get the following equation $$Tp = \frac{4(N3/N1)}{((N3/N1) + 1)} \times \frac{(N2/N3)}{((N2/N3) + 1)} \times Pc =$$

$$\frac{4(N2/N1)}{((N2/N1) + 1) + (N2/N3) + (N3/N1)} \times Pc$$

Most materials of interest for the third material have characteristic impedances between $0.1 \times 10E6$ to $10 \times 10E6$ rayls.
For a $0.1 \times 10E6$, Tp=$25 \times 10E-6$
For $10 \times 10E6$, Tp=$22 \times 10E-6$ Thus, for any lossless material used as a coupling to air with a characteristic impedance between $0.1 \times 10E6$ to $10 \times 10E6$ rayls, the resulting input power is at least doubled and the energy transmitted to the air varies by only 10%. The preferred lens material is one of the plastics such as acrylic or ABS. The lens should:
(1) be a plastic for production,
(2) have a ½" diameter and be approximately 0.08 thick,
(3) have a concave radius of 2" in one axis and a convex radius of 4" in the other axis, and
(4) be cemented to the crystal face with about ½ drop of glue (preferably that sold under the trademark Eastman 910, or equivalent).

Regarding the lens mount, to diminish acoustic coupling between the receiver and transmitter, the lenses are mounted in polyurethane foam. A brass tube surrounds each crystal and its inner foam mount which provides electrical shielding and is soldered to the shield of the cable wiring to the crystals. The crystals are left floating, i.e., both electrodes are at a potential not referenced to ground. This gives greater electrical isolation in the receiver since it does not pick up ground referenced noise. The brass tubes are held in place by the polyurethane foam to the desired package shape. The lenses protrude from the bottom surface foam package.

Regarding the crystal shape and material, the transmitter crystal is preferably ¼" OD×0.200" for a series resonance of 400 KHz. PZT-4 material was chosen for the crystals 30 and 34 as the best compromise in strength, efficiency, and ease of workability. The receiver crystal is preferably ¼ OD×0.190" for a parallel resonance of 400 KHz, and is also made of PZT-4 material.

Regarding the electrical wiring, a twisted shielded pair of 22 gauge stranded wire is used. The wire shielding is soldered to the brass tubes 38 and 40. The brass tubes are isolated from each other electrically. A pair of 34 gauge solid wires is soldered across the metal plated crystal faces and is then soldered to the 22 gauge lead wires. All wiring is foamed in place. The black wire of the twisted pair is attached to the outside crystal face which is marked with a small dot.

The control module 26 houses the control circuit board to which the crystals 30 and 34 are connected by the cables 42 and 44 and the connector 48. FIGS. 4A and 4B together provide a master block diagram of the control circuit 60. The control circuit will now be described with reference to FIGS. 4-12.

The receiver transducer 62 (FIGS. 4, 5, and 6) is a 400 Khz, ¼ inch diameter parallel resonant piezo-electric crystal 34 made of PZT-4 material. The crystal is coupled to the air by means of a plastic lens 36 which is shaped to receive the beam pattern. The transducer assembly 20 incorporates a brass tube 40 that is ⅜ inch in diameter and is used for electrical isolation. The crystal 34 is mounted such that it is centered in the tube with the lens 36 exposed at one end of the tube. The tube assembly is foamed with polyurethane for acoustic isolation.

The receiver section 64 (FIGS. 4, 5 and 6) has a total gain of 96 db and is comprised of two protective diodes 110 and 112 and two MC1350P IF amplifiers 114 and 116 that are interconnected through a tuned transformer 118 with another tuned transformer 120 to interconnect the second amplifier 116 to the detector 68. These amplifiers 114 and 116 have provisions for gain control from Pin 5 and are used in this application by the microcomputer 66.

The detector circuit 68 (FIGS. 4, 5 and 7) changes the 400 Khz from the receiver 64 to a DC Analog signal. This detector is special in that it can not only detect the envelope of the pulse but since it is a DC coupled detector, it has no offset shift due to pulse width variations. By having a balanced detector system, the temperature drift is very low.

The receiver gain reduction 70 (FIGS. 4, 5, and 6) is comprised of five resistors that form a binary weighted current sinking "D to A" converter that is driven by the microcomputer 66, which allows for thirty-two stages of gain level control.

The threshold comparator 72 (FIGS. 4, 5, and 7) is comprised of an LM393N comparator 122 and is used in conjunction with the time varying detection to convert the analog receiver signal to a digital signal which is then fed to the microcomputer 66. Within this circuit is a means for adjusting the slope of the time varying detector using a 100 K potentiometer and a means of adjusting the threshold detector using a 500 ohm potentiometer 125.

The time varying detection generator 74 (FIGS. 4, 5, and 7) uses the gate signal that the microcomputer 66 sends to the transmitter, nd charges a 15 Nanofarad capacitor 124 to two volts, which sets the peak level of the time varying detector wave form. This circuit is comprised of 2N4126 switching transistor 126 and the power supply to support that circuit.

The modulator 76 (FIGS. 4, 5, and 9) is comprised of a 12 volt Zener diode 128 and two transistors 130 and 132 that perform an (Anding) function for the transmitter gate signal (T) and the 400 KHz signal from the oscillator. This (Anded) signal is then level shifted through the 12 volt Zener diode 128 and the 2N4402 transistor 132 to the gate of the final amplifier 78.

The final amplifier 78 (FIGS. 4, 5, and 9) is comprised of a BUZ-71A MOS-FET 134, a resistor 136 and a transformer 138. The resistor discharges the gate source capacitor of the MOS-FET 134. The MOS-FET 134 switches the output transformer 138 to the minus 20 volt supply in response to the gate drive signal. The transformer 138 steps the voltage up to the transmitting crystal 30 to approximately 2000 volts.

The transmit transducer 80 (FIGS. 4, 5, and 9) is comprised of a 400 KHz ¼ inch diameter series resonant piezo-electric crystal 30 made of PZT-4 material much the same as the receiver crystal 34 with the exception of the thickness. The crystal 30 is coupled to the air by means of a plastic lens 32 which is also shaped to form the beam pattern. The assembly of the transmit transducer 80 is exactly the same as for the receiver as described above.

The microcomputer 66 (FIGS. 4 and 5) is a General Instruments Pic-1654 and contains the intelligence and control functions of the entire system. It communicates to the rest of the system through twelve I/0 pins. It also contains the oscillator circuit, the master clear circuit, and the real time clock counter input.

The crystal 82 (FIGS. 4 and 5) and components of the 4 MHz crystal comprises passive components that form the feedback network for the oscillator in the Pic-1654.

The power-on reset circuit 84 (FIGS. 4 and 5) forms a 10 millisecond reset pulse to the microcomputer 66 at POWER-ON that allows the 4 MHz oscillator crystal 82 to start and the microcomputer 66 to become initialized.

A divide by ten counter 86 (FIGS. 4, 5, and 10) converts the 4 MHz computer clock to a 400 KHz square wave signal to operate the transmitter.

The divide by three counter 88 (FIGS. 4, 5 and 10) converts the 400 KHz signal to a 133 KHz signal that is applied to the microcomputer 66 as the real time clock counter input. Number thirteen and number fourteen are encompassed within the same IC (74HC390) divider chip which has a divide by ten and a divide by three circuit.

The front panel module 90 (FIGS. 4, 5, and 12) consists of two LED indicators 92 and 94. One is an "Over-Ice/Cup Remove" (FIGS. 4, 5, and 12) red indicator 92 and the other is a green "Fill" LED 94, indicating that the cup can be filled or is being filled. This indicator 94 remains "on" steady when a cup is okay until filling starts. In the event that there is too much ice in the cup, or that the cup is not recognized as a cup, the red indicator light 92 will flash on and off.

Figures 11A, 11B:
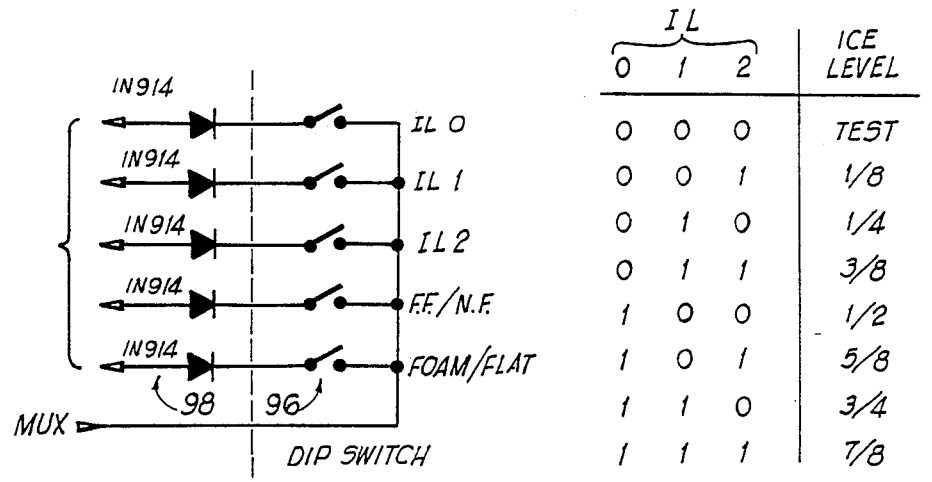
Fig. 11A is a schematic circuit diagram of the dip switch of FIG. 4.
Fig. 11B is a table showing how to set the switches for a desired ice level.
Figure 12:
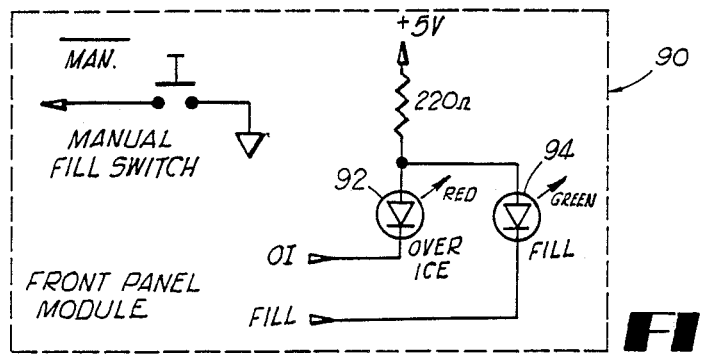
FIG. 12 is a schematic circuit diagram of the front panel module with the manual fill switch and the over-ice and filling indicator lights.

There is a programming dip switch 96 (FIGS. 4, 5, and 11A) comprising five individual switches accessible by removing a cover (not shown) on the lower rear surface of the control module 26. One switch is used to select between a normal flow or a fast flow valve assembly, depending upon which type of valve assembly the automatic control system is being attached to. Another switch is used for selecting a foamy or flat product such as water. The other three switches are used for selecting ice level or test position. The test position is used for alignment of the receiver during manufacturing and has no field use. The binary output of the three ice level switches allows for seven ice level selections from ⅛ cup to ⅞ths cup, as illustrated in Fig. 11B.

The multiplexer circuit 98 (FIGS. 4 and 5) allows the microcomputer 66 to read either the dip switches or to set the gain of the receiver as necessary. It is comprised of five signal diodes.

The power supply 100 (FIGS. 4, 5, and 8) uses 24 volts AC from the 50 VAC transformer (not shown) in the dispenser 10. The present control system consumes less than 2 volt-amps at 24 volts AC. The 24 volts AC is rectified and filtered to form a minus 20 volt DC supply and a plus 25 volt DC supply. The minus 20 volt supply is regulated with a Zener diode and supplies power to the transmitter. The plus 25 volt supply is unregulated but has a 39 volt Zener diode used as surge protection. The 25 volt DC supply is regulated down to 15 volts for the receiver subsystem by a 78L15 three terminal regulator 140. An MPS-A42 transistor 142 is used as a fly-back oscillator to provide the plus five volts needed to operate the computer circuitry. The 4.3 volt Zener diode 144 connected between the plus five volt supply and the base of a 2N4124 transistor 146 serve to regulate the fly-back oscillator.

The output switch 104 (FIGS. 4, 5, and 8) for the two solenoids of the valve assembly 12 is operated from either the microcomputer 66 or the manual push button 102 on the front of the control module 26. The resistor diode network couples the microcomputer 66 and the manual switch 102 to the base of a 2N4124 transistor 148 which then turns the output triac 149 on or off, which then turns the two solenoids in the valve assembly 12 on or off.

Figure 13:
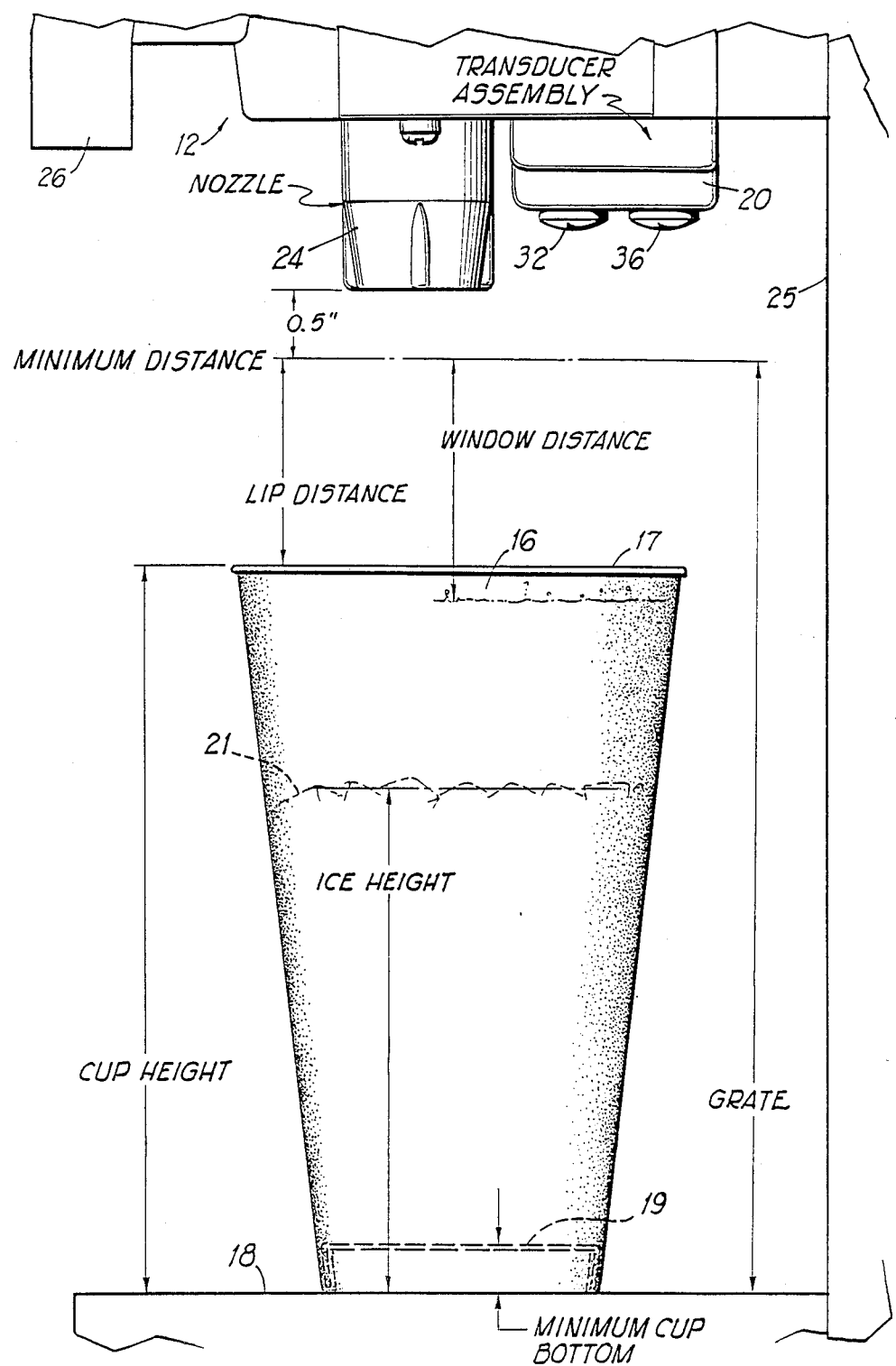
FIG. 13 is an elevational view showing a nozzle, the transducer assembly, the grate, and a cup.
Figure 14:
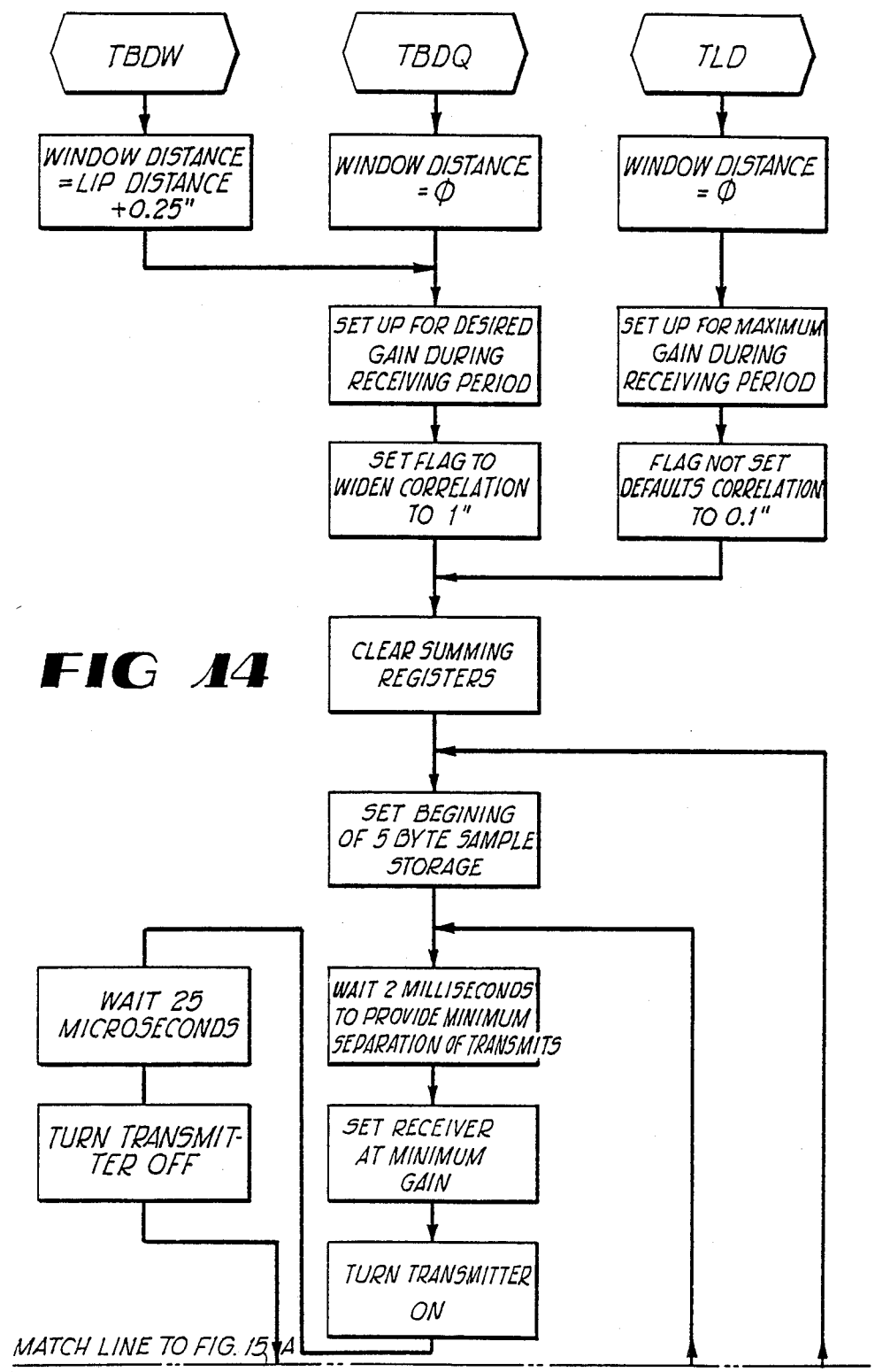
Figure 15A:
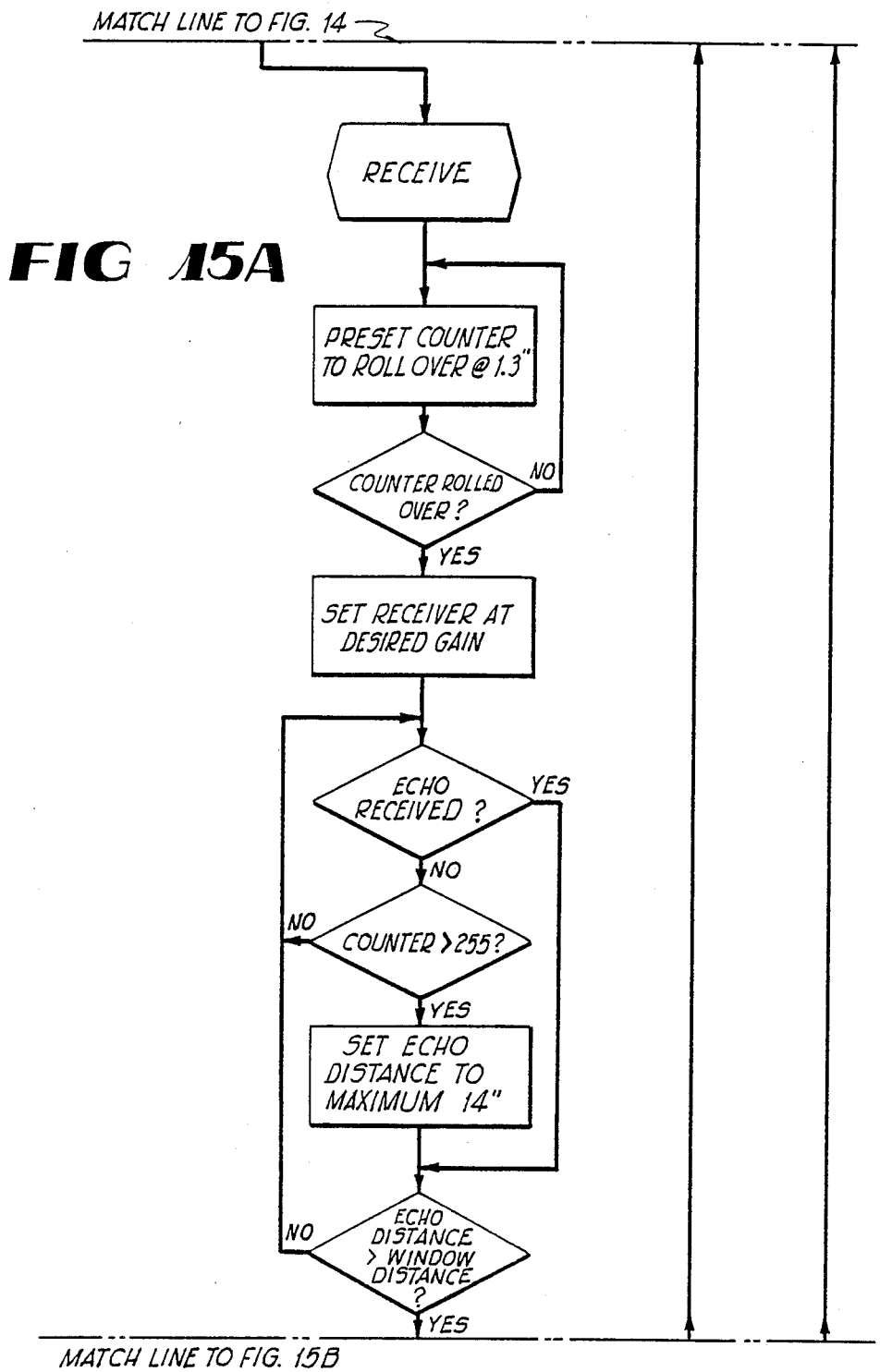
Figure 15C:
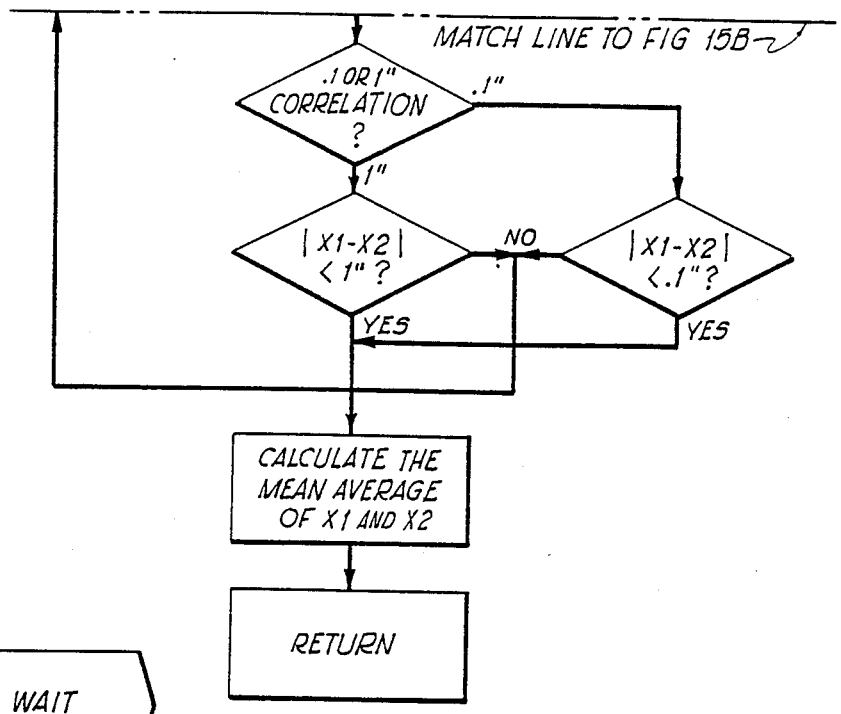
Figure 16:
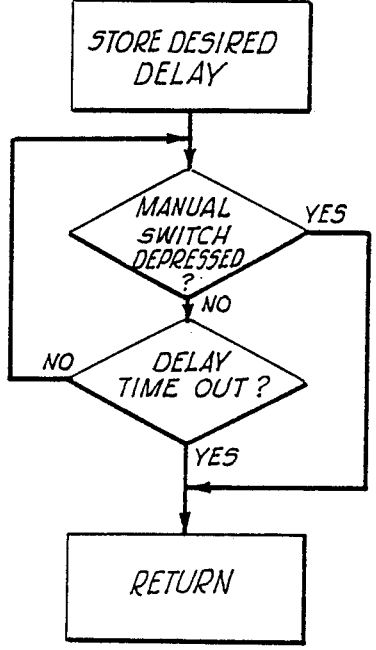
Figure 17:
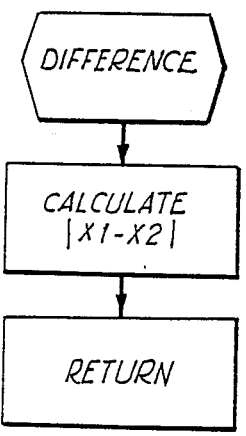
Figure 18:
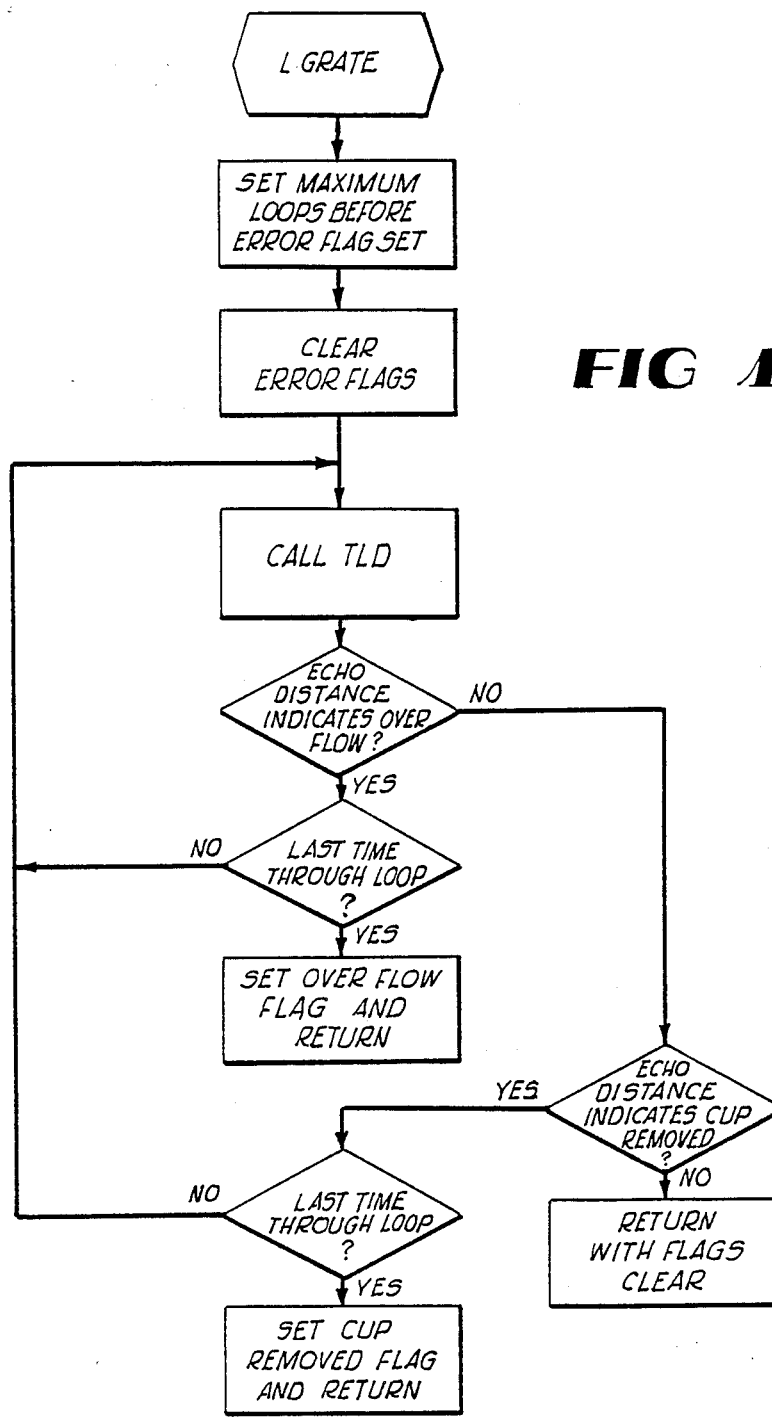
Figure 19:
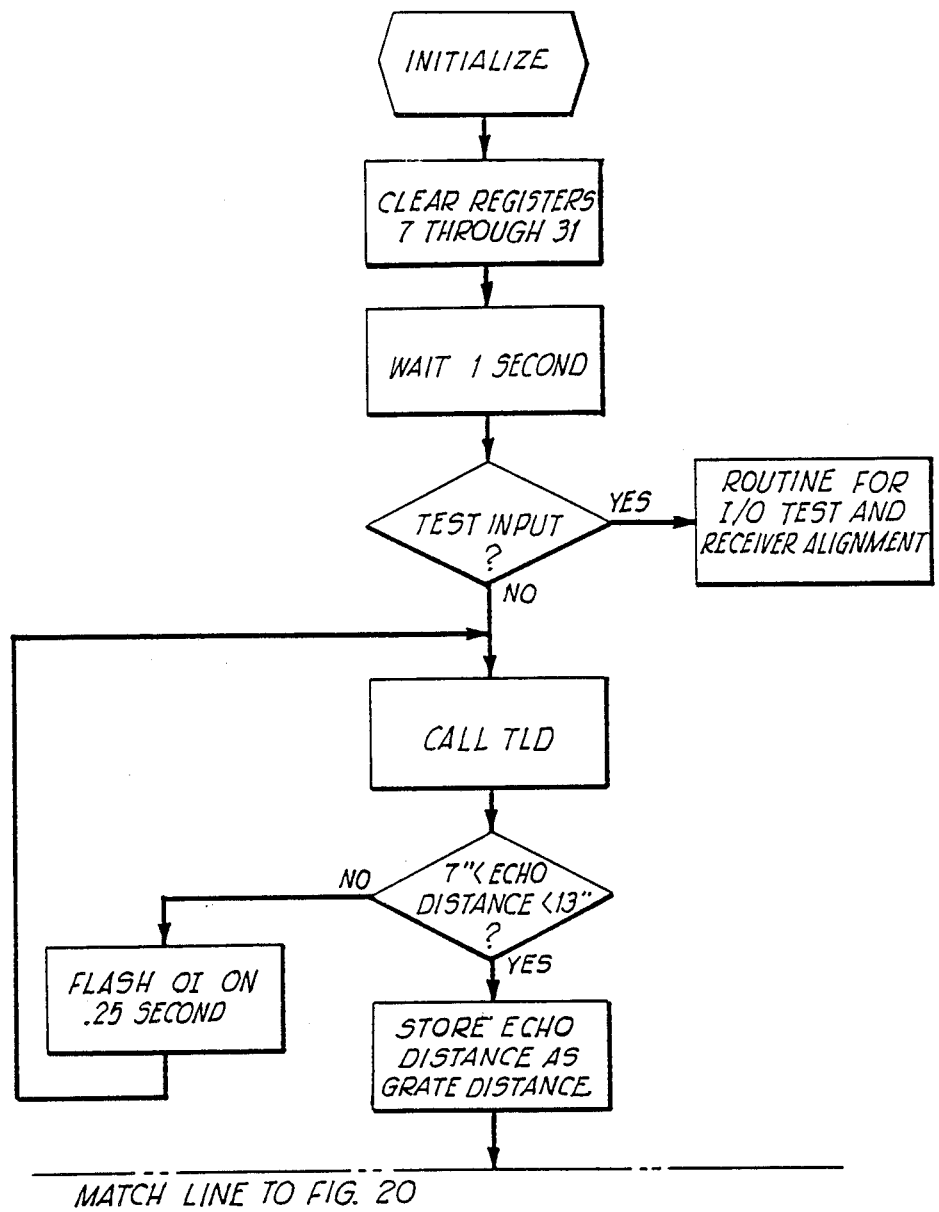
Figure 20B:
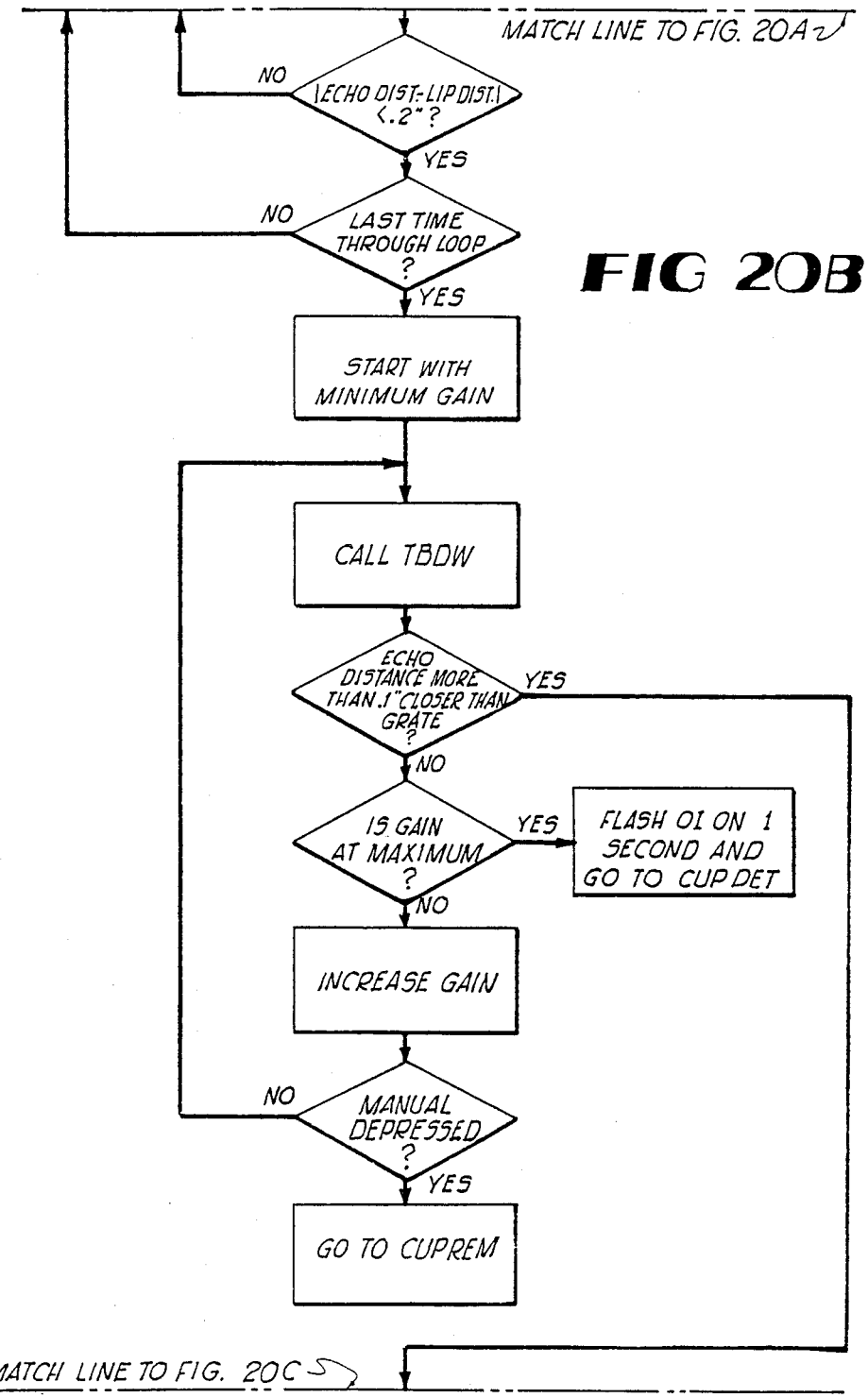
Figure 20C:
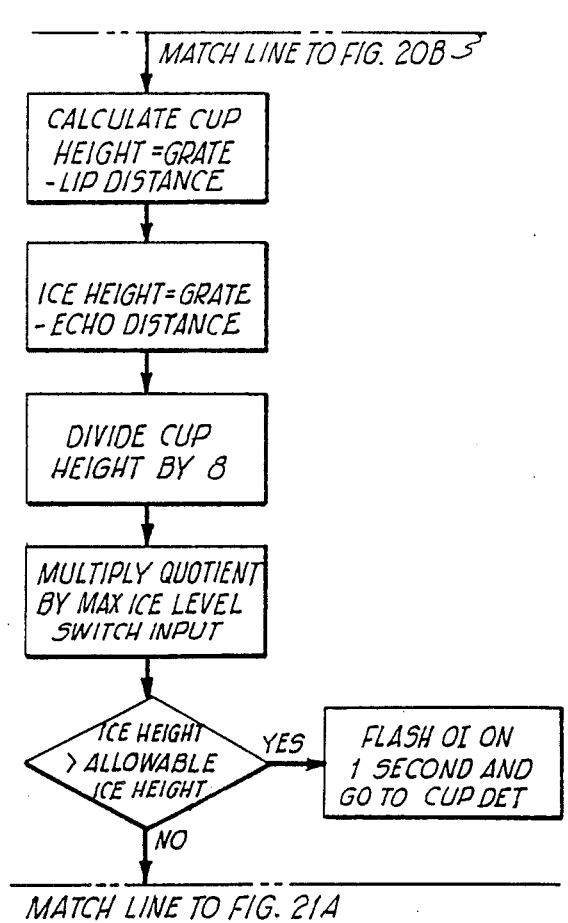
Figure 21A:
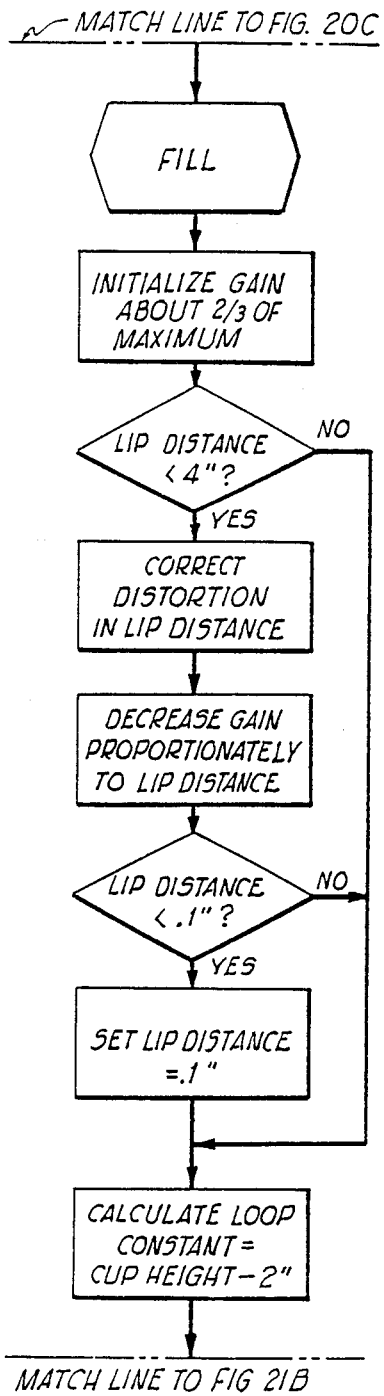
Figure 21B:
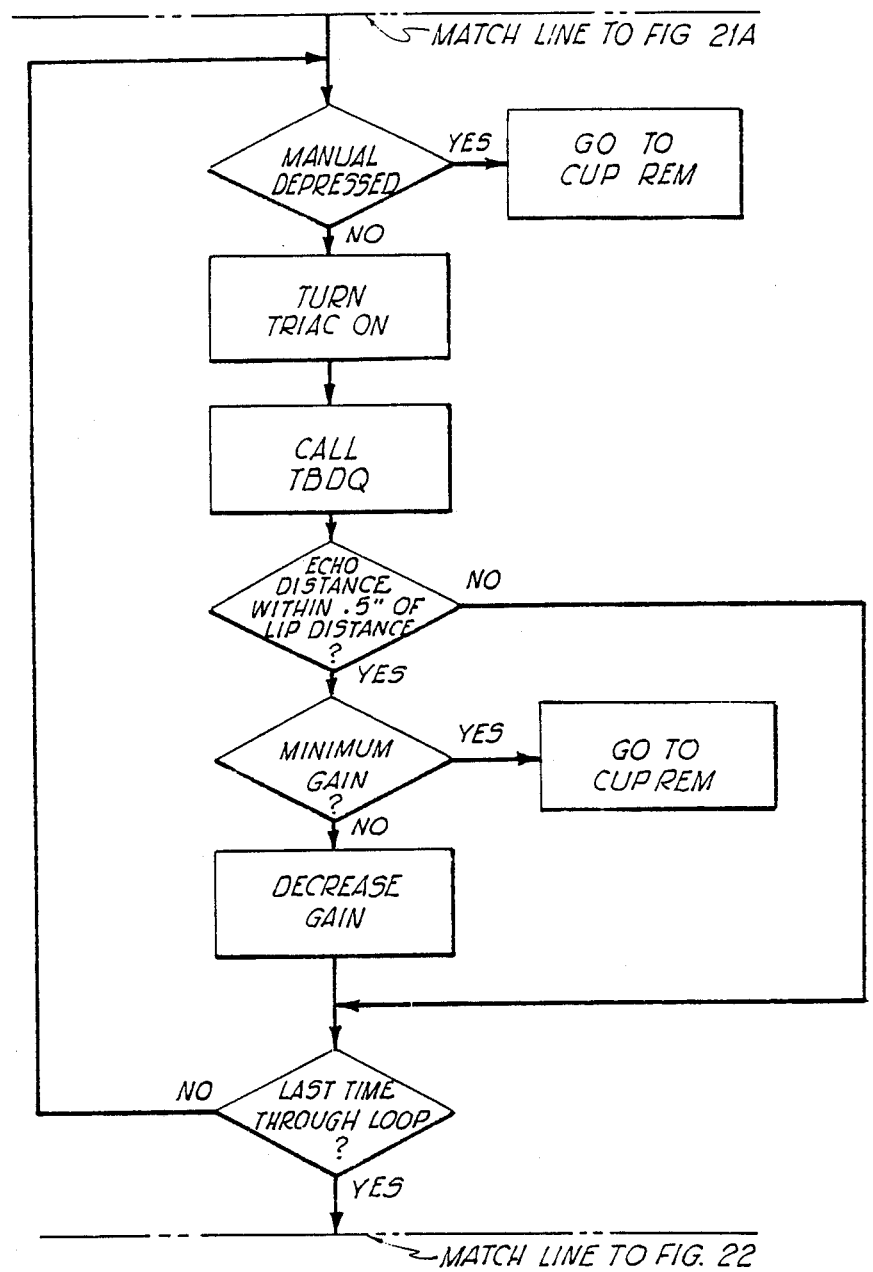
Figure 23:
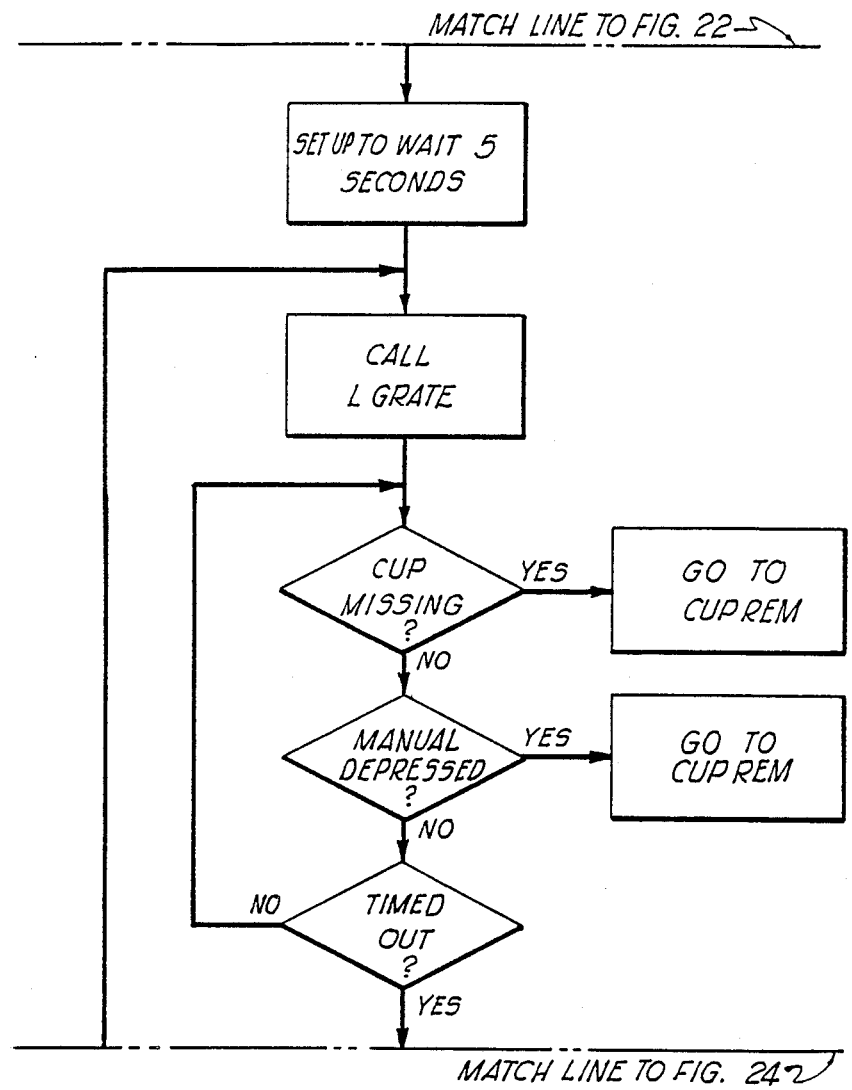
Figure 24:
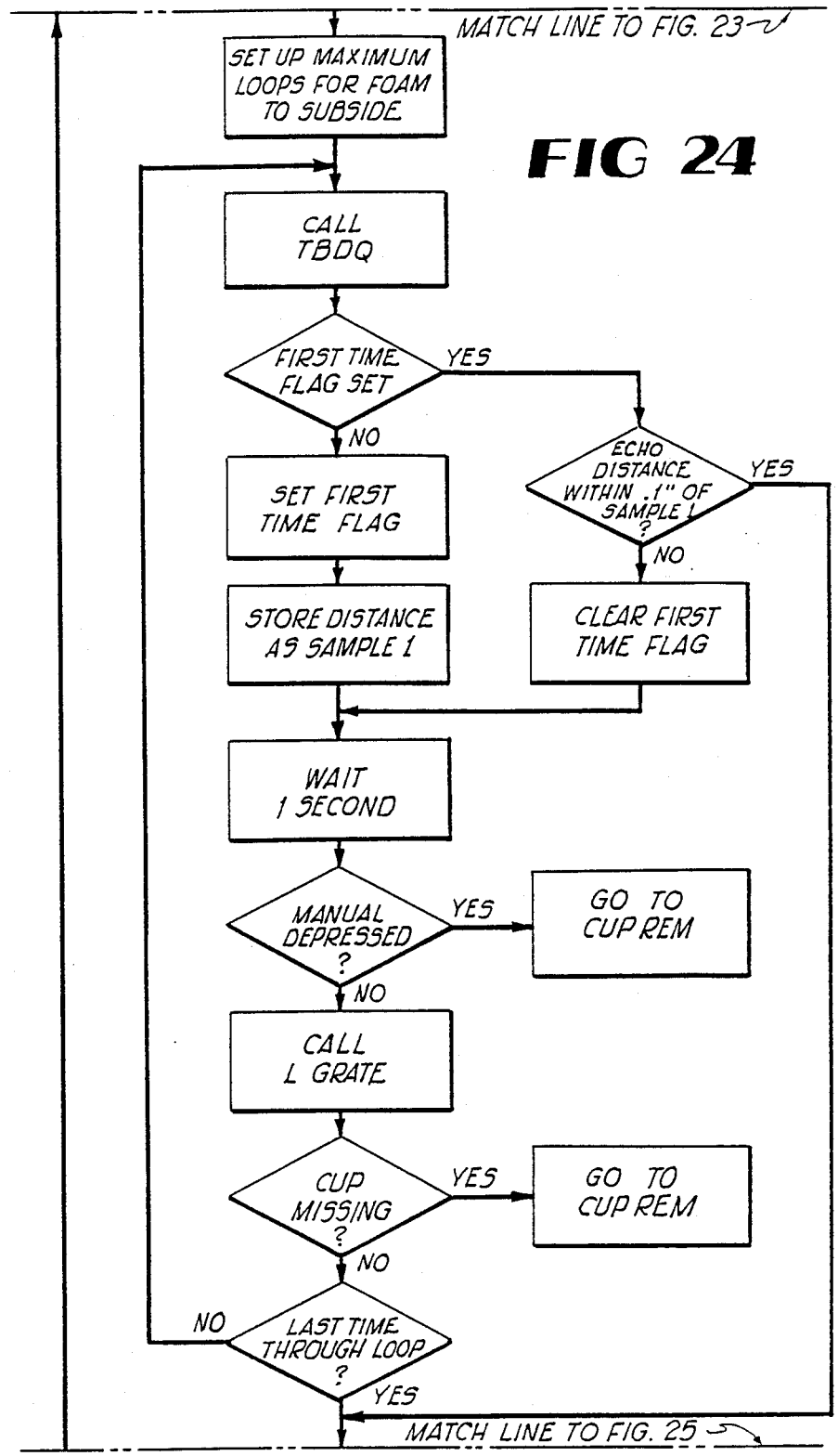
Figure 25:
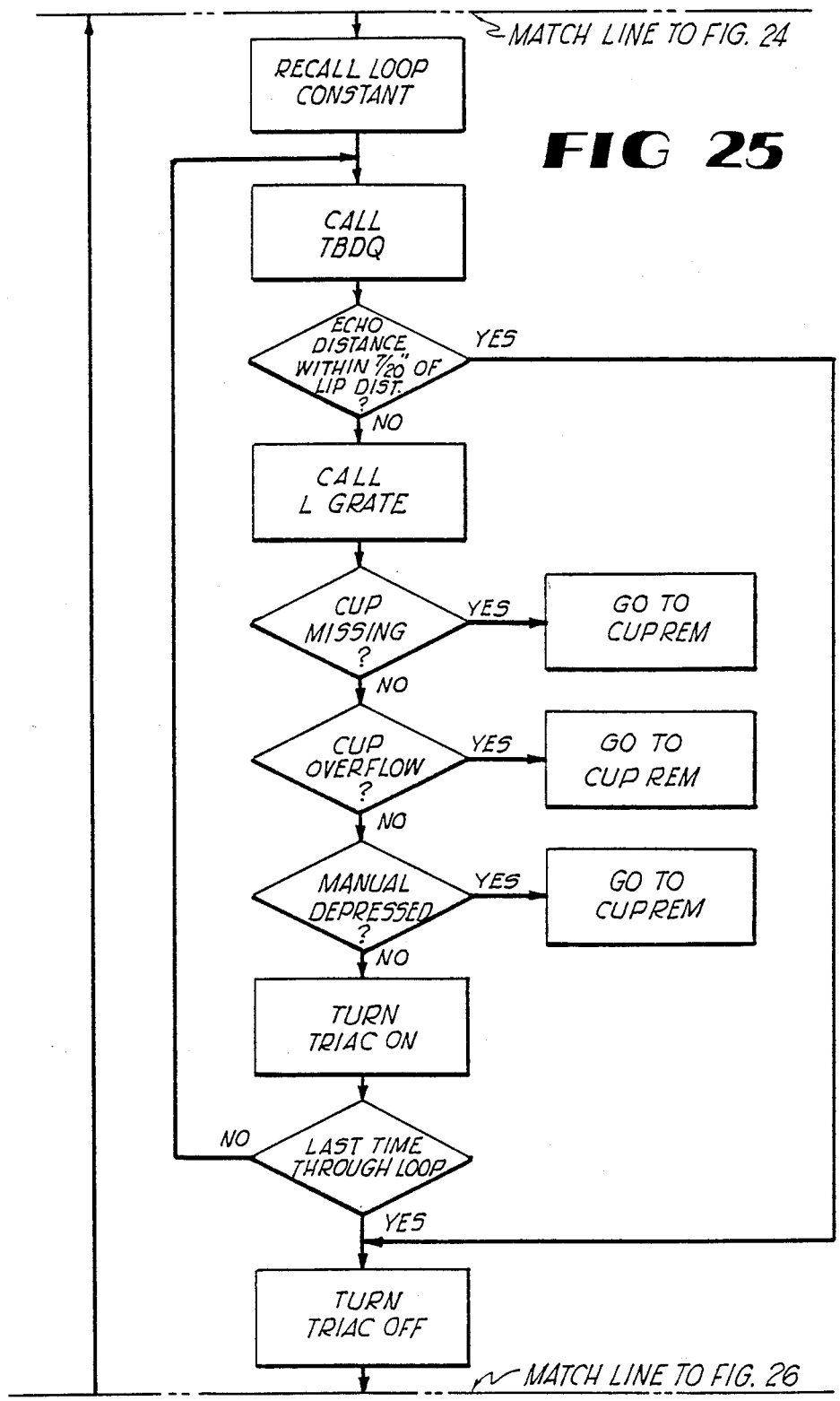
Figure 26:
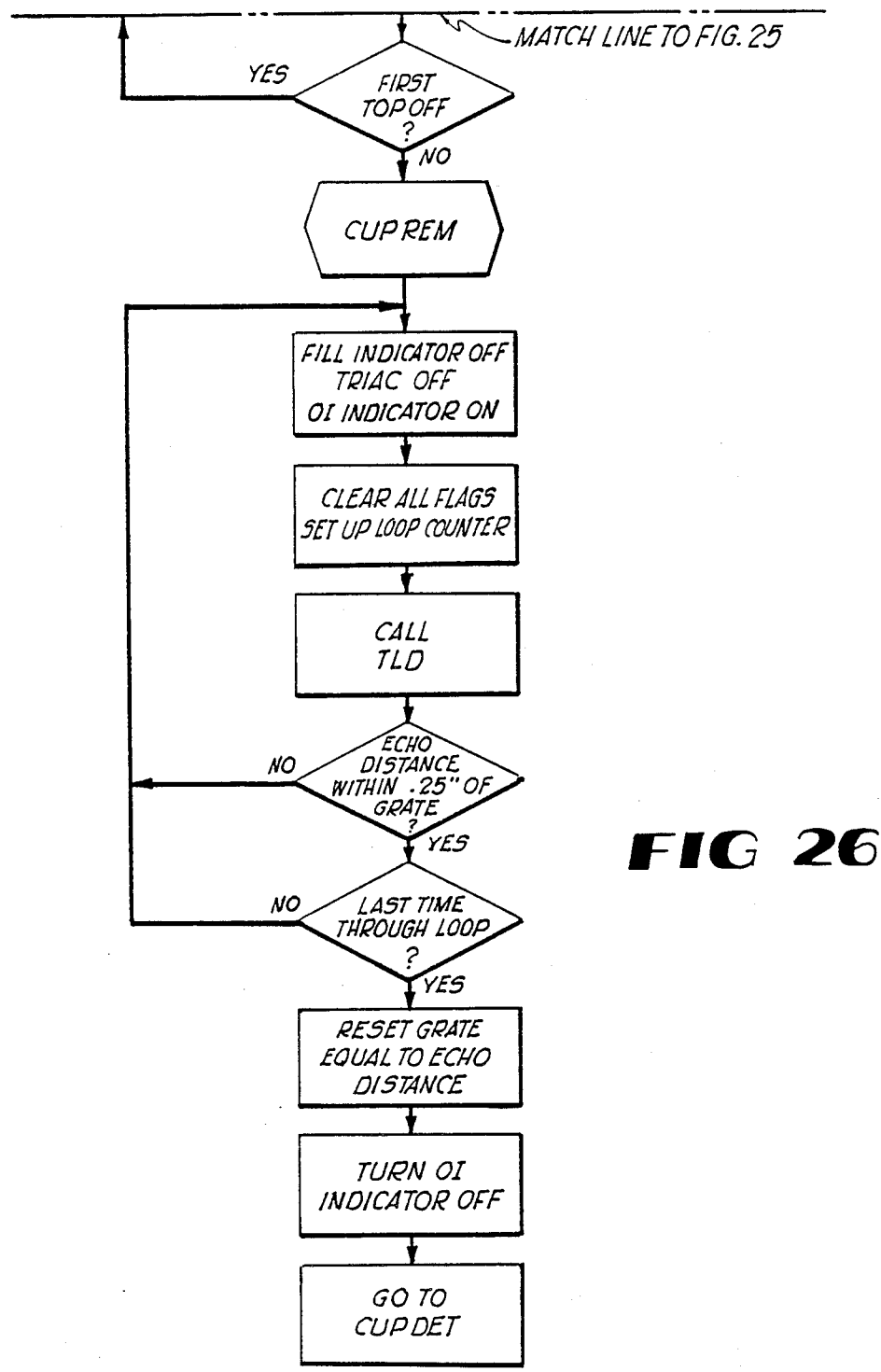

The software will now be described with reference to FIGS. 13 through 26. FIG. 13 is a side elevation view showing the transducer assembly 20, the lenses 32 and 36, the nozzle 24 of the beverage dispenser valve assembly 12, the control module 26, the splash plate 25, the grate 18 and a cup 16 having a cup lip 17, a cup bottom 19, and a top level 21 of ice in the cup.

The software includes four (4) major routines which are labeled Initialization Routine (INIT), Cup Detection (CUPDET), Fill Routine (FILL), and Cup Removal Routine (CUPREM).

The software also includes five (5) subroutines that are defined as Time Delay (WAIT), Absolute Value of the Difference of Two Numbers (DIFF), Grate/Overflow Detector (LGRATE), Transmit (TBDQ, TBDW, and TLD as described below), and Receive (REC).

The Transmitter Subroutine sets the variables for the receiver routine and outputs a 25 microsecond pulse (10 cycles at 400 KHz which occupies 0.1" air space) during which time the transmitter is active. The selection of receiver variables is made through three different entry points (or surfaces off which the transmitted beam reflects): TBDQ (Transmit Bottom Detector), TBDW (Transmit Bottom Detector with window), and TLD (Transmit Lip Detector).

The receiver has 32 steps of gain controlled by the software. The gain is set to minimum from the start of transmit to approximately 1.3" target distance time (180 microseconds). At that time the gain is set equal to the gain variable set up in the entry point routines. For TLD, the gain is always set to maximum. For TBDQ and TBDW, the gain is determined by the calling routine. In TBDQ and TLD, the distance of the first echo detected is captured for processing. In TBDW, a lip masking window is enabled which ignores any echoes closer than the lip distance +0.25". This allows a higher gain to be used to look at liquid level rising inside the cup. Under all entry points, 5 transmissions and receptions are made with the echo distances stored in RAM. The processing algorithm looks for two samples that correlate within 0.1" for TLD, or 1" for TBDQ and TBDW. The average of the two distances is used as the echo distance. A 2 millisecond delay is incorporated before each transmit to allow previous multiple reflections to decay.

WAIT is a programmable delay subroutine that returns to the calling routine immediately if the manual push button is pressed. It has a maximum delay of 1 second.

DIFF is a subroutine that calculates the absolute value of the difference of two numbers.

LGRATE is the Grate/Overflow detector subroutine and is used during the FILL routine. It uses TLD to detect with maximum gain and no window. If the subroutine detects an echo distance less than the lip distance minus 0.1", the overflow flag is set before returning. If the subroutine detects an echo distance within 0.25" of the grate distance, the cup removal flag is set before returning.

INIT is used when the microcomputer is initialized by the "Master Clear" (hardware). During power up, the first instruction processed is at location 777 octal. This instruction "GOTO INIT" commands the computer to begin executing this routine, which comprises the following: (1) the RAM is cleared; (2) wait 1 second for power to stabilize; (3) run the diagnostic routine if enabled; (4) use TLD to look with maximum gain and no window for an echo distance between 7" and 13"; (5) if it does not detect an echo within this range, the "Over Ice" indicator on the front panel flashes; (6) if it does detect an echo distance within 7" to 13", the distance is stored in RAM as the Grate distance and the program continues at CUPDET.

CUPDET is the Cup Detection routine. This routine collects data using TLD and accepts a cup using the following procedure:

A. The manual fill switch on the front panel is monitored continuously to assure proper operation. If the manual switch is pressed, the computer begins the Cup Removal routine immediately.

B. A stable lip distance must be established more than 3" from the grate. A stable lip distance is defined as 5 consecutive echo distances from TLD separated by 6 milliseconds that correlate within 0.2". This corresponds to the cup lip being stable for 130 milliseconds.

C. A cup bottom or ice level must be discerned that is more than 0.1" above the grate and more than 0.25" below the lip. This is accomplished by using TBDW and varying the gain as follows:

With minimum gain, obtain an echo distance using TBDW. If the echo distance is not more than 0.1" closer than the grate, then the gain is increased 1 step and another sample is taken. If the gain reaches the maximum, the Over-Ice indicator flashes and the Cup Detection routine begins again.

D. The ice/bottom height is calculated from the last distance obtained as outlined in (c) above and the grate, and then stored as the actual ice height. The cup height is calculated from the lip distance and the grate. The cup height is divided by 8 and the quotient is multiplied by the 3 bit binary number input as selected on the ice level programming switches. This allowable ice height is compared with the actual ice height. If the actual ice height is greater than allowed by the switch selection, the Over-Ice indicator flashes and the Cup Detection routine begins again. If the actual ice height is less than the amount selected by the switch, the FILL routine begins.

The FILL routine controls the complete filling and top off operation. The routine limits the solenoid operation to a maximum of 3 On/Off cycles. After each of the first 2 cycles, the routine waits for the foam to settle before starting the next cycle. After the foam is settled and the cup is within 7/20" of being full, the Cup Removal routine begins. If the manual switch is pressed at any time during the FILL routine, the Cup Removal routine begins immediately. Each of the cycles has a maximum solenoid on time which if exceeded causes the Cup Removal routine to being.

A detailed description of the FILL routine follows:

A. Before the valve assembly 12 solenoids are actuated, several checks and corrections are made. The gain is initially set at 11/16 of maximum gain. If the Lip Distance is less than 4", the gain is adjusted with the empirically derived equation:

Gain = Gain ⅛ (4" lip distance).

If the Lip Distance is less than 4", the Lip Distance is adjusted with the empirically derived equation:

Lip Distance = Lip Distance ⅜ (4" Lip Distance)

If the Lip Distance is less than 0.1", the Lip Distance is set to 0.1" to allow the cup overflow to function properly.

The Time Constant for this particular cup height is calculated with the equation:

Time Constant = cup height 2".

This time constant is used in each of the three cycles to provide a maximum "Solenoids On" time proportional to the cup height.

B. The gain must be adjusted such that the fluid level is detected and the lip is not during the period when the cup vibrates such as at the beginning of a FILL. To accomplish this a period of time proportional to cup height is programmed to allow filling to start and gain enough weight to minimize cup vibration and adjust gain as necessary. During this time period the routine uses TBDQ to check if the echo distance is within 0.75" of the Lip Distance. If it is, the gain is reduced one step. If the gain reaches minimum, the cup removal routine begins. If the cup is removed during this period, the solenoids will not turn off because the Grate/Overflow detector subroutine is not called during the period due to trying to get as many samples as possible to adjust the gain. At the end of the period, the solenoids stay on.

C. A second maximum time period begins that is also proportional to the cup height. During this time period, the routine uses TBDW to monitor the liquid level and turns the solenoids off when the liquid level is within 0.5" of the Lip Distance. The Grate/Overflow detector subroutine checks to see if the cup has been removed or if TBDW has missed the liquid level rising and an overflow is imminent. If the cup is missing, the cup removal routine begins. If there is an overflow indicated, the solenoids are turned off.

D. A 5 second pause begins at this time to allow the foam to settle 0.25" below the cup lip. The Grate/Overflow subroutine checks once each second to ascertain that a cup is still in place. If the cup is missing, the cup removal routine is started.

E. After the 5 second pause, a minimum number of seconds for the foam to subside is set at 16, and once a second, an echo distance is obtained with TBDQ. If 2 consecutive echo distances are within 1" of each other, or if the period times out, the top cycle begins. The Grate/Overflow detector subroutine checks once a second for a missing cup. Once a cup is found missing, the cup removal routine begins.

F. The top off cycle uses TBDQ to determine if the liquid level is within 7/20" of the lip. If this condition exists, the solenoids are not turned on. If the echo distance is not within 7/20", the solenoids turn on until that condition is met.

G. A repeat of "D," "E," and "F" now occurs to implement the second top off cycle.

The cup removal routine (CUPREM) turns the fill indicator 92 off, the value assembly 12 solenoids off, and the Over-Ice indicator 94 on. It uses TLD and waits for an echo distance within 0.25" of the grate. When this condition exists, a new grate distance is stored, the Over-Ice indicator turns off, and the Cup Detection routine begins again.

As described above, the system of the present invention provides an ultrasonic method and apparatus for controlling the automatic filling of beverage cups. The system can be used with any beverage, such as coffee, tea, milk, fruit juice, and carbonated soft drinks. The beverages can produce foam during filling or not. Different sized cups can be used and they can have ice therein.

The system can be used in conjunction with any known, standard beverage dispenser. In the case of carbonated soft drink dispensers, the transducer assembly and the control module of the present invention are located directly on the valve assembly. The cup actuated arm and the microswitch are removed from the standard valve assembly; the triac 149 in FIG. 8 takes the place of the microswitch and simultaneously turns the syrup solenoid and the carbonated water solenoid on and off.

The system of this invention is on and working whenever the power to the dispenser is on. The power is often left on to the dispenser to maintain the refrigeration system on.

A brief overview will now be provided without reference to the details of the system, which have already been described above.

The system first obtains a grate signal and stores it in the RAM. The way it does this is to transmit five 25 microsecond pulses (having a length in air of about 0.1 inch), each spaced apart about 2 milliseconds. If two signals are not received that are the same within 0.1 inch, then this first set of pulses is discarded and a new set of five pulses is immediately (in about two milliseconds) transmitted. If two signals are received and are within 0.1 inch, and if they are from a distance of from about 7 to 13 inches, then the system decides that it is the grate distance and stores it in the RAM.

The system then goes to the cup detection routine. The same set of pulses is transmitted and is received at maximum sensitivity. To determine that a cup is present, the system has to see 5 consecutive echo distances, each separated by 6 milliseconds, that correlate to within 0.2 inch. That is, 5 sets of pulses are transmitted with 6 milliseconds between each set. If at least two signals are received from the first set of 5 pulses that are within 0.1 inch, then that will be one value (or one echo distance). After receiving 5 of those in a row within 0.2 inch, the system knows that a cup lip (or something other than the grate) is present.

The system then goes to the next routine. In this routine the system looks for something greater than 0.1 inch above the grate and greater than 0.25 inch below the lip, that is, either the cup bottom or ice. If it finds this, it concludes that the something present is a cup (rather than just a hand, for example). When the ice or bottom is obtained, it is stored temporarily. The cup height is then calculated and the ice height is then calculated. It is then calculated whether or not the cup has too much ice. If it does not, the system goes to the FILL routine. This routine is somewhat complex.

In the FILL routine there are four filling periods. A first period or initial fill that is not monitored but which is set as a time function based on cup height. It will fill to about ⅓ cup under certain usual conditions. The system then switches automatically, without stopping the filling, to the second period in which the filling is monitored, and in which the filling is shut off when the liquid level rises to within 0.75 inch of the stored lip distance. The FILL routine then waits 5 seconds to allow foam to subside (if the control module is set for a foamy beverage). The monitoring continues waiting for the foam to quit moving and when two distances are received within 0.1 inch, then it calculates if the level is within 7/20 inch of the lip. If it is not, filling is resumed and monitored until the level is within 7/20 inch of the lip. If it is within 7/20 inch, filling does not resume. The "top off" routine is then repeated after another 5 second pause.

After the end of the FILL routine, the fill indicator light 92 is turned off, the solenoids are turned off, and the over-ice indicator light 94 turns off.

A second embodiment of the present invention will now be described with reference to FIGS. 27–46. An important difference between this embodiment and that described above with reference to FIGS. 1–26 is that this embodiment is designed so that two or more beverage dispensing valves having the ultrasonic control system of this embodiment can be located in close proximity to each other, such as by being adjacent valves on a dispenser, without interference therebetween. However, many other features of the two embodiments are identical.

Figure 27:
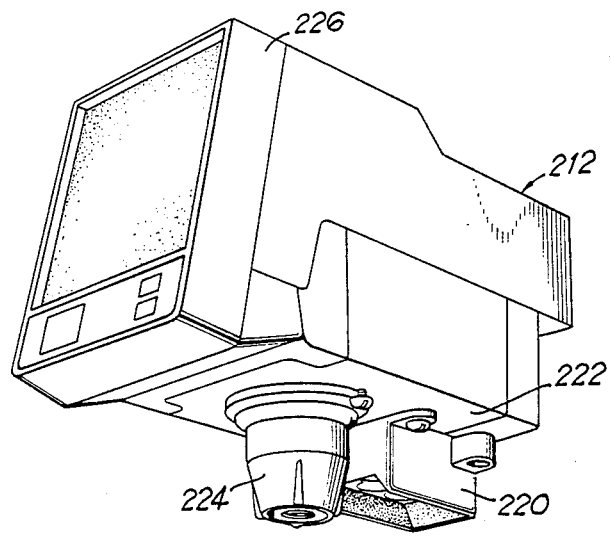
FIG. 27 is a perspective view of another embodiment of a valve assembly useful on the beverage dispenser of FIG. 1.

FIG. 27 shows a valve assembly 212, similar to valve assembly 12, that can be used as one or more of the valve assemblies on the dispenser 10 of FIG. 1. The automatic filling apparatus of this embodiment of the present invention includes a transducer assembly 220 located on the bottom surface 222 of the valve assembly 212 and behind the nozzle 224, and a control module 226 attached to the front of the valve assembly 212.

Figure 28:
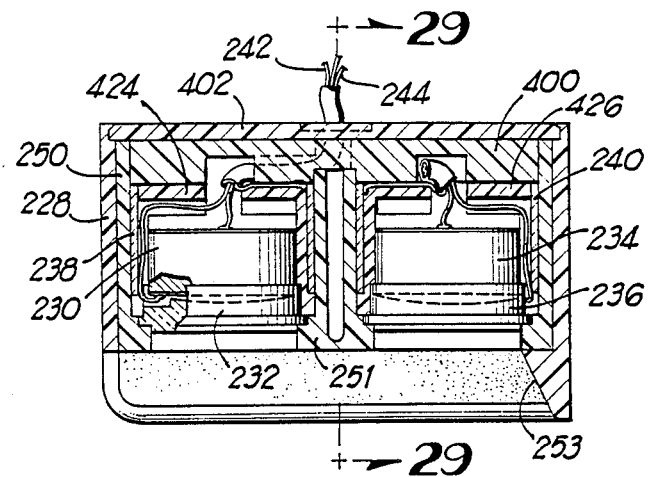
FIG. 28 is a cross-sectional side view of the transducer assembly shown in FIG. 27.
Figure 29:
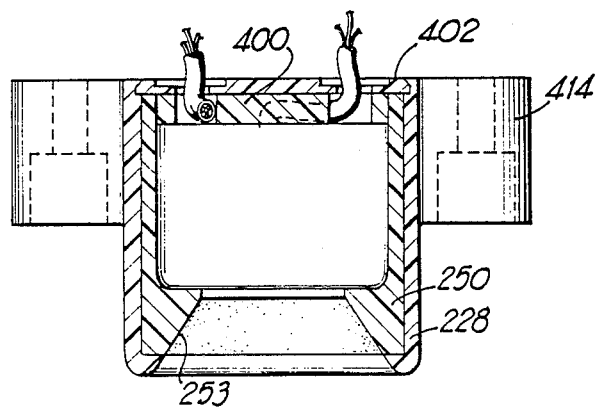
FIG. 29 is a cross-sectional end view of the transducer assembly of FIG. 28.
Figure 30:
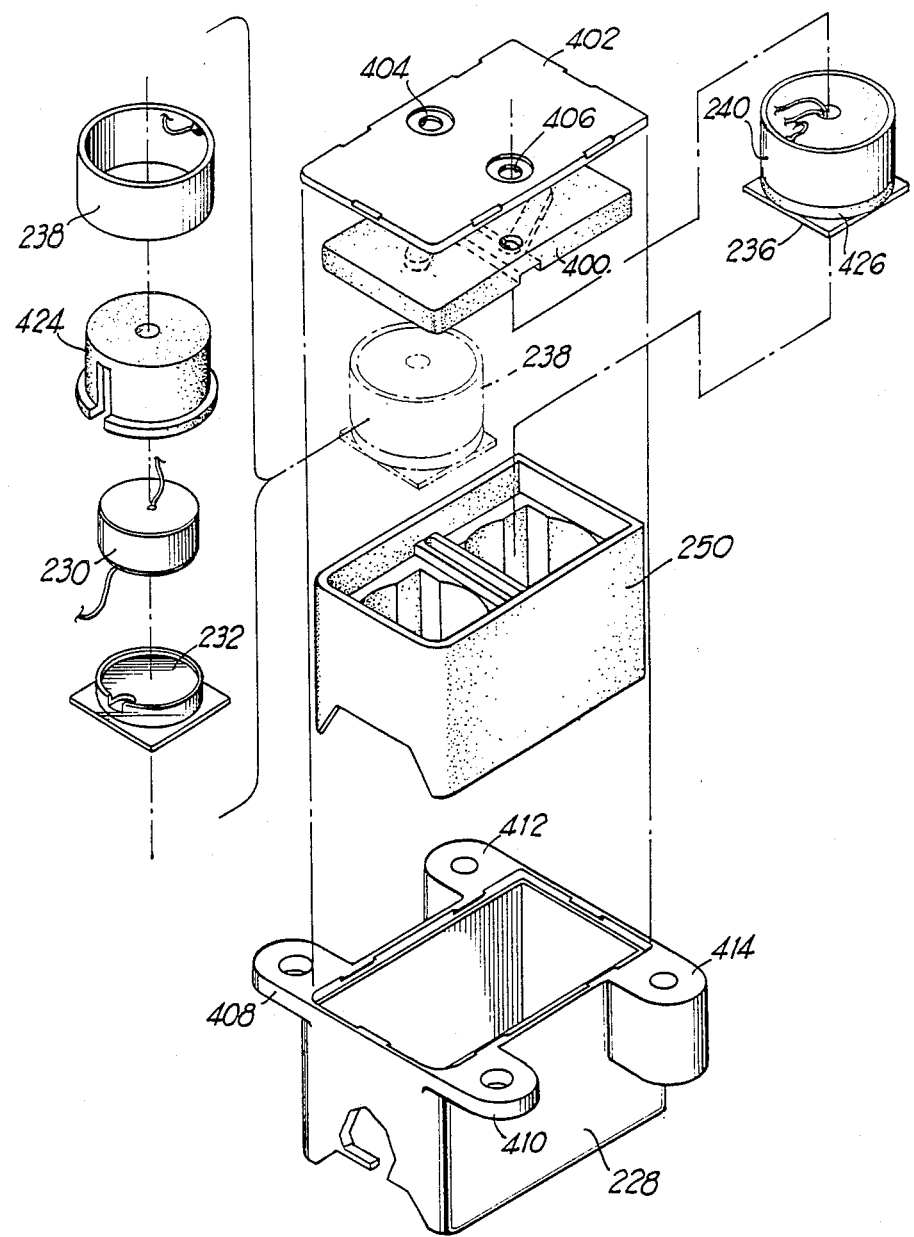
FIG. 30 is an exploded perspective view of the transducer assembly of FIG. 28.
Figure 3I:
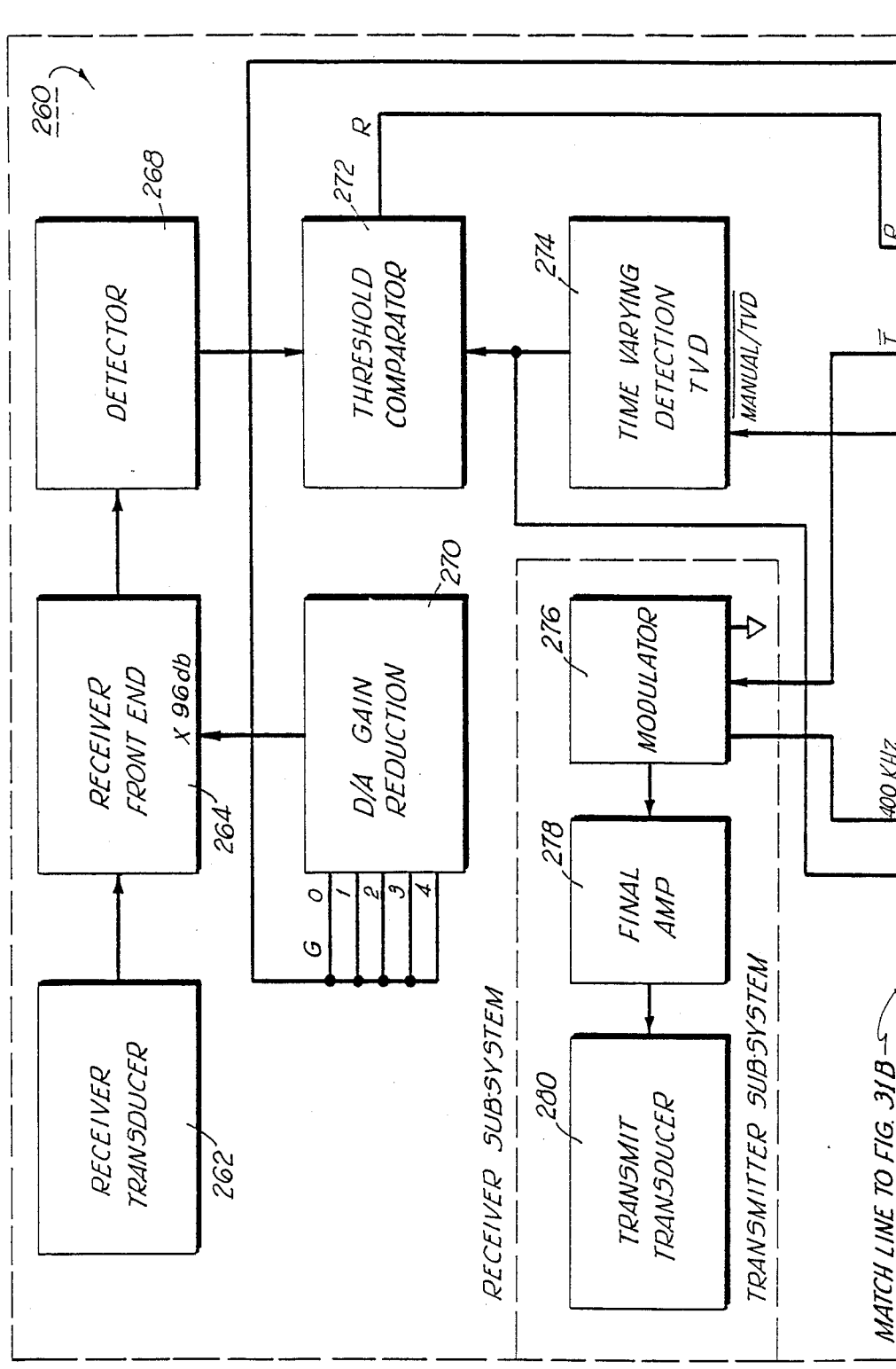

The transducer assembly 220 is best shown in FIGS. 28–30 and include a plastic housing 228 in which is contained a transmitter crystal 230 having a plastic lens 232, and a separate receiver crystal 234 having a plastic lens 236. The transmitter and receiver crystals are located inside of brass tubes 238 and 240, respectively.

A pair of shielded cables 242 and 244 each consist of a shield wire connected to a respective one of the brass tubes 238 and 240 and also a pair of wires connected to a respective one of the crystals at opposite locations thereon, as shown in FIG. 28. Each of the crystals has a metal plating on each of its upper and lower surfaces. The wire connections to the crystals are 28 gauge wire soldered directly to the crystal plating.

The cables 242 and 244 are about nine inches long and terminate in a single MTA connection (such as 48 in FIG. 3), for connection to the control module 226. Substantially all of the space within the housing 228 is filled with urethane foam 250.

The transmitter crystal 230 and the receiver crystal 234 are preferable PZT-5a ceramic crystals (a generic trade designation for a particular crystal material), which are a combination of lead titanate and lead zirconate. Each of the crystals is attached to its respective lens preferably by using about ½ drop of glue such as that sold under the trademark Eastman 910. The plastic lens is preferably made of ABS or polycarbonate plastic.

The plastic housing 228 has a pair of flanges on each side thereof, each flange having a screw hole for attaching the transducer assembly 220 to the valve assembly 212.

The brass tubes 238 and 240 have the same function as described above with reference to brass tubes 38 and 40. As shown in FIGS. 28–30, the transducer assembly 220 includes the plastic housing 228, a urethane foam filler 250, a urethane foam lid 400, a plastic cover 402, and the transmitter and receiver subassemblies 420 and 422, respectively, slid into a pair of spaced-apart cylindrical cavities in the foam filler 250.

The transmitter subassembly 420 includes the transmitter crystal 230, the lens 232, a urethane foam thimble 424 and the brass tube 238. The receiver subassembly similarly includes the receiver crystal 234, the lens 236, a urethane foam thimble 426 and the brass tube 240.

The lenses 232 and 234 are shaped as shown in FIGS. 28 and 30 with a square flange and a circular lip to receive the crystal. The crystal is glued to the lens as described above. The crystal-lens unit is then pushed inside the thimble and the tube is pushed over the thimble. The lens has a recess for the wire connection to the lower face of the crystal and the thimbles have two grooves as shown in FIG. 28 for the two wires connected to the crystal. No groove is provided for the wire connected to the brass tube.

The housing 228 has a pair of thin flanges 408 and 410 and a pair of thick flanges 412 and 414 with screw holes for use in connecting the transducer assembly 220 to the dispensing valve 212. The thick flanges 412 and 414 are used to adjust the position of the housing 220 and thus, the location of the transmitted beam.

As shown in FIG. 28, the lenses 232 and 236 are recessed into the bottom of the foam filler 250 to provide a baffle 251 there between. Also, the lower sidewalls 253 of the filler 250 extend downwardly below the lenses 232 and 234. The baffle 251 helps prevent ultrasonic energy passing directly from the transmitter to the receiver. The sidewalls 253 help prevent ultrasonic energy from being transmitted sideways to an adjacent valve. The foam absorbs the ultrasonic energy.

The selection of the most desirable frequency to use is also the same as described above with reference to the first embodiment.

Regarding the beam shape, at 14 inches, the total maximum beam pattern needs to be less than 3 inches wide at the limits of detectability (−40 db) in the side to side direction and approximately 3 inches front to back with −3 db point in the front followed closely by the 0 db point and then tapering off to −6 db at the rear. The gain at a point near the front of the pattern (toward the nozzle) needs to be a maximum with the gain falling off smoothly by about 6 db as the pattern reaches the back point. The crystal pattern was chosen empirically as the one giving the best cup lip to ice (front) ratio with the crystals aligned from front to back between the nozzle 224 and the splash plate 25.

The resulting overall gain pattern at 12 inches had a spread sideways of 3.5 degrees, and a resulting spread front to rear of 12 degrees.

To achieve the desired beam pattern, it was necessary to lens the crystals. A 2 inch concave radius produced the 8 degrees to 3.5 degrees narrowing from side to side for both transmit and receiving crystals, a 4 inch convex radius produced the 8° to 12° spreading from front to rear for the receiver crystal and a flat lens toward the front for ½ the crystal followed by a 3 inch convex radius to the rear for the transmitter crystal which formed a fan-shaped beam pattern with an elongated footprint having a width of approximately ¾ inch at −3 db and having a length of about 2½ inches with a bright spot about 1 inch in from the front with −3 db at the front and −6 db at the rear and 12 inches away from the transducer assembly 220. This beam-shape footprint has its long dimension extending front to back relative to the dispenser.

Coupling from the crystals to the air was calculated in the same manner described above for the first embodiment.

One change in this second embodiment is that the lenses are inset into the bottom surface of the foam package.

Regarding the crystal shape and material, the transmitter crystal is preferably ½" OD×0.200" for a series resonance of 400 KHz. PZT-5a material was chosen for the crystals 230 and 234 as the best compromise in strength, efficiency, low mechanical Q, and ease of workability. The receiver crystal is preferably ½" OD X 0.190" for a parallel resonance of 400 KHz, and is also made of PZT-5a material.

Regarding the electrical wiring, a twisted shielded pair of 28 gauge stranded wire is used and soldered directly to the plating on the crystal faces. The wire shielding is soldered to the brass tubes 238 and 240. The brass tubes are isolated from each other electrically. The black wire of the twisted pair is attached to the outside crystal face which is marked with a small dot.

Figure 31B:
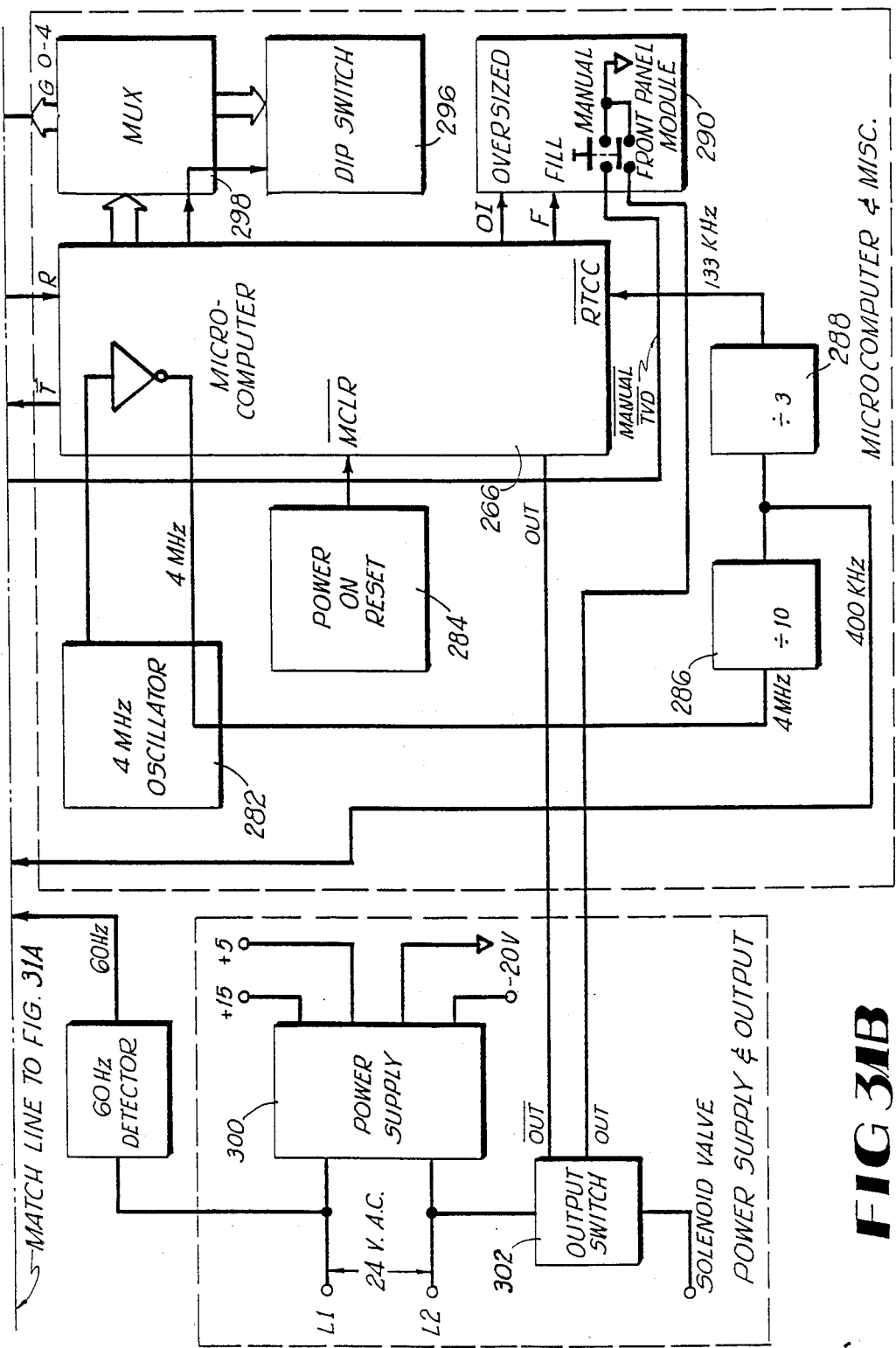
Figure 32:
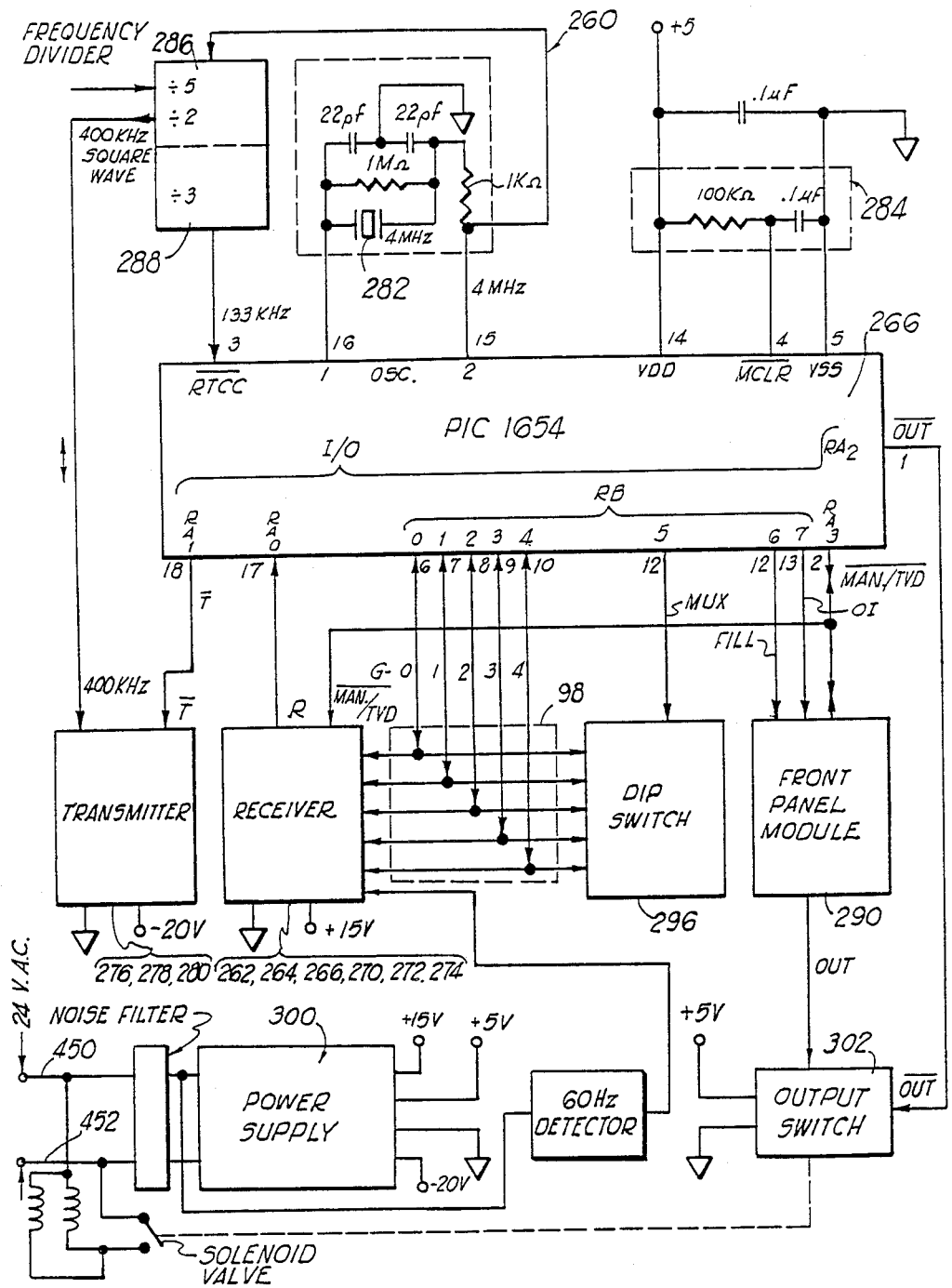
FIG. 32 is a microprocessor block diagram.
Figure 33:
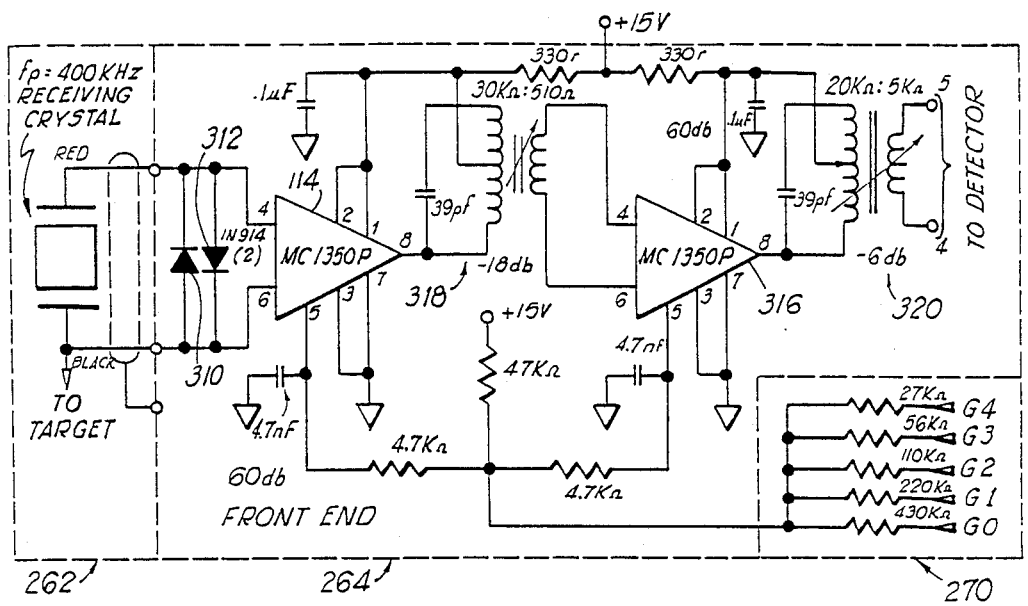
FIG. 33 is a schematic circuit diagram of part of the receiver subassembly including the receiver, the receiver front end, and the D/A gain reduction of FIG. 31.
Figure 34:
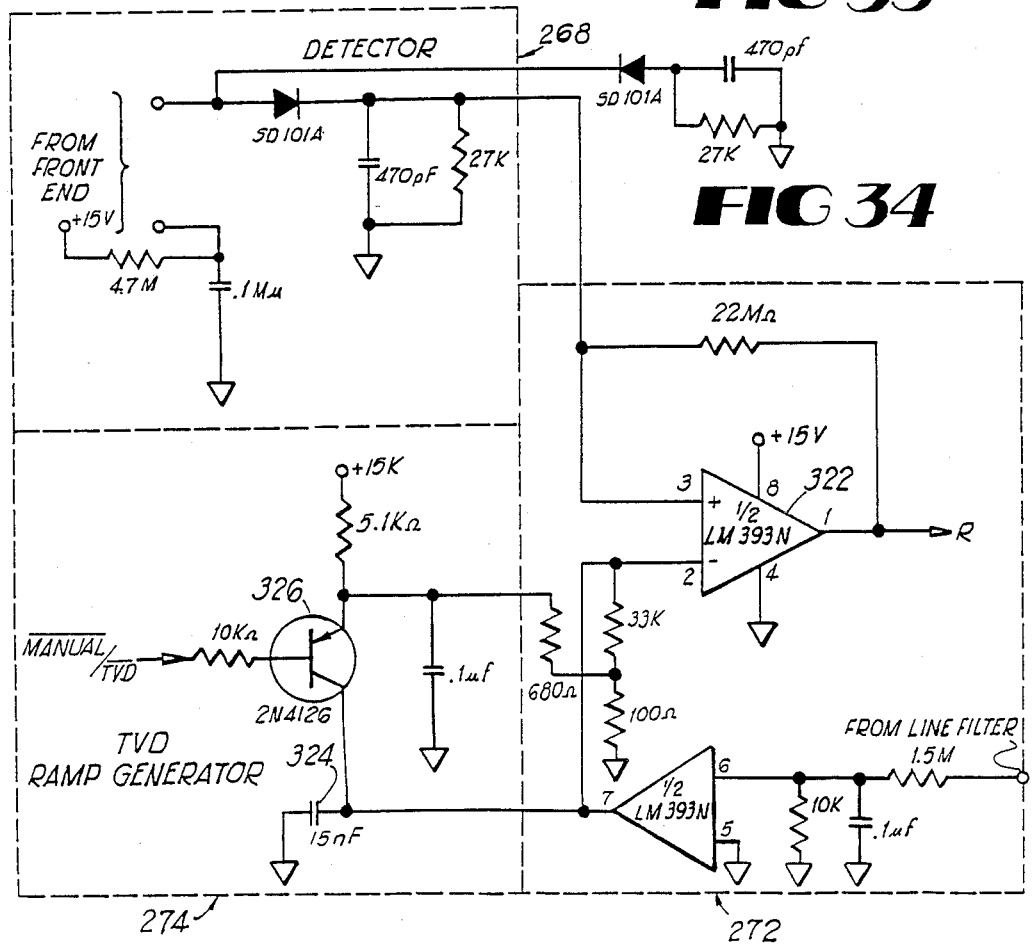
FIG. 34 is a schematic circuit diagram of another part of the receiver subassembly including the detector threshold comparator, the time varying detection generator, and the 60 Hz detector of FIG. 31.
Figure 35:
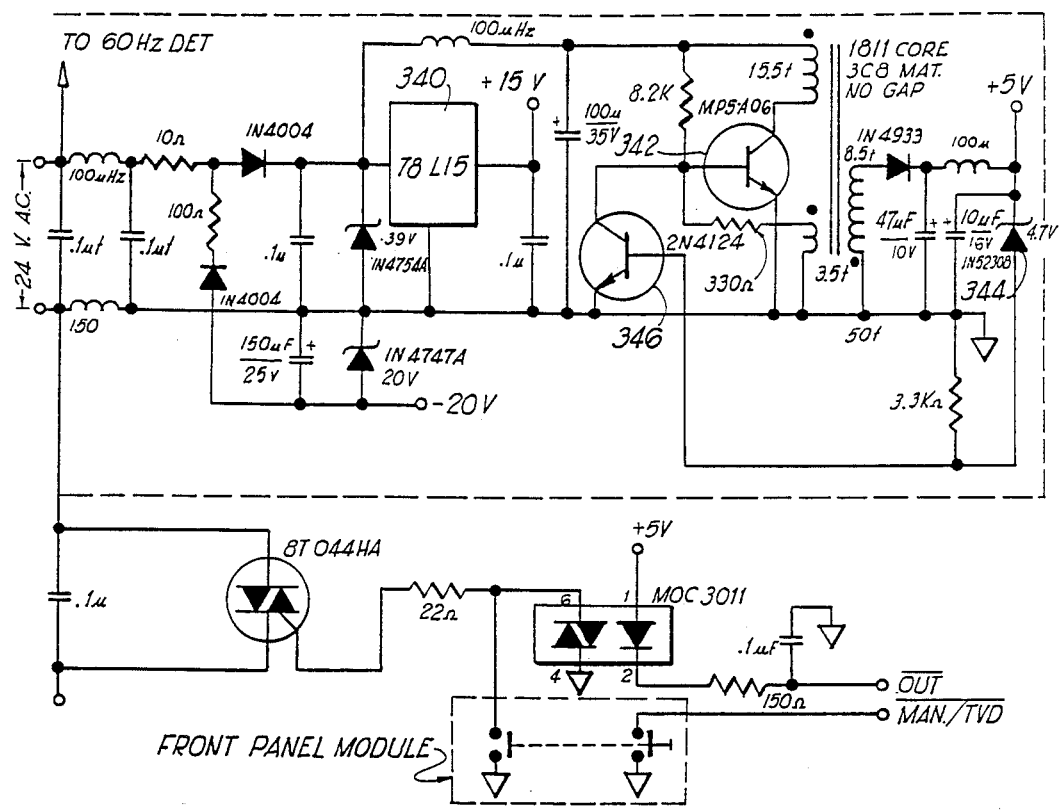
FIG. 35 is a schematic circuit diagram of the power supply and output switch of FIG. 31.
Figure 36:
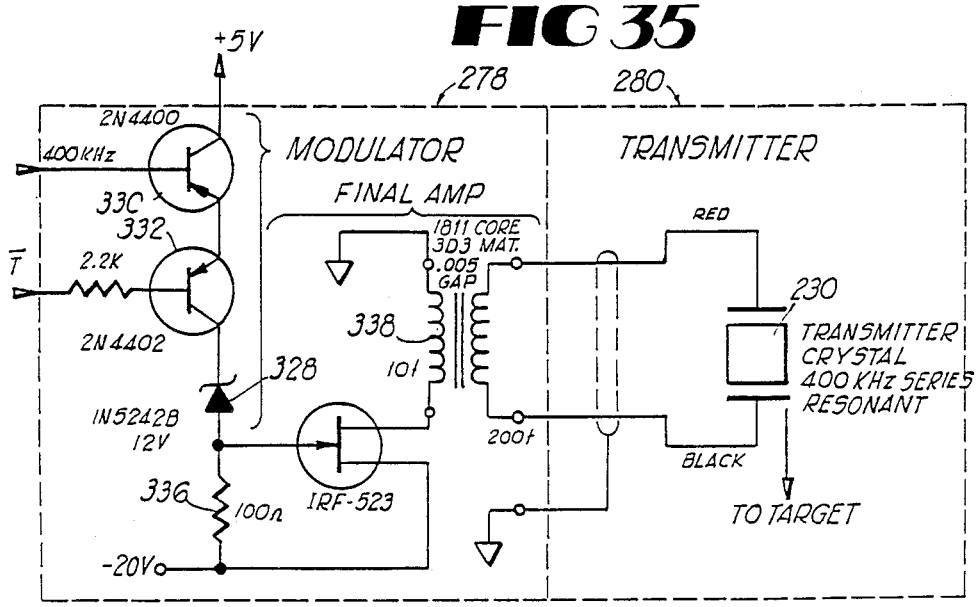
FIG. 36 is a schematic circuit diagram of the transmitter subsystem of FIG. 31.
Figure 37:
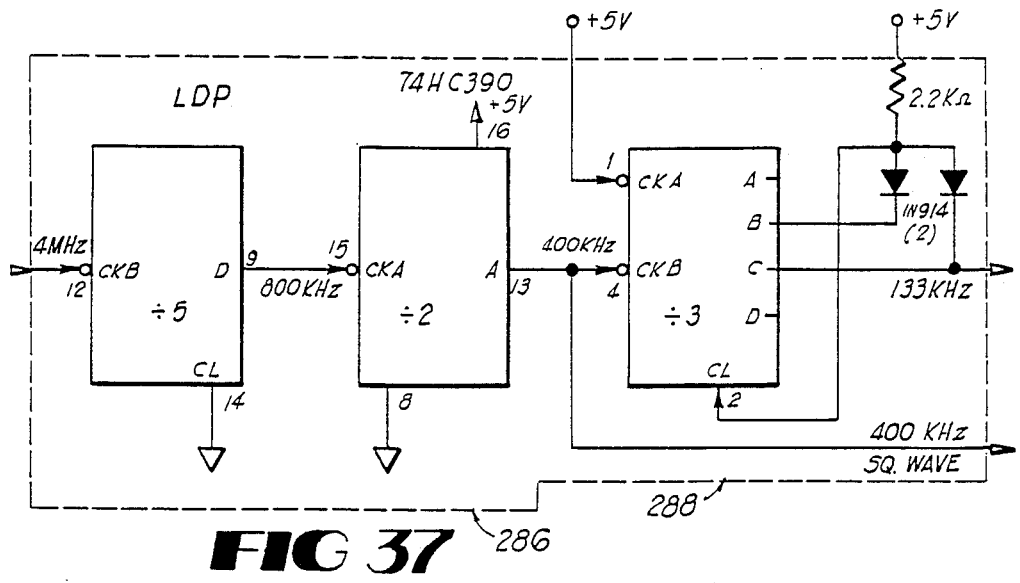
FIG. 37 is a schematic circuit diagram of the frequency divider of FIG. 31.

The control module 226 houses the control circuit board to which the crystals are connected by the cables 242 and 244 and the connector 248. FIGS. 31A and 31B together provide a master block diagram of the control circuit 260. The control circuit will now be described with reference to FIGS. 31-39.

The receiver transducer 262 (FIGS. 31, 32, and 33) is a 400 Khz, ½ inch diameter parallel resonant piezo-electric crystal coupled to the air by means of a plastic lens shaped to receive the beam pattern. The transducer assembly 220 incorporates a brass tube 240 that is ⅜ inch in diameter and is used for electrical isolation. The crystal is mounted such that it is centered in the tube with the lens 236 exposed at one end of the tube. The polyurethane foam provides for acoustic isolation.

The receiver section 264 (FIGS. 31, 32 and 33) has a total gain of 96 db and is comprised of two protective dides 310 and 312 and two MC1350P IF amplifiers 314 and 316 that are interconnected through a tuned transformer 318 with another tuned transformer 320 to interconnect the second amplifier 316 to the detector 268. These amplifiers 314 and 316 have provisions for gain control from Pin 5 and are used in this application by the microcomputer 266.

The detector circuit 268 (FIGS. 31, 32 and 33) changes the 400 Khz from the receiver 264 to a DC Analog signal. This detector is special in that it can not only detect the envelope of the pulse but since it is a DC coupled detector, it has no offset shift due to pulse width variations. By having a balanced detector system, the temperature drift is very low.

The receiver gain reduction circuit 270 (FIGS. 31, 32, and 33) is comprised for five resistors that form a binary weighted current sinking "D to A" converter that is driven by the microcomputer 266, which allows for thirty-two stages of gain level control.

The threshold comparator 272 (FIGS. 31, 32, and 33) is comprised of an LM393N comparator 322 and is used in conjunction with the time varying detection to convert the analog receiver signal to a digital signal which is then fed to the microcomputer 266.

The time varying detection generator 274 (FIGS. 31, 32 and 34) uses the manual TVD signal from the microcomputer 266 and charges a 15 Nanofarad capacitor 324 to two volts, which sets the peak level of the time varying detector wave form. This circuit is compromised of a 2N4126 switching transistor 326 and the power supply to support that circuit. 60 Hz detection is accomplished in the 60 Hz detector shown in FIGS. 31, 32 and 34. The incoming 60 Hz, 24 VAC power is sensed, after filtering, by of the comparator LM393N 322 and the output shunts the TVD signal to ground which, because the detector 268 signal is biased above ground, forces the detector comparator output high for ½ of the 60 Hz wave form. The microcomputer 266 senses this and uses the falling edge of the 60 Hz signal from the detector comparator to start its sequences and is thereby phase locked to the 60 Hz −24VAC power system. Adjacent valve assemblies are separated in time by reversing their 24VAC wires 450 and 452 (see FIG. 32) so that adjacent units synchronize to different ½ cycles of the 60 Hz power supply and thereby do not interfere with each other. Alternatively, a switch can be provided having two positions labeled "A" and "B" to designate the two possible orientations of the wires 450 and 452. Thus, if one valve assembly has an "A" position, each immediately adjacent valve assembly must have the switch on the "B" position. Units spaced more than one valve assembly apart are far enough apart not to interfere with each other.

The modulator 276 (FIGS. 31, 32, and 36) is comprised of a 12 volt Zener diode 328 and two transistors 330 and 332 that perform an (Anding) function for the transmitter gate signal (T) and the 400 KHz signal from the oscillator. This (Anded) signal is then level shifted through the 12 volt Zener diode 328 and the 2N4402 transistor 332 to the gate of the final amplifier 278.

The final amplifier 278 (FIGS. 31, 32, and 36) is comprised of a IRF-523 MOS-FET 334, a resistor 336 and a transformer 338. The resistor discharges the gatesource capacitor of the MOS-FET 334. The MOS-FET 334 switches the output transformer 338 to the minus 20 volt supply in response to the gate drive signal. The transformer 338 steps the voltage up to the transmitting crystal 230 to approximately 2000 volts.

The transmit transducer 280 (FIGS. 31, 32, and 36) is comprised of a 400 KHz ½ inch diameter series resonant piezo-electric crystal 30 made of PZT-5A material much the same as the receiver crystal with the exception of the thickness. The crystal 230 is coupled to the air by means of a plastic lens 232 which is also shaped to form the beam pattern. The assembly of the transmit transducer 280 is exactly the same as for the receiver as described above.

The microcomputer 266 (FIGS. 31 and 32) is a General Instruments Pic-1654 and contains the intelligence and control functions of the entire system. It communicates to the rest of the system through twelve I/0 pins. It also contains the oscillator circuit, the master clear circuit, and the real time clock counter input.

The crystal 282 (FIGS. 31 and 32) and components of the 4 MHz crystal comprise passive components that form the feedback network for the oscillator in the Pic-1654.

The power-on reset circuit 284 (FIGS. 31 and 32) forms a 10 millisecond reset pulse to the microcomputer 266 at POWER-ON that allows the 4 MHz oscillator crystal 282 to start and the microcomputer 266 to become initialized.

A divide by ten counter 286 (FIGS. 31, 32, and 37) converts the 4 MHz computer clock to a 400 KHz square wave signal to operate the transmitter.

The divide by three counter 288 (FIGS. 31, 32 and 37) converts the 400 KHz signal to a 333 KHz signal that is applied to the microcomputer 266 as the real time clock counter input. Number thirteen and number fourteen are encompassed within the same IC (74HC390) divider chip which has a divide by ten and a divide by three circuit.

The front panel module 290 (FIGS. 31, 32, and 39) consists of two LED indicators 292 and 294. One is an "Over-Ice/Cup Remove" (FIGS. 31, 32, and 39) red indicator 292 and the other is a green "Fill" LED 294, indicating that the cup can be filled or is being filled. This indicator 294 remains "on" steady when a cup is okay until filling ends. In the event that there is too much ice in the cup, the Over-Ice/Cup Remove red indicator will light and stay lit until the cup is removed. If the cup is not recognized as a cup, due to mispositioning the green indicator light 294 will flash on and off.

Figures 38A, 38B:
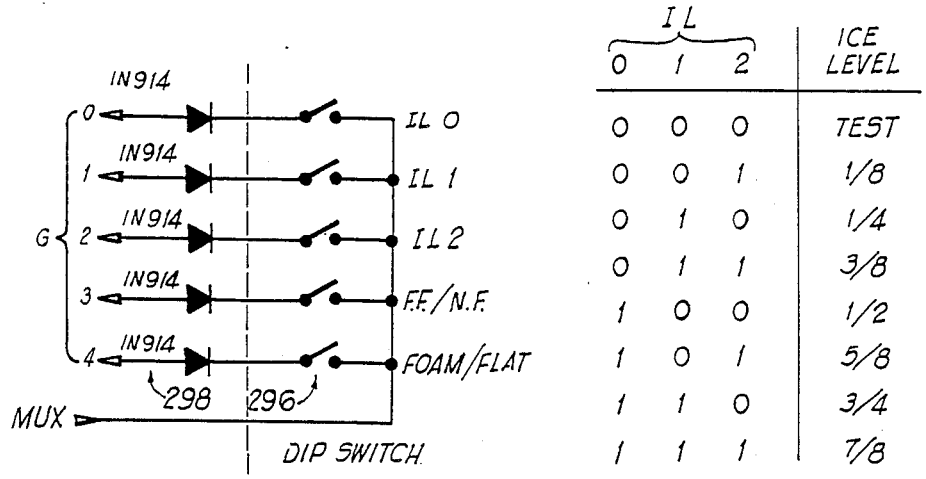
FIG. 38A is a schematic circuit diagram of the dip switch of FIG. 31
FIG. 38B is a table showing how to set the switches for a desired ice level.
Figure 39:
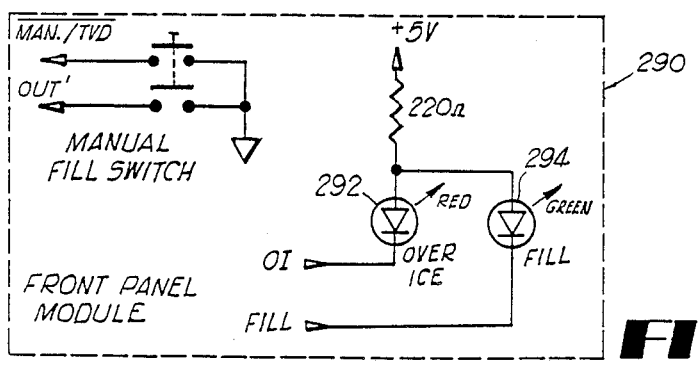
FIG. 39 is a schematic circuit diagram of the front panel module with the manual fill switch and the over-ice and filling indicator lights.
Figure 40A:
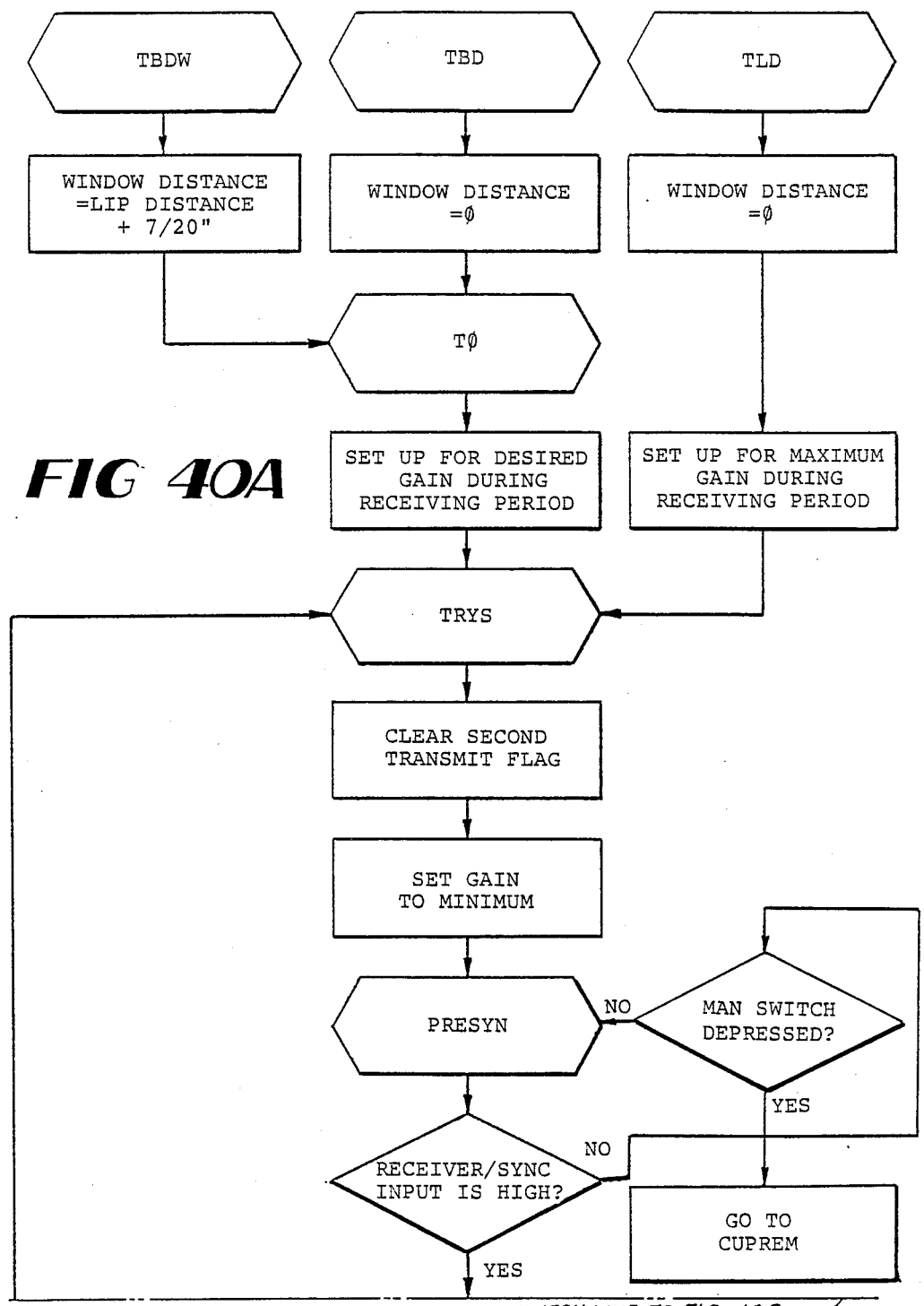
Figure 40B:
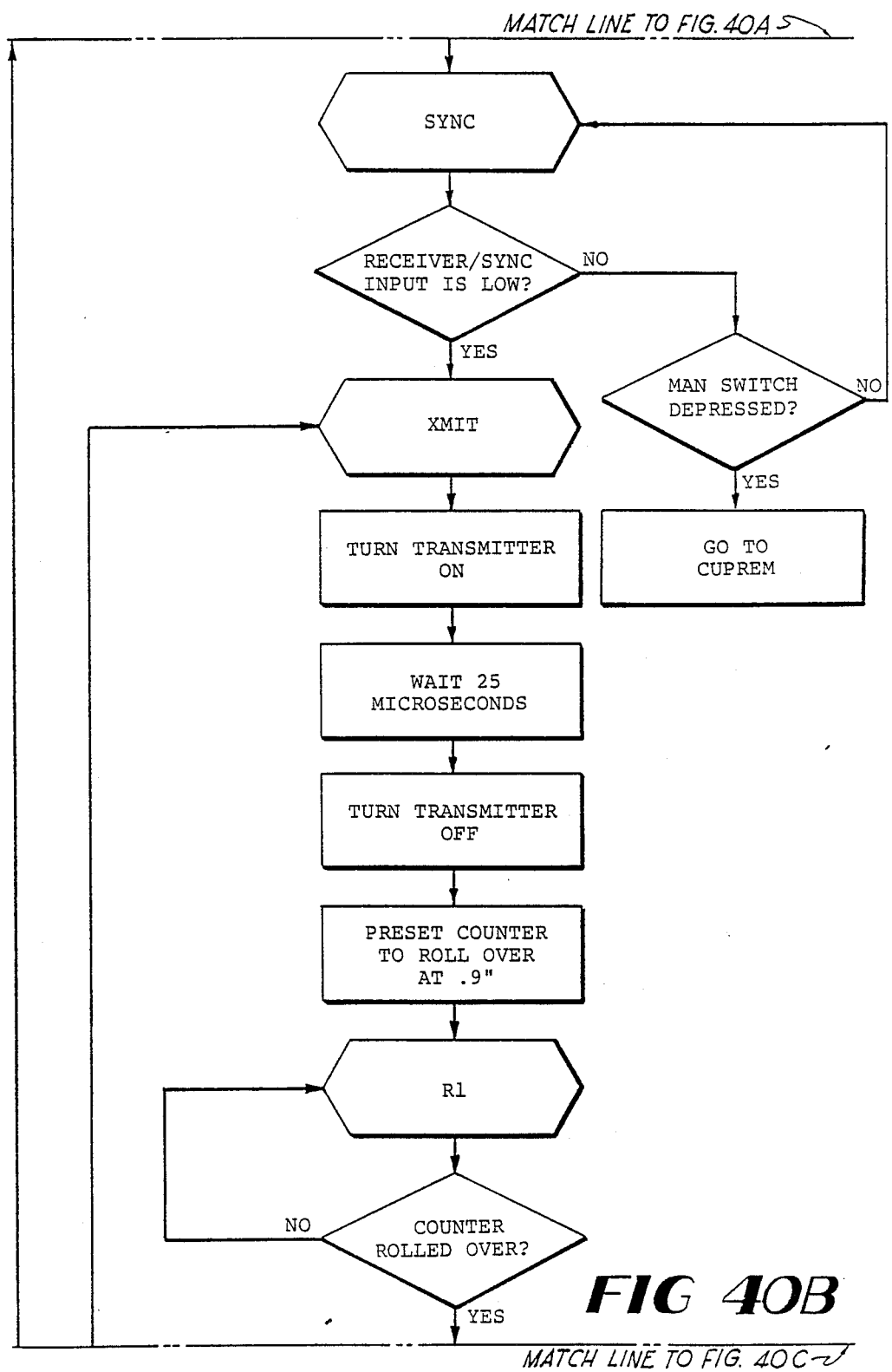
Figure 40C:
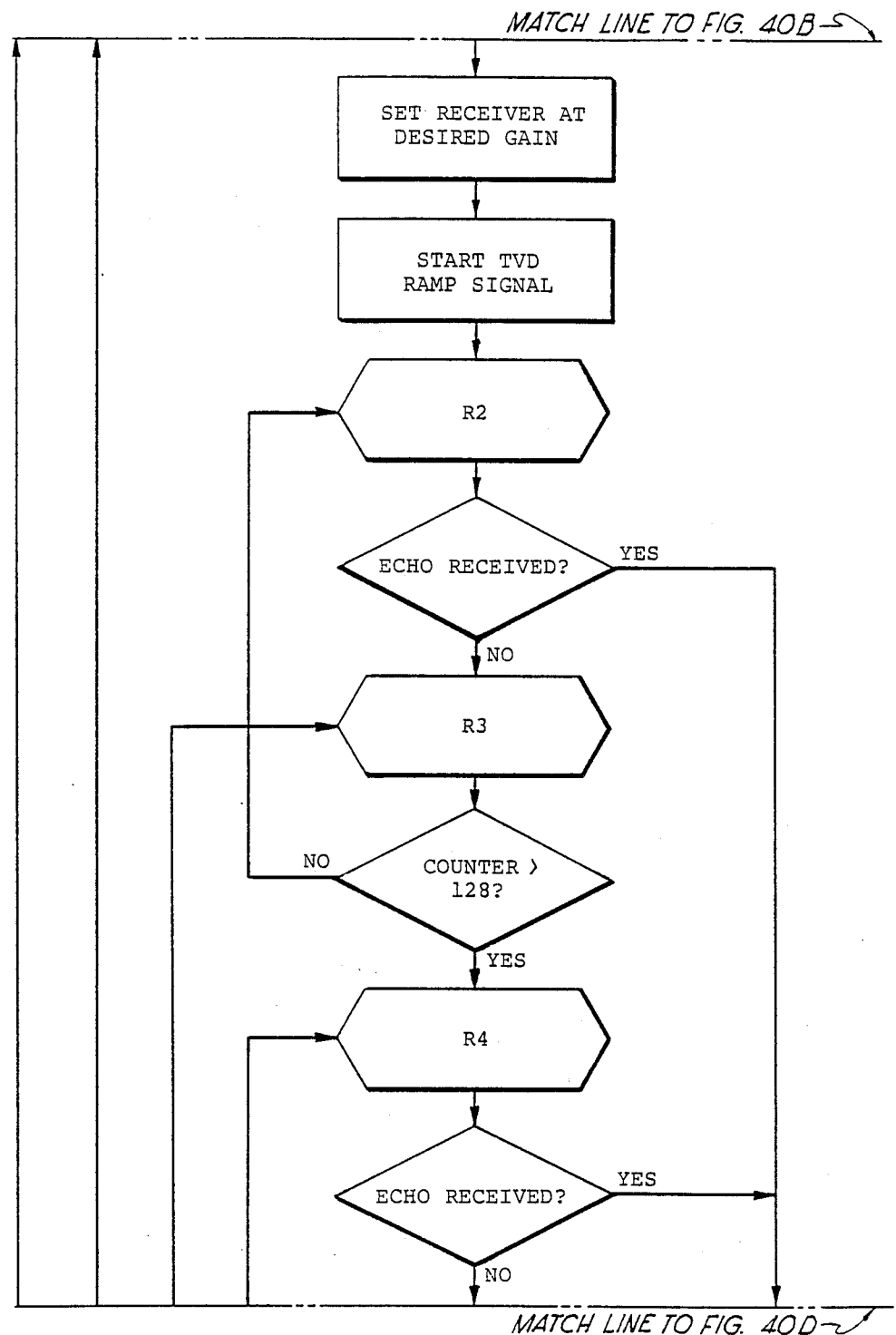
Figure 40D:
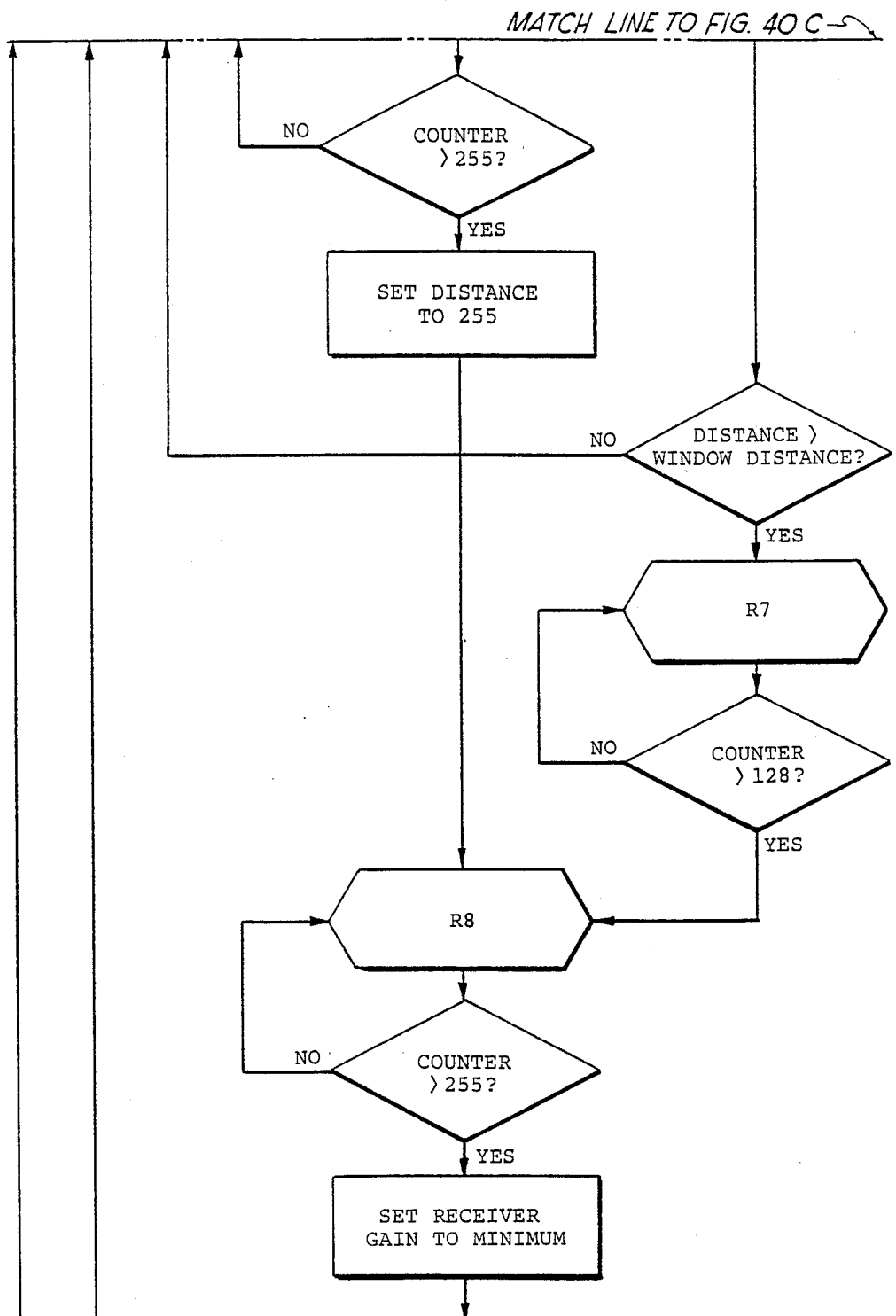
Figure 40E:
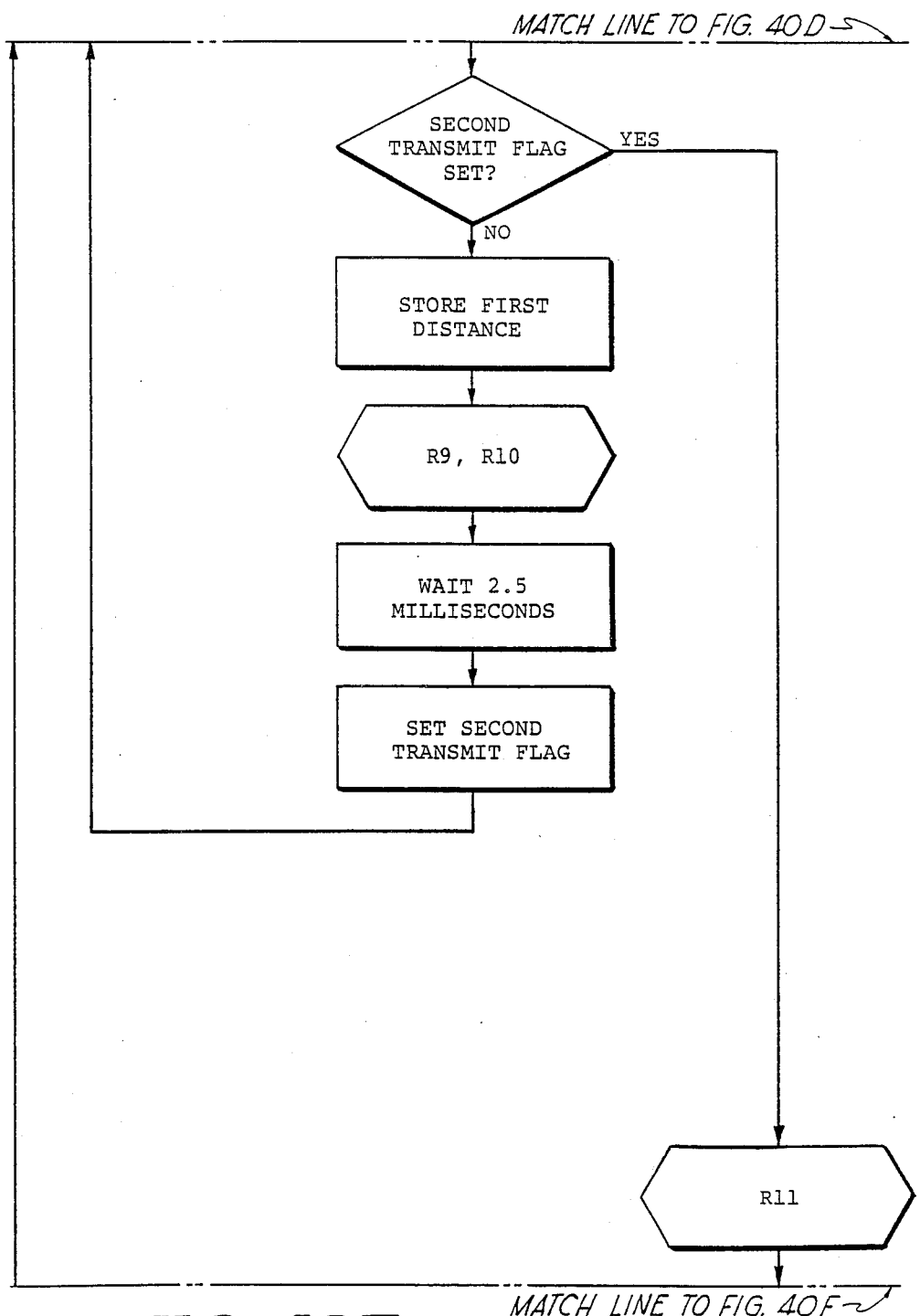
Figure 43A:
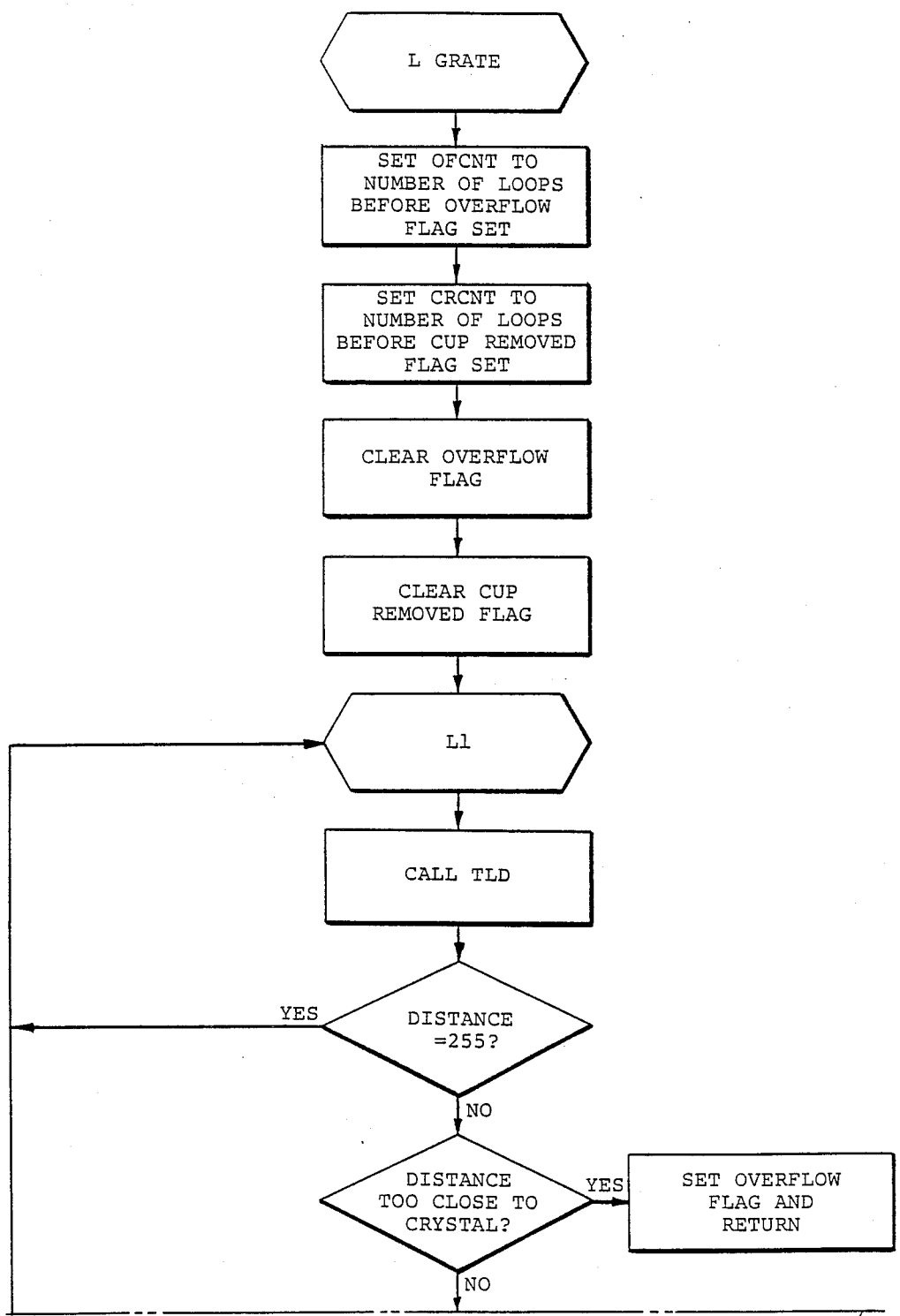
Figure 43B:
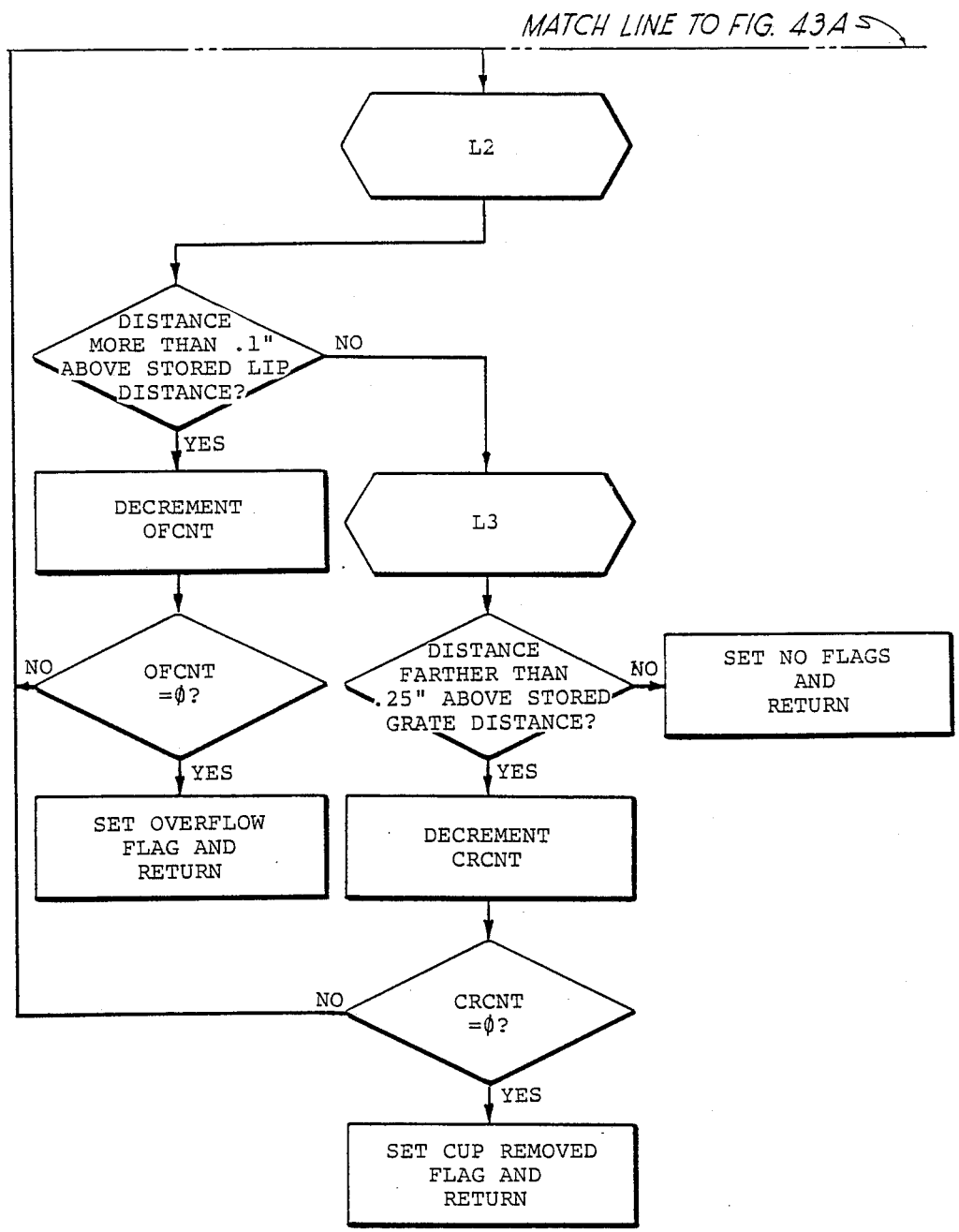
Figure 44A:
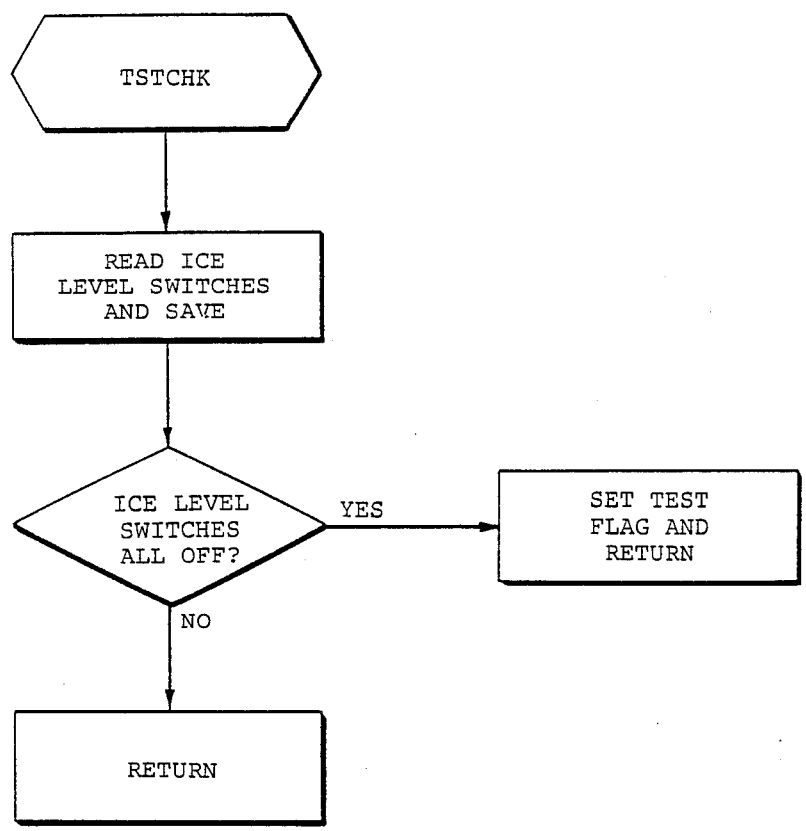
Figure 44B:
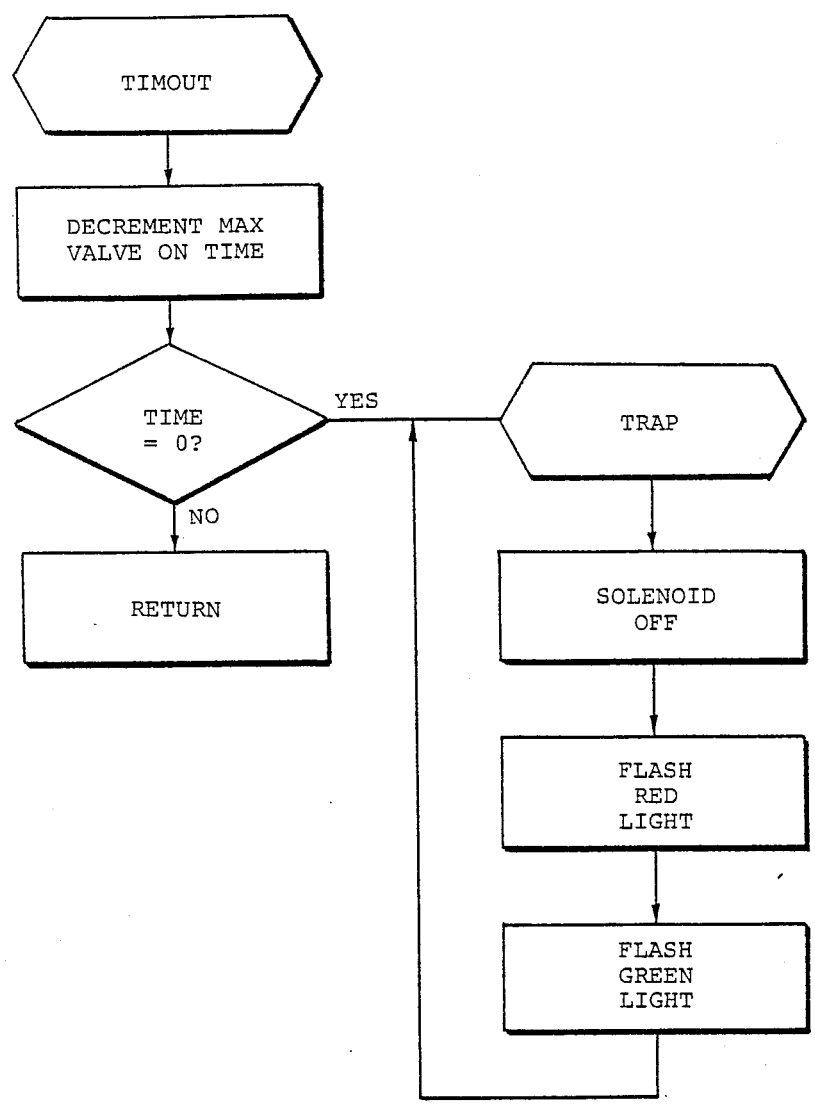

There is a programming dip switch 296 (FIGS. 31, 32 and 38A) comprising five individual switches accessible by removing a cover (not shown) on the lower rear surface of the control module 226. One switch is used to select between a normal flow or a fast flow valve assembly, depending upon which type of valve assembly the automatic control system is being attached to. Another switch is used for selecting a foamy or flat product such as water. The other three switches are used for selecting ice level or test position. The test position is used for alignment of the receiver during manufacturing and has no field use. The binary output of the three ice level switches allows for seven ice level selections from ⅛ cup to 16/2 ths cup, as illustrated in FIG. 38B.

The multiplexer circuit 298 (FIGS. 31 and 32) allows the microcomputer 266 to read either the dip switches or to set the gain of the receiver as necessary. It is comprised of five signal diodes.

The power supply 300 (FIGS. 31, 32, and 35) uses 24 volts AC from the 24 VAC transformer (not shown) in the dispenser 10. This 24 cVAC is filtered to remove any high frequency noise that might interfere with the system operation. The present control system consumes less than 2 volt-amps at 24 volts AC. The 24 volts AC is rectified and filtered to form a minus 20 volt DC supply is regulated with a Zener diode and supplies power to the transmitter. The plus 25 volt supply is unregulated but has a 39 volt Zener diode used as surge protection. The 25 volt DC supply is regulated down to 15 volts for the receiver subsystem by a 78L15 three terminal regulator 340. An MPS-A06 transistor 142 is used as a fly-back oscillator to provide the plus five volts needed to operate the computer circuitry. The 4.3 volt Zener diode 344 connected between the plus five volt supply and the base of a 2N4124 transistor 346 serve to regulate the fly-back oscillator.

The output switch 304 (FIGS. 31, 32, and 35) for the two solenoids of the valve assembly 212 is operated from either the microcomputer 266 or the manual push button 302 on the front of the control module 226. The resistor, opto-coupler network couples the microcomputer 266 to the Triac 349 which in turn energizes the valve solenoids in the valve 212 when either the microprocessor 266 or the manual push button 302 so requires.

The software will now be described with reference to FIGS. 40 through 46.

The software includes 4 major routines which are labeled Initialization Routine (INIT), Cup Detection (CUPDET), Fill Routine (FILL), and Cup Removal Routine (CUPREM).

The software also includes six subroutines that are defined as time delay (WAIT), absolute value of the difference of two numbers (DIFF), Grate/Overflow detector (LGRATE), Transmit/Receive, check for test mode (TSTCHK), and check for maximum value on time (TIMOUT).

The Transmitter/Receiver subroutine obtains a distance data by allowing the transmitter to operate for a period of 25 microseconds (10 cycles at 400 kHz which occupies 0.1" air space) and then monitoring the receiver output for reflections. Two Transmit/Receive periods are contained in the time period of a single half cycle of the sinusoidal line input voltage. The synchronization permits transmission only during the positive half cycle which allows two valves to operate side by side without interference by reversing the line input wires on adjacent valves. Three different entry points to the subroutine select receiver options' TBD (Transmit Bottom Detector), TBDW (Transmit Bottom Detector with Window) and TLD (Transmit Lip Detector).

The receiver has 32 steps of gain controlled by the software. The gain is set to minimum from the start of transmit to approximately 0.9" target distance time (180 microseconds). At that time, the gain is set equal to the gain variable set up in the entry point routines. For TLD, the gain is always set to maximum. For TBD and TBDW, the gain is determined by the calling routine. In TBD and TLD, the distance of the first echo detected is captured for processing. In TBDW, a lip masking window is enabled which ignores any echoes closer than the lip distance +0.35". This allows a higher gain to be used to look at liquid level rising inside the cup. Under all entry points, 2 transmissions, each separated by two milliseconds of receive time and two milliseconds of waiting for all reflections to cease, are made and the received distances stored in RAM. The processing algorithm accepts the distances if they correlate within a 0.4" and returns with the mean value as the correct distance. If the two distances do not correlate, then the routine waits on the synchronization signal and takes two new samples to correlate.

WAIT is a programmable delay subroutine that returns to the calling routine immediately if the manual push button is pressed. It has a minimum delay of 3.5 msec, and a maximum delay of 0.9 seconds.

DIFF is a subroutine that calculates the absolute value of the difference of two numbers.

LGRATE is Grate/Overflow detector subroutine used during the FILL routine to determine whether a cup has been removed or if foam or liquid has risen above the lip. The subroutine uses TLD to detect with maximum gain and no window. If TLD returns with a distance of exactly 13.7", the distance is rejected and TLD is called again. 13.7" is the maximum distance allowed by the receiver software and indicates no reflection was detected. If TLD returns with a distance less than 0.25", the overflow flag is immediately set. If TLD returns with a distance more than 0.1" closer than the stored Lip Distance for three consecutive calls to TLD, the overflow flag is set. If TLD returns a distance farther than 0.25" above the stored GRATE value for twelve consecutive calls to TLD, the cup removed flag is set. If TLD at any time returns a distance that does not meet any conditions above, the subroutine ends with no flags set.

TSTCHK (FIG. 44A) is a subroutine that reads the five position DIP (Dual Inline Package) switch. The switch positions are stored in the location in RAM labeled SWITCH. If the switches in positions 1, 2 and 3 are all off, the Test flag is set.

TIMOUT (FIG. 44B) is used whenever the solenoid valve is turned on. The subroutine decrements the "Valve on Time" register and checks to see if the value of the Register is Zero. If it is greater than zero the subroutine ends. If the value of the register is zero, the routine enters a trap loop from which there is no exit except through a hardware reset. The trap loop turns the solenoid off and alternately flashes the red and green indicators.

Figure 45B:
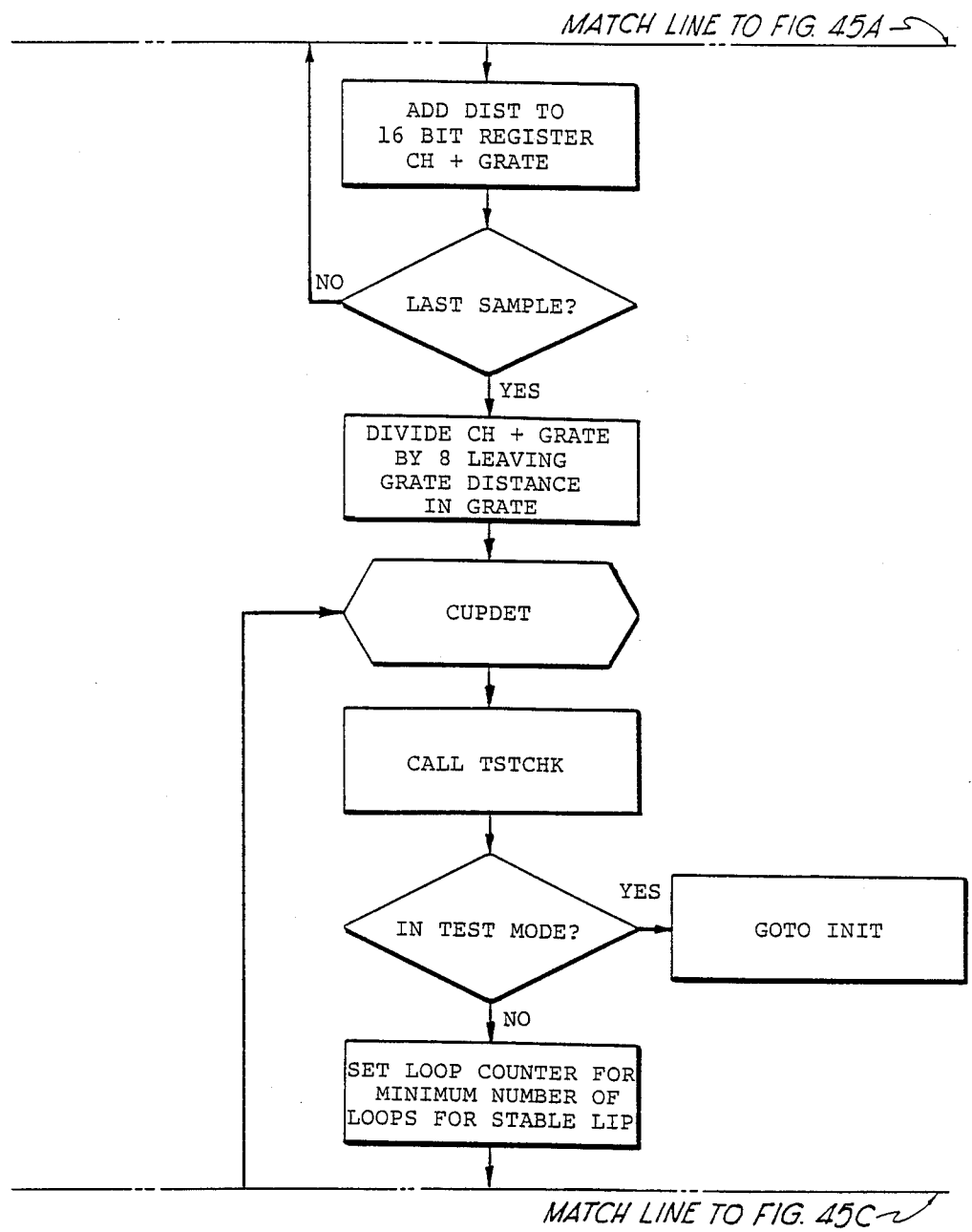
Figure 45C:
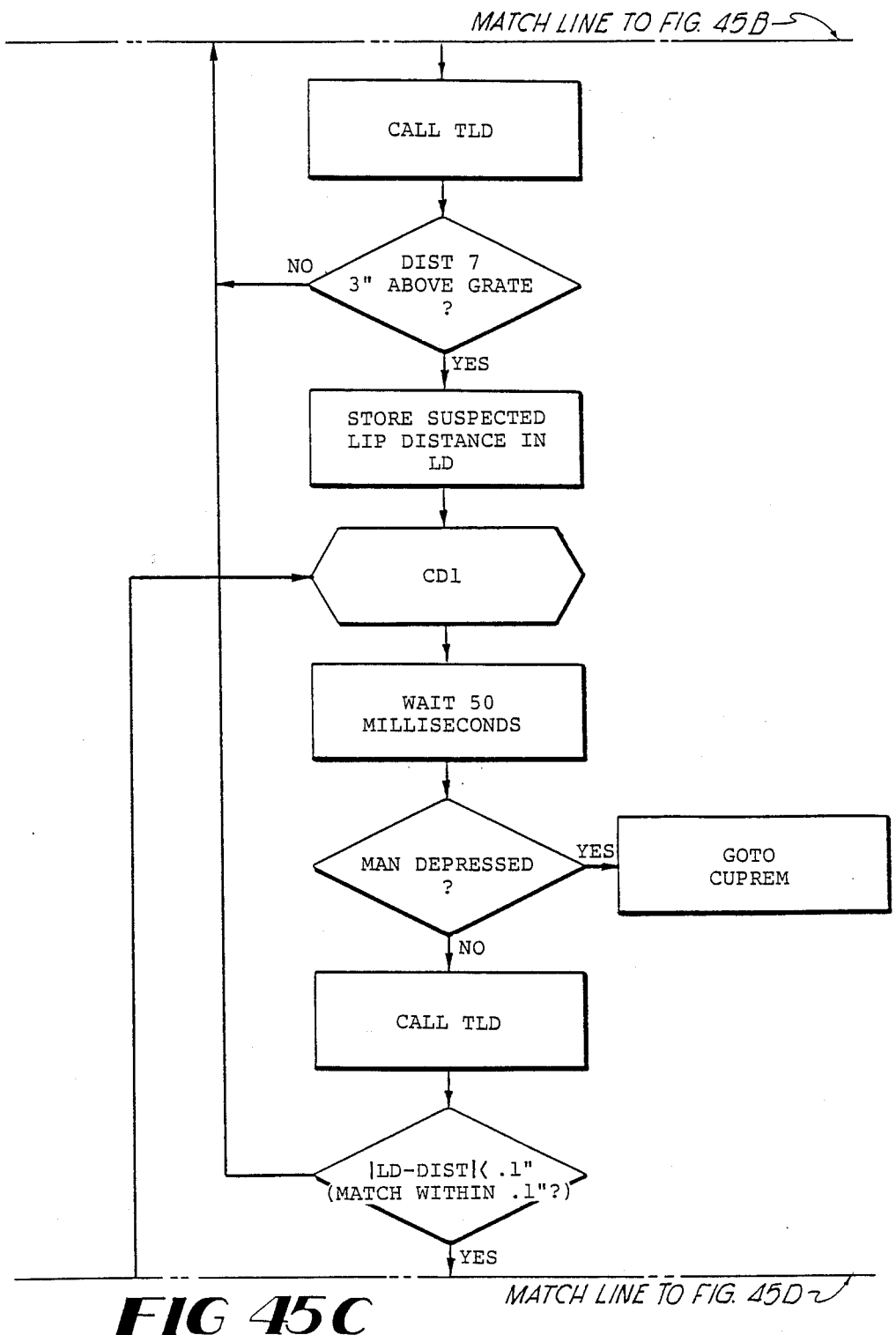
Figure 45D:
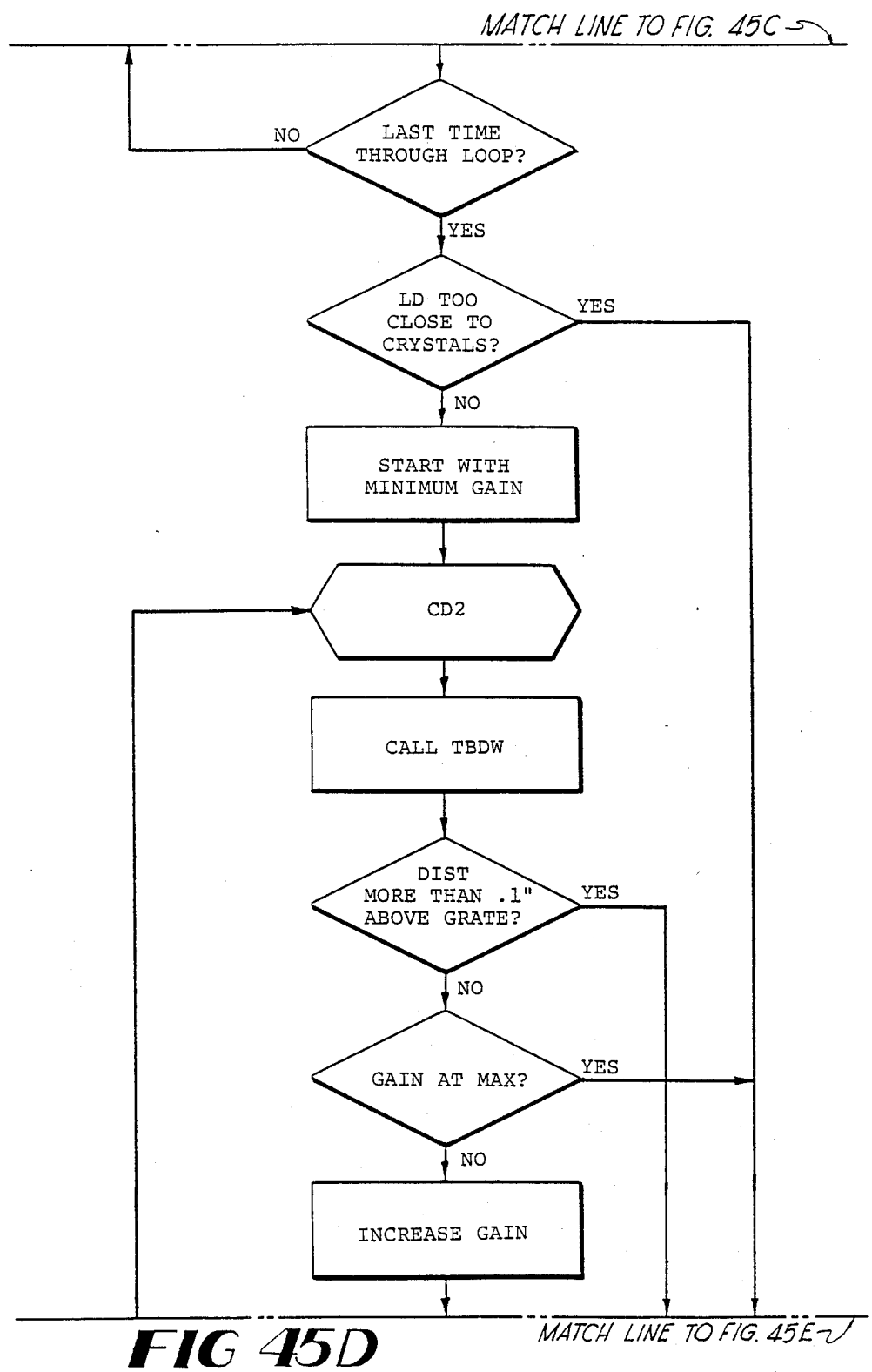
Figure 45E:
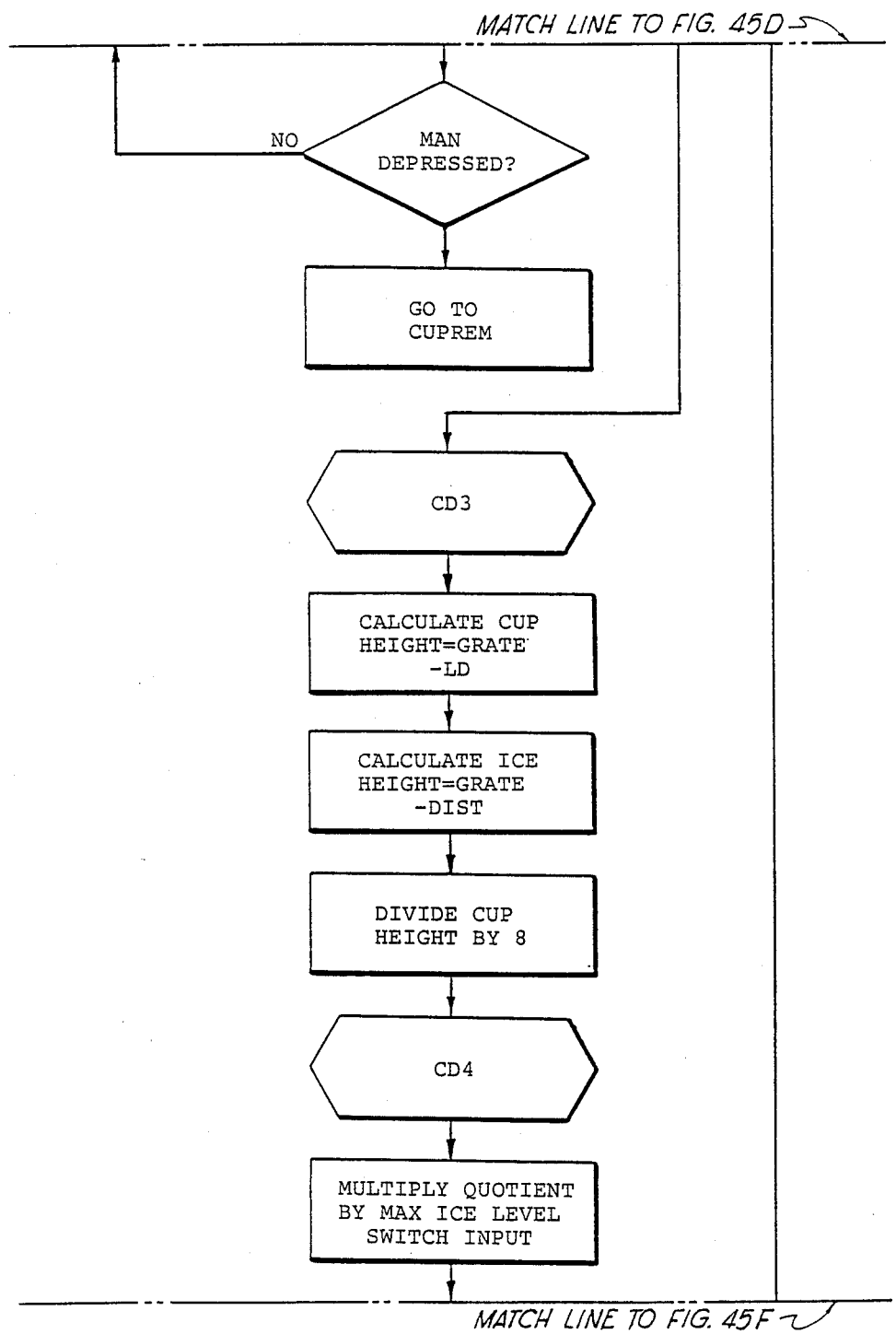
Figure 45F:
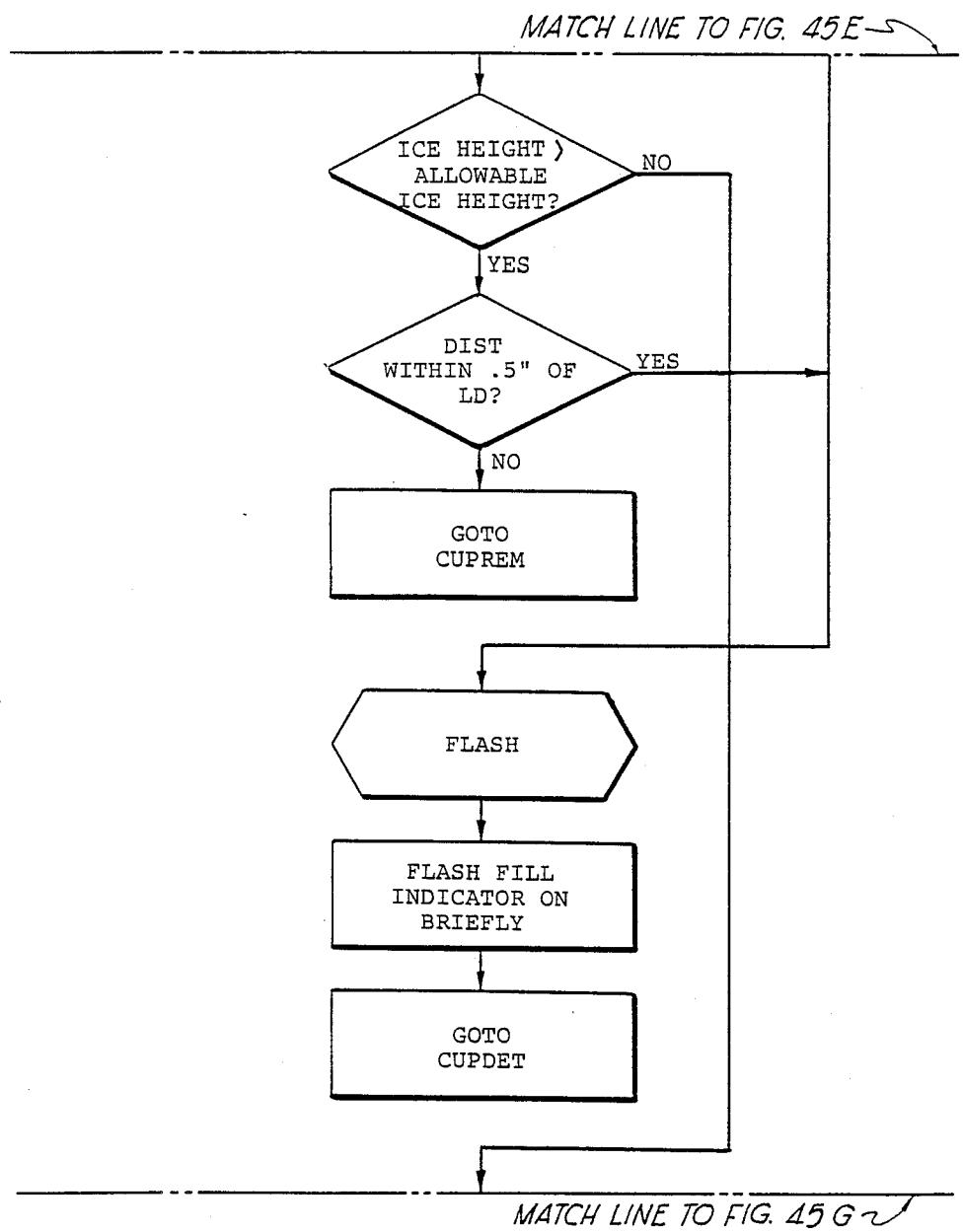
Figure 45G:
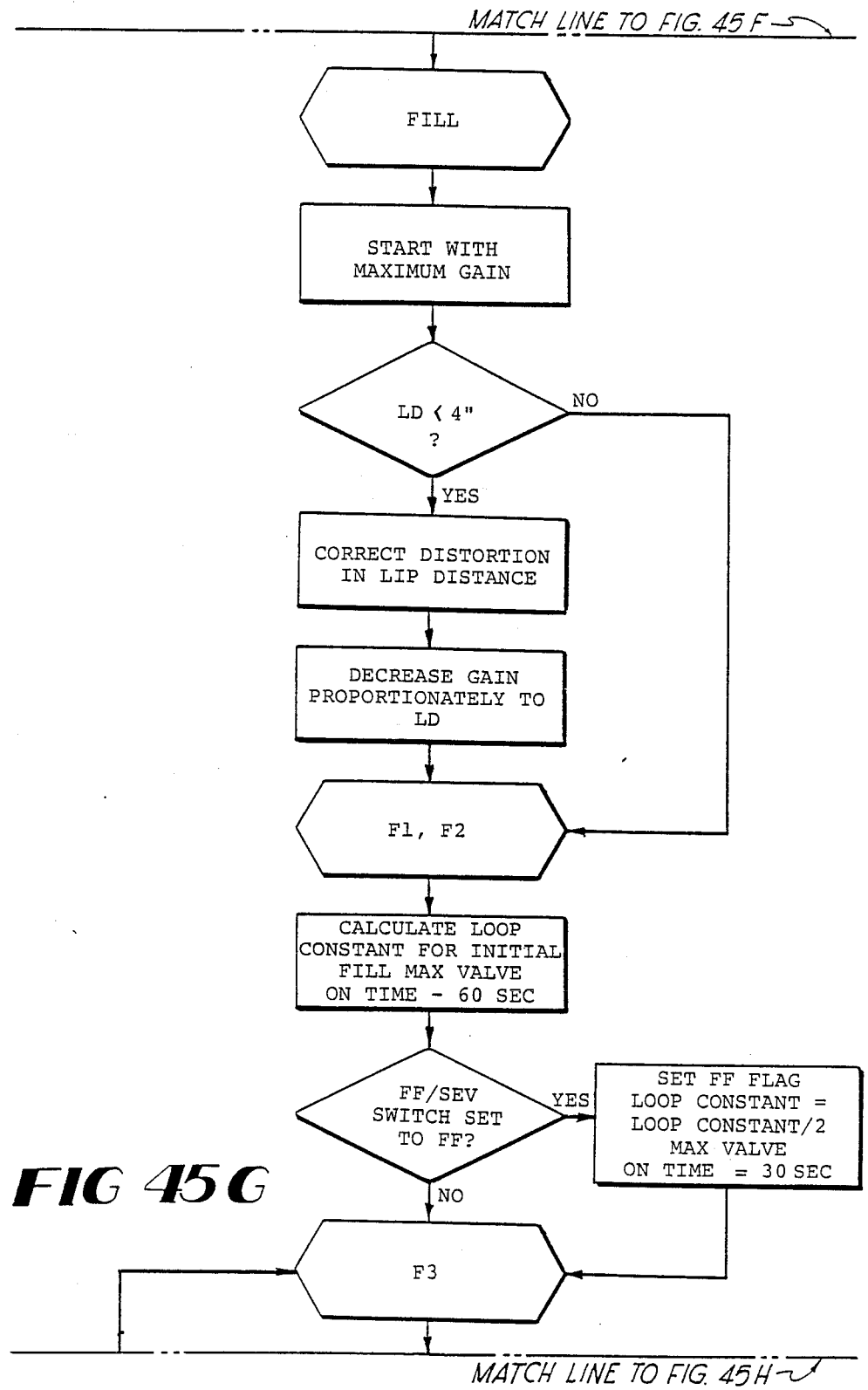
Figure 45I:
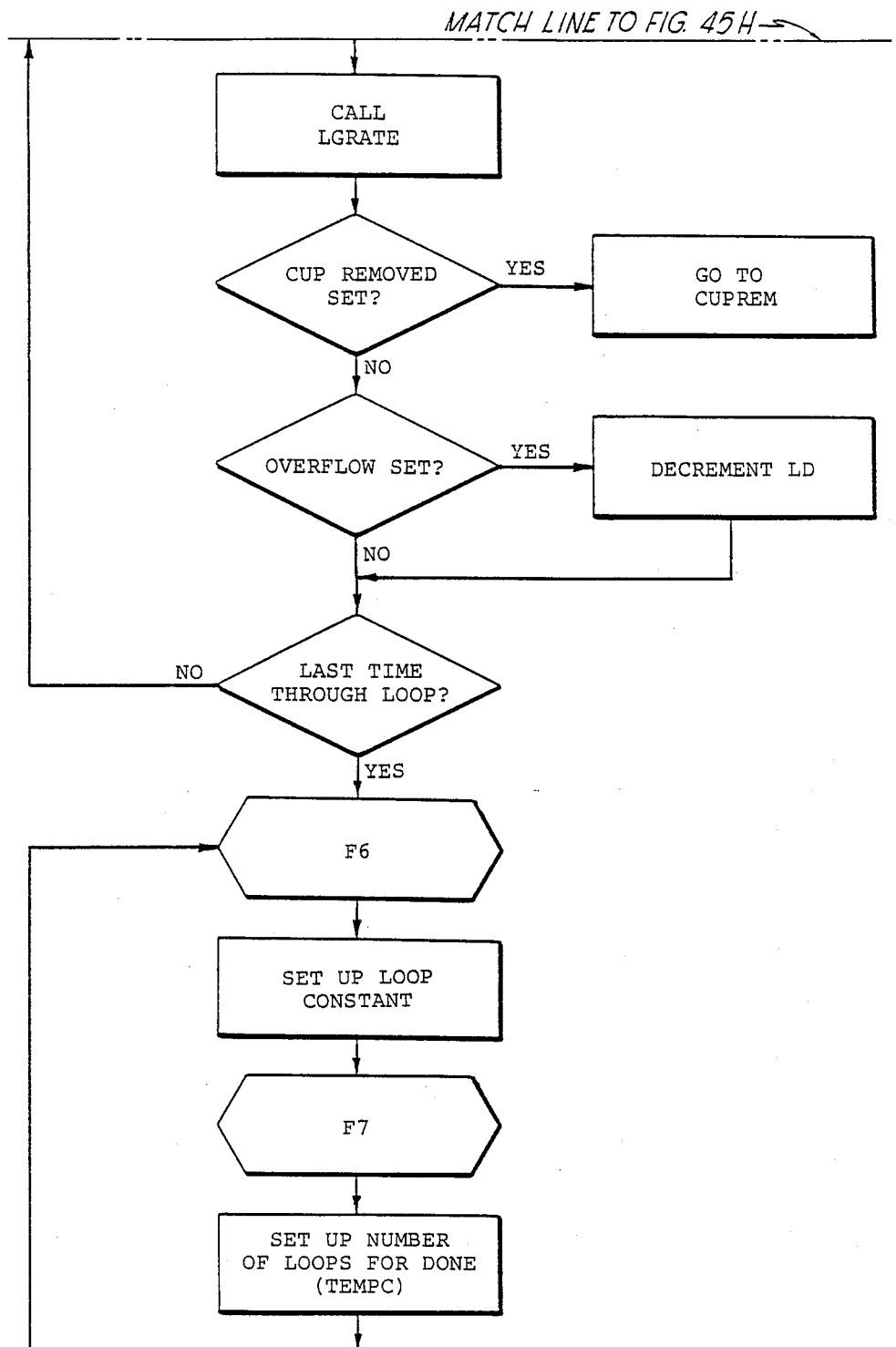
Figure 45J:
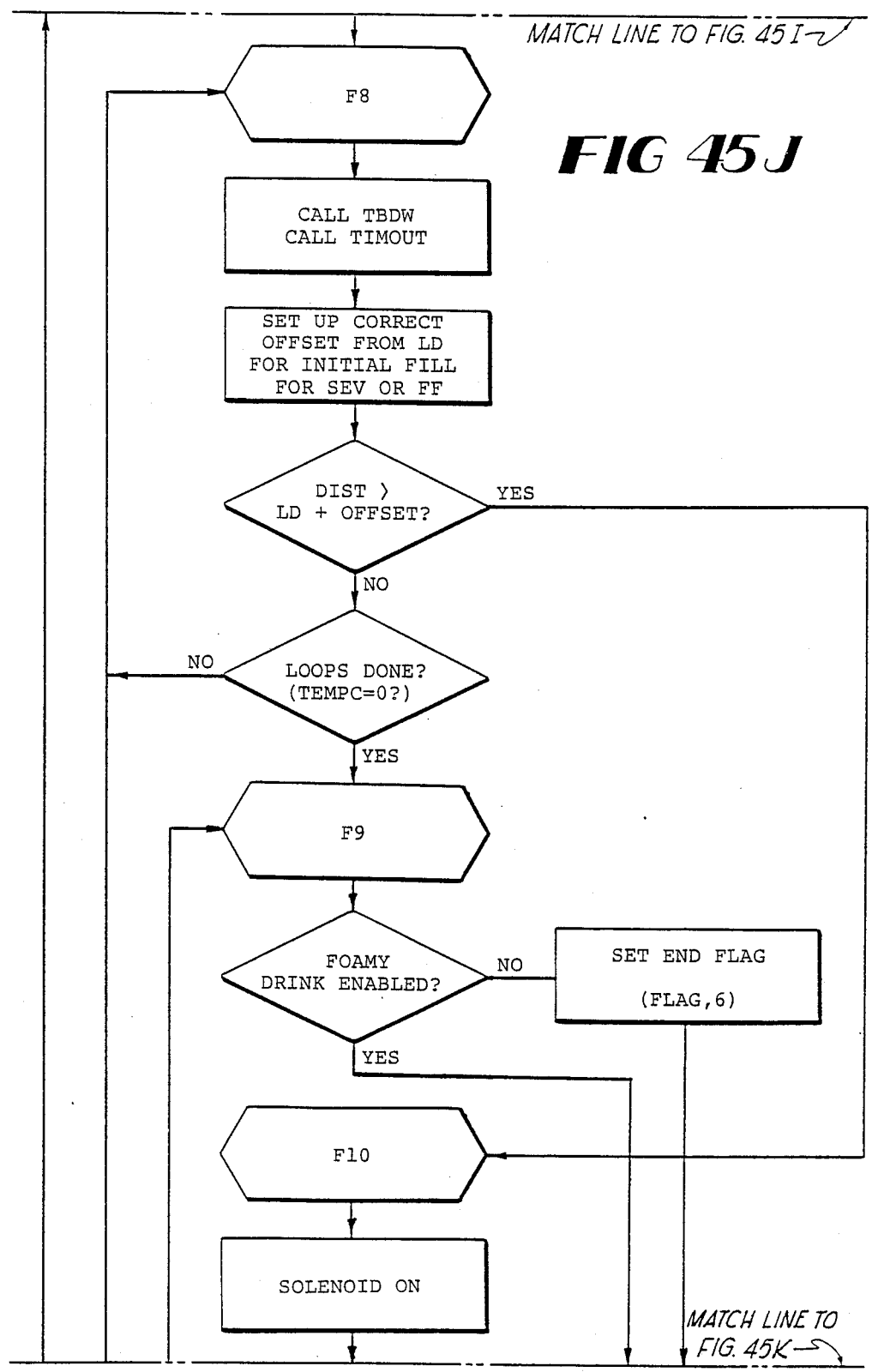
Figure 45K:
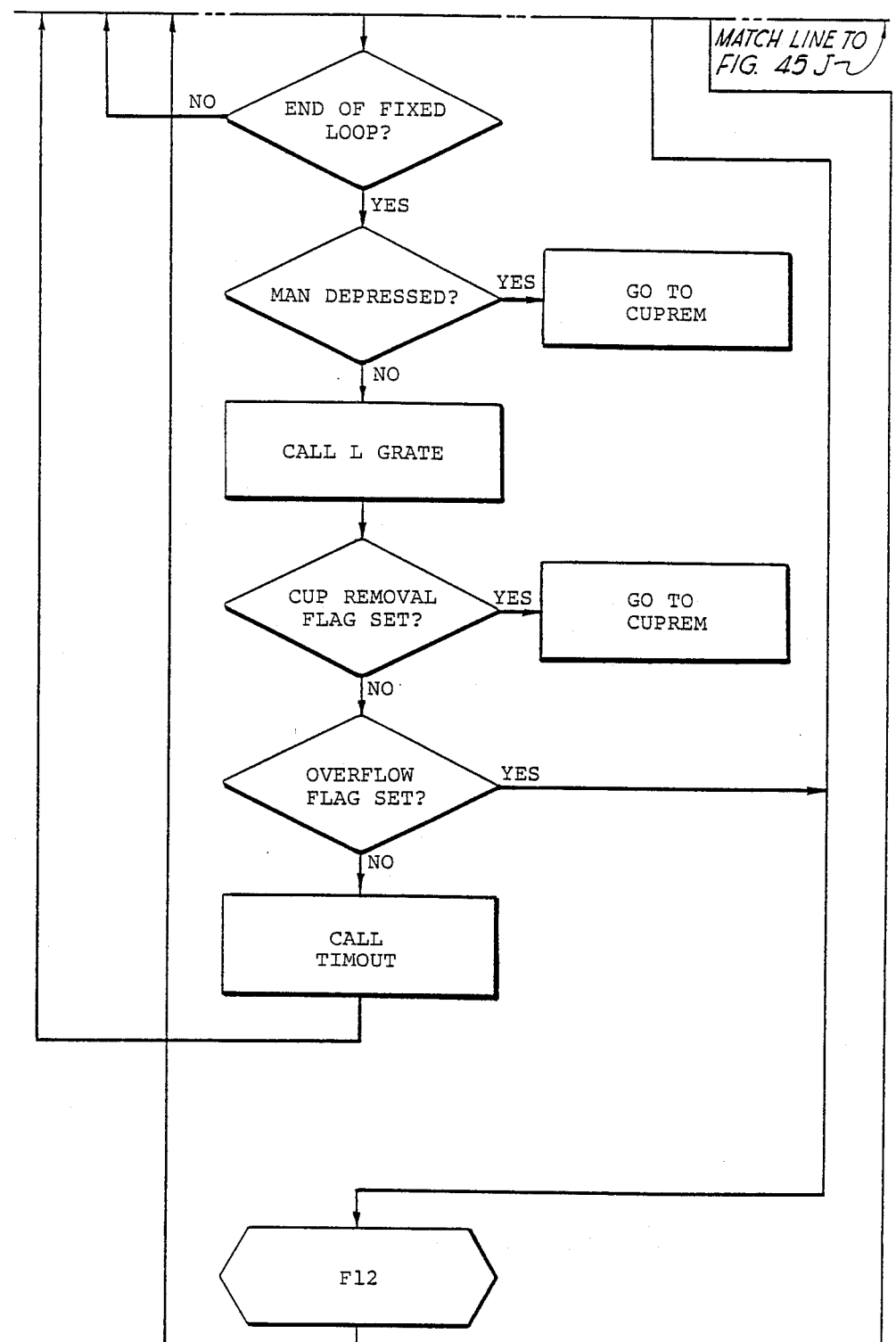
Figure 45L:
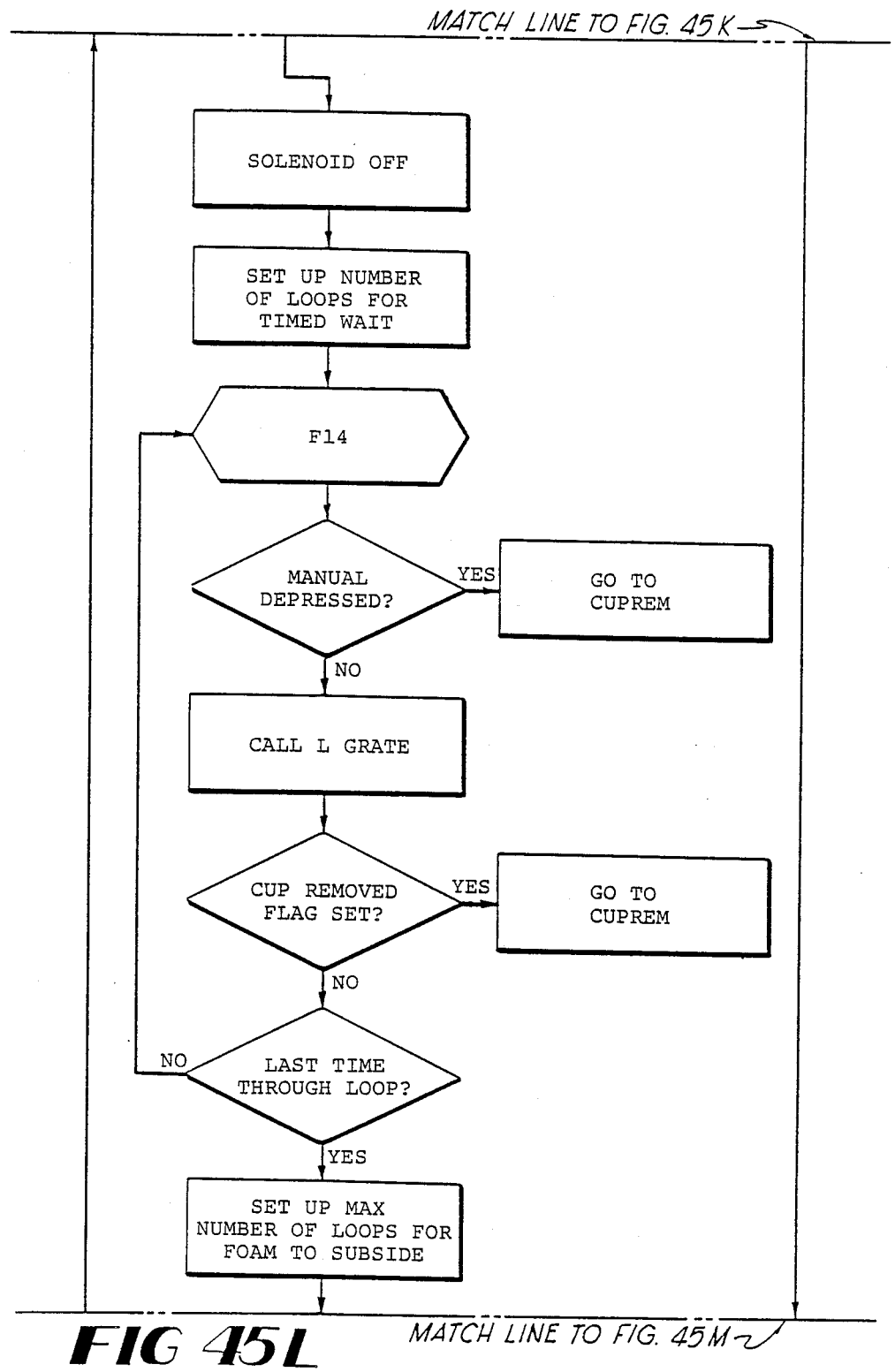
Figure 45M:
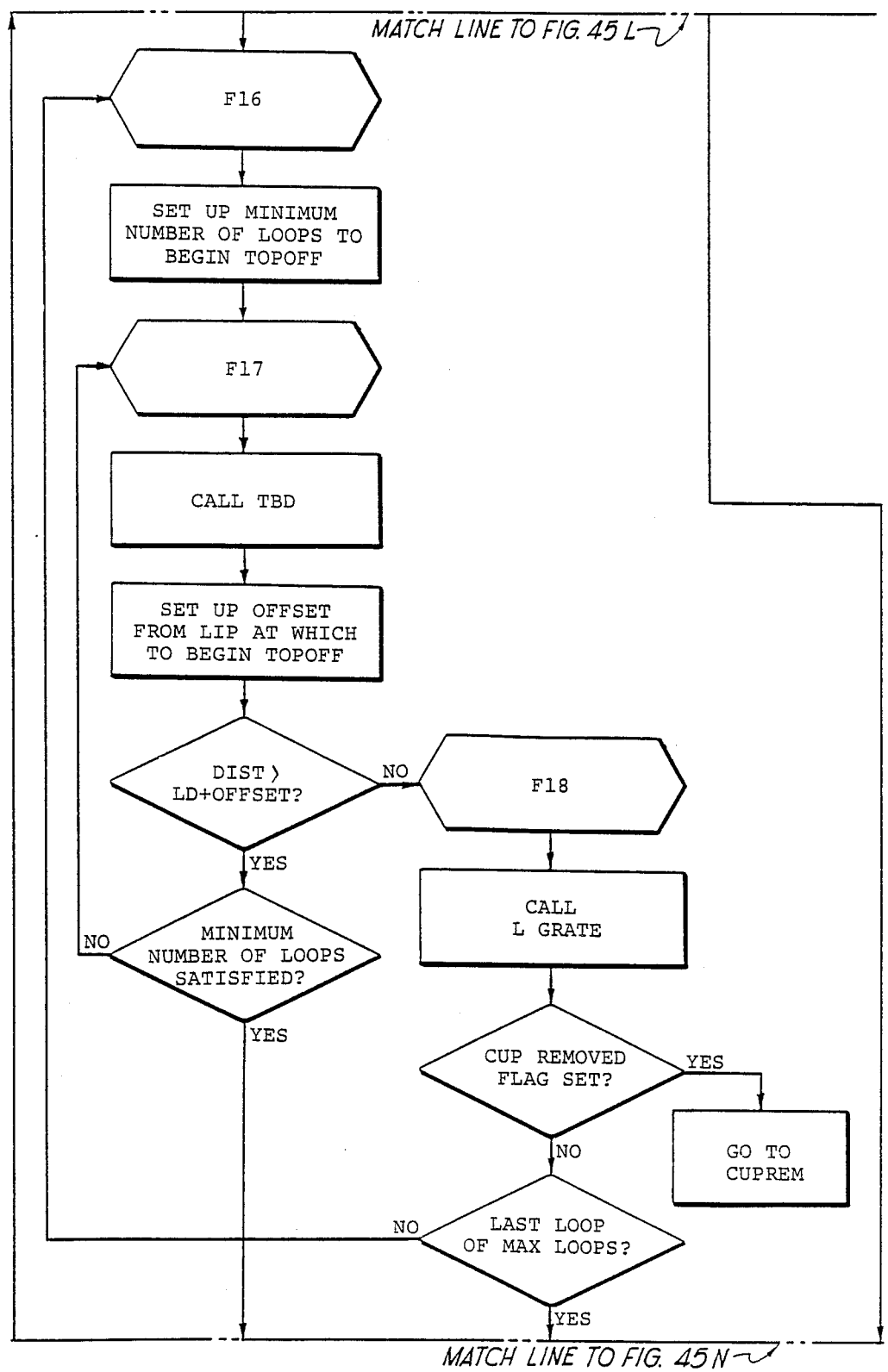
Figure 45N:
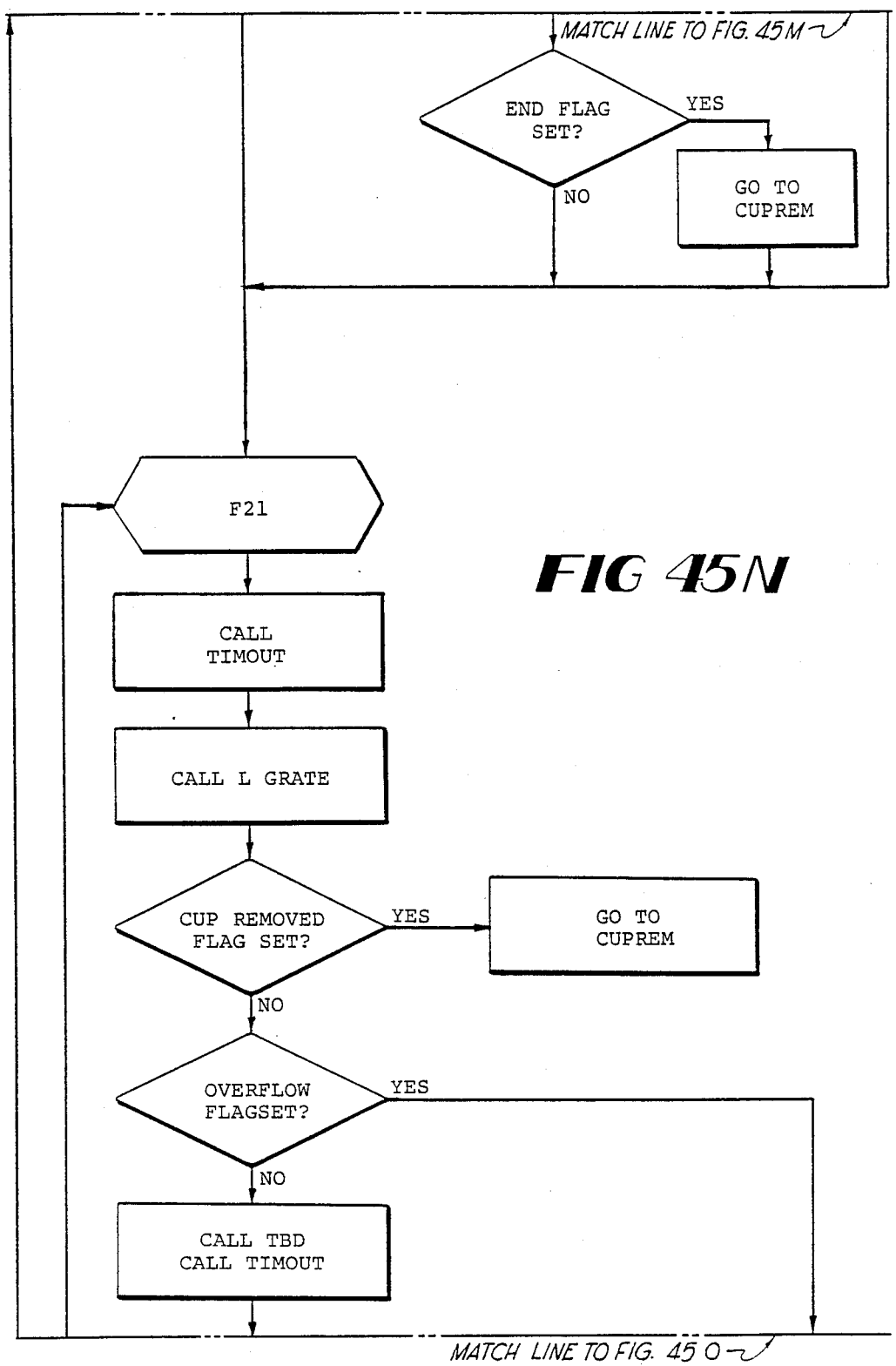
Figure 45:
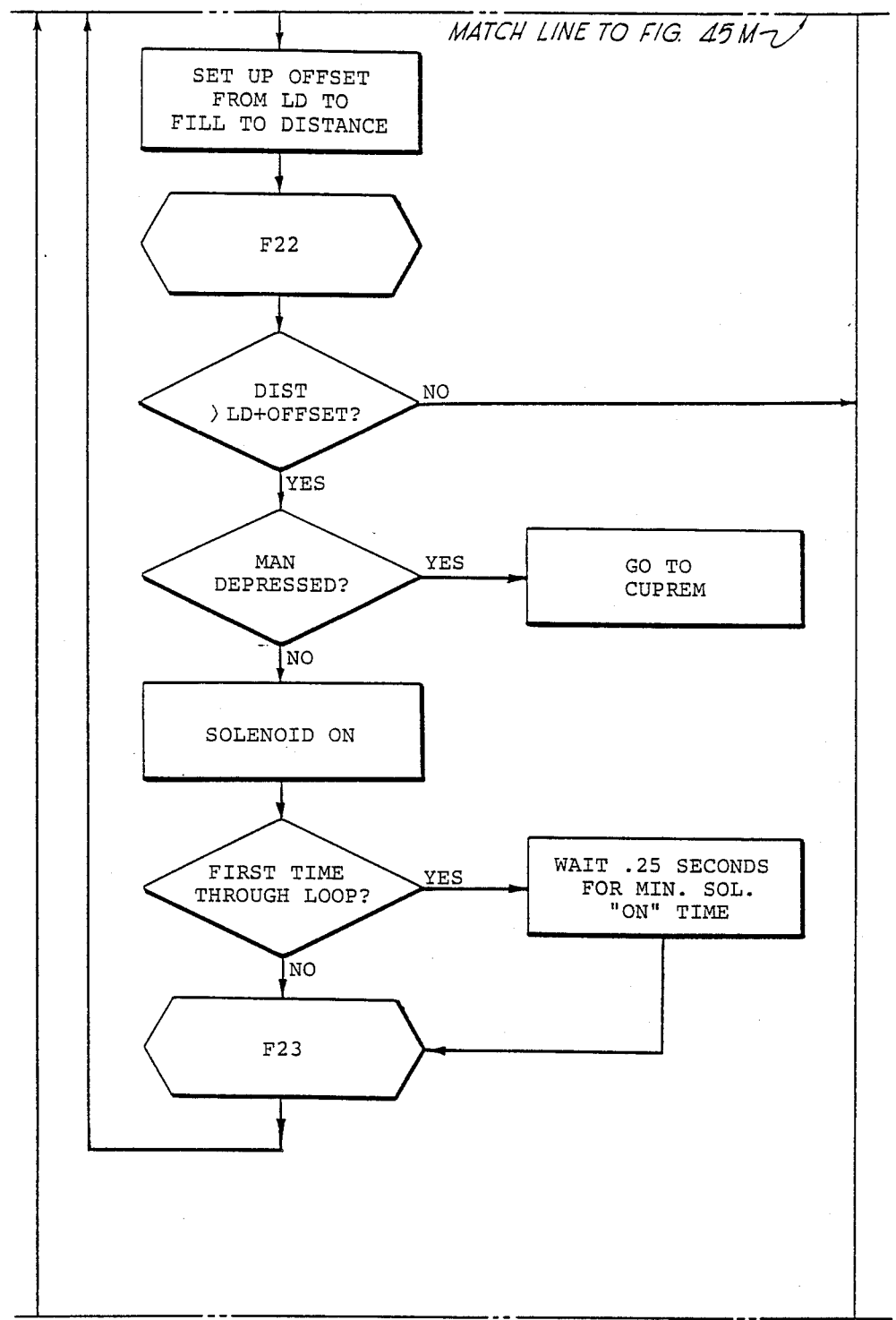
Figure 45P:
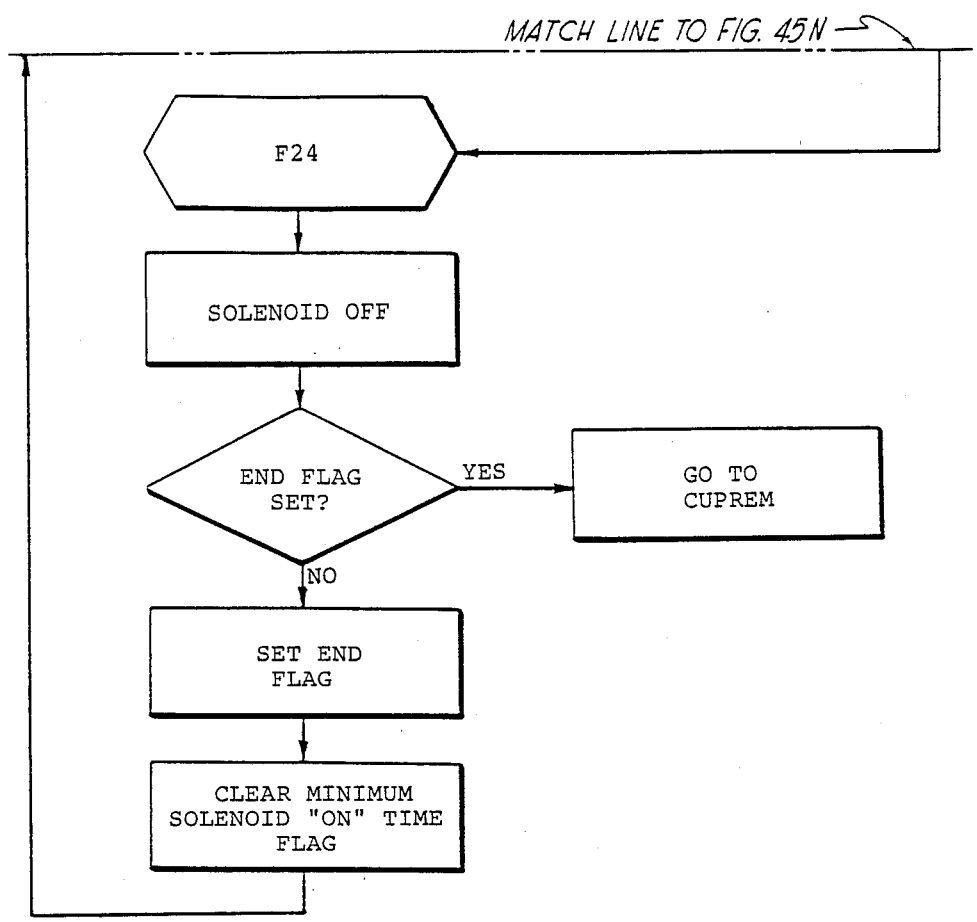
Figure 46:
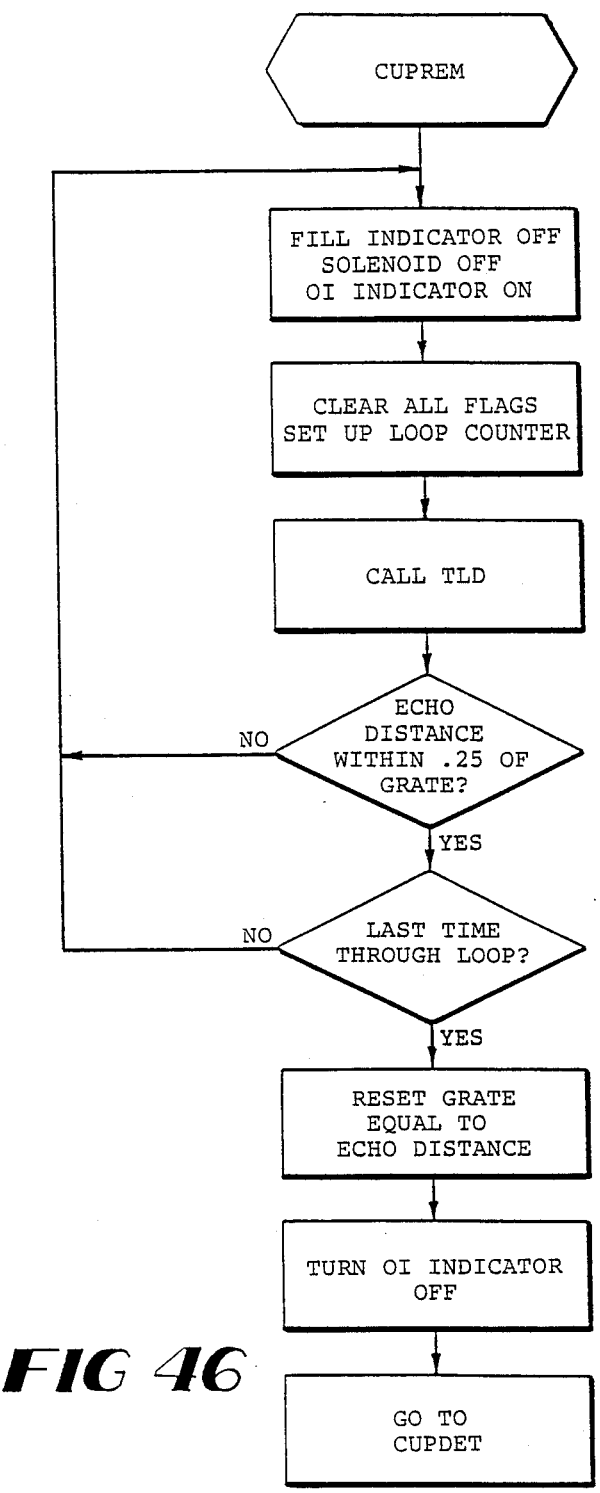

INIT (FIG. 45A) is used when the microcomputer is initialized by the "Master Clear" (hardware). During power up, the first instruction processed is set at location 777 octal. This instruction "GOTO INIT" commands the computer to begin executing this routine, which comprises the following
  a. All RAM are cleared.
  b Wait 1 second for power to stabilize.
  c. Call TSTCHK and run the diagnostic routine if test flag is set.
  d. Use TLD to look with maximum gain and no window for an echo distance between 7" and 13".
  e. If it does not detect an echo within this range, the "Over Ice" indicator on the front panel flashes.
  f. If it does detect an echo distance within 7" to 13", an average of 8 samples is stored in RAM as the Grate distance and the program continues at CUPDET.

CUPDET is the Cup Detection routine. This routine collects data using TLD and accepts a cup using the following procedure:
  a. The manual fill switch on the front panel is monitored continuously to assure proper operation. If the manual switch is pressed, the computer begins the Cup Removal routine immediately. The DIP switch is read by calling TSTCHK and if the test flag is set, the CUPDET routine ends and the INIT routine begins.
  b. A stable lip distance must be established more than 3" above the GRATE. A stable lip distance is defined as 5 consecutive echo distances from TLD separated by 60 milliseconds that correlate within 0.1". This corresponds to the cup lip being stable for 330 milliseconds. If the stable lip distance is too close to the crystals (0.6"), the Lip Distance is rejected, the FILL indicator flashes and CUPDET begins again.
  c. A cup bottom or ice level must be discerned that is more than 0.1" above the Grate and more than 0.5" below the lip. This is accomplished using TBDW and varying the gain as follows: With minimum gain, obtain an echo distance using TBDW. If the echo distance is not more than 0.1" closer than the grate, then the gain is increased one step and another sample is taken. If the gain reaches the maximum, the FILL indicator flashes and the Cup Detection routine begins again.
  d. The Ice/Bottom height is calculated from the last distance obtained as outlined in (C) above and the GRATE and then stored as the actual ice height. The cup height is calculated from the lip distance and the GRATE. The cup height is divided by 8 and the quotient is multiplied by the 3 bit binary number input as selected on the ice level programming switches. This allowable ice height is compared to the actual ice height and the Lip Distance. If the actual ice height is greater than allowed by the switch selection, but less than 0.5" below the Lip Distance, the cup is rejected and the Cup Removal routine begins. If the actual ice height is within 0.5" of the Lip Distance, the cup is not positioned correctly and the FILL indicator flashes before beginning the Cup Detection routine again. If the actual ice height is less than the level selected by the switch, the FILL routine begins.

The FILL routine controls the complete filling and top off operation. The routine limits the solenoid operation to a maximum of 3 On/Off cycles. After each of the first 2 cycles, the routine waits for the foam to settle before starting the next cycle. When the cup is full, the Cup Removal routine begins. If the manual switch is pressed at anytime during the FILL routine, the Cup Removal routine begins immediately. The timeout subroutine is called during the time the solenoid valve is turned on by the fill program to monitor the valve on time. If the maximum valve on time is exceeded, the timeout subroutine turns the valve off and does not return on the fill routine. A detailed description of the FILL routine follows:
  a. Before the solenoid is actuated, several checks and corrections are made. The gain is initially set at maximum. If the Lip Distance is less than 4", the gain is adjusted with the empirically derived equation:

$$\text{Gain} = \text{Gain} \, \tfrac{1}{8}(4'' \text{ lip distance})$$

If the Lip Distance is less than 4", the Lip Distance is adjusted with the empirically derived equation:

$$\text{Lip Distance} = \text{Lip Distance} \, \tfrac{1}{8}(4'' \text{Lip Distance})$$

The Time Constant for this particular cup height is calculated with the equation:

$$\text{Time Constant} = \text{cup height}/4 \text{ for SEV and cup height}/8 \text{ for Fast Flow.}$$

This Time Constant is used in the first of the three cycles to provide an initial fill time proportional to the cup height.

b. The gain must be adjusted such that the fluid level is detected and the lip is not during the period when the cup vibrates such as at the beginning of a FILL. Also if the cup was not positioned perfectly, the Lip Distance may be slightly farther than originally detected. To adjust the gain, an initial filling period proportional to cup height is allowed to minimize cup vibration and adjust gain as necessary. During this time period the routine uses TBD to check if the echo distance is within 0.75" of the stored Lip Distance. If it is, the gain is reduced one step. If the gain reaches minimum, the Cup Removal routine begins. This time is also used to adjust the Lip Distance as follows: LGRATE is called and if an overflow is detected then the Lip Distance is decremented (an overflow in LGRATE is defined as more than 0.1" less than the stored Lip Distance). If LGRATE detects a missing cup then the Cup Removal routine begins immediately. At the end of this period, the solenoid valve stays on.

c During the next time period the routine uses TBDW to monitor the liquid level. If the Foamy/Flat switch is set to Foamy, the solenoid turns off when the liquid level is within 0.5" for SEV or 0.7" for FFV. If the Foamy/Flat switch is set to Flat, the solenoid is not turned off until the liquid level reaches 0.2" for SEV and 0.3" for FFV, at which time the cup removal routine begins. This condition must be met in two consecutive checks for the solenoid to turn off. The Grate/Overflow detector subroutine checks to see if the cup has been removed or if TBDW has missed the liquid level rising and an overflow is imminent. If the cup is missing, the cup removal routine begins. If there is an off.

d. A 4-second pause begins at this time to allow the foam to settle. The Grate/Overflow subroutine checks continuously for the cup to be removed. If it is, the cup removal routine begins immediately.

e. After the pause, another 4-second time period starts. Using TBD, the foam level is monitored. If the foam drops below 0.4" for 10 consecutive checks, this period ends and the first top-off period begins. If the foam does not drop below 0.4" within 4 seconds, the first top-off period begins anyway. The Grate/Overflow subroutine continuously checks for a missing cup. If a missing cup is detected, the cup removal routine begins.

f. The first top-off cycle uses TBD to determine if the liquid/foam level is within 0.1" for a normal 1½ ounces per second valve assembly and 0.05 for the faster 3 ounces per second valve assemblies. If this condition exists, the solenoid is not turned on and this cycle ends. If not, then the solenoid is turned on until the condition is met. For stability, the solenoid has a minimum on time of 0.25 seconds.

g. A repeat of "D", "E", and "F" occurs now to implement the second top-off cycle with the exception that in "F" the values are 0.2" for the normal 1½ ounces per second valve assembly and 0.3" for the faster 3 ounces per second valve assembly.

The cup removal routine (CUPREM) turns the fill indicator off, the solenoid off, and the Over-Ice indicator on. It uses TLD and waits for an echo distance within 0.25" of the Grate. When this condition exists, a new Grate distance is stored, the Over-Ice indicator turns off, and the Cup Detection routine begins again.

A third and preferred embodiment of the present invention will now be described with reference to FIGS. 47-57 and the source code attached hereto as Appendix A.

Figure 47:
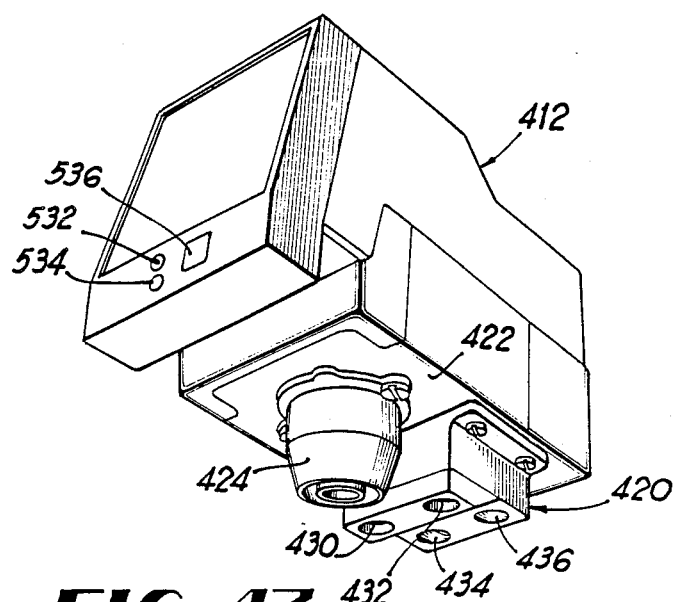
FIG. 47 is a perspective view of a beverage dispenser valve assembly using the automatic filling system of the preferred, four crystal embodiment of this invention.
Figure 48:
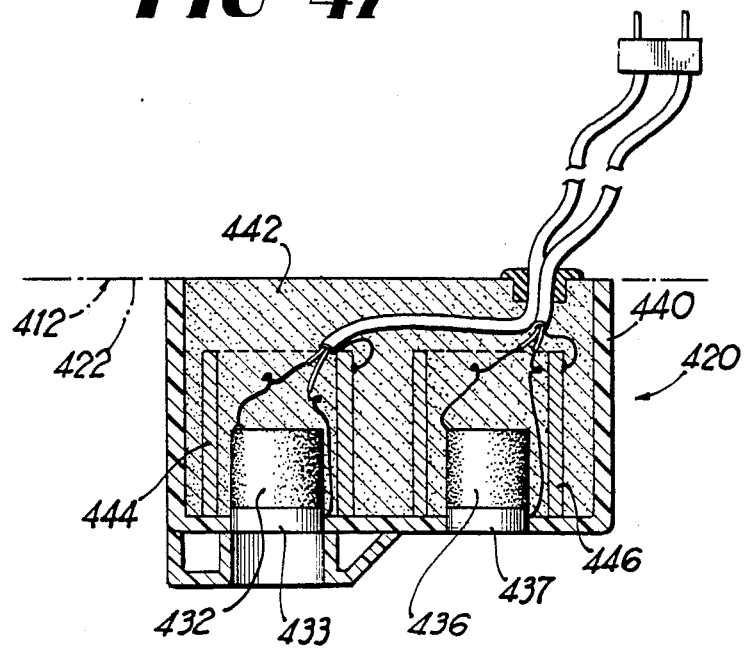
FIG. 48 is a cross-sectional side view of the transducer assembly shown in FIG. 47.
Figure 49:
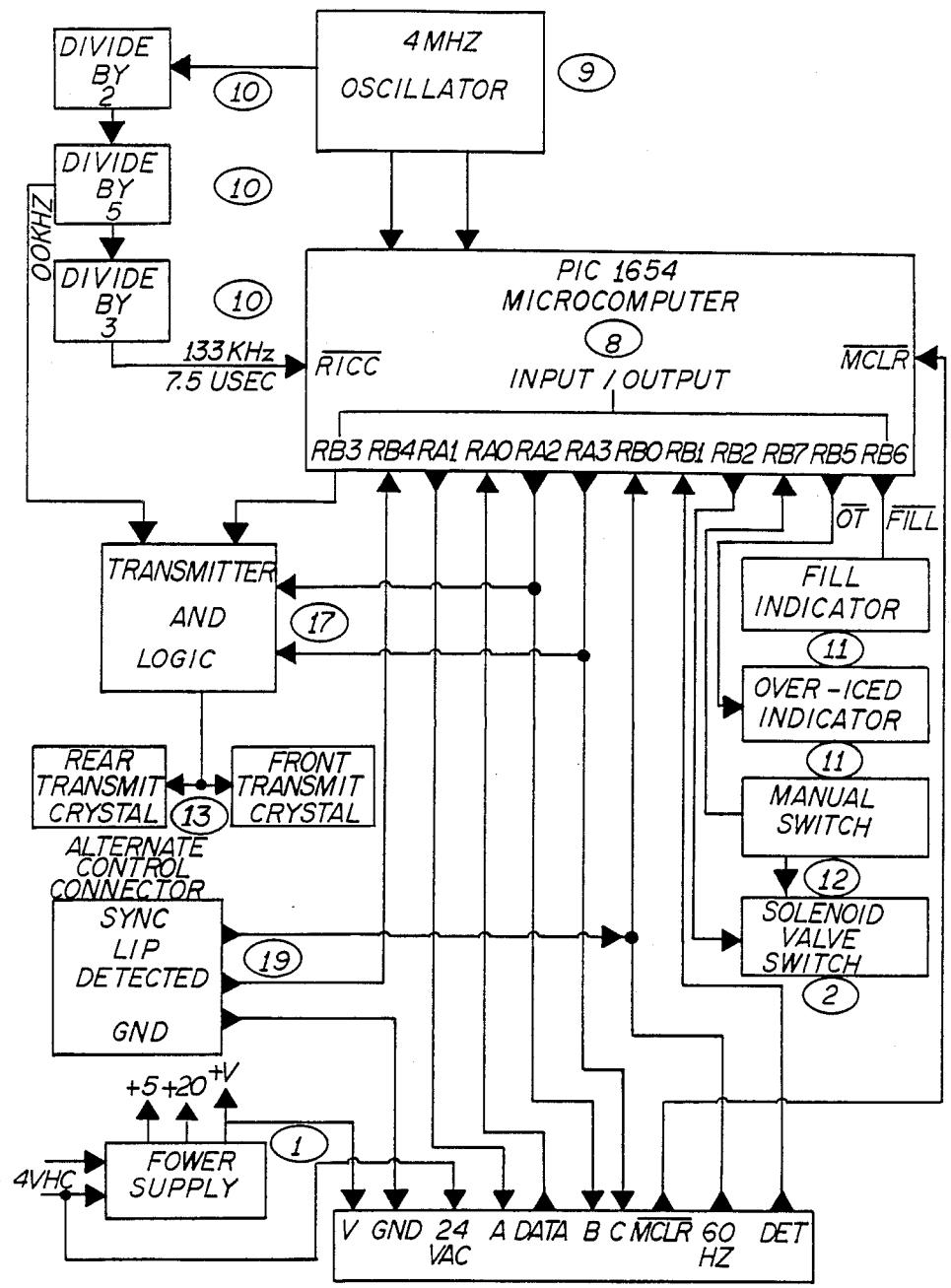
FIG. 49 is a block diagram of part of the electronics package of the four crystal embodiment.
Figure 50:
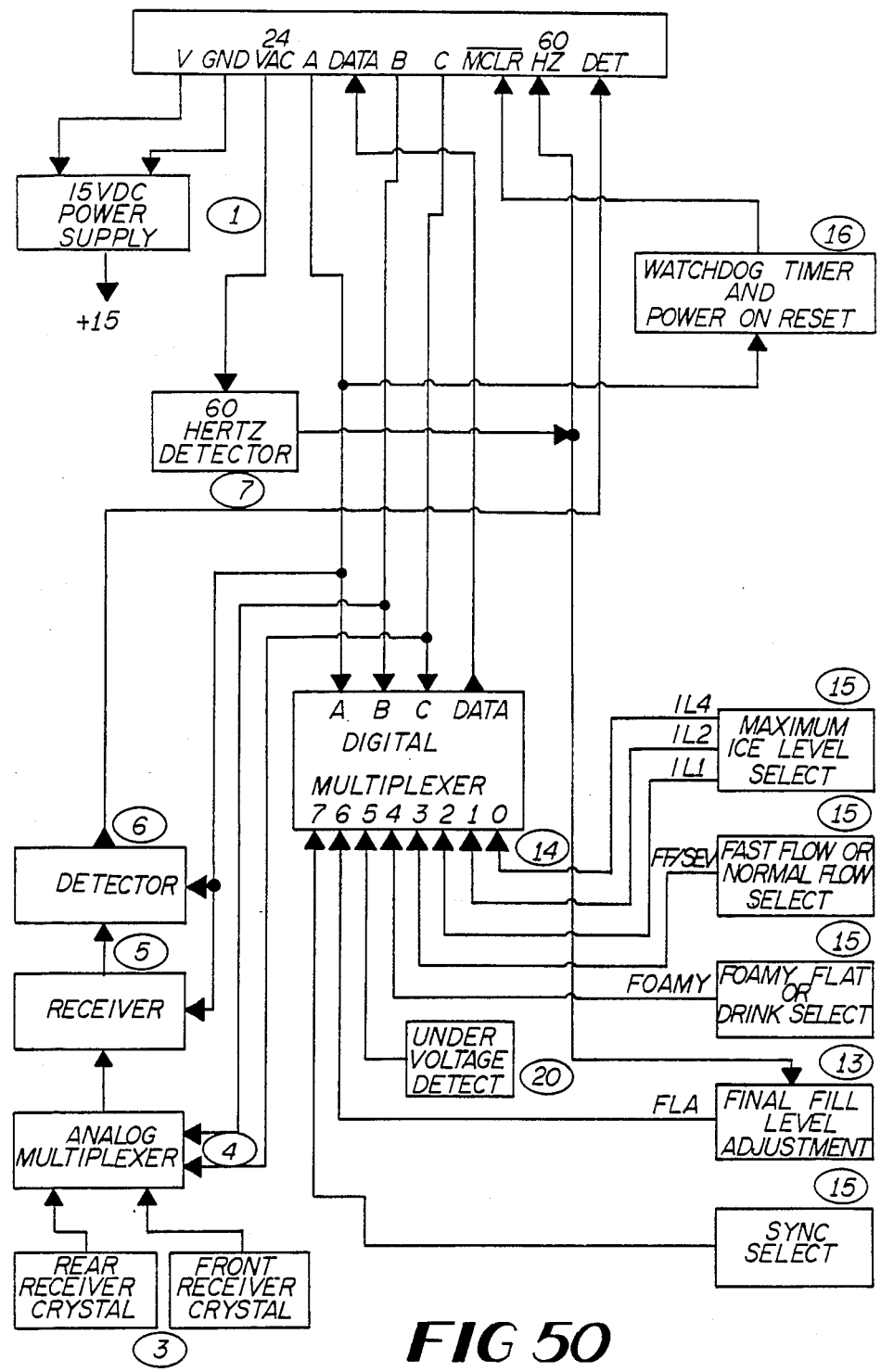
FIG. 50 is a block diagram of another part of the electronics package of the four crystal embodiment.
Figure 51:
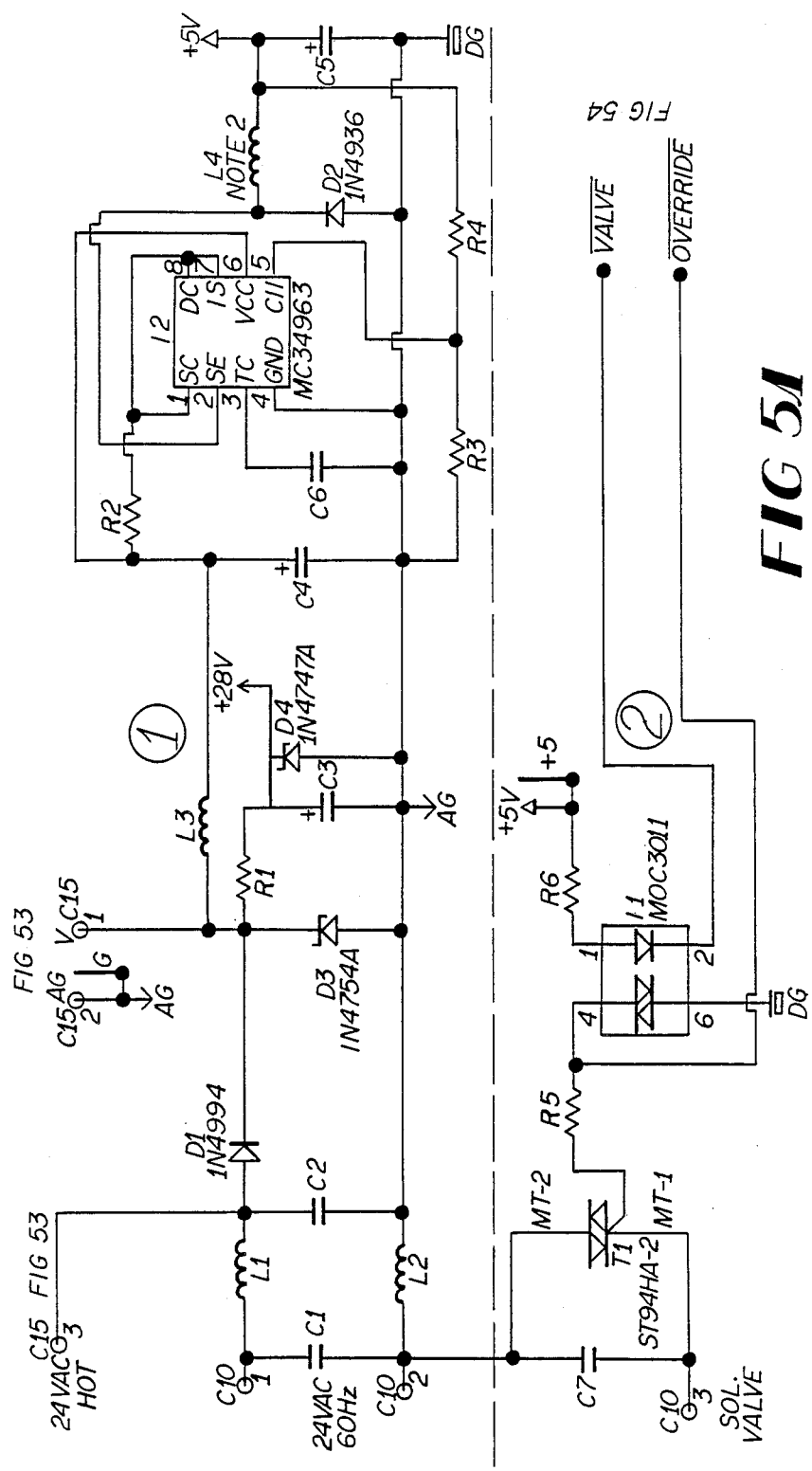
FIG. 51 is an electric schematic of the power supper shown in FIG. 49.
Figure 57B:
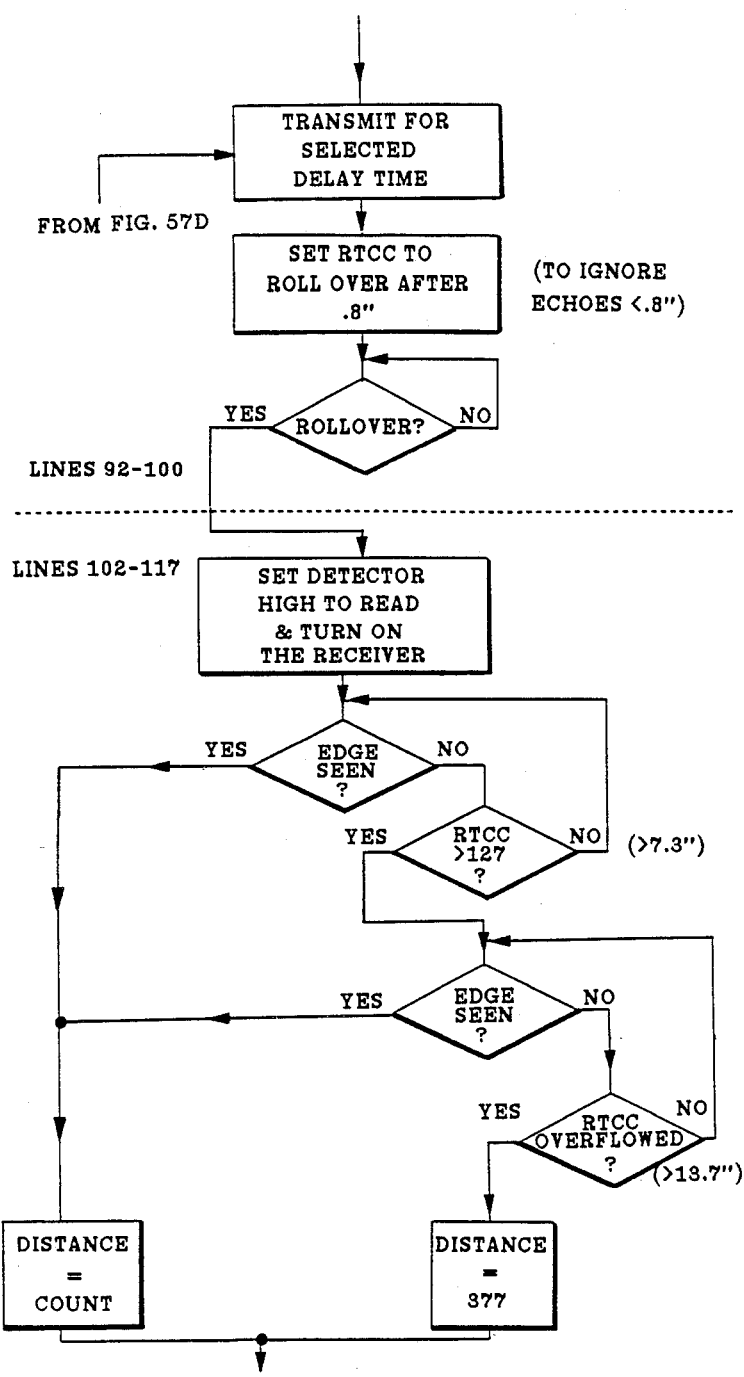
FIGS. 57A–57Z are flow charts of the software used in the four crystal embodiment.
Figure 57C:
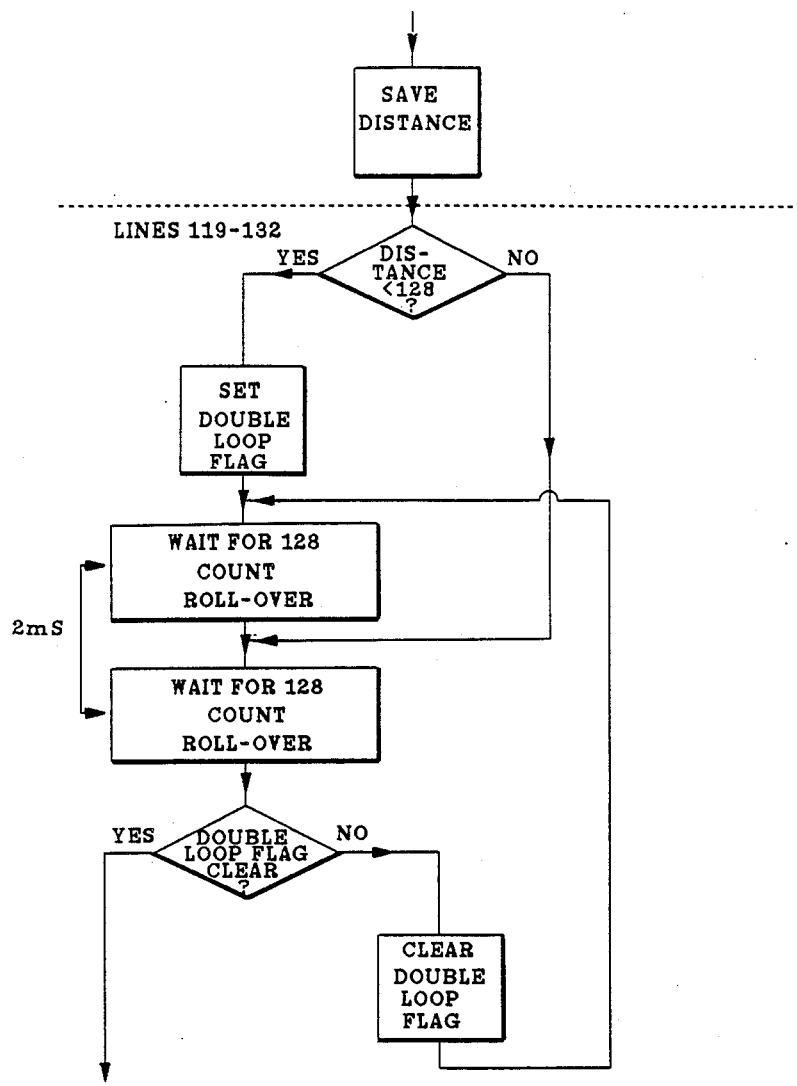
Figure 57D:
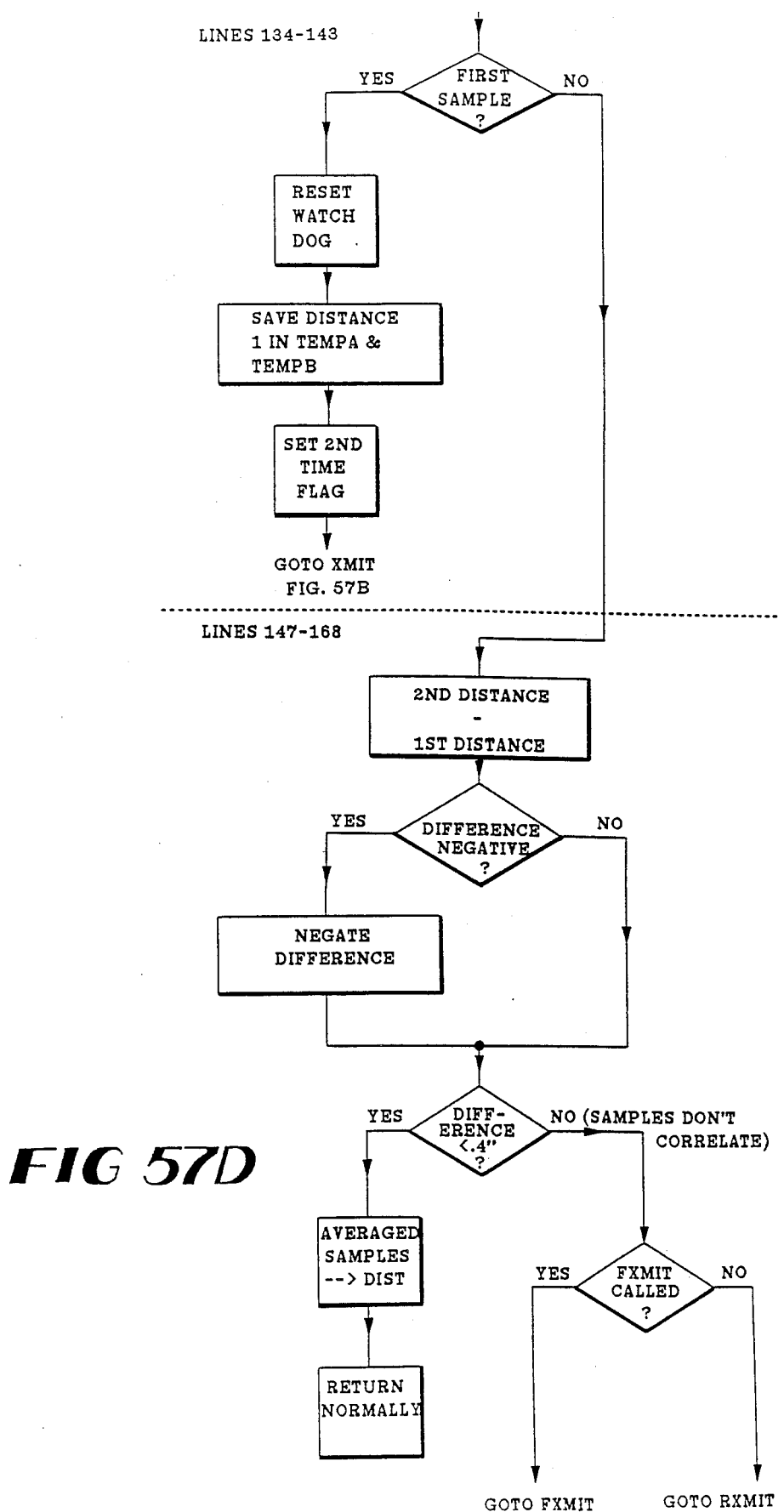
Figure 57E:
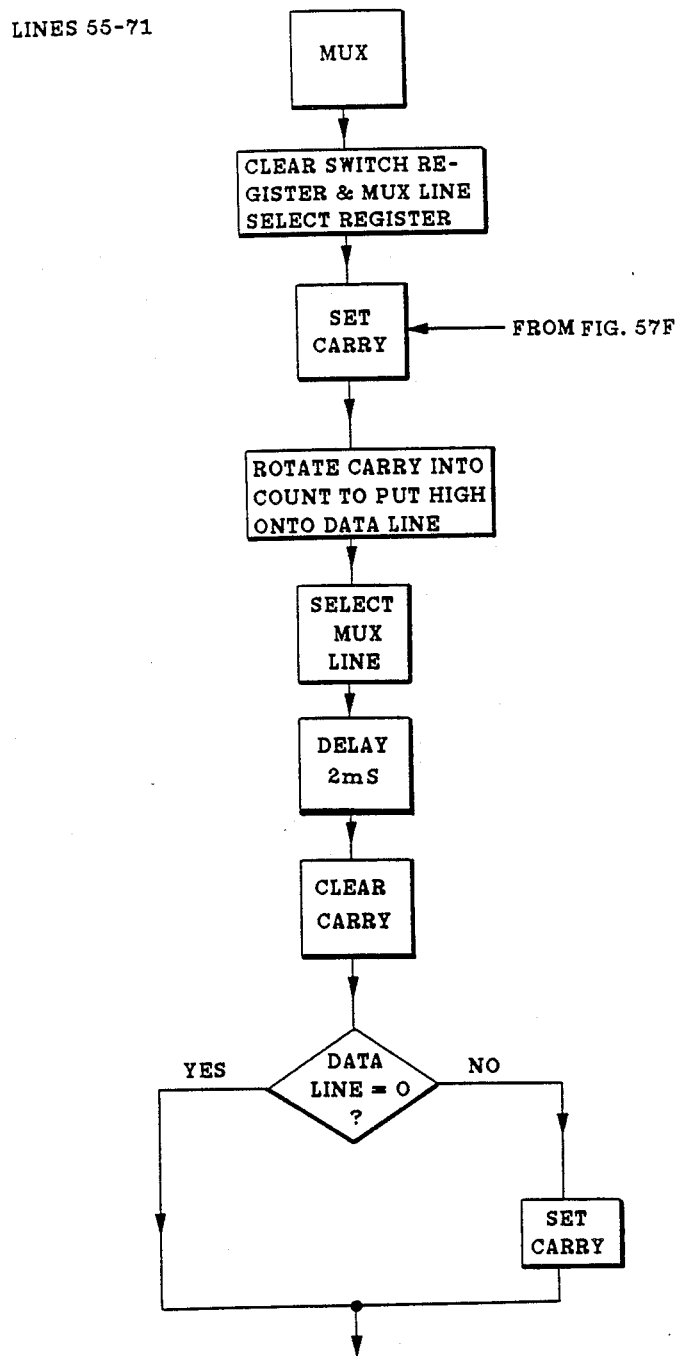
Figure 57F:
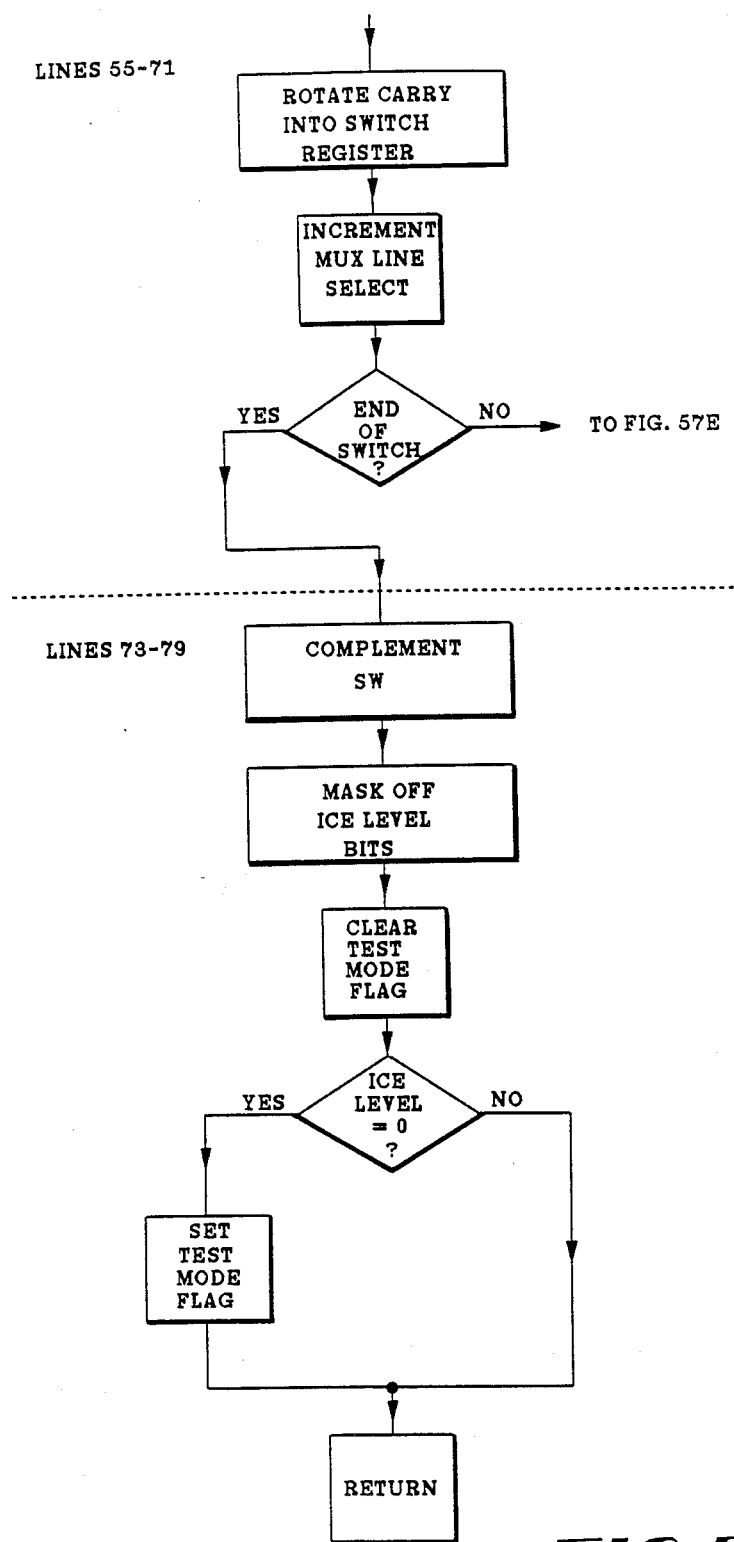
Figure 57G:
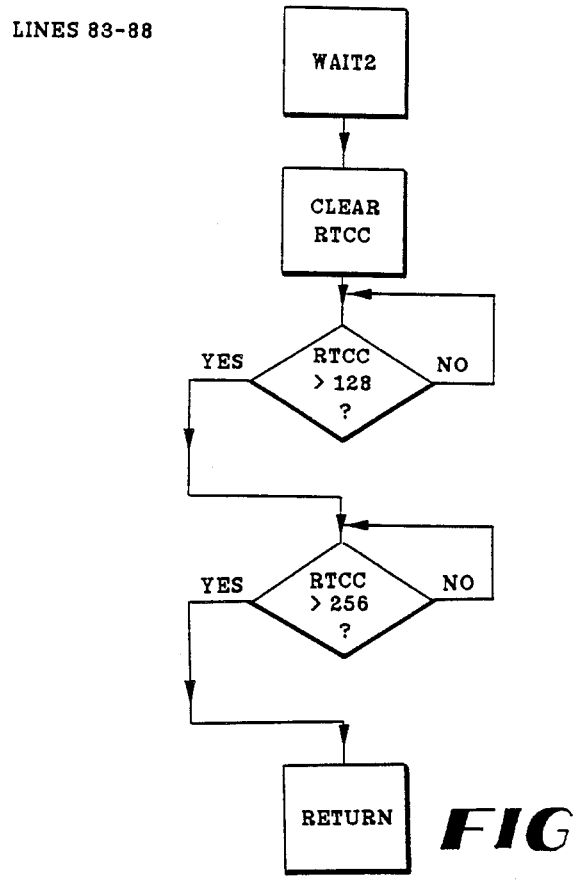
Figure 57H:
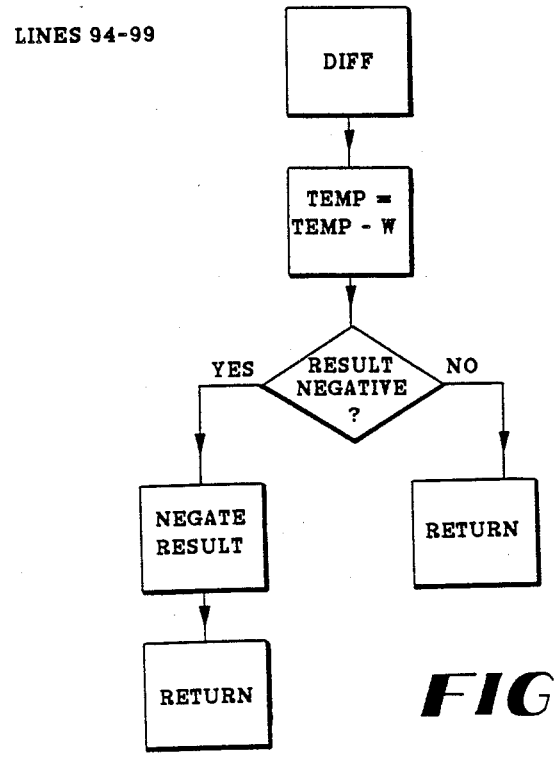
Figure 57I:
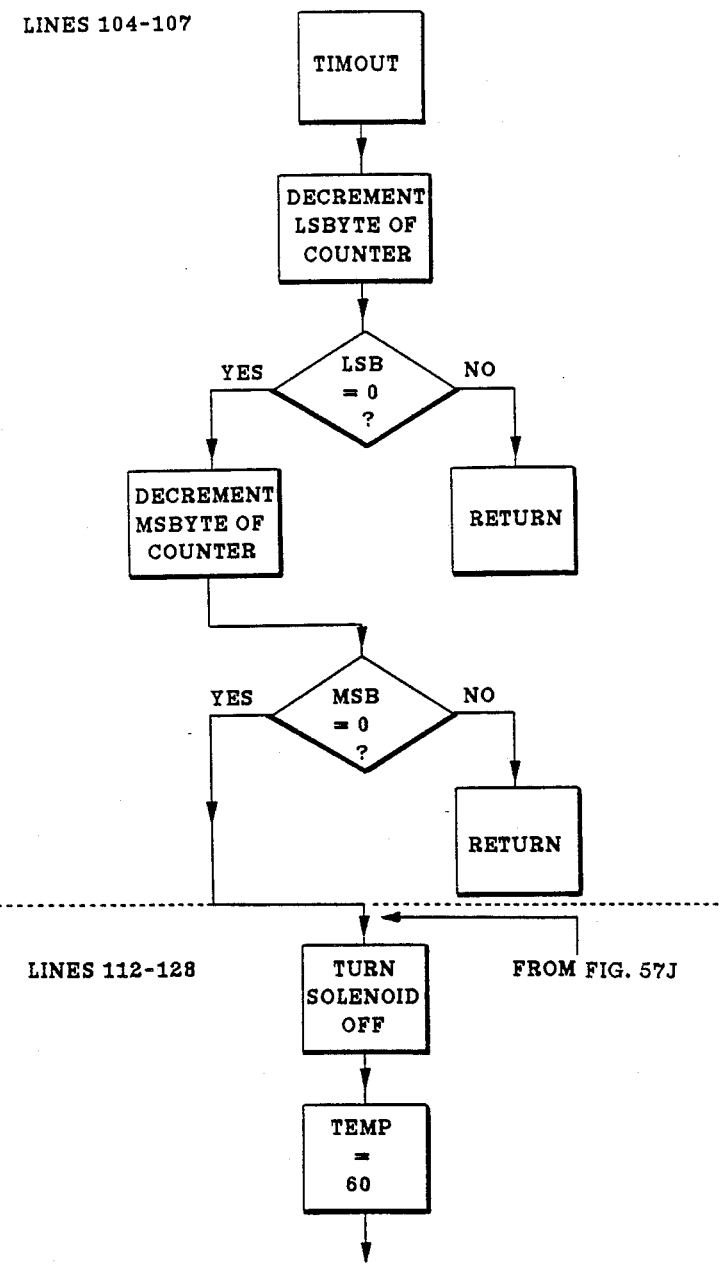
Figure 57J:
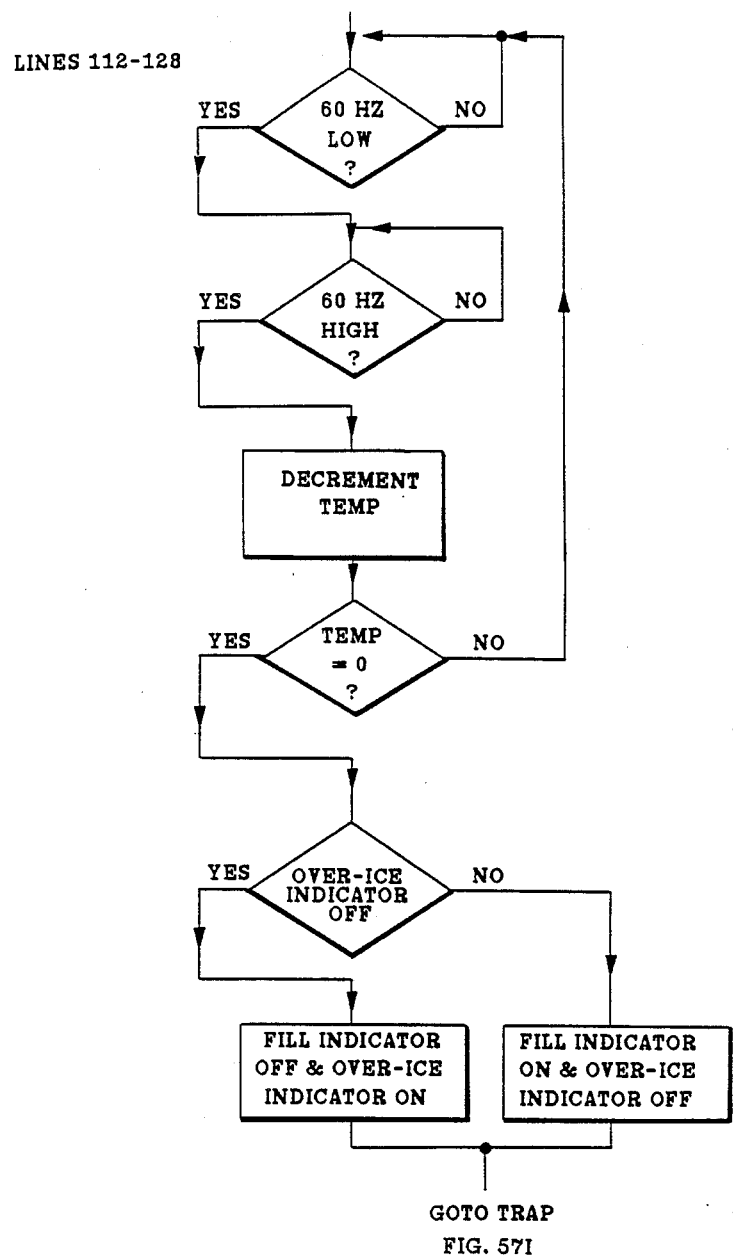
Figure 57K:
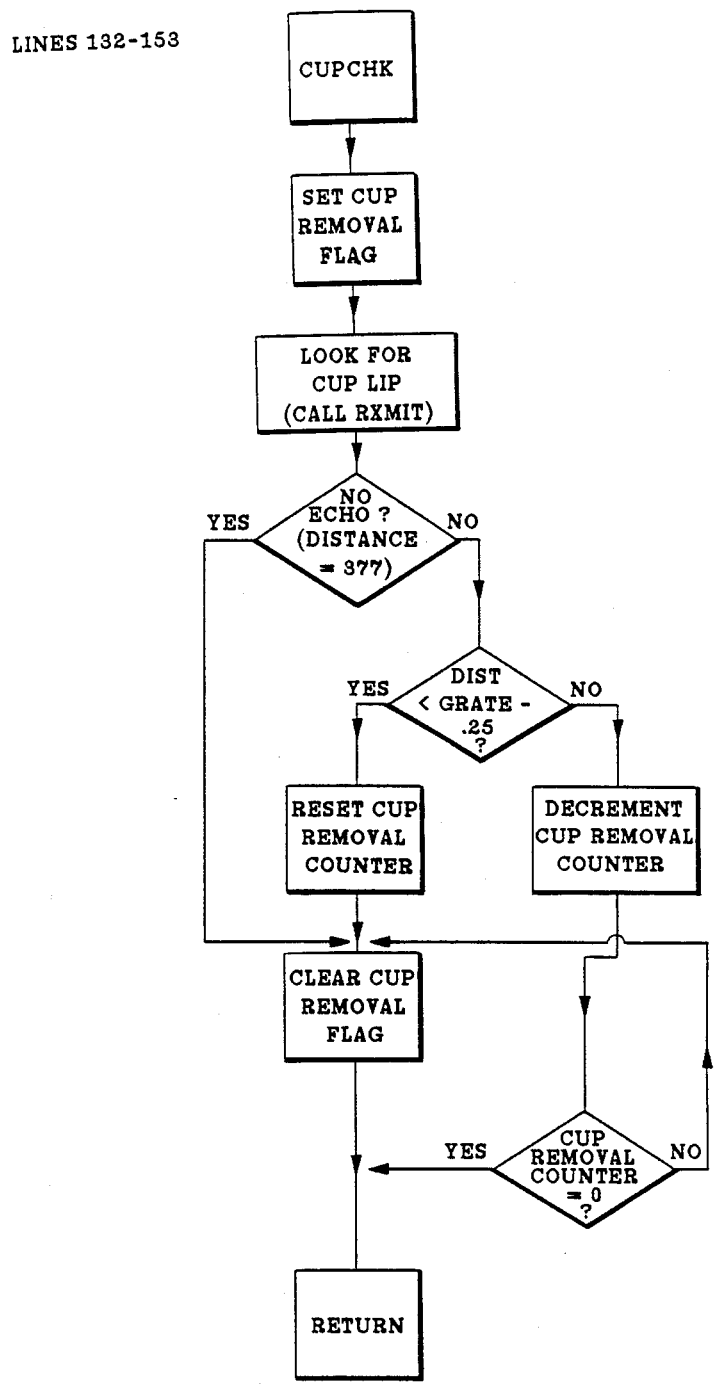
Figure 57L:
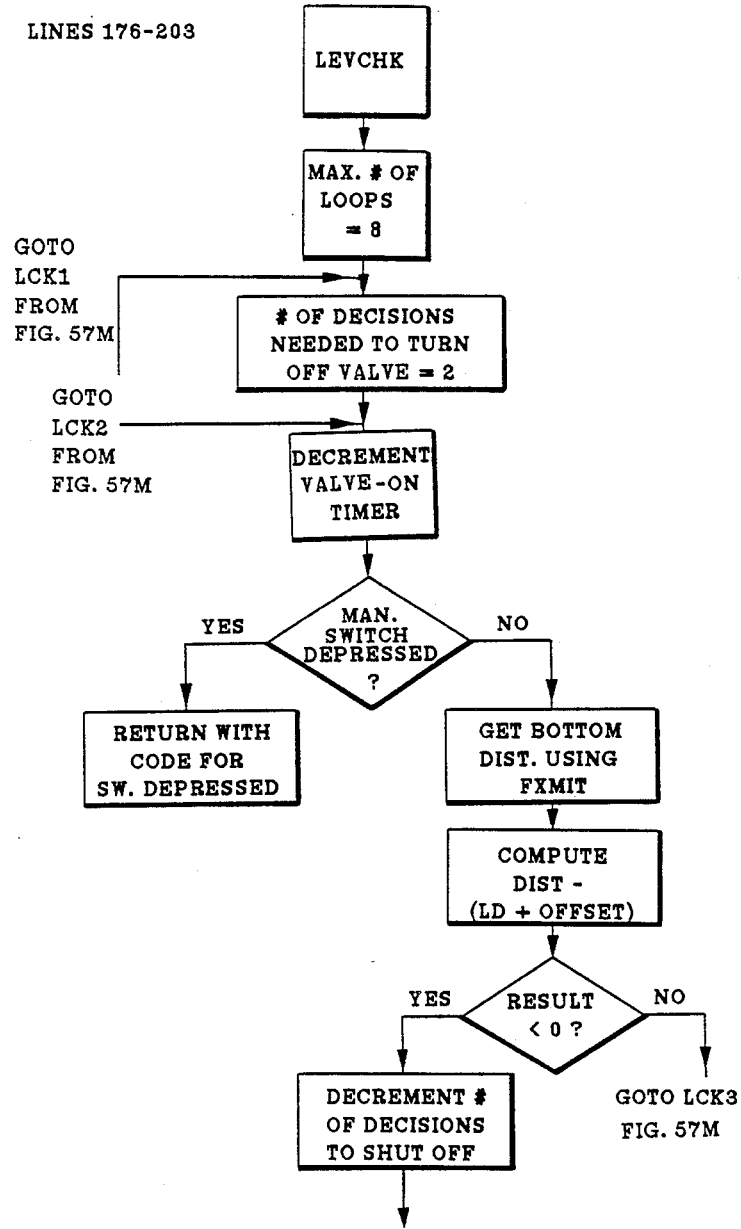
Figure 57M:
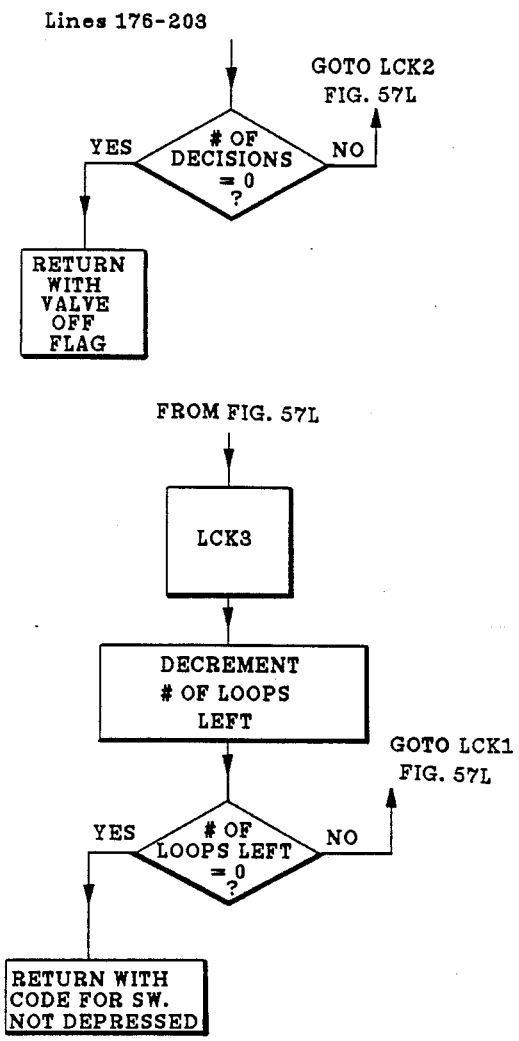
Figure 57N:
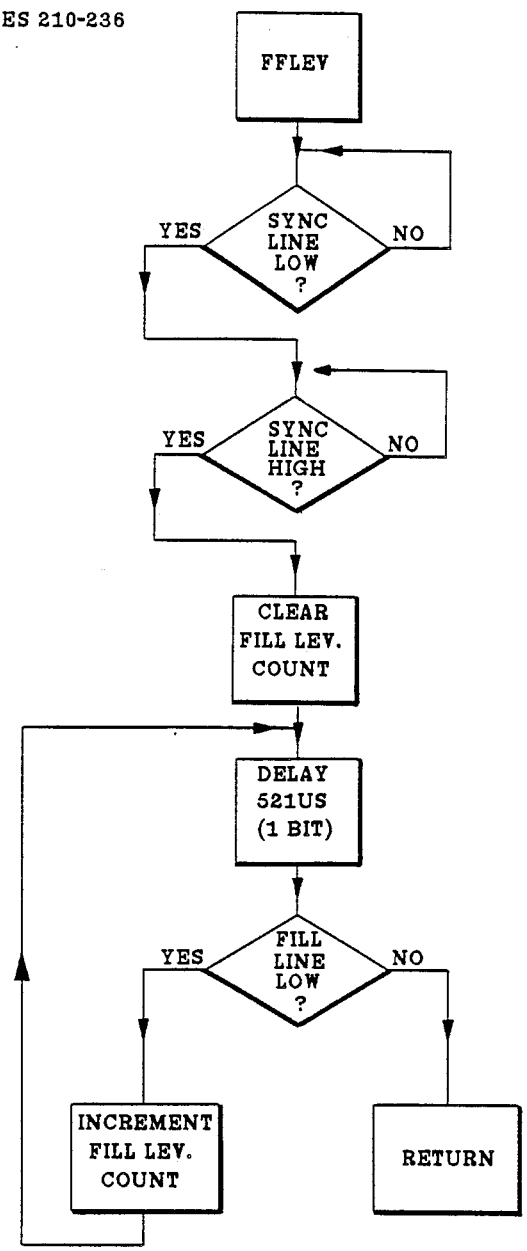
Figure 570:
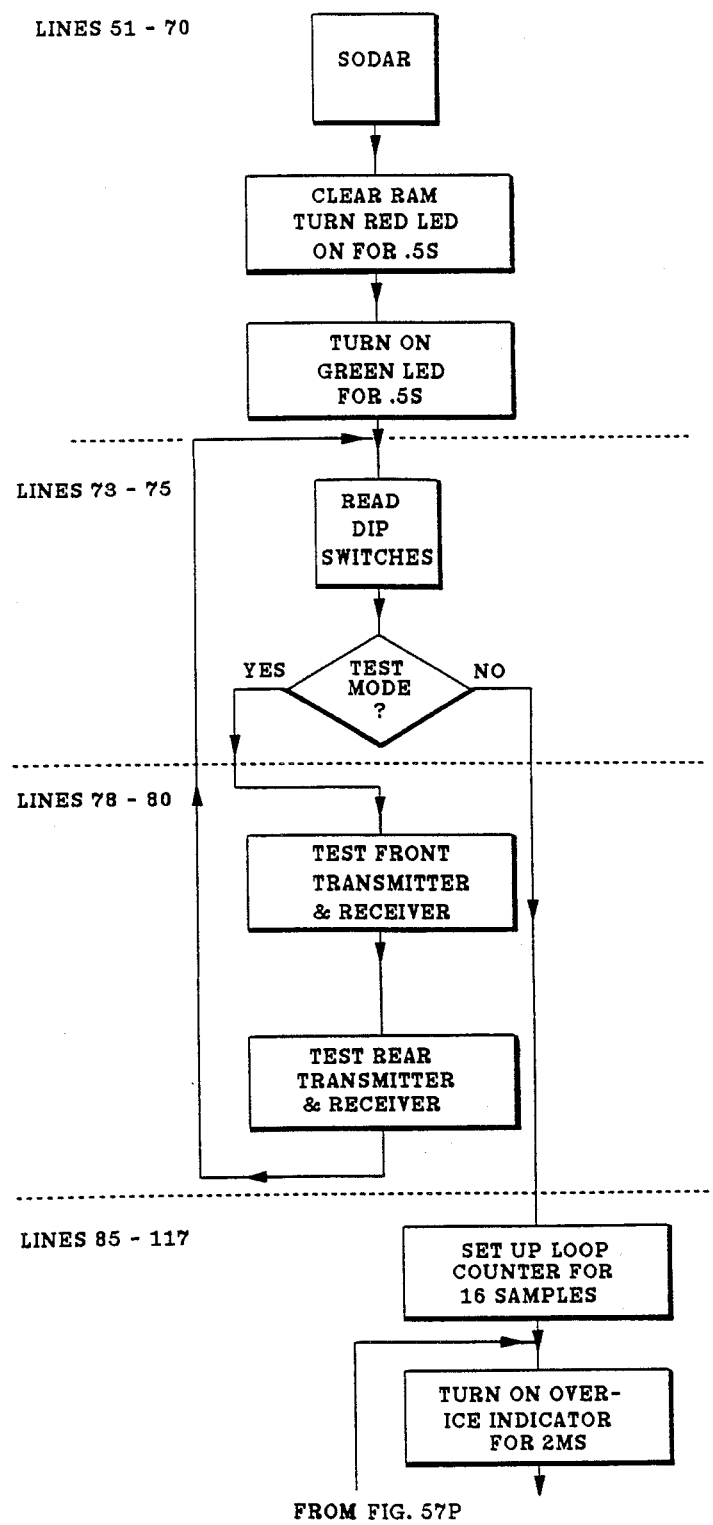
Figure 57P:
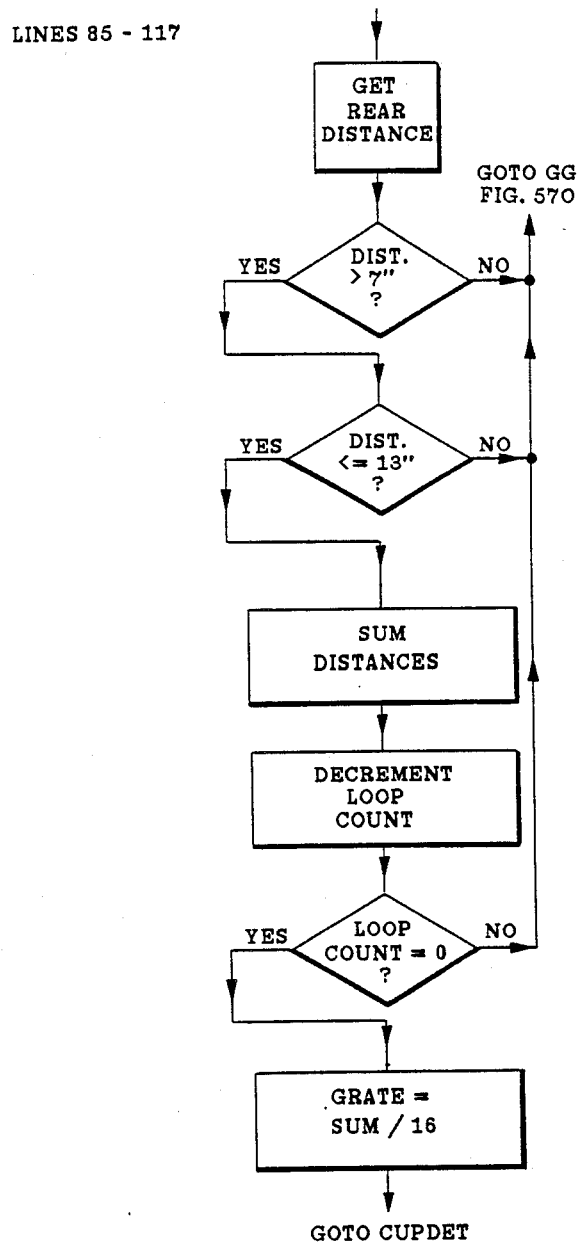
Figure 57Q:
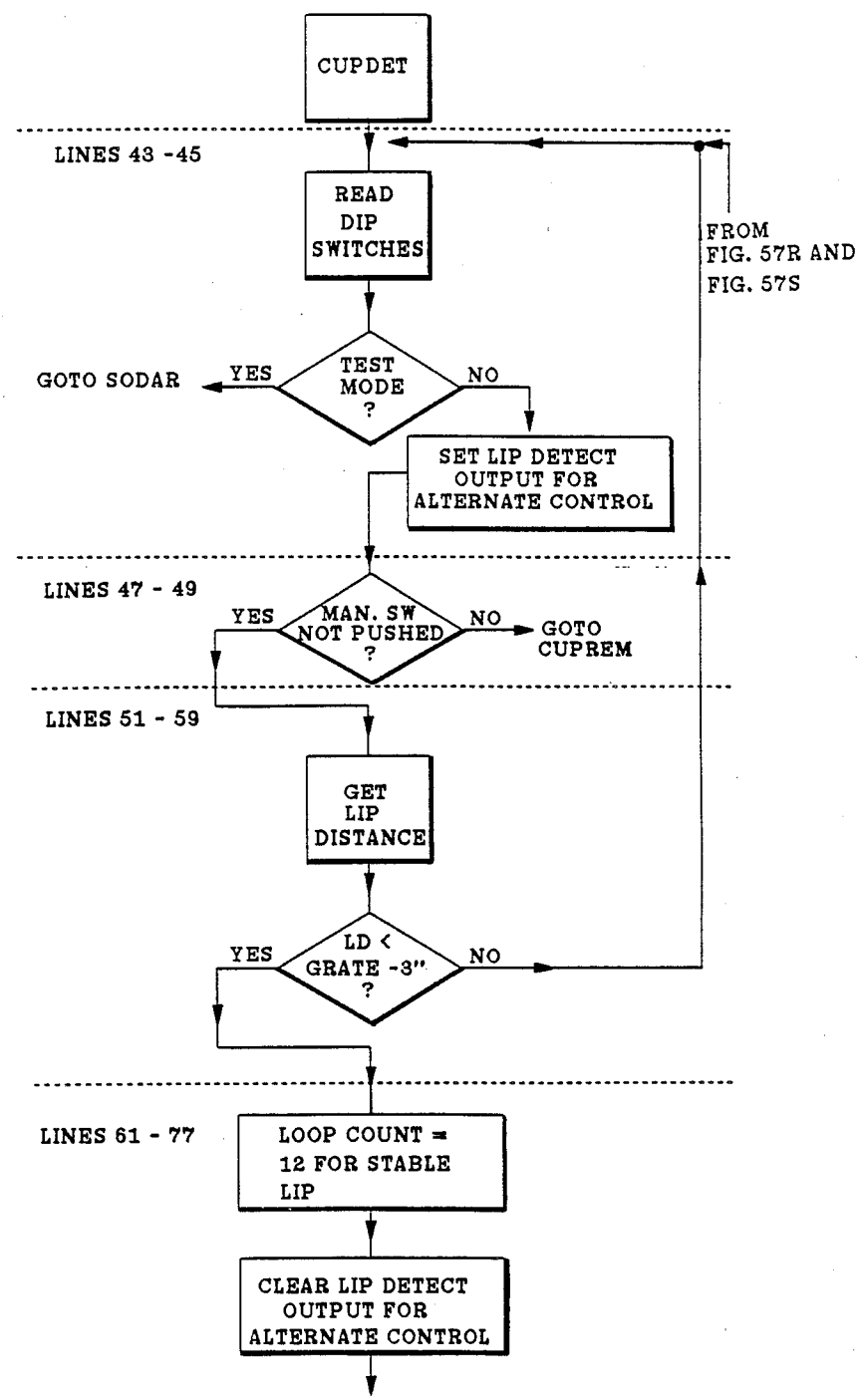
Figure 57R:
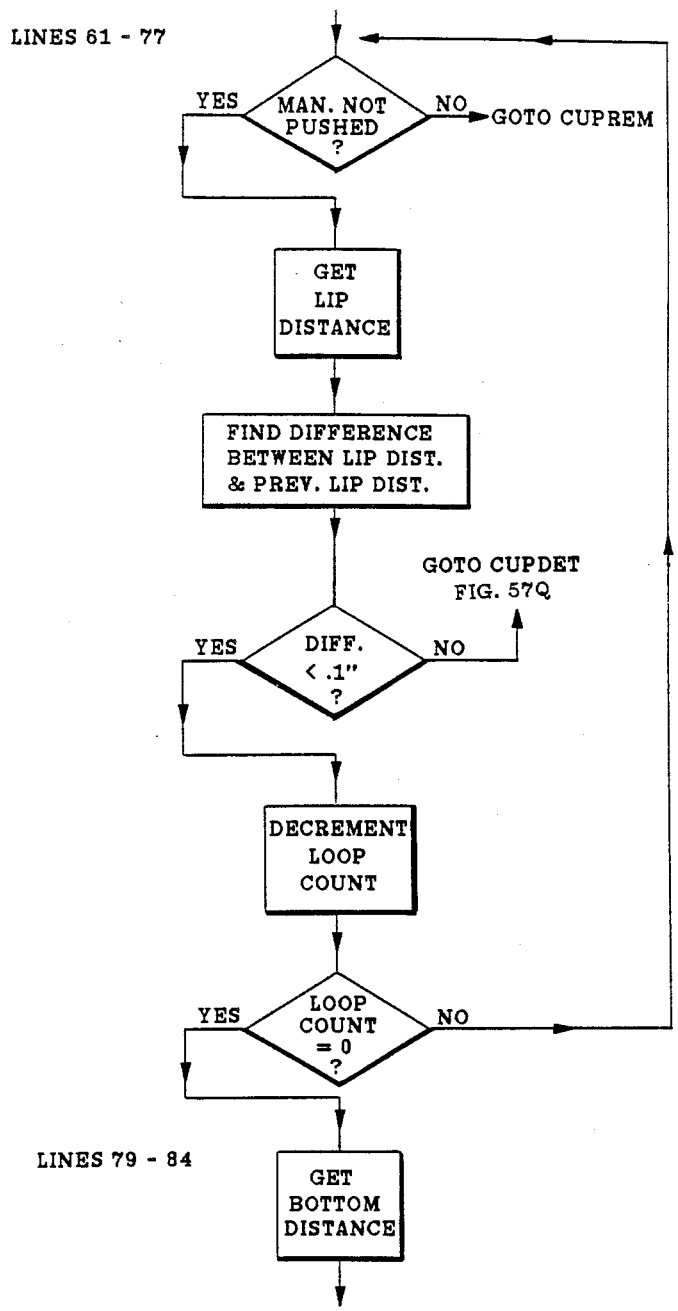
Figure 57S:
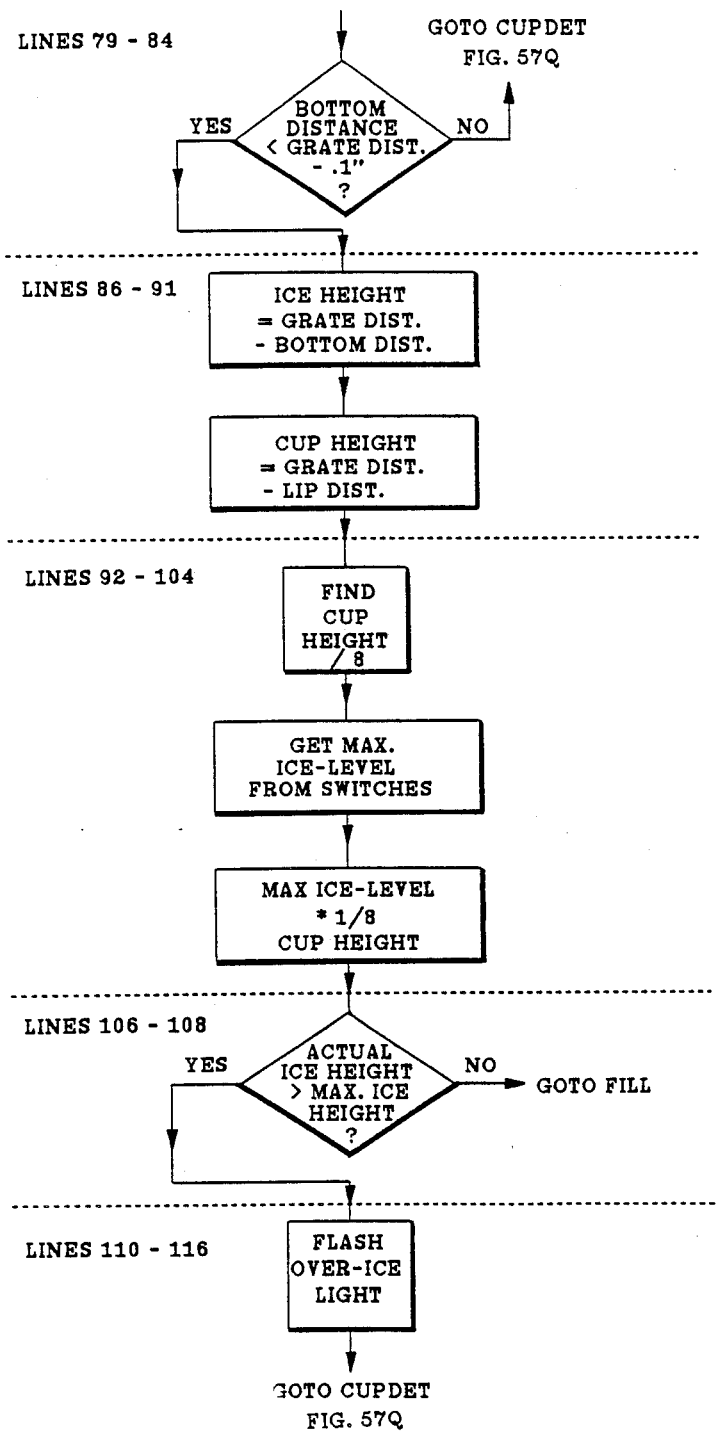
Figure 57T:
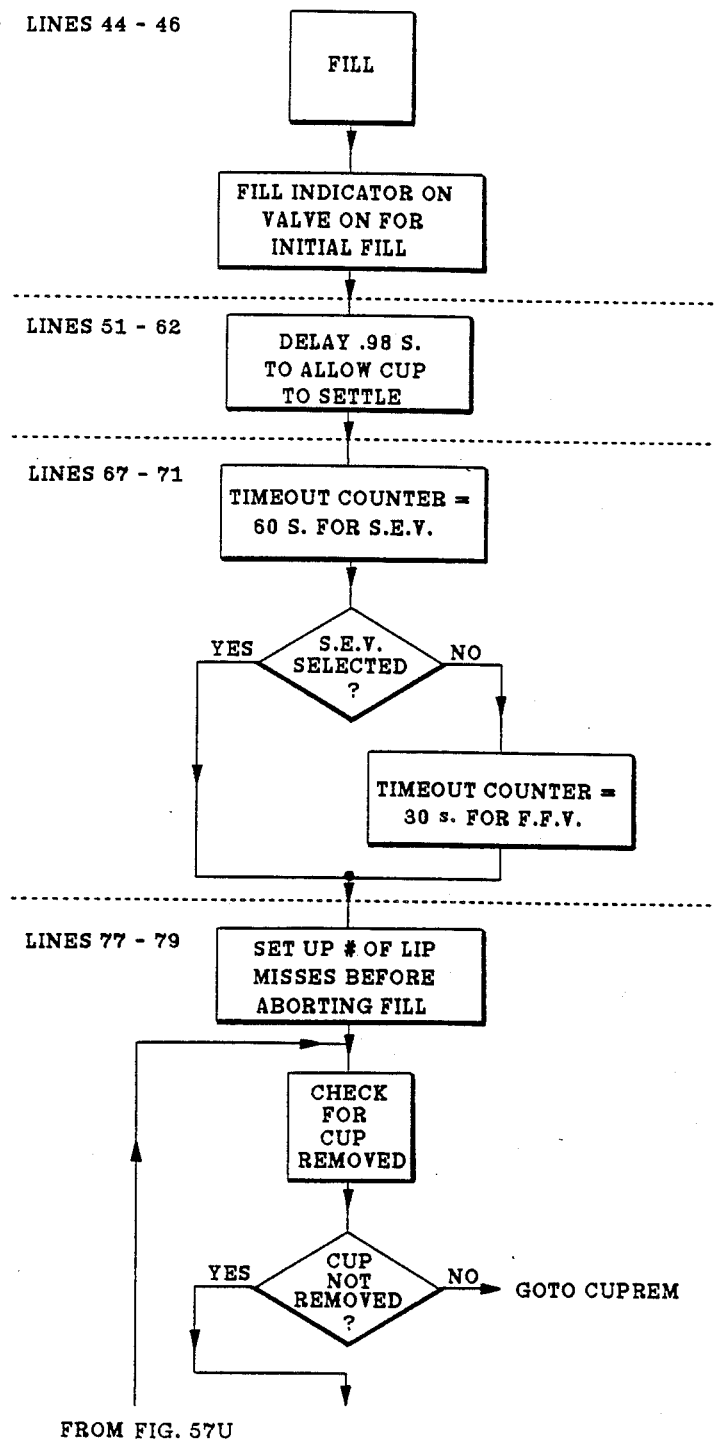
Figure 57U:
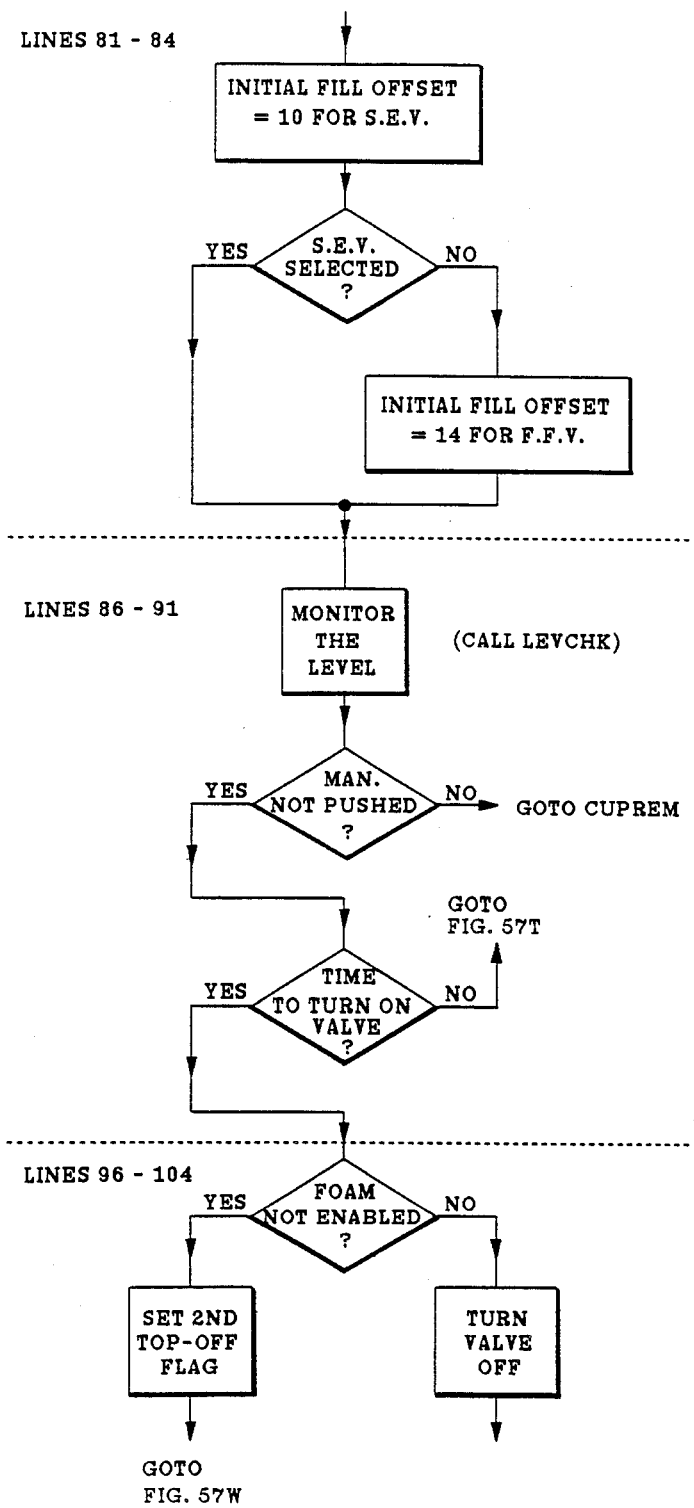
Figure 57V:
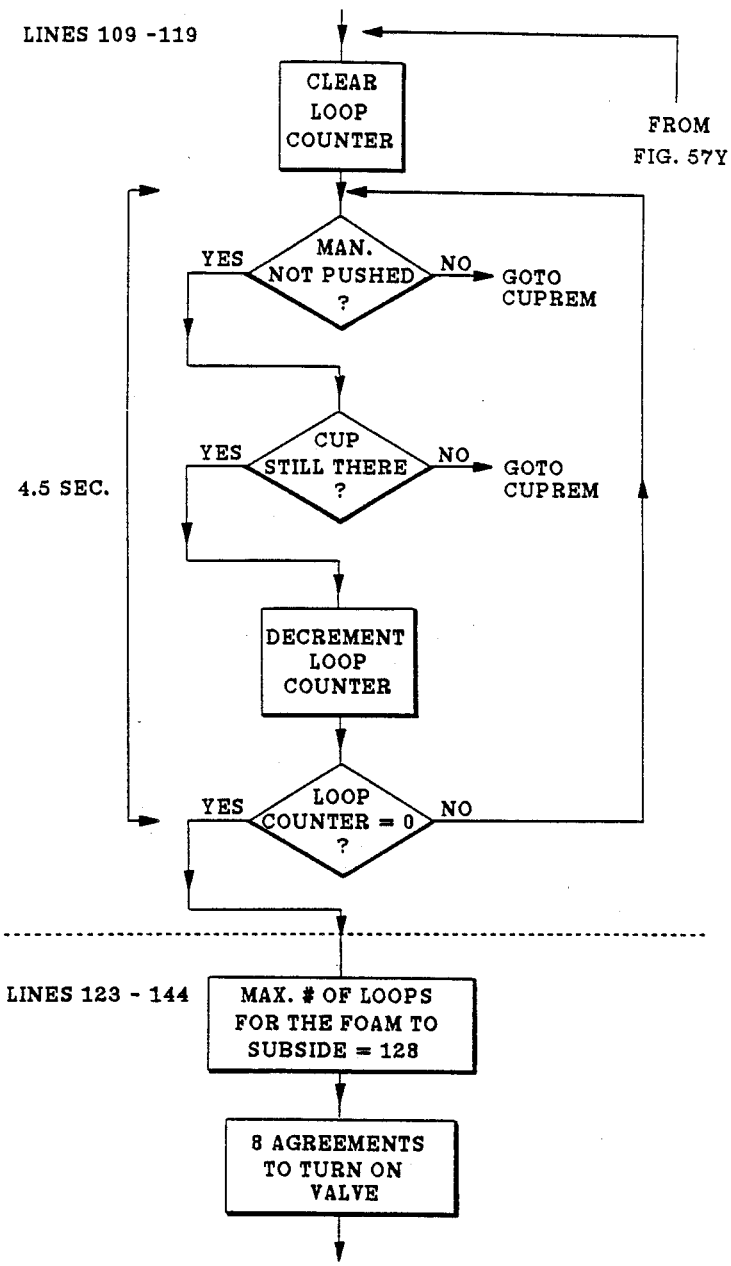
Figure 57W:
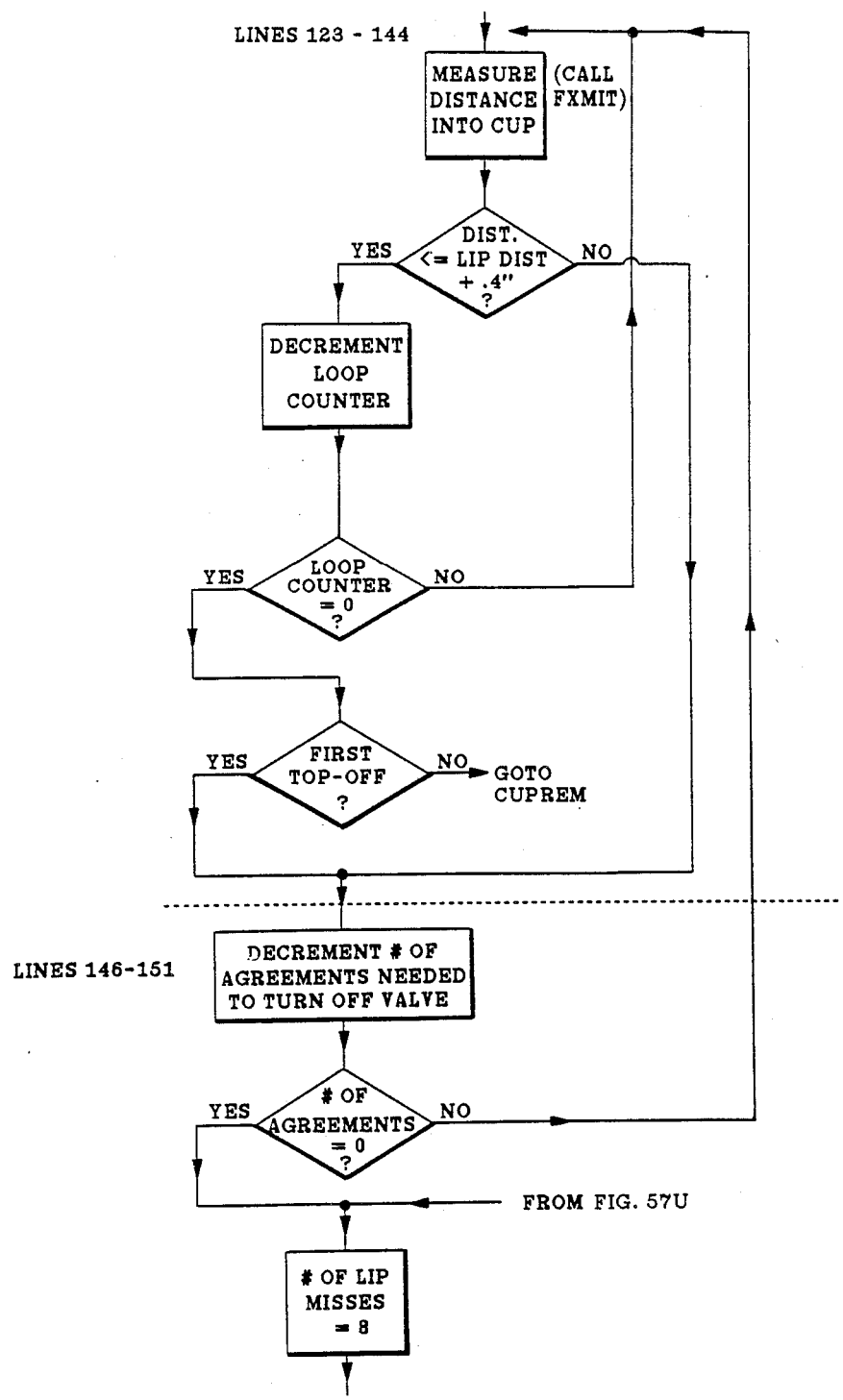
Figure 57Z:
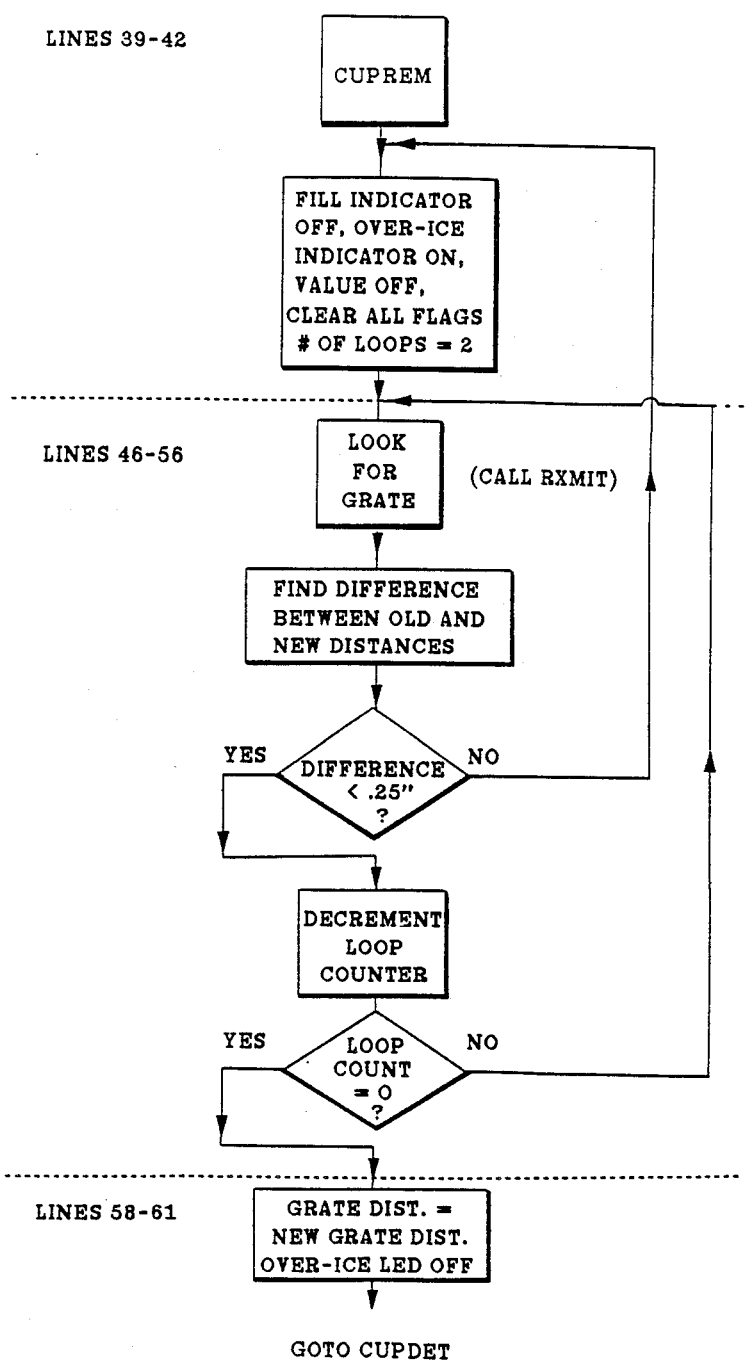

Briefly, FIGS. 47 and 48 show the transducer assembly as attached to a typical beverage dispenser valve, FIGS. 49 and 50 are electrical block diagrams of the electronics package, FIGS. 51-56 are electric schematic diagrams of certain of the circuit components, and FIGS. 57A-57Z are flow charts of the software.

It is believed that it will be helpful to first describe some of the main differences between this third and preferred embodiment, and the previously described two embodiments. This third embodiment employs four crystals instead of two crystals. The four crystals are divided into pairs with each having a receiver and a transmitter. The front pair of crystals are used to detect the presence of a cup bottom or ice level. While the drink is pouring, the front crystals monitor the liquid level in the cup. Lenses and channelizer tubes are used on the front crystals to focus the ultrasonic beam and to minimize side lobes. Without the channelizer tubes, side lobes are more pronounced which cause echoes to be detected from the nozzle and from the front lip of the cup. Either of these echoes would prevent this system from pouring. By adding the channelizer tubes, the side lobes are minimized, allowing more latitude in cup placement.

The rear pair of crystals are used to detect the presence of a cup lip and to determine the distance to the grate. While a drink is pouring, the rear crystals periodically check for the presence of a cup. If the cup is removed, the rear crystals will detect the grate which causes this system to turn off the valve. The previously described embodiments had only one transmitter circuit to drive the one transmitter crystal. This new embodiment has two transmitter circuits, one for each transmitter crystal. By having two transmitters, the transmit periods can be different for the front and rear crystals. In the previously described embodiments, a flyback transmitter is used. This new embodiment uses a push-pull type transmitter. The push-pull type transmitter can deliver more transmit power to the crystals. The transducer housing has been modified in this new embodiment to accommodate the two new crystals and the channelizer tubes on the front crystals. The channelizer tubes can be removed for cleaning. The fill height is no longer fixed in this new embodiment. A potentiometer is provided to allow the target fill height to be adjusted.

Now that certain differences have been described, it is believed that a brief overview will be helpful before describing this embodiment in detail. The automatic filling system of this embodiment of the invention first determines the distance to the grate by transmitting a 100 microsecond plus from the rear transmitter. If sixteen measurements indicate the grate distance is between 7" and 13" then the average grate valve from the sixteen measurements is stored in RAM.

The next step is for the system to detect a cup. The system uses a 100 microsecond pulse, transmitted from the rear transmitter to look for a cup lip. A valid cup lip is any object detected by the rear crystals which is at least 3" above the grate. Twelve consecutive lip measurements within ±0.1" are required before the system goes on to the bottom detect routine.

To determine the presence of a cup bottom, this system uses a 25 microsecond pulse transmitted from the front transmitter. A valid cup bottom is any object detected by the front crystals which is at least 0.1" above the grate and is below the maximum ice level selected by dip switches on the circuit board. Once a valid bottom is detected, this system goes to the Fill Routine.

The Fill Routine turns on the valve. While the drink is pouring, this system monitors the presence of a cup lip using the rear crystals, and it monitors the level within the cup using the front crystals. When the liquid level in the cup has reached 0.5" of the lip and the dip switch on the circuit board is set for "foamy products", ths system stops the valve and waits for the foam to subside. Up to two topoffs can occur if necessary. A topoff is initiated when the liquid level drops below 0.4" of the cup lip. If the dip switch on the circuit board is set for "non-foamy products", this system allows the valve to continue dispensing until the liquid level is equal to the preset target level.

This system has a fail safe timer which will override the normal control scheme and shut-off a fast flow valve (3 oz/sec) after 30 seconds or a standard flow valve (1.5 oz/sec) after 60 seconds.

The rear transmitter-receiver pair looks at just the grate and the lip, while the front transmitter-receiver pair looks at just the liquid level. The front beam is concentrated like a spotlight, while the rear beam is fan-shaped, i.e. it is narrow side to side but wide front to rear. The front beam has to go through a mist which requires more power, and the spotlight shape provides a beam of concentrated power over a smaller area. Since most losses are caused by the speeding of a beam, however, more power is used by the rear fan-shaped beam. The two pairs of transmitters and receivers of the present invention allow the system to look at two different areas at the same time and with differently shaped beams.

With reference now to the drawings, FIG. 47 shows a valve assembly 412, which can be any known valve assembly, for use on the dispenser 10 of FIG. 1. The automatic filling system of this preferred embodiment includes a transducer assembly 420 located on the bottom surface 422 of the valve assembly and behind the nozzle 424, and an electronics package.

The transducer assembly is shown in FIGS. 47 and 48, and includes a cup bottom and liquid level transmitter crystal 430, a cup bottom and liquid level receiver crystal 432, a lip and grate transmitter crystal 434, and a lip and grate receiver crystal 436.

FIG. 48 is a cross-sectional side view of the transducer assembly 420 through the crystals 432 and 436. The assembly 420 is basically the same as described above regarding the first two embodiments, and includes a plastic housing 440 filled with urethane foam 442. The crystals 430, 432, 434, and 436 are each positioned inside of a brass tube (such as tubes 444 and 446), and each have a plastic lens (such as lenses 433 and 437).

The electronics package will now be described first with reference to the electric block diagrams of FIGS. 49 and 50, and the schematic circuit diagrams of FIGS. 51–56, and then the software will be described with reference to the flow diagram of FIGS. 57A–57Z and the source code (Appendix A).

Referring to FIGS. 49–56, the electronics package is constructed of two double sided printed circuit boards approximately 2.5 by 3.7 inches housed in an ABS plastic enclosure. The block diagrams of FIGS. 49 and of the system are related to the schematics of FIGS. 51–56 as follows:

1. The power supply 500, shown in FIGS. 49 and 51, uses 24 volts from the 50 VAC/transformer in the dispenser 10 of FIG. 1. The 24 volts AC is filtered by two 100 microhenry inductors and a 0.1 microfarad capacitor to attenuate high frequency spikes on the 24 VAC line. The AC voltage is then rectified and filtered to supply an unregulated voltage "V" which has a nominal value of 25 volts. A 39 Volt Zener, D3 is reverse biased across this voltage to provide surge protection. The 25 Volt supply is regulated down to 15 Volts for the receiver subsystem by a 78L15 3 terminal regulator. The 25 volt supply is also dropped to 20 volts with a Zener regulator for the transmitter supply. A stepdown switching power supply is utilized to provide the +5 volts for the microcomputer and logic. The supply uses an MC34063 control circuit and a 660 microhenry inductor to regulate the 25 VDC down to 5 VDC with an efficiency of about 80 percent.

2. The usual switch in the valve assembly 412 that energizes the two solenoids (the syrup and the carbonated water solenoids) is removed and replaced by a switch shown in FIG. 51. This is a solid state switch (triac), STO4HA-2, which can be controlled either by the microcomputer through the optically coupled triac driver MOC3011, or by depressing the manual override switch described in paragraph number 12 below.

3. The Front and Rear receiver crystals 432 and 436 are made from a PZT 4 ceramic material but could be made from other variations available on the market. They are used as two separate receiver crystals that are switched electronically to allow the electronics to see the grate and cup lip from the rear crystal 436 and the cup bottom and fluid level from the front crystal 432. These crystals are coupled to the air with an acrylic plastic lens which also serves to shape the beam of the ultrasonic sound. The rear lens are angled toward the center of the valve 3.5 degrees and have a straight radius of 2 degrees as shown in FIG. 58. The lenses are attached to the crystals using a cement that has the same density as an acrylic lens so as not to reflect the sound waves back into the crystal. The crystals and lenses are then mounted in a polyeurethane foam molded section that is inserted in a brass housing for electrical and accoustical isolation between the lenses. The brass housings, each containing a lens and crystal, are then mounted in another polyeurethane foam block which inserts into the ABS transducer housing. The lenses have flanges that when mounted in the foam block properly positions the angles such that when the transmitted signal reflects back to the receiver crystal, the line will collect the most signal from the area to which the sound has been beamed. The front lens, as shown in FIG. 59, has a conical shape on the surface which is angled 3.5 degrees toward the center of the valve and has a 3.5 degree countersink in the face of the lens. The front lens also have a tube 510 approximately 0.5 inches long and ½ inch in diameter that is also angled toward the center of the valve that channels the sound past the nozzle 424 so that there are no echoes to reflect from the nozzle back to the lens.

Figure 52:
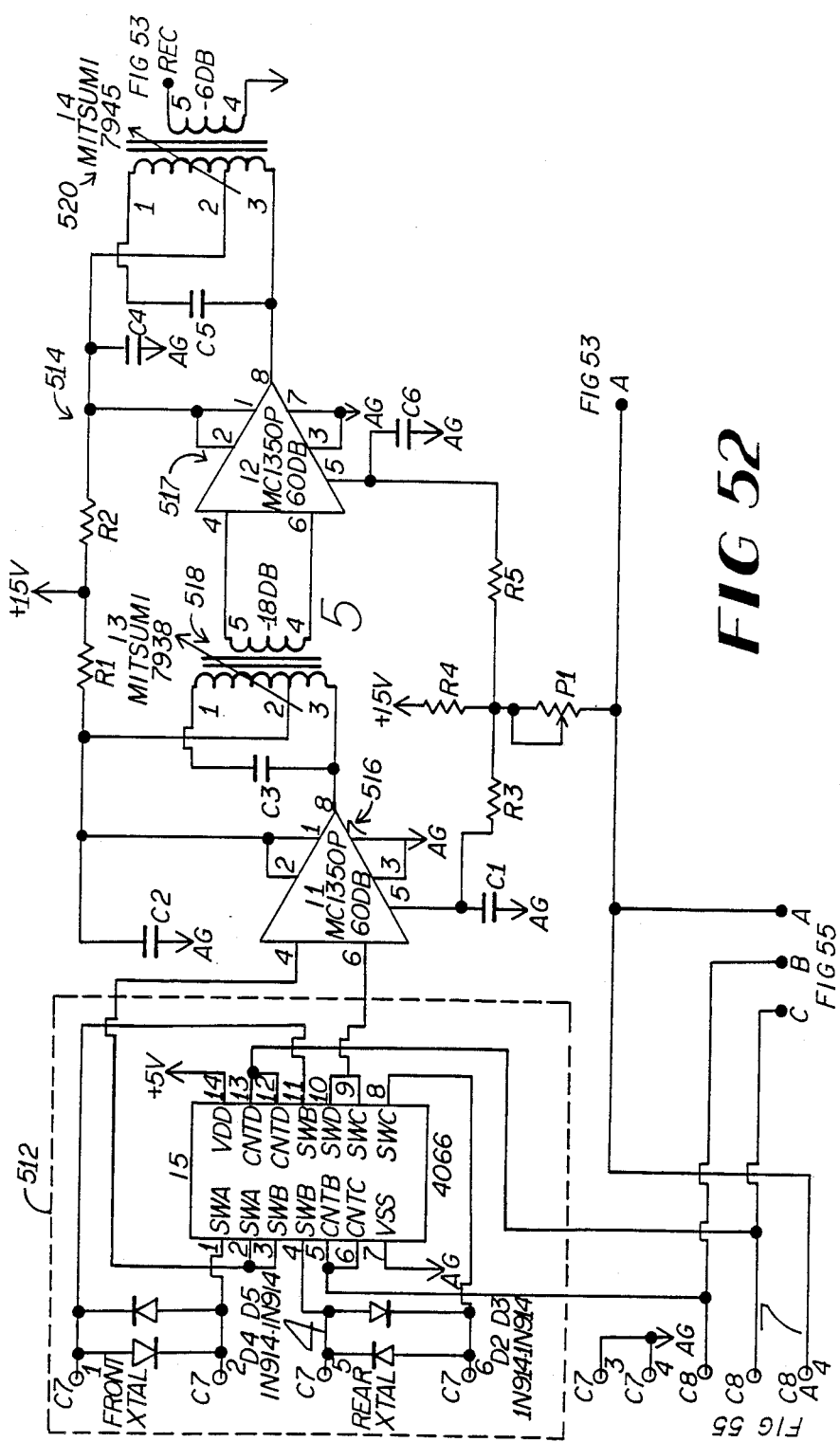
FIG. 52 is an electric schematic of the receiver shown in FIG. 50.

4. The analog multiplexer 512 is shown in FIG. 52, and uses a 4066 quad CMOS analog switch which allows the electrical signals from either of the two receiver crystals 432 or 436 to pass to the tuned amplifier. The analog inputs to the chip are protected from high voltage inputs by the 1N914 diodes. The digital inputs which select the crystal are the "B" and "C" lines directly from the microcomputer.

5. The receiver 514 is shown in FIG. 52 and has a maximum gain of 96 DB and is constructed with 2 MC135OP "I.F." amplifiers 516 and 517 that are connected through a tuned transformer 518. A second tuned transformer 520 couples the amplified signal to the detector 522 shown in FIG. 53. The tuning transformers are tuned to a narrow band centered at 400 KHZ. The amplifiers have provision for gain control through Pin 5 of the MC135OP. By setting "A" line from the microcomputer high during the excitation phase of the transmission, the gain of the amplifiers is reduced to a minimum. When the excitation phase is over, the gain is returned to maximum. This keeps the amplifiers from saturating during tee period of transmitter excitation and minimizes the effect of direct coupling of sound from the transmitter crystal to the receiver crystal.

6. The detector circuit 522 shown in FIG. 53 demodulates the 400 KHZ from the receiver to a DC analog signal, compares the amplitude with a fixed level and outputs a digital level to the microcomputer. The amplitude demodulator is special in that it can not only detect the envelope of the pulse but since it is a DC coupled detector, it has no offset shift due to pulse width variations. By having a balanced detector system, the temperature drift is very low. The level comparator uses one half of an LM393 voltage comparator and a resistive divider. The resistive divider is connected to the "A" line from the microcomputer. As described in paragraph 5 above, the "A" line is set high during the period of transmitter excitation. When line "A" is at 5 volts, the level to which the analog signal is compared to is raised from approximately 2 volts DC to approximately 6 volts DC which insures that no digital signals will reach the microcomputer during the excitation phase of the transmitter.

Figure 53:
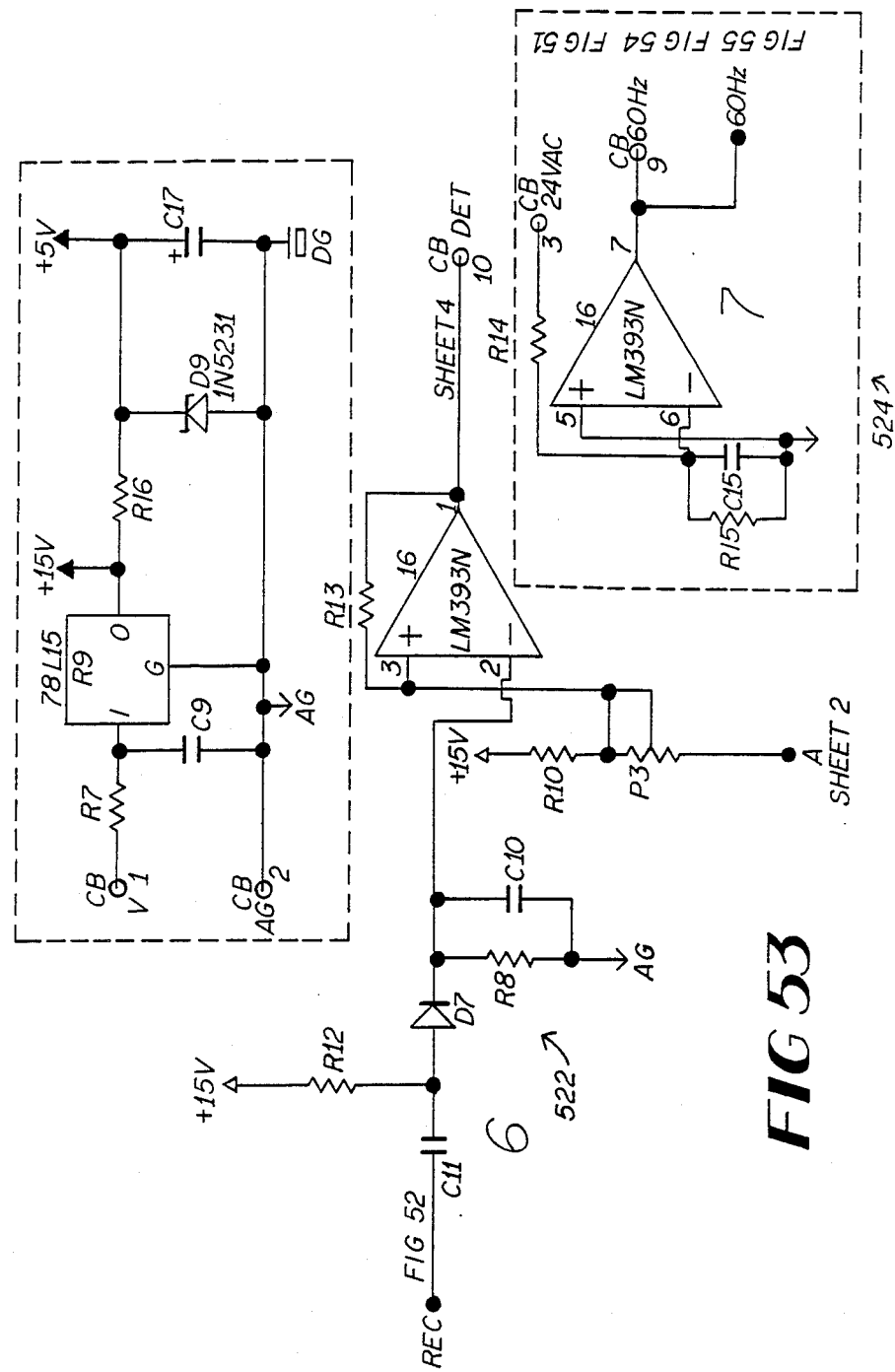
FIG. 53 is an electric schematic of the detector shown in FIG. 50.

7. The 60 hertz detector 524 shown in FIG. 53 is constructed using one half of an LM393 voltage comparator. 24 VAC is attenuated and compared to ground. The output is a 60 HZ ZERO TO 5 volts square wave. This waveform is the basis for the timing of the transmitters. A selector switch described in paragraph 15 below tells the microcomputer to transmit on either the high portion of the waveform or on the low portion of the waveform. This feature will allow two closely spaced systems to operate without interference.

Figure 54A:
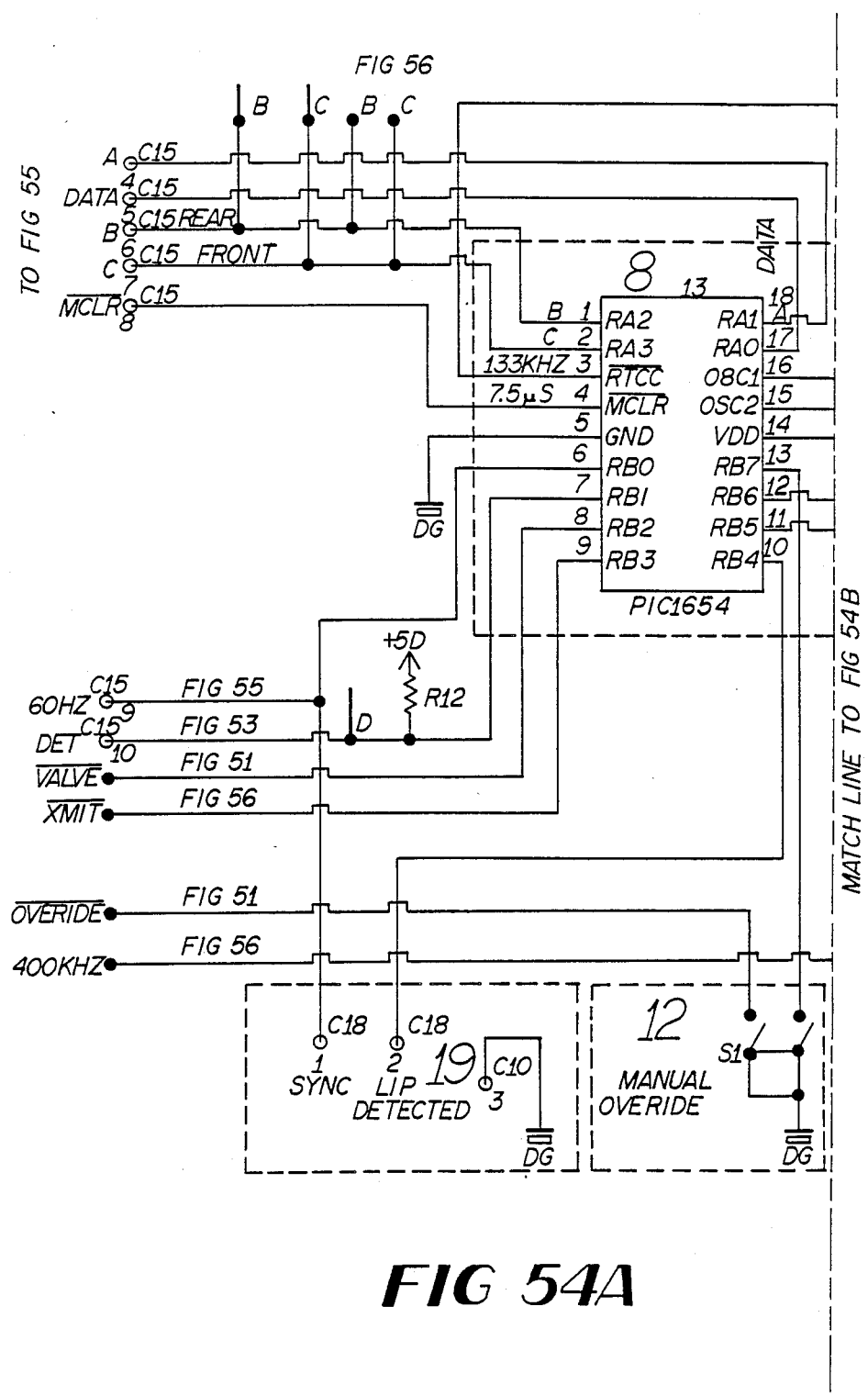
FIG. 54 is an electric schematic of the microcomputer shown in FIG. 49.
Figure 54B:
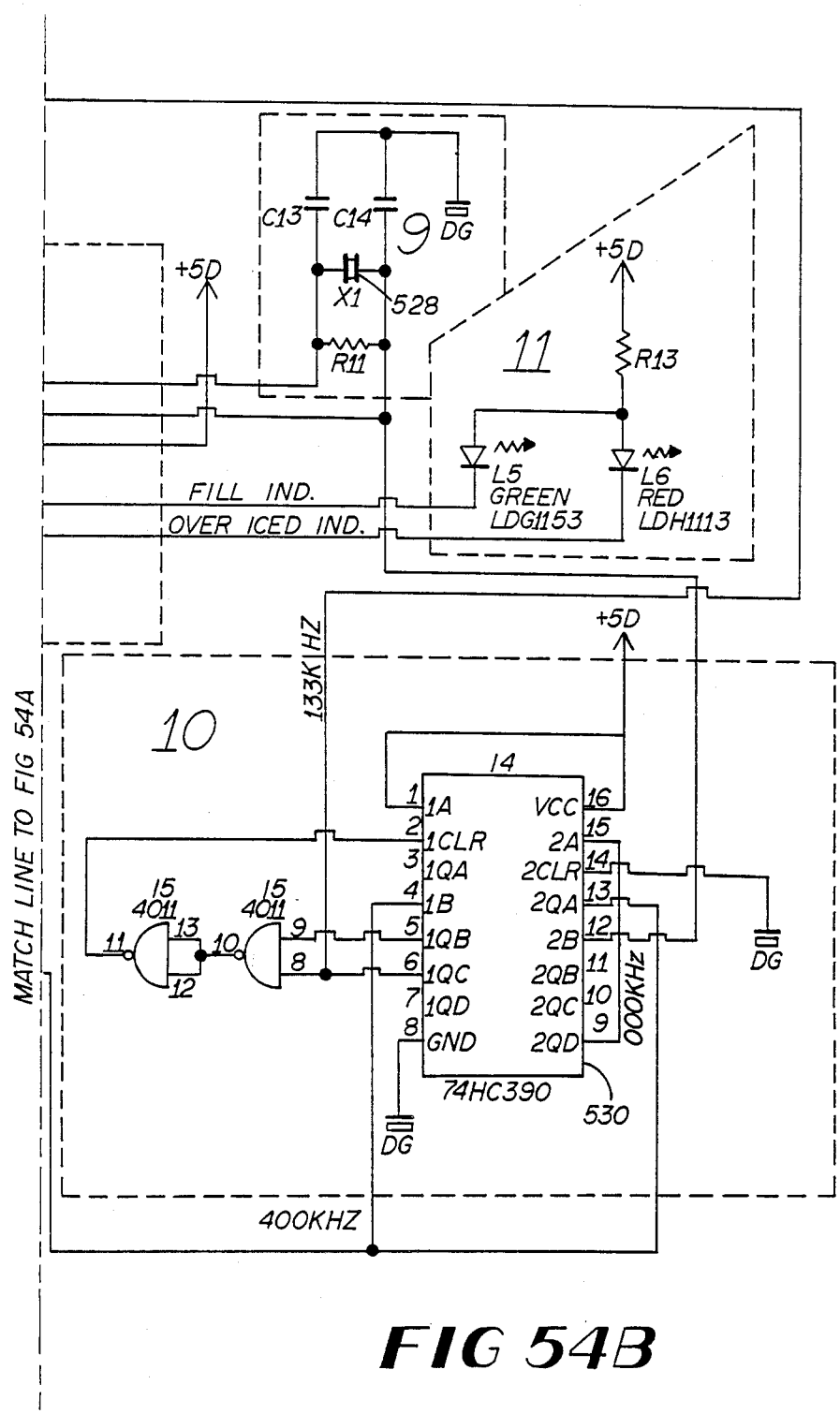
Figure 56:
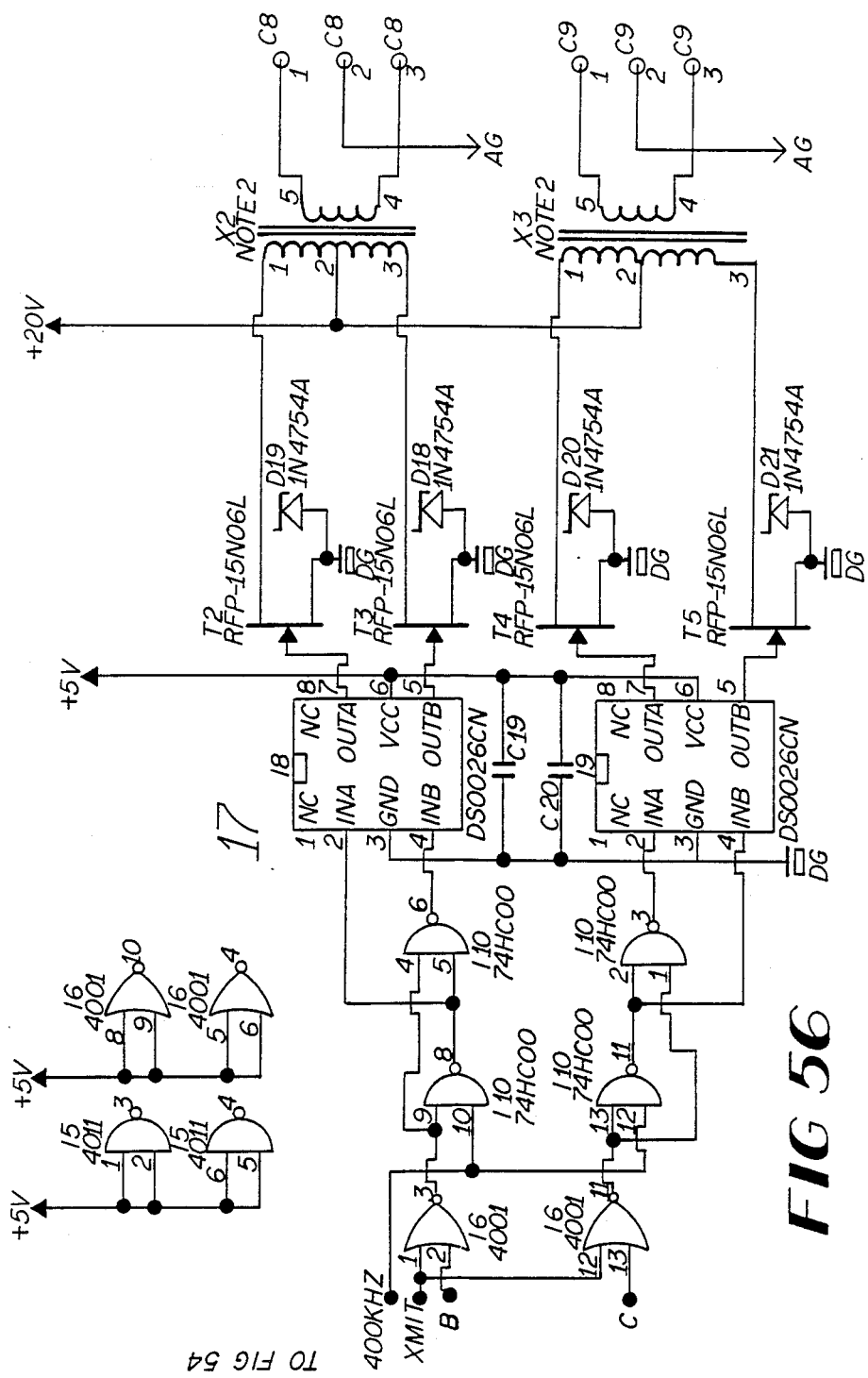
FIG. 56 is an electric schematic of the transmitter shown in FIG. 49.

8. The microcomputer 526 shown in FIG. 54 is a General Instrument's PIC-1654 and contains the intelligence and control functions of the entire system. It communicates to the rest of the system through 12 I/0 pins. It also contains the oscillator circuit, the master clear circuit, and the real time clock counter input.

9. The 4 Mhz crystal 528 and other passive components form the feedback network for the oscillator in the microcomputer 526 and is shown in FIG. 54.

10. The 74Hc390 counter/divider chip 530 shown in FIG. 54 is used to divide the 4 Mhz into 400 kilohertz and 133 kilohertz. The 400 kilohertz is used in the transmitter as the frequency of transmission and the 133 kilohertz is input to the real time clock counter input of the microcomputer. One period of the 133 kilohertz signal corresponds to the time it takes for sound to travel to and from an object 1/20th of an inch.

11. The front panel indicator lights 532 and 534 shown in FIG. 54 consist of one red LED and one green LED. The green LED is labelled fill and is illuminated during the filling process. The red LED is labelled over-ice/cup remove, and is illuminated when the ice level is detected to be above the allowable ice level (user selected by DIP switches described in paragraph 15 below. The red LED also illuminates at the end of a filling cycle when the cup (not shown) is ready to be removed.

12. The front panel manual override switch 536 shown in FIG. 55 is a two pole pushbutton switch. One pole is connected directly to the gate circuit of the valve control triac as described in paragraph 2 above which allows the user to directly control the actuation of the two solenoid valves in the valve assembly 412. The other pole is used as an input to the microcomputer 526 and notifies the microcomputer that the user has actuated the valve 412, so the microcomputer knows it is not in control.

13. The final fill level adjustment circuit shown in FIG. 55 allows the user to adjust the final drink level in the cup. The circuit itself is a variable edge delay circuit which uses 2 CMOS logic gates from a 4011 I.C. as buffers and a potentiometer, capacitor, and diode network to delay the rising edge of the 60 hertz square wave input. The output of the final fill level adjustment is input to the Cmos digital multiplexer described in paragraph 14 below.

14. The digital multiplexer shown in FIG. 55 is a Cmos analog switch (4051) which is configured as a single pole 8 position switch. The "A" "B" and "C" lines from the microcomputer 526 select which of the 8 inputs will be connected to the "Data" line of the microcomputer.

15. The six individual switches shown in FIG. 55 and referred to as a dip-switch in this application are to enable the user to configure the controller for proper operation under different operating conditions. Three of the switches are used to set a maximum ice level allowed setting which can be from ⅛ to ⅝ of the cup height. When these switches are off, the manufacturing test is enabled. One switch selects between two different flow rates. One switch selects either a foaming drink routine or a non-foaming drink routine. The last switch is the sync select switch that selects which half of the 60 hertz square wave will be used for transmitting and receiving. As described in paragraph 7 above, this feature allows two systems to operate in close proximity.

16. The watch dog timer circuit showing in FIG. 55 provides power on reset for the microcomputer 526 and monitors the operation, forcing the microcomputer to reset if it detects the "A" line not changing "states" for as long as 8 seconds. The circuit itself consists of an edge detector, a retriggerable timer, and a gated oscillator. The edge detector differentiates the rising edge of the "A" line from the microcomputer. The "A" line in normal operation will have approximately 120 rising edges per second. The output of the differentiator is buffered with a Cmos logic gate (4011) whose output retriggers the retriggerable timer. If the differentiator does not receive rising edges from the "A" line, then the retriggerable timer times out within 8 seconds. When the retriggerable timer times out it enables the gate on the gated oscillator, which tries to reset the microcomputer until the "A" line again starts changing "states."

17. The transmitter logic shown in FIG. 56 and the power amp is the circuitry which inputs the 5 volt logic levels from the microcomputer and outputs the approximately 1000 volt peak 400 kilohertz. The transmitter logic allows the microcomputer to have direct control over the pulse link of 400 kilohertz to be transmitted and which crystal is going to be used to transmit. The two CMOS Nor-gates (4001) with the B line and C line and the transmit line as input allows the microcomputer to select which crystal is going to transmit. The output of the Nor-gate is input for two Nan-gates (4hcOO) along with the 400 kilohertz square wave. The output of the two Nan-gates 400 kilohertz modulated pulses which are buffered by the buffered chip (dsOO26cn) which provides the drive for the power mosfets (RFP-15NO6L). The zener diodes across the power amp protect the power amp from reverse voltage and overvoltage. Each pair of power amps drives a ferrite transformer in a class B push-pull configuration. The output winding is directly attached to the ceramic piezzo crystals.

18. The transmitter crystal is the same configuration as the receiver crystal except that they are mounted on the opposite side, but the crystals and lenses are interchangeable with the front receiver or the rear receiver respectively. The removable section from the front lens housing that contains the tubes is removable for easy cleaning of the lens itself. The front crystal lens is shown in FIG. 59.

19. The alternate control connector shown in FIG. 54 allows more than one control to operate a single valve. The lip detected output is normally high and when the microcomputer detects a lip, the lip detected output would go low to notify the other control that it may be ready to initiate a fill operation. The sync input would normally be a high impedance input that would not affect operation. When the sync input is changed to a low impedance, the 60 hertz square wave that the micro is using to synchronize transmissions would be held low, inhibiting transmissions until the high impedance state returns, allowing the 60 hertz square wave to again synchronize transmission. This feature along with additional Logic will allow more than one transducer assembly and electronics package to control a single valve.

The software used in this preferred embodiment of the invention will now be described with reference to the flow chart in FIGS. 57A-57Z and the source code in Appendix A. To aid in this description the flow chart is divided by dashed lines into areas with certain numerals assigned thereto, which numerals correspond to the numbered lines in the source code (Appendix A).

The single chip microcomputer 526 is a General Instrument PIC 1654. Some notable characteristics of the microcomputer are:
A. 512 program steps
B. 32 bytes of RAM
C. All instructions execute in 2 or 4 microseconds
D. All sub routines must begin in lower half of memory.
E. It has an eight bit clock counter.
F. When master clear is pulled low and then released high, the program counter is set to the last program location (511).
G. The architecture includes a two level stack.

The program consists of 4 main program routines and 8 subroutines.

The 4 main routines are entitled: SODA, CUPDET, FILL, AND CUPREM.

In the accompanying program listings, each of the main program routines have a separate listing. Each routine and subroutine have their separate set of line numbers starting with 1.

The subroutines are all contained in 2 program listings. The transmitter and receiver subroutine is entitled SODAR 86 TRANSMITTER.

The other 7 subroutines are contained in the listing entitled MISCELLANEOUS SUBROUTINES. The accompanying source code (Appendix A) is sequenced in the same manner as this description.

1. Lines 1 through 29 contain the register definitions for the transmit subroutine.

The transmit subroutine has 2 entry points, FXMIT and RXMIT. The FXMIT entry point selects the front crystals and a 25 microsecond transmit pulse width. The RXMIT entry point selects the rear crystal and a 100 microsecond transmit pulse width. Line numbers 34 through 43 contain these entry points and prepare the hardware for transmission.

Line 44 tests the position of the sync switch to determine whether to transmit during the high or low portion of the 60 hertz square wave.

Line 48 through 63 looks for the low to high transition of the 60 hertz sync input.

Lines 66 through 79 have the same function but look for the high to low transition.

Lines 82 through 89 transmit either a 25 microsecond or 100 microsecond pulse width of 400 kilohertz depending on the entry point. Lines 92 through 100 allow the microcomputer to ignore any echoes less than , 0.8 from the crystal face. Lines 102 through 117 capture the elapsed time until the leading edge of the first echo appears.

Lines 119 through 132 guarantee that the microcomputer will not transmit again until 4 milliseconds after the first transmit.

Line 134 through 143 check to see if the distance received was the first sample or the second sample. If it is the first sample, then it stores the distance in a temporary register and goes back to line 82 to transmit again for the second sample.

Lines 147 through 168 compares the two distances. If the distances vary by more than 0.4, then two more samples are obtained by going back to the entry point of either subroutine FXMIT or RXMIT. If the samples do agree within 0.4 of an inch, then they are averaged and the program returns to the calling routine.

2. The following subroutines are contained in miscellaneous subroutines listings.

2. The MUX subroutine controls the digital multiplexer through the A, B, and C lines and reads the selected input on the Data line.

Lines 1 through 49 contain register definitions and program label definitions.

Lines 55 through 71 read the positions of the dip switch into a register called SW.

Lines 73 through 79 check the ice level switches for an "all off" condition which is the position for the manufacturing test.

3. The WAIT 2 subroutine, lines 83 through 88, delays for 2 milliseconds and then returns to the calling routine.

4. The subroutine DIFF, lines 94 through 99, calculates the absolute value of the difference of two numbers.

5. The TIMOUT subroutine lines checks to see if the valve assembly 412 has been longer than 60 seconds for standard flow valve or 30 seconds for a fast flow valve. If it has, then the valve is turned off and the FILL and OVER ICE indicator alternate flashing.

Lines 104 through 107 decrement the TIMOUT counter and check for zero.

Lines 112 through 128 turn the solenoid off and alternately flash the OVER ICE indicator and the FILL indicator.

6. The CUPCHK subroutine checks during the filling process to see that the cup has not been removed.

Lines 132 through 153 use the rear transmitter to look for the grate. If the distance is within ¼ inch of the grate distance, then the "Cup Removed" flag is returned to the calling subroutine.

Lines 156 through 172 are not being used at this time.

The LEVCHK subroutine monitors the liquid/foam level during the filling process. The calling routine sends the distance below the lip distance that the valve should turn off.

7. Lines 176 through 203 uses the distance returned from the FXMIT subroutine to decide whether to send a flag back to the calling routine to turn the valve off.

8. The FFLEV subroutine is called to read the variable final fill level.

Lines 210 through 236 measure the time between the rising edge of the 60 hertz waveform and the rising edge of the final fill level waveform through the digital multiplexer.

9. This time is scaled for a 0 to 2 inch offset. The main routine "Coke SODAR Project" performs initialization of the microcomputer, checks for the manufacturing test mode, and then obtains the initial grate distance before going to the cup detection routine.

Lines 1 through 35 contain register and program label definition.

Line 48 is the start vector which contains the first instruction executed when the system is reset.

Lies 51 through 64 is one second power up delay which allows the power supplies to stabilize before transmission begins.

Lines 66 through 70 clears all of the RAM registers.

Lines 73 through 75 read the configuration switches and check for the test mode.

Lines 78 through 80 are the manufacturing test routine.

Lines 85 through 117 obtain the initial grate value. The RXMIT subroutine is used to obtain distances. The distances are checked for being between 7 inches and 13 inches from the crystal. Any distance not between 7 and 13 inches from the crystal. Any distance not between 7 and 13 inches flashes the OVERICE indicator and ignores the valve. 16 acceptable samples of the grate are averaged and then the program exits to the cup detection routine.

10. The CUPDET routine is the cup detection routine. This routine has a specific set of criteria that must be satisfied before the routine exits to the FILL routine. First the routine uses the RXMIT subroutine to look at: the lip signal. The lip signal must be stable and within the distance of a legitimate lip signal. Then the routine uses the FXMIT subroutine to look inside the cup at the cup bottom or the ice level is present. The routine then recalls the maximum ice level from the dip switches and calculates the maximum ice level for that particular cup. If the ice level is greater than the maximum ice level allowed then the maximum ice level allowed then the OVERICE indicator flashes and the CUPDET routine begins again. If the actual ice level is less than the maximum ice selected by the dipswitch, then the routine exits to the FILL routine.

Lines 1 through 38 contain register and program label definitions.

Lines 43 through 45 read the dip switches by calling the subroutine MUX and tests for the manufacturing test mode. If the test mode is input, then the program branches back to the beginning of the SODAR initialization routine.

Lines 47 through 49 check for the manual override switch being pressed. If the switch is pressed then the program branches to the cup removal routine.

Lines 51 through 77 use the RXMIT subroutine to look for a stable lip in the following sequence:

Lines 51 through 59 check to see that the lip is at least 3 inches above the grate.

Lines 61 through 77 make sure that the lip distance is stable by having to see 12 samples in a row that are within 0.1 inch of each other.

Lines 79 through 84 use the subroutine FXMIT to look down into the cup to get the cup bottom distance or ice level. This also determines that the bottom of the cup is at least 0.1 inches above the grate.

Lines 86 through 91 calculate the cup height by subtracting the lip distance from the grate distance.

Lines 92 through 104 divide the cup height by 8 and multiplies the dividend by the maximum ice level switch inputs.

Lines 106 through 108 determine whether the actual ice height is greater than the maximum ice height selected by the dip switches. If the actual ice height is greater than selected, then lines 110 through 116 flash the red OVERICE indicator and branch to the beginning of the cup detection routine. If the actual ice height is less than the maximum ice height, then the routine exits to the FILL routine.

11. The FILL routine handles either foamy product or non foamy product and a fast flow or standard flow. These options are set in the dip switch. The FILL routine first turns the FILL indicator and the solenoid valves in the valve assembly 412 on. It then waits for one second before monitoring the liquid level. The level is then monitored using the LEVCHK subroutine until the initial FILL level for that particular type of valve assembly is reached. The routine then checks to see whether foamy or non foamy product is enabled. If non foamy is selected the valve is not turned off and the final topoff begins. If foamy product is enabled, then the valve is turned off and the program waits for 5 seconds before monitoring the foam level. When the foam level drops below 0.4 below the Lip, the first of two possible topoffs begin, separated by additional time to allow the foam to subside. When the final fill level is reached the program exits to the cup removal routine. Periodically during the entire fill routine the CUPCHK subroutine is called to ensure that the cup has not been removed.

Lines 1 through 40 contain register and program label definitions.

Lines 44 through 46 turn both the fill indicator and the valve on.

Lines 51 through 62 provide a 1 second delay while monitoring the manual pushbutton switch. This allows for initial splash and cup movement without aborting the fill.

Lines 67 through 71 set up the respective maximum "valve on" times for the standard (SEV) or fast flow valve.

Lines 74 through 91 provide the control for the initial fill in the following sequence:

Lines 77 through 79 use the subroutine CUPCHK to check for the cup having been removed. If the cup has been removed, the program branches to the cup removal routine.

Lines 81 through 84 select the distance below the lip for the initial fill.

Lies 86 through 91 use the LEVCHK subroutine to check if the manual switch has been depressed or if the liquid level is at or above the initial fill level.

Lines 96 through 104 first check the configuration switch to see if foamy product is enabled. If foamy product is not enabled, the final top off flag is set and the program branches to the top of routine. If foamy product is enabled, the valve is turned off.

Lines 109 through 119 are used in the first and second top off and provide a delay of 4.5 seconds, allowing the foam to finish rising and begin to fall. The routine checks for the manual switch being depressed. If the manual switch is depressed the program branches to the cup removal routine.

Lines 123 through 144 also used in the first and the second top off routine. This routine uses the FXMIT subroutine to monitor the foam level in the cup. There are 3 possible exits from this routine.

(a) Before and after the first top off if the foam level falls below 0.4 inches below the lip the routine branches to the top of routine.

(b) Before the first top off begins, if approximately 10 seconds passes and the foam level is not below 0.4 inches below the lip, then the program branches to the top off routine.

(c) If after the first top off routine, approximately 10 seconds has passed and the foam level has not fallen below 0.4 inches below the lip, then the program branches to the cup removal routine.

Lines 146 through 167 are the top off routines for the first and second top off in the following sequence:

Lines 146 through 151 use the CUPCHK subroutine to ensure that the cup has not been removed. If the cup has been removed the program branches to the cup removal routine.

Lines 146 through 167 are the top off routines for the first and second top off in the following sequence:

Lines 146 through 151 use the CUPCHK subroutine to ensure that the cup has not been removed. If the cup has been removed the program branches to the cup removal routine.

Line 153 calls the Final Fill Level (FFLEV) subroutine which returns with the "Final Fill Level" distance below the lip.

Lines 155 through 161 monitor the liquid level in the cup. The LEVCHK subroutine is called and the return flags are checked to see if the manual switch has been depressed or if the fill level is at or above the final fill level.

Lines 163 through 167 turn the valve off when the liquid level reaches or exceeds the final fill level. If only one top off has occurred, the program branches back to line 109 to wait for the foam to fall. If the second top off has taken place the program branches to the cup removal routine.

12. The Cup Removal Routine (CUPREM) waits until the cup has been removed and then branches back to the cup detection routine. Lines 1 through 35 contain register and program label definitions.

Lines 39 through 42 turn the Fill indicator off turn the OVERICE/"Cup Remove" indicator on, turn the valve off, and clears all the flags.

Lines 46 through 56 check to see if the cup has been removed. This routine calls the RXMIT subroutine and checks for a distance within a quarter inch of the stored grate distance. If the measured distance is within a quarter inch of the stored grate distance.

Lines 58 through 61 store the measured distance as the new grate distance, turns the "OVERICE/Cup Remove" indicator off, and branches to the cup detection routine. Acquiring a new grate signal allows for minor shifting of the grate during operation.

FIGS. 58 and 59 show the rear and front transducer lenses, respectively, which have been described above. Referring to FIG. 58, the rear lens 540 has a diameter of 0.54 inch and a height of 0.21 inch. FIG. 58A is an edge view, FIG. 58B is a front view, FIG. 58C is a side view, and FIG. 58D is a rear view. The front surface is cylindrical and has a radius of curvature of 2.0 inch. The rear lens is tilted at an angle of 3.5° toward the centerline of the nozzle.

The front lens 542 is shown in FIG. 59 and is also tilted at an angle of 3.5° toward the centerline of the nozzle. FIGS. 59, A, B, C and D are edge, front, side and rear views, respectively. The front surface of the lens 542 has a conical shape formed by a 3.5 degree countersink in the face thereof. Each of the lenses 540 and 542 has a notch 541 and 543, respectively, for orientation purposes.

It is noted that all of the three embodiments of this invention employ a transmitter crystal that is separate from the receiver crystal (hereby defined as a bi-static system).

The difference between a bi-static system and a single crystal transducer used in ultrasonic applications is that the single crystal acts as a transmitter and a receiver. The bi-static system uses a single crystal for a transmitter and a different crystal for a receiver. The characteristics of the two systems are that you can normally get usable signals in the near field range (close to the transducer assembly) from a bi-static system.

The transmitter crystal continues to ring for several cycles after it is turned off, which is merely the "coasting down" of the mechanical motion generated by the current applied to the transducer crystal. The separate receiver crystal in a bi-static system does not experience that jolt from transmitting (unless it is not properly insulated, electrically and acoustically, from the transmitter). Therefore, it can receive a signal in the near range field much sooner than can a single crystal transducer. Some systems operate at a frequency of around 1 megahertz, which means that they are very limited as to the distance they can transmit in the air because a 1 megahertz ultrasonic signal dissipates very fast through absorption by much smaller particulates in the air than say a 400 kilohertz. Another problem with using 1 megahertz, is that it takes a tremendous amount of power to drive a 1 megahertz ultrasonic signal more than a very few inches.

While the preferred embodiments of this invention have been described above in detail, it is to be understood that variations and modifications can be made therein without departing from the spirit and scope of the present invention as set forth in the appended claims. For example, other materials can be used for the crystals and the lenses and other numbers of crystals can be used and other arrangements and locations can be used for the two crystals of the transducer assembly. In addition, a different ultrasonic transmitter and receiver can be used in place of the crystals, if desired, such as various ultrasonic foil devices. While two specific control circuits have been described in detail, other control circuits and other components thereof can be used. While a microcomputer has been described and is preferred, the control circuit can alternatively use a microprocessor connected to a remote RAM and ROM, for example. While the transducer assembly and the control module are shown attached to the dispenser valve assembly, this is not essential; they can be attached to the dispenser and just connected electrically to the valve assembly.

```
LINE ADDR INSTR          SODAR86 TRANSMITTER

1.                     TITLE  "SODAR86 TRANSMITTER"
2.                     INIT
3.            +        LIST   E,P=1654
4.   0000     +INDEX   EQU    0
5.   0001     +RTCC    EQU    1
6.   0002     +PC      EQU    2
7.   0003     +SWR     EQU    3
8.   0004     +FSR     EQU    4
9.   0005     +RA      EQU    5
10.  0006     +RB      EQU    6
11.                    SPACE FOR I/O DEFINITIONS
12.
13.  0007     +DIST    EQU    7
14.  0010     +GRATE   EQU    10
15.  0011     +LD      EQU    11
16.  0012     +CH      EQU    12
17.  0013     +FLAG    EQU    13
18.  0014     +TEMP    EQU    14
19.  0015     +TEMPA   EQU    15
20.  0016     +TEMPB   EQU    16
21.  0017     +TEMPC   EQU    17
22.  0020     +SW      EQU    20
23.  0021     +LC      EQU    21
24.  0022     +IH      EQU    22
25.  0023     +TOUTLO  EQU    23
26.  0024     +TOUTHI  EQU    24
27.  0025     +CRCNT   EQU    25
28.  0026     +TEMP1   EQU    26
29.  0027     +LC1     EQU    27
30.
31.
32.  0000              ORG    000
33.
34.  0000 2253 FXMIT   BCF    FLAG,5   ;CLEAR FLAG FOR NORMAL TRANSMIT PERIOD
35.  0001 6012         MOVLW  12       ; .. code TO SELECT FRONT RECEIVER CRYSTALS and set watchdog
36.  0002 5005         GOTO   PXMIT
37.  0003 2653 RXMIT   BSF    FLAG,5   ;SET FLAG FOR LONGER TRANSMIT PERIOD
38.  0004 6006         MOVLW  06       ; .. code TO SELECT REAR RECEIVER CRYSTALS and set watchdog
39.  0005 0045 PXMIT   MOVWF  RA
40.
41.  0006 2353         BCF    FLAG,7   ;CLEAR SECOND TIME FLAG
42.  0007 2446         BSF    RB,1     ;SET DETECTOR HIGH
43.
44.  0010 3760         BTFSS  SW,7     ; .. skip on low to high transition
45.  0011 5026         GOTO   THL1
46.
47.          ;                 LOOKING FOR LOW TO HIGH TRANSITION
48.  0012 2406 TLH1    BSF    RB,0
49.  0013 3006         BTFSC  RB,0     ;MAKE SURE IT'S LOW FIRST
50.  0014 5012         GOTO   TLH1
51.
52.  0015 3445 TLH2    BTFSS  RA,1     ; .. skip on watch dog high
```

```
53. 0016 5021           GOTO  TLH2A
54.
55. 0017 2045           BCF   RA,1            ; .. clear watch dog
56. 0020 5022           GOTO  TLH2B
57.
58. 0021 2445  TLH2A    BSF   RA,1            ; .. set watch dog
59. 0022 2406  TLH2B    BSF   RB,0            ;NO LOOK FOR TRANSITION
60. 0023 3406           BTFSS RB,0            ;SKIP ON TRANSITION
61. 0024 5015           GOTO  TLH2
62.
63. 0025 5041           GOTO  XMIT
64.
65.            ;             LOOKING FOR HIGH TO LOW TRANSITION
66. 0026 3445  THL1     BTFSS RA,1            ; .. skip on watch dog high
67. 0027 5032           GOTO  THL1A
68.
69. 0030 2045           BCF   RA,1            ; .. clear watch dog
70. 0031 5033           GOTO  THL1B
71.
72. 0032 2445  THL1A    BSF   RA,1            ; .. set watch dog
73. 0033 2406  THL1B    BSF   RB,0
74. 0034 3406           BTFSS RB,0            ;MAKE SURE IT'S HIGH FIRST
75. 0035 5026           GOTO  THL1
76.
77. 0036 2406  THL2     BSF   RB,0
78. 0037 3006           BTFSC RB,0            ;SKIP ON TRANSITION
79. 0040 5036           GOTO  THL2
80.
81.            ;        NOW TRANSMIT 25 USEC OR _ OF 400 KHZ
82. 0041 6004  XMIT     MOVLW 4
83. 0042 3253           BTFSC FLAG,5          ;SKIP ON REGULAR TRANSMIT PERIOD
84. 0043 6020           MOVLW 20              ;LONGER TRANSMIT PERIOD
85. 0044 0054           MOVWF TEMP
86. 0045 2146           BCF   RB,3            ;START TRANSMITTING
87. 0046 1354  XTIME    DECFSZ TEMP
88. 0047 5046           GOTO  XTIME
89. 0050 2546           BSF   RB,3            ;STOP TRANSMITTING
90.            ;
91.
92. 0051 6360           MOVLW 360             ;PRESET COUNTER TO ROLL OVER AT .8"
93.            ;!!!!!!!!!!!!!!!!!!!!!
94. 0052 0000           NOP   BTFSC FLA',5
95. 0053 0000           NOP   MOVLW 372
96.            ;!!!!!!!!!!!!!!!!!!!!!
97. 0054 0041           MOVWF RTCC
98.
99. 0055 3341  R1       BTFSC RTCC,7          ;IGNORE ANY ECHOES < .8"
100. 0056 5055          GOTO  R1
101.
102. 0057 2446          BSF   RB,1            ;SET DET HIGH TO READ
103.
104. 0060 2045          BCF   RA,1            ;RESET WATCHDOG AND ALLOW RECEIVER TO TURN ON
105.
106. 0061 3446  R2      BTFSS RB,1            ;SKIP ON NO EDGE
107. 0062 5073          GOTO  R5              ;SAW EDGE
108. 0063 3741  R3      BTFSS RTCC,7          ;SKIP ON COUNTER > 128 () 7.3")
109. 0064 5061          GOTO  R2
110. 0065 3446  R4      BTFSS RB,1            ;SKIP ON NO EDGE
111. 0066 5073          GOTO  R5              ;SAW EDGE
```

| | | | | | |
|---|---|---|---|---|---|
| 112. | 0067 | 3341 | | BTFSC | RTCC,7 | ;SKIP ON COUNTER OVERFLOW () 13.7") |
| 113. | 0070 | 5065 | | GOTO | R4 | ;NO COUNTER OVERFLOW, WAIT FOR EDGE |
| 114. | 0071 | 6377 | | MOVLW | 377 | ;IF COUNTER OVERFLOWS THEN MAKE DISTANCE 377 |
| 115. | 0072 | 5074 | | GOTO | R6 | |
| 116. | 0073 | 1001 | R5 | MOVF | RTCC,W | ;GET COUNT (DISTANCE) |
| 117. | 0074 | 0047 | R6 | MOVWF | DIST | ;SAVE DISTANCE |
| 118. | | | | | | |
| 119. | 0075 | 3347 | | BTFSC | DIST,7 | ;SKIP ON DIST < 128 |
| 120. | 0076 | 5102 | | GOTO | W2 | |
| 121. | | | | | | |
| 122. | 0077 | 2413 | | BSF | FLAG,0 | ;NEED TO DELAY FOR 2 MSEC |
| 123. | | | | | | |
| 124. | 0100 | 3741 | W1 | BTFSS | RTCC,7 | ;WAIT FOR COUNTER TO ROLL OVER |
| 125. | 0101 | 5100 | | GOTO | W1 | |
| 126. | 0102 | 3341 | W2 | BTFSC | RTCC,7 | ;WAIT FOR COUNTER TO ROLL OVER |
| 127. | 0103 | 5102 | | GOTO | W2 | |
| 128. | | | | | | |
| 129. | 0104 | 3413 | | BTFSS | FLAG,0 | ;LOOP TWICE 256/133333 = 1.9 MSEC |
| 130. | 0105 | 5110 | | GOTO | W3 | |
| 131. | 0106 | 2013 | | BCF | FLAG,0 | |
| 132. | 0107 | 5100 | | GOTO | W1 | |
| 133. | | | | | | |
| 134. | 0110 | 3353 | W3 | BTFSC | FLAG,7 | ;SKIP ON FIRST SAMPLE |
| 135. | 0111 | 5120 | | GOTO | R7 | ;IF SECOND SAMPLE, THEN CORRELATE AND AVERAGE |
| 136. | | | | | | |
| 137. | 0112 | 2445 | | BSF | RA,1 | ; SET WATCHDOG FOR ~~WIRING COUPLING~~ |
| 138. | | | | | | |
| 139. | 0113 | 1007 | | MOVF | DIST,W | ;STORE FIRST DISTANCE |
| 140. | 0114 | 0055 | | MOVWF | TEMPA | ;IN TEMPA |
| 141. | 0115 | 0056 | | MOVWF | TEMPB | ;ALSO IN TEMPB FOR LATER AVERAGE |
| 142. | 0116 | 2753 | | BSF | FLAG,7 | ;SET SECOND TIME FLAG |
| 143. | 0117 | 5041 | | GOTO | XMIT | |
| 144. | | | | | | |
| 145. | | | ; | CORRELATE AND AVERAGE | | |
| 146. | | | ; | COMPUTE ABSOLUTE VALUE OF DIFFERENCE | | |
| 147. | 0120 | 1007 | R7 | MOVF | DIST,W | ;RECALL FIRST DISTANCE |
| 148. | 0121 | 0255 | | SUBWF | TEMPA | ;DIFFERENCE |
| 149. | 0122 | 3003 | | BTFSC | SWR,0 | ;SKIP ON NEGATIVE DIFFERENCE |
| 150. | 0123 | 5126 | | GOTO | R8 | ;DONE |
| 151. | 0124 | 1154 | | COMF | TEMP | ;NEGATE |
| 152. | 0125 | 1254 | | INCF | TEMP | ;" |
| 153. | | | | | | |
| 154. | | | ; | MUST CORRELATE WITHIN .4" | | |
| 155. | 0126 | 6010 | R8 | MOVLW | 10 | ;8 * 1/20 = .4" |
| 156. | 0127 | 0255 | | SUBWF | TEMPA | ;DIFFERENCE |
| 157. | 0130 | 3003 | | BTFSC | SWR,0 | ;SKIP ON DIFF < .4" |
| 158. | 0131 | 5136 | | GOTO | tryaq | ;SAMPLES DO NOT CORRELATE |
| 159. | | | | | | |
| 160. | | | ; | SAMPLES DO CORRELATE, SO AVERAGE THEM | | |
| 161. | 0132 | 1016 | | MOVF | TEMPB,W | ;RECALL FIRST DISTANCE |
| 162. | 0133 | 0747 | | ADDWF | DIST | ;ADD TO SECOND DISTANCE |
| 163. | 0134 | 1447 | | RRF | DIST | ;DIVIDE BY TWO |
| 164. | 0135 | 4000 | | RETLW | 0 | ;RETURN NORMALLY |
| 165. | | | | | | |
| 166. | 0136 | 3653 | tryaq | BTFSS | FLAG,5 | ; .. skip on RXMIT called |
| 167. | 0137 | 5000 | | GOTO | FXMIT | |
| 168. | 0140 | 5003 | | GOTO | RXMIT | |
| 169. | | | | | | |
| 170. | | | | END | | |

SODARGE TRANSMITTER

SYMBOL TABLE LISTING
```
SYMBOL-VALUE
 CH      0012 U
 CRCNT   0025 U
 DIST    0007 F
 FLAG    0013 F
 FSR     0004 U
 FXMIT   0000 L
 GRATE   0010 U
 IH      0022 U
 INDEX   0000 U
 LC      0021 U
 LC1     0027 U
 LD      0011 U
 PC      0002 U
 PXMIT   0005 L
 R1      0055 L
 R2      0061 L
 R3      0063 U
 R4      0065 L
 R5      0073 L
 R6      0074 L
 R7      0120 L
 R8      0126 L
 RA      0005 F
 RB      0006 F
 RTCC    0001 F
 RXMIT   0003 L
 SW      0020 F
 SWR     0003 F
 TEMP    0014 F
 TEMP1   0026 U
 TEMPA   0015 F
 TEMPB   0016 F
 TEMPC   0017 U
 THL1    0026 L
 THL1A   0032 L
 THL1B   0033 L
 THL2    0036 L
 TLH1    0012 L
 TLH2    0015 L
 TLH2A   0021 L
 TLH2B   0022 L
 TOUTHI  0024 U
 TOUTLO  0023 U
 W1      0100 L
 W2      0102 L
 W3      0110 L
 XMIT    0041 L
 XTIME   0046 L
 tryag   0136 L
 49 SYMBOLS
```

C 1987
The Coca Cola Company

APPENDIX A

```
CC1      0216  U
CC2      0232  L
CC3      0233  L
CH       0012  U
CRCNT    0025  F
CUPCHK   0215  U
DIFF     0162  L-
DIST     0007  F
FFLEV    0301  U
FLAG     0013  F
FSR      0004  U
FXMIT   -0000  L
GRATE    0010  F
IH       0022  U
INDEX    0000  U
LADJ     0235  L
LC       0021  F
LC1      0027  F
LCK1     0257  L
LCK2     0261  L
LCK3     0276  L
LD       0011  F
LEVCHK   0255  U
M1       0132  L
MUX      0130  U
PC       0002  U
RA       0005  F
RB       0006  F
RTCC     0001  F
RXMIT    0003  L
SW       0020  F
SWR      0003  F
TEMP     0014  F
TEMP1    0026  F
TEMPA    0015  U
TEMPB    0016  U
TEMPC    0017  U
TIMOUT   0170  L
TOUTHI   0024  F
TOUTLO   0023  F
TRAP     0174  L
TRAP1    0177  L
TRAP1A   0201  L
TRAP2    0212  L
WAIT2    0154  L
WAITA    0155  L
WAITB    0157  L
data     0050  B
delay    0314  L
fla1     0303  L
fla2     0306  L
loopcn   0030  F
loopnd   0326  L
loopst   0312  L
sync     0060  B
    55  SYMBOLS
```

```
LINE ADDR INSTR       MISCELLANEOUS SUBRO...l
        mux.
  1.    Subroutine      TITLE  "MISCELLANEOUS SUBROUTINES"
  2.                    INIT
  3.           +        LIST   E.P=1654
  4.    0000   +INDEX   EQU    0
  5.    0001   +RTCC    EQU    1
  6.    0002   +PC      EQU    2
  7.    0003   +SWR     EQU    3
  8.    0004   +FSR     EQU    4
  9.    0005   +RA      EQU    5
 10.    0006   +RB      EQU    6
 11.           TIONS
 12.
 13.    0007   +DIST    EQU    7
 14.    0010   +GRATE   EQU    10
 15.    0011   +LD      EQU    11
 16.    0012   +CH      EQU    12
 17.    0013   +FLAG    EQU    13
 18.    0014   +TEMP    EQU    14
 19.    0015   +TEMPA   EQU    15
 20.    0016   +TEMPB   EQU    16
 21.    0017   +TEMPC   EQU    17
 22.    0020   +SW      EQU    20
 23.    0021   +LC      EQU    21
 24.    0022   +IH      EQU    22
 25.    0023   +TOUTLO  EQU    23
 26.    0024   +TOUTHI  EQU    24
 27.    0025   +CRCNT   EQU    25
 28.    0026   +TEMP1   EQU    26
 29.    0027   +LC1     EQU    27
 30.
 31.           ;MUX PROGRAM TO READ THE DIP SWITCHES
 32.           ;   AND PUT THE DIP SWITCH VALUES IN REGISTER SW AS FOLLOWS:
 33.           ;   SW,0   LSB OF ICE LEVEL
 34.           ;   SW,1   MIDDLE BIT OF ICE LEVEL
 35.           ;   SW,2   MSB OF ICE LEVEL
 36.           ;   SW,3   FF=0,SEV=1
 37.           ;   SW,4   NOT FOAMY=0,FOAMY =1
 38.           ;   SW,5   ALWAYS ZERO
 39.           ;   SW,6   FILL LEVEL ADJUST
 40.           ;   SW,7   SYNC SELECT LOW TO HIGH OR HIGH TO LOW
 41.
 42.    0000   FXMIT    EQU    000
 43.    0003   RXMIT    EQU    003
 44.
 45.           ;..................................................
 46.
 47.    0030   loopcn   EQU    30
*** INFORMATIVE-LABEL TOO LONG, TRUNCATED
 48.    0000   data     EQU    0
 49.    0000   sync     EQU    0
 50.
 51.           ;..................................................
 52.
 53.    0130            ORG    130
 54.
 55.    0130 0160 MUX   CLRF   SW       ;CLEAR SWITCH REGISTER
 56.    0131 0154       CLRF   TEMP     ;ZERO ABC COUNTER INITIALLY
```

```
57.
58.  0132  2403  M1      BSF    SWR,0              ;SET CARRY
59.
60.  0133  1514          RLF    TEMP,W             ;ROTATE COUNT TO LINE UP WITH HI ON DATA
61.  0134  0045          MOVWF  RA                 ;OUTPUT NEW CODE
62.  0135  4554          CALL   WAIT2              ;WAIT TWO MILLISECONDS
63.
64.  0136  2003          BCF    SWR,0              ;CLEAR CARRY
65.  0137  3005          BTFSC  RA,0               ;SKIP ON DATA line = 0 (CARRY ALREADY ZERO
66.  0140  2403          BSF    SWR,0              ;SET CARRY
67.
68.  0141  1460          RRF    SW                 ;ROTATE CARRY INTO SW
69.  0142  1254          INCF   TEMP               ;NEXT BIT
70.  0143  3554          BTFSS  TEMP,3             ;STOP WHEN 8 IS REACHED
71.  0144  5132          GOTO   M1
72.
73.  0145  1120          COMF   SW,W               ;RECALL COMPLEMENTED SW
74.  0146  7007          ANDLW  007                ; .. CLEAR ALL BUT ICE LEVEL ( 111 on ice level is test)
75.  0147  2213          BCF    FLAG,4             ;CLEAR TEST FLAG
76.  0150  3103          BTFSC  SWR,2              ;SKIP ON NOT IN TEST MODE
77.  0151  2613          BSF    FLAG,4             ;SET TEST FLAG
78.  0152  2313          BCF    FLAG,6             ;CLEAR WATCHDOG BIT
79.  0153  4000          RETLW  0                  ;RETURN WITH TEST STATE AND SWITCH
80.
81.
82.                  ;           ROUTINE TO WAIT 2 MILLISECONDS
83.  0154  0141  WAIT2   CLRF   RTCC
84.  0155  3741  WAITA   BTFSS  RTCC,7
85.  0156  5155          GOTO   WAITA
86.  0157  3341  WAITB   BTFSC  RTCC,7
87.  0160  5157          GOTO   WAITB
88.  0161  4000          RETLW  0
89.
90.              ;           ROUTINE TO CALCULATE THE ABSOLUTE VALUE
91.              ;           OF THE DIFFERENCE OF TWO NUMBERS
92.              ;           TEMP = !TEMP - W!
93.
94.  0162  0254  DIFF    SUBWF  TEMP               ;TEMP = TEMP - W
95.  0163  3003          BTFSC  SWR,0              ;SKIP ON NO CARRY I.E. NEGATIVE NUMBER
96.  0164  4000          RETLW  0                  ;POSITIVE DIFFERENCE
97.  0165  1154          COMF   TEMP               ;DO TWO'S COMPLEMENT
98.  0166  1254          INCF   TEMP
99.  0167  4000          RETLW  0
100.
101.             ;           ROUTINE TO CHECK FOR A 60 SECOND "VALVE ON"
102.             ;           TIME - TOUTHI AND TOUTLO INITIALIZED AT F1 in fill routine
103.
104. 0170  1363  TIMOUT  DECFSZ TOUTLO             ;DECREMENT LSBYTE
105. 0171  4000          RETLW  0
106. 0172  1364          DECFSZ TOUTHI             ;DECREMENT MSBYTE
107. 0173  4000          RETLW  0
108.             ;           IF VALVE ON FOR LONGER THAN TIME ALLOWED
109.             ;           THEN TURN VALVE OFF AND FLASH LED'S UNTIL
110.             ;           HARDWARE RESET
111.
112. 0174  2506  TRAP    BSF    RB,2               ;KEEP SOLENOID OFF
113. 0175  6074          MOVLW  74                 ;60 DECIMAL
114. 0176  0054          MOVWF  TEMP
115. 0177  3006  TRAP1   BTFSC  RB,0               ;SKIP ON 60 HZ LOW
```

```
116.  0200  5177            GOTO    TRAP1
117.  0201  3406   TRAP1A   BTFSS   RB,0        ;SKIP ON 60 HZ HIGH
118.  0202  5201            GOTO    TRAP1A
119.  0203  1354            DECFSZ  TEMP        ;COUNT 60 CYCLES
120.  0204  5177            GOTO    TRAP1
121.  0205  3646            BTFSS   RB,5        ;SKIP ON OI INDICATOR OFF
122.  0206  5212            GOTO    TRAP2
123.  0207  2706            BSF     RB,6        ;FILL INDICATOR OFF
124.  0210  2246            BCF     RB,5        ;OI INDICATOR ON
125.  0211  5174            GOTO    TRAP
126.  0212  2306   TRAP2    BCF     RB,6        ;FILL INDICATOR ON
127.  0213  2646            BSF     RB,5        ;OI INDICATOR OFF
128.  0214  5174            GOTO    TRAP
129.
130.                ;               ROUTINE TO LOOK FOR CUP TO BE REMOVED
131.
132.  0215  2553   CUPCHK   BSF     FLAG,3      ;SET CUP REMOVAL FLAG
133.  0216  4403   CC1      CALL    RXMIT       ;LOOK FOR LIP
134.
135.  0217  1107            COMF    DIST,W      ;CHECK FOR DIST = 377 (NO ECHO)
136.  0220  3103            BTFSC   SWR,2       ;SKIP ON DIST NOT 377
137.  0221  5233            GOTO    CC3         ;DON'T DECREMENT JUST RETURN
138.
139.  0222  6005            MOVLW   5           ;CHECK FOR DIST WITHIN .25 OF GRATE
140.  0223  0210            SUBWF   GRATE,W     ;W = GRATE - .25
141.  0224  0207            SUBWF   DIST,W      ;W = DIST - (GRATE - .25)
142.
143.  0225  3003            BTFSC   SWR,0       ;SKIP ON DIST < GRATE - .25
144.
145.  0226  5232            GOTO    CC2         ;CUP LIP MISSING SO DECREMENT COUNTER
146.
147.  0227  6001            MOVLW   01          ;RESET CUP COUNTER
148.  0230  0065            MOVWF   CRCNT
149.  0231  5233            GOTO    CC3         ;RETURN WITH CLEAR FLAG
150.
151.  0232  1365   CC2      DECFSZ  CRCNT       ;DECREMENT CUP REMOVAL COUNTER
152.  0233  2153   CC3      BCF     FLAG,3      ;CLEAR CUP REMOVAL FLAG
153.  0234  4000            RETLW   0
154.
155.
156.  0235  4403   LADJ     CALL    RXMIT
157.  0236  1011            MOVF    LD,W        ;RECALL LIP DISTANCE
158.  0237  0054            MOVWF   TEMP
159.  0240  1007            MOVF    DIST,W      ;RECALL LAST DISTANCE
160.  0241  4562            CALL    DIFF        ;TEMP = :TEMP - W:
161.  0242  6024            MOVLW   24          ;DECIMAL 20 (1")
162.  0243  0254            SUBWF   TEMP        ;CHECK FOR DISTANCE WITHIN 1" OF LIP
163.  0244  3003            BTFSC   SWR,0       ;SKIP ON DIFF < 1"
164.  0245  5235            GOTO    LADJ        ;NOT 377 OR GRATE OR LIP SO TRY AGAIN
165.
166.  0246  1011            MOVF    LD,W        ;RECALL LIP
167.  0247  0207            SUBWF   DIST,W      ;W = DIST - LD
168.  0250  0054            MOVWF   TEMP
169.  0251  2003            BCF     SWR,0       ;CLEAR CARRY
170.  0252  1414            RRF     TEMP,W      ;TEMP = DIFF/2
171.  0253  0751            ADDWF   LD          ;NEW LIP DISTANCE = LD + (DIST - LD)/2
172.  0254  4000            RETLW   0           ;RETURN NORMALLY
173.
174.          ;     SUBROUTINE TO MONITOR THE LIQUID/FOAM LEVEL AND CONTROL THE VALVE
```

```
175.
176. 0255 6010 LEVCHK  MOVLW  10           ;SET UP MAX NUMBER OF LOOPS
177. 0256 0061         MOVWF  LC           ;IN THIS SUBROUTINE
178.
179. 0257 6002 LCK1    MOVLW  2            ;SET UP NUMBER OF DECISIONS
180. 0260 0067         MOVWF  LCI          ;NEEDED TO TURN OFF VALVE
181.
182. 0261 4570 LCK2    CALL   TIMOUT       ;DECREMENT VALVE-ON TIMER
183.
184. 0262 2746         BSF    RB,7         ;CHECK FOR MAN. DEPRESSED
185. 0263 3746         BTFSS  RB,7         ;SKIP ON MAN. NOT DEPRESSED
186. 0264 4001         RETLW  01           ;RETURN WITH CODE FOR MAN. DEPRESSED
187.
188. 0265 4400         CALL   FXMIT        ;FRONT TRANSMIT
189. 0266 1026         MOVF   TEMP1,W      ;RECALL OFFSET
190. 0267 0711         ADDWF  LD,W         ;W = LD + OFFSET
191. 0270 0207         SUBWF  DIST,W       ;W = DIST - (LD + OFFSET)
192. 0271 3003         BTFSC  SWR,0        ;SKIP ON DIST < LD + OFFSET (W IS NEG)
193. 0272 5276         GOTO   LCK3
194.
195. 0273 1367         DECFSZ LCI          ;SKIP ON TIME TO SHUT OFF
196. 0274 5261         GOTO   LCK2
197.
198. 0275 4002         RETLW  02           ;RETURN WITH VALVE OFF FLAG
199.
200. 0276 1361 LCK3    DECFSZ LC           ;TIME TO RETURN NORMALLY?
201. 0277 5257         GOTO   LCK1         ;
202.
203. 0300 4000         RETLW  0            ;RETURN WITH NO FLAG
204.
205.
206. 0301 6015 FFLEV   MOVLW  0DH          ; .. select fill level adjust line
207. 0302 0045         MOVWF  RA
208.
209.
210. 0303 2406 fla1    BSF    RB,sync
211. 0304 3006         BTFSC  RB,sync      ; .. Is the sync line low?
212. 0305 5303         GOTO   fla1         ; .. No, so keep looking for low
213.
214. 0306 2406 fla2    BSF    RB,sync
215. 0307 3406         BTFSS  RB,sync      ; .. Yes it was, so look for transition to high now
216. 0310 5306         GOTO   fla2
217.
218. 0311 0166         CLRF   TEMP1        ; .. sync went high so start counting
219. 0312 6043 loopst  MOVLW  23H
220. 0313 0070         MOVWF  loopcnt
221. 0314 1370 delay   DECFSZ loopcnt
222. 0315 5314         GOTO   delay
223.
224. 0316 2405         BSF    RA,data
225. 0317 3005         BTFSC  RA,data      ; .. If we're still low then keep quantizing
226. 0320 5326         GOTO   loopnd
227.
228. 0321 1266         INCF   TEMP1        ; .. Increment the final fill level distance
229. 0322 6046         MOVLW  26H          ; .. 37
230. 0323 0226         SUBWF  TEMP1,W
231. 0324 3503         BTFSS  3,2          ; .. Skip on zero
232. 0325 5312         GOTO   loopst
233.
```

```
234.  0326  6003  loopnd  MOVLW  3
235.  0327  0766          ADDWF  TEMP1           ; .. Add .125 inches to limit minimum
236.  0330  4000          RETLW  0
237.
238.                      END

LINE  ADDR  INSTR     .  CUPDET CUP DETECTIL .

1.                      TITLE  "CUPDET CUP DETECTION"
  2.                      INIT
  3.                 +    LIST   E,P=1654
  4.  0000         +INDEX   EQU    0
  5.  0001         +RTCC    EQU    1
  6.  0002         +PC      EQU    2
  7.  0003         +SWR     EQU    3
  8.  0004         +FSR     EQU    4
  9.  0005         +RA      EQU    5
 10.  0006         +RB      EQU    6
 11.                TIONS
 12.
 13.  0007         +DIST    EQU    7
 14.  0010         +GRATE   EQU   10
 15.  0011         +LD      EQU   11
 16.  0012         +CH      EQU   12
 17.  0013         +FLAG    EQU   13
 18.  0014         +TEMP    EQU   14
 19.  0015         +TEMPA   EQU   15
 20.  0016         +TEMPB   EQU   16
 21.  0017         +TEMPC   EQU   17
 22.  0020         +SW      EQU   20
 23.  0021         +LC      EQU   21
 24.  0022         +IH      EQU   22
 25.  0023         +TOUTLO  EQU   23
 26.  0024         +TOUTHI  EQU   24
 27.  0025         +CRCNT   EQU   25
 28.  0026         +TEMP1   EQU   26
 29.  0027         +LCI     EQU   27
 30.
 31.  0000         FXMIT    EQU   000
 32.  0003         RXMIT    EQU   003
 33.  0150         MUX      EQU   150
 34.  0174         WAIT2    EQU   174
 35.  0202         DIFF     EQU   202
 36.  0400         SODAR    EQU   400
 37.  0600         FILL     EQU   600
 38.  0740         CUPREM   EQU   740
 39.
 40.
 41.  0455                  ORG   455
 42.
 43.  0455  4550  CUPDET    CALL  MUX          ;READ SWITCHES
 44.  0456  3213            BTFSC FLAG,4       ;SKIP ON NOT TEST MODE
 45.  0457  5400            GOTO  SODAR
 46.
 47.  0460  2746            BSF   RB,7
 48.  0461  3746            BTFSS RB,7         ;SKIP ON MAN. NOT DEPRESSED
 49.  0462  5740            GOTO  CUPREM
 50.
 51.  0463  4403            CALL  RXMIT        ;REAR TRANSMIT
```

```
52.  0464  6074          MOVLW   74              ;CHECK FOR LD < GRATE - 3
53.  0465  0210          SUBWF   GRATE,W         ;W = GRATE - 3
54.  0466  0207          SUBWF   DIST,W          ;W = LD - (GRATE - 3)
55.  0467  3003          BTFSC   SWR,0           ;SKIP ON LD < GRATE - 3
56.  0470  5455          GOTO    CUPDET
57.
58.  0471  1007          MOVF    DIST,W          ;RECALL LIP DISTANCE
59.  0472  0051          MOVWF   LD              ;STORE LIP DISTANCE
60.
61.  0473  6014          MOVLW   14              ;MINIMUM NUMBER FOR STABLE LIP
62.  0474  0061          MOVWF   LC              ;LOOP COUNT
63.
64.  0475  2746  LIPDET  BSF     RB,7
65.  0476  3746          BTFSS   RB,7            ;SKIP ON MAN. NOT DEPRESSED
66.  0477  5740          GOTO    CUPREM
67.  0500  4403          CALL    RXMIT           ;READ LIP
68.  0501  1011          MOVF    LD,W            ;RECALL LIP DISTANCE
69.  0502  0054          MOVWF   TEMP            ;
70.  0503  1007          MOVF    DIST,W          ;RECALL LAST REAR DISTANCE
71.  0504  4602          CALL    DIFF            ;TEMP = |TEMP - W|
72.  0505  6002          MOVLW   2
73.  0506  0214          SUBWF   TEMP,W          ;TEMP = TEMP-2 (.1")
74.  0507  3003          BTFSC   SWR,0           ;SKIP ON DIFF < .1"
75.  0510  5455          GOTO    CUPDET          ;NOT STABLE. TRY AGAIN
76.  0511  1361          DECFSZ  LC              ;SKIP ON STABLE LIP
77.  0512  5475          GOTO    LIPDET
78.
79.  0513  4400  BOTDET  CALL    FXMIT           ;LOOK AT BOTTOM
80.  0514  6002          MOVLW   2
81.  0515  0210          SUBWF   GRATE,W         ;W = GRATE - .1"
82.  0516  0207          SUBWF   DIST,W          ;COMPARE DISTANCE WITH GRATE - .1"
83.  0517  3003          BTFSC   SWR,0           ;SKIP ON DIST < GRATE - .1"
84.  0520  5455          GOTO    CUPDET          ;NO BOTTOM OR ICE LEVEL FOUND
85.
86.  0521  1007          MOVF    DIST,W          ;RECALL DISTANCE
87.  0522  0210          SUBWF   GRATE,W         ;W = GRATE - BOTTOM = ICE HEIGHT
88.  0523  0062          MOVWF   IH              ;STORE ICE HEIGHT
89.  0524  1011          MOVF    LD,W            ;W = LIP DISTANCE
90.  0525  0210          SUBWF   GRATE,W         ;W = GRATE - LIP DISTANCE = CUP HEIGHT
91.  0526  0052          MOVWF   CH              ;STORE CUP HEIGHT
92.  0527  2003          BCF     SWR,0           ;CLEAR CARRY
93.  0530  1452          RRF     CH              ;/2     (DIVIDE BY 8 TOTAL)
94.  0531  2003          BCF     SWR,0
95.  0532  1452          RRF     CH              ;/4
96.  0533  2003          BCF     SWR,0
97.  0534  1452          RRF     CH              ;/8
98.  0535  1120          COMF    SW,W            ;RECALL SWITCH INPUTS
99.  0536  7007          ANDLW   7               ;MASK ALL OTHER INPUTS
100. 0537  0061          MOVWF   LC              ;STORE IN LOOP COUNTER
101. 0540  0100          CLRW                    ;CLEAR ACCUMULATOR
102. 0541  0712  MAXICE  ADDWF   CH,W            ;MULTIPLY BY ICE LEVEL INPUT
103. 0542  1361          DECFSZ  LC
104. 0543  5541          GOTO    MAXICE          ; .. max. ice height = ice level switches * 1/8 cup height
105.
106. 0544  0222          SUBWF   IH,W            ;W = ACTUAL ICE HEIGHT - MAX ICE HEIGHT
107. 0545  3403          BTFSS   SWR,0           ;SKIP ON ACTUAL > MAX
108. 0546  5600          GOTO    FILL            ;OK TO FILL
109.
110. 0547  2246          BCF     RB,5            ;FLASH red over-ice LIGHT AND TRY AGAIN
```

```
111. 0550 0154        CLRF   TEMP
112. 0551 4574 FLSH   CALL   WAIT2        ;WAIT .5 SECOND
113. 0552 1354        DECFSZ TEMP
114. 0553 5551        GOTO   FLSH
115. 0554 2646        BSF    RB,5         ;red LED OFF
116. 0555 5455        GOTO   CUPDET       ;TRY AGAIN
117.
118.                  END
```

CUPDET CUP DETECTION

SYMBOL TABLE LISTING

```
SYMBOL-VALUE
BOTDET  0513 U
CH      0012 F
CRCNT   0025 U
CUPDET  0455 L
CUPREM  0740 L
DIFF    0202 L
DIST    0007 F
FILL    0600 L
FLAG    0013 F
FLSH    0551 L
FSR     0004 U
FXMIT   0000 L
GRATE   0010 F
IH      0022 F
INDEX   0000 U
LC      0021 F
LC1     0027 U
LD      0011 F
LIPDET  0475 L
MAXICE  0541 L
MUX     0150 L
PC      0002 U
RA      0005 U
RB      0006 F
RTCC    0001 U
RXMIT   0003 L
SODAR   0400 L
SW      0020 F
SWR     0003 F
TEMP    0014 F
TEMP1   0026 U
TEMPA   0015 U
TEMPB   0016 U
TEMPC   0017 U
TOUTHI  0024 U
TOUTLO  0023 U
WAIT2   0174 L
37 SYMBOLS
```

```
LINE ADDR INSTR    COKE SODAR PROJECT

1.                 TITLE  "COKE SODAR PROJECT"
2.                 INIT
3.          +      LIST   E.P=1654
4.   0000   +INDEX EQU    0
```

```
5.  0001         +RTCC     EQU    1
6.  0002         +PC       EQU    2
7.  0003         +SWR      EQU    3
8.  0004         +FSR      EQU    4
9.  0005         .+RA      EQU    5
10. 0006         +RB       EQU    6
11.              TIONS
12.
13. 0007         +DIST     EQU    7
14. 0010         +GRATE    EQU    10
15. 0011         +LD       EQU    11
16. 0012         +CH       EQU    12
17. 0013         +FLAG     EQU    13
18. 0014         +TEMP     EQU    14
19. 0015         +TEMPA    EQU    15
20. 0016         +TEMPB    EQU    16
21. 0017         +TEMPC    EQU    17
22. 0020         +SW       EQU    20
23. 0021         +LC       EQU    21
24. 0022         +IH       EQU    22
25. 0023         +TOUTLO   EQU    23
26. 0024         +TOUTHI   EQU    24
27. 0025         +CRCNT    EQU    25
28. 0026         +TEMP1    EQU    26
29. 0027         +LC1      EQU    27
30.
31. 0000         FXMIT     EQU    0
32. 0003         RXMIT     EQU    3
33. 0150         MUX       EQU    150
34. 0174         WAIT2     EQU    174
35. 0455         CUPDET    EQU    455
36.
37.              ;                 FLAG DEFINITIONS
38.              ;                 FLAG,0  FIRST LOOP FLAG FOR TRANSMIT 2 MSEC DELAY
39.              ;                 FLAG,1  SECOND TOPOFF FLAG
40.              ;                 FLAG,2  1 SECOND LOOP FLAG
41.              ;                 FLAG,3  CUP REMOVED FLAG
42.              ;                 FLAG,4  TEST MODE
43.              ;                 FLAG,5
44.              ;                 FLAG,6  WATCHDOG STATUS BIT
45.              ;                 FLAG,7  SECOND SAMPLE TRANSMIT BIT
46.
47. 0777                   ORG    777              ;PROGRAM STARTS HERE AT MASTER CLEAR
48. 0777  5400             GOTO   SODAR            ;START PROGRAM AT SODAR
49.
50. 0400                   ORG    400
51. 0400  2246   SODAR     BCF    RB,5             ; .. Turn on over-ice LED
52. 0401  0161             CLRF   LC
53. 0402  4574   s0r       CALL   WAIT2            ; .. Delay .5 sec.
54. 0403  1361             DECFSZ LC
55. 0404  5402             GOTO   s0r
56.
57. 0405  2646             BSF    RB,5             ; .. Turn off over-ice LED
58.
59. 0406  2306             BCF    RB,6             ; .. Turn on fill LED
60. 0407  4574   s0q       CALL   WAIT2            ; .. Delay .5 sec.
61. 0410  1361             DECFSZ LC
```

```
62.  0411  5407            GOTO   50a
63.
64.  0412  270c            BSF    RB.6              ; .. Turn off fill LED
65.
66.  0413  6007            MOVLW  7                 ;CLEAR RAM FIRST
67.  0414  0044            MOVWF  FSR
68.  0415  0140   S1       CLRF   INDEX
69.  0416  1744            INCFSZ FSR
70.  0417  5415            GOTO   S1
71.
72.                ;              CHECK FOR TEST MODE
73.  0420  4550   TEST     CALL   MUX               ;READ SWITCHES
74.  0421  3613            BTFSS  FLAG.4            ;SKIP ON IN TEST MODE
75.  0422  5426            GOTO   GGRAT             ;IF NOT IN TEST MODE THEN GET GRATE
76.
77.                ;              BEGINNING OF TEST MODE
78.  0423  4400            CALL   FXMIT             ;EXERCISE FRONT TRANSMITTER AND RECEIVER
79.  0424  4403            CALL   RXMIT             ;EXERCISE REAR TRANSMITTER AND RECEIVER
80.  0425  5420            GOTO   TEST
81.
82.
83.                ;              GET INITIAL GRATE VALUE AT POWER UP
84.                ;              MUST BE BETWEEN 7" AND 13"
85.  0426  6020   GGRAT    MOVLW  20                ;AVERAGE 16 GOOD SAMPLES
86.  0427  0061            MOVWF  LC
87.                ;              FLASH RED INDICATOR FIRST
88.  0430  2246   GG       BCF    RB.5              ;TURN ON RED OI INDICATOR
89.  0431  4574            CALL   WAIT2             ;WAIT 2 MILLISECONDS
90.  0432  2646            BSF    RB.5              ;TURN OFF RED OI INDICATOR
91.
92.  0433  4403            CALL   RXMIT             ;USE REAR TRANSMIT
93.  0434  6163            MOVLW  163               ;CHECK FOR DIST >= 7"
94.  0435  0207            SUBWF  DIST,W
95.  0436  3403            BTFSS  SWR.0             ;SKIP ON DIST >= 7"
96.  0437  5430            GOTO   GG                ;IF NOT FLASH RED AND TRY AGAIN
97.  0440  6353            MOVLW  353               ;CHECK FOR DIST <= 13"
98.  0441  0207            SUBWF  DIST,W
99.  0442  3003            BTFSC  SWR.0             ;SKIP ON DIST <= 13"
100. 0443  5430            GOTO   GG                ;IF NOT FLASH RED AND TRY AGAIN
101. 0444  1007            MOVF   DIST,W
102. 0445  0750            ADDWF  GRATE             ;ADD UP GRATE DISTANCES
103. 0446  3003            BTFSC  SWR.0             ;CHECK FOR OVERFLOW
104. 0447  1252            INCF   CH                ;USE CUP HEIGHT FOR MSBYTE
105. 0450  1361            DECFSZ LC                ;SKIP ON LAST SUM
106. 0451  5430            GOTO   GG                ;GET ANOTHER SAMPLE
107.
108. 0452  6004            MOVLW  4                 ;DIVIDE BY 16
109. 0453  0061            MOVWF  LC                ;
110. 0454  1452   GAV      RRF    CH
111. 0455  1450            RRF    GRATE
112. 0456  1361            DECFSZ LC                ;SKIP ON DIVIDE DONE
113. 0457  5454            GOTO   GAV
114.
115.                ;              GRATE DISTANCE IS NOW IN GRATE
116.
117. 0460  5455            GOTO   CUPDET            ;JUMP THERE FOR NOW
118.                        END
```

COKE SODAR PROJECT

```
        SYMBOL TABLE LISTING
SYMBOL-VALUE
CH      0012  F
CRCNT   0025  U
CUPDET  0455  L
DIST    0007  F
FLAG    0013  F
FSR     0004  F
FXMIT   0000  L-
GAV     0454  L
GG      0430  L
GGRAT   0426  L
GRATE   0010  F
IH      0022  U
INDEX   0000  F
LC      0021  F
LC1     0027  U
LD      0011  U
MUX     0150  L
PC      0002  U
RA      0005  U
RB      0006  F
RTCC    0001  U
RXMIT   0003  L
S1      0415  L
SODAR   0400  L
SW      0020  U
SWR     0003  F
TEMP    0014  U
TEMP1   0026  U
TEMPA   0015  U
TEMPB   0016  U
TEMPC   0017  U
TEST    0420  L
TOUTHI  0024  U
TOUTLO  0023  U
WAIT2   0174  L
s0q     0407  L
s0r     0402  L
 37 SYMBOLS
```

```
LINE  ADDR  INSTR      FILL ROUTINE

1.                    TITLE  "FILL ROUTINE"
 2.                    INIT
 3.           +        LIST   E,P=1654
 4.   0000    +INDEX   EQU    0
 5.   0001    +RTCC    EQU    1
 6.   0002    +PC      EQU    2
 7.   0003    +SWR     EQU    3
 8.   0004    +FSR     EQU    4
 9.   0005    +RA      EQU    5
10.   0006    +RB      EQU    6
11.            TIONS
12.
13.   0007    +DIST    EQU    7
```

```
14.  0010      +GRATE    EQU    10
15.  0011      +LD       EQU    11
16.  0012      +CH       EQU    12
17.  0013      +FLAG     EQU    13
18.  0014      +TEMP     EQU    14
19.  0015      +TEMPA    EQU    15
20.  0016      +TEMPB    EQU    16
21.  0017      +TEMPC    EQU    17
22.  0020      +SW       EQU    20
23.  0021      +LC       EQU    21
24.  0022      +IH       EQU    22
25.  0023      +TOUTLO   EQU    23
26.  0024      +TOUTHI   EQU    24
27.  0025      +CRCNT    EQU    25
28.  0026      +TEMP1    EQU    26
29.  0027      +LC1      EQU    27
30.
31.  0000      FXMIT     EQU    000
32.  0003      RXMIT     EQU    003
33.  0174      WAIT2     EQU    174
34.  0202      DIFF      EQU    202
35.  0210      TIMOUT    EQU    210
36.  0235      CUPCHK    EQU    235
37.  0255      LADJ      EQU    255
38.  0275      LEVCHK    EQU    275
39.  0321      FFLEV     EQU    321
40.  0740      CUPREM    EQU    740
41.
42.  0600                ORG    600
43.
44.  0600 2306 FILL      BCF    RB,6           ;FILL INDICATOR ON
45.
46.  0601 2106           BCF    RB,2           ;INITIAL FILL VALVE ON
47.
48.
49.            ;   IGNORE FILL LEVEL FOR ONE SECOND TO ALLOW CUP TO SETTLE
50.
51.  0602 2513           BSF    FLAG,2         ;USE 1 SECOND LOOP FLAG TO LOOP TWICE
52.  0603 0161 F0        CLRF   LC             ;
53.  0604 4574 F0A       CALL   WAIT2          ;INSIDE LOOP GIVES 256 * 1.92MS = .49 SEC
54.  0605 2746           BSF    RB,7           ;CHECK FOR MAN DEPRESSED
55.  0606 3746           BTFSS  RB,7
56.  0607 5740           GOTO   CUPREM
57.  0610 1361           DECFSZ LC
58.  0611 5604           GOTO   F0A
59.  0612 3513           BTFSS  FLAG,2         ;.49 * 2 = .98 SEC
60.  0613 5616           GOTO   F1
61.  0614 2113           BCF    FLAG,2
62.  0615 5603           GOTO   F0
63.
64.            ;   SET UP THE TIMEOUT COUNTER FOR SELECTED VALVE TO
65.            ;   TURN OFF VALVE IF TIME EXCEEDS MAX VALVE "ON" TIME
66.
67.  0616 6014 F1        MOVLW  14             ;SET UP 60 SECOND MAX ON FOR SEV
68.  0617 3560           BTFSS  SW,3           ;SKIP ON SEV
69.  0620 6006           MOVLW  6              ;SET UP 30 SECOND MAX ON FOR FF
70.  0621 0064           MOVWF  TOUTHI         ;STORE IN MSBYTE OF TIMEOUT COUNTER
71.  0622 0163           CLRF   TOUTLO
72.
```

```
 73.                ;
 74. 0623 6001      MOVLW  01              ;SET UP NUMBER OF grates distances noted BY CUPCHK
 75. 0624 0065      MOVWF  CRCNT           ;BEFORE ABORTING FILL
 76.
 77. 0625 4635  F2  CALL   CUPCHK          ;CHECK FOR CUP REMOVED
 78. 0626 3153      BTFSC  FLAG,3          ;SKIP ON CUP NOT REMOVED
 79. 0627 5740      GOTO   CUPREM          ;CUP REMOVED OR LOST LIP
 80.
 81. 0630 6012      MOVLW  12              ;OFFSET FOR INITIAL FILL FOR SEV
 82. 0631 3560      BTFSS  SW,3            ;SKIP ON SEV
 83. 0632 6016      MOVLW  16              ;OFFSET FOR INITIAL FILL FOR FF
 84. 0633 0066      MOVWF  TEMP1           ;STORE OFFSET IN TEMP1
 85.
 86. 0634 4675      CALL   LEVCHK          ;MONITOR THE LEVEL
 87. 0635 0054      MOVWF  TEMP            ;MOVE RETURN LITERAL TO TEMP
 88. 0636 3014      BTFSC  TEMP,0          ;SKIP IF MAN NOT DEPRESSED
 89. 0637 5740      GOTO   CUPREM
 90. 0640 3454      BTFSS  TEMP,1          ;SKIP IF TIME TO TURN OFF VALVE
 91. 0641 5625      GOTO   F2
 92.
 93.                ; FIRST FILL IS FINISHED. IF NON FOAMY PRODUCT, THEN TOP OFF
 94.                ; WITHOUT TURNING VALVE OFF
 95.
 96. 0642 3220      BTFSC  SW,4            ;SKIP ON FOAM NOT ENABLED
 97. 0643 5646      GOTO   F2A
 98. 0644 2453      BSF    FLAG,1          ;SET SECOND TOPOFF FLAG
 99. 0645 5700      GOTO   F5
100.
101.                ; FOAMY PRODUCT IS SELECTED. SO TURN VALVE OFF
102.                ; AND PROCEED WITH FOAM ALGORITHM
103.
104. 0646 2506  F2A BSF    RB,2            ;VALVE OFF
105.
106.                ; WAIT 4.5 SECONDS MINIMUM FOR FOAM
107.                ; TO FINISH RISING AND BEGIN TO FALL
108.
109. 0647 0161  F3  CLRF   LC
110. 0650 2746  F3A BSF    RB,7            ;CHECK MAN SW
111. 0651 3746      BTFSS  RB,7            ;SKIP ON MAN NOT DEPRESSED
112. 0652 5740      GOTO   CUPREM
113.
114. 0653 4635      CALL   CUPCHK          ;SEE IF CUP IS STILL THERE
115. 0654 3153      BTFSC  FLAG,3          ;SKIP ON CUP STILL THERE
116. 0655 5740      GOTO   CUPREM
117.
118. 0656 1361      DECFSZ LC
119. 0657 5650      GOTO   F3A
120.
121.                ; LOOP AND WATCH FOAM SUBSIDE
122.
123. 0660 6200  F4  MOVLW  200
124. 0661 0061      MOVWF  LC              ;MAX NUMBER OF LOOPS FOR FOAM TO SUBSIDE
125.
126. 0662 6010      MOVLW  10              ;8 AGREEMENTS TO TURN ON VALVE
127. 0663 0067      MOVWF  LC1
128.
129. 0664 4400 FOMFAL CALL FXMIT           ;LOOK IN CUP
130. 0665 6010      MOVLW  10
131. 0666 0711      ADDWF  LD,W            ;DISTANCE AT WHICH TO BEGIN TOPOFF
```

```
132. 0667 0207         SUBWF   DIST,W      ;COMPARE
133. 0670 3003         BTFSC   SWR,0       ;SKIP ON DIST <= (LD+10)  [LD + .4"]
134.
135. 0671 5676         GOTO    FOMF1
136.
137. 0672 1361         DECFSZ  LC          ;SKIP AFTER WAITING
138. 0673 5664         GOTO    FOMFAL
139.
140. 0674 3053         BTFSC   FLAG,1      ;SKIP ON FIRST TOPOFF
141. 0675 5740         GOTO    CUPREM      ;DONE
142.
143. 0676 1367  FOMF1  DECFSZ  LC1         ;MUST DECIDE X NUMBER OF TIMES TO START VALVE
144. 0677 5664         GOTO    FOMFAL
145.
146. 0700 6010  F5     MOVLW   10          ;SET NUMBER OF grate distances noted BY CUPCHK before aborting FILL
147. 0701 0065         MOVWF   CRCNT
148.
149. 0702 4635  F5A    CALL    CUPCHK      ;CHECK FOR CUP REMOVED
150. 0703 3153         BTFSC   FLAG,3      ;SKIP ON CUP NOT REMOVED
151. 0704 5740         GOTO    CUPREM      ;CUP MISSING
152.
153. 0705 4721         CALL    FFLEV       ;GET FINAL FILL LEVEL
154.
155. 0706 2106         BCF     RB,2        ;TURN VALVE ON
156. 0707 4675         CALL    LEVCHK      ;MONITOR THE LEVEL
157. 0710 0054         MOVWF   TEMP        ;MOVE RETURN LITERAL TO TEMP
158. 0711 3014         BTFSC   TEMP,0      ;SKIP ON MAN NOT DEPRESSED
159. 0712 5740         GOTO    CUPREM
160. 0713 3454         BTFSS   TEMP,1      ;SKIP ON TIME TO TURN VALVE OFF
161. 0714 5702         GOTO    F5A         ;TRY AGAIN
162.
163. 0715 2506         BSF     RB,2        ;TURN VALVE OFF
164. 0716 3053         BTFSC   FLAG,1      ;SKIP ON FIRST TOPOFF
165. 0717 5740         GOTO    CUPREM      ;FINISHED
166. 0720 2453         BSF     FLAG,1
167. 0721 5647         GOTO    F3          ;WAIT ON FOAM AGAIN
168.
169.                   END

FILL ROUTINE

SYMBOL TABLE LISTING
SYMBOL-VALUE
CH       0012  U
CRCNT    0025  F
CUPCHK   0235  L
CUPREM   0740  L
DIFF     0202  U
DIST     0007  F
F0       0603  L
F0A      0604  L
F1       0616  L
F2       0625  L
F2A      0646  L
F3       0647  L
F3A      0650  L
F4       0660  U
F5       0700  L
F5A      0702  L
```

```
FFLEV   0321  L
FILL    0600  U
FLAG    0013  F
FOMF1   0676  L
FOMFAL  0664  L
FSR     0004  U
FXMIT   0000  L
GRATE   0010  U
IH      0022  U
INDEX   0000  U
LADJ    0255  U
LC      0021  F
LC1     0027  F
LD      0011  F
LEVCHK  0275  L
PC      0002  U
RA      0005  U
RB      0006  F
RTCC    0001  U
RXMIT   0003  U
SW      0020  F
SWR     0003  F
TEMP    0014  F
TEMP1   0026  F
TEMPA   0015  U
TEMPB   0016  U
TEMPC   0017  U
TIMOUT  0210  U
TOUTHI  0024  F
TOUTLO  0023  F
WAIT2   0174  L
47 SYMBOLS
```

```
LINE  ADDR  INSTR       CUPREM

1.                     TITLE  "CUPREM"
 2.                     INIT
 3.            +        LIST   E.P=1654
 4.   0000    +INDEX    EQU    0
 5.   0001    +RTCC     EQU    1
 6.   0002    +PC       EQU    2
 7.   0003    +SWR      EQU    3
 8.   0004    +FSR      EQU    4
 9.   0005    +RA       EQU    5
10.   0006    +RB       EQU    6
11.           TIONS
12.
13.   0007    +DIST     EQU    7
14.   0010    +GRATE    EQU    10
15.   0011    +LD       EQU    11
16.   0012    +CH       EQU    12
17.   0013    +FLAG     EQU    13
18.   0014    +TEMP     EQU    14
19.   0015    +TEMPA    EQU    15
20.   0016    +TEMPB    EQU    16
21.   0017    +TEMPC    EQU    17
22.   0020    +SW       EQU    20
23.   0021    +LC       EQU    21
```

```
24.  0022        +IH      EQU    22
25.  0023        +TOUTLO  EQU    23
26.  0024        +TOUTHI  EQU    24
27.  0025        +CRCNT   EQU    25
28.  0026        +TEMP1   EQU    26
29.  0027        +LC1     EQU    27
30.
31.
32.  0000        FXMIT    EQU    000
33.  0003        RXMIT    EQU    003
34.  0202        DIFF     EQU    202
35.  0455        CUPDET   EQU    455
36.
37.  0740                 ORG    740
38.
39.  0740  2706  CUPREM   BSF    RB,6       ;FILL INDICATOR OFF
40.  0741  2246           BCF    RB,5       ;OI INDICATOR ON
41.  0742  2506           BSF    RB,2       ;VALVE OFF
42.  0743  0153           CLRF   FLAG       ;CLEAR ALL FLAGS
43.  0744  6002           MOVLW  2          ;NUMBER OF LOOPS
44.  0745  0061           MOVWF  LC
45.
46.  0746  4403  CR1      CALL   RXMIT      ;REAR DISTANCE
47.  0747  1010           MOVF   GRATE,W    ;RECALL OLD GRATE
48.  0750  0054           MOVWF  TEMP
49.  0751  1007           MOVF   DIST,W     ;CURRENT DISTANCE
50.  0752  4602           CALL   DIFF       ;TEMP = !TEMP - W!
51.  0753  6005           MOVLW  5          ;CHECK FOR DIFF < .25"
52.  0754  0254           SUBWF  TEMP       ;TEMP = TEMP - 5
53.  0755  3003           BTFSC  SWR,0      ;SKIP ON DIFF < .25"
54.  0756  5740           GOTO   CUPREM     ;IF DIFF > .25 TRY AGAIN
55.  0757  1361           DECFSZ LC         ;CHECK TWICE
56.  0760  5746           GOTO   CR1
57.
58.  0761  1007           MOVF   DIST,W     ;RECALL DISTANCE
59.  0762  0050           MOVWF  GRATE      ;STORE NEW GRATE
60.  0763  2646           BSF    RB,5       ;OI INDICATOR OFF
61.  0764  5455           GOTO   CUPDET     ;READY FOR NEW CUP
62.
63.
64.
65.                       END
```

CUPREM

SYMBOL TABLE LISTING
SYMBOL-VALUE
CH      0012  U
CR1     0746  L
CRCNT   0025  U
CUPDET  0455  L
CUPREM  0740  L
DIFF    0202  L
DIST    0007  F
FLAG    0013  F
FSR     0004  U
FXMIT   0000  U
GRATE   0010  F

| | | |
|---|---|---|
| IH | 0022 | U |
| INDEX | 0000 | U |
| LC | 0021 | F |
| LC1 | 0027 | U |
| LD | 0011 | U |
| PC | 0002 | U |
| RA | 0005 | U |
| RB | 0006 | F |
| RTCC | 0001 | U |
| RXMIT | 0003 | L |
| SW | 0020 | U |
| SWR | 0003 | F |
| TEMP | 0014 | F |
| TEMP1 | 0026 | U |
| TEMPA | 0015 | U |
| TEMPB | 0016 | U |
| TEMPC | 0017 | U |
| TOUTHI | 0024 | U |
| TOUTLO | 0023 | U |

30 SYMBOLS

What is claimed:

1. An apparatus for automatically filling a container with a beverage comprising:
   (a) a beverage dispenser including a beverage dispensing nozzle located above a container supporting grate;
   (b) a pair of ultrasonic energy transmitters mounted on said dispenser for transmitting ultrasonic energy down toward said container supporting grate located below said beverage dispensing nozzle;
   (c) a pair of ultrasonic energy receivers mounted on said dispenser, separate from and spaced apart from said transmitters and positioned for receiving ultrasonic energy reflected back up from the direction of said grate and from generating signals corresponding to the travel time of the ultrasonic energy;
   (d) control circuit means using said generated signals for automatically detecting the presence of any container placed on said grate and below said nozzle; and
   (e) said control circuit means including means using said generated signals for controlling the filling of any container placed on said grate with beverage from said nozzle.

2. The apparatus as recited in claim 1 wherein both of said transmitters and receivers are crystals.

3. The apparatus as recited in claim 2 wherein said control circuit means includes means for operating said crystals at a frequency in a range from about 200 to about 450 KHz.

4. The apparatus as recited in claim 2 including a lens connected to a bottom surface of each of said crystals for both coupling the crystals to air and also for lensing said crystals.

5. The apparatus as recited in claim 2 wherein both of said transmitters and receivers are contained in a single transducer assembly.

6. The apparatus as recited in claim 5 wherein said nozzle is connected to a beverage dispenser valve assembly and wherein said transducer assembly is attached to said valve assembly adjacent to said nozzle.

7. The apparatus as recited in claim 6 wherein said control circuit means is contained in a control module attached to said valve assembly.

8. The apparatus as recited in claim 1 wherein said transmitters and receivers include a front pair including a transmitter and a receiver and a rear pair including a transmitter and a receiver, and wherein said control circuit includes means for detecting the presence of a cup lip using said rear pair, and means for detecting the presence of a cup bottom using said front pair.

9. The apparatus as recited in claim 8 including means for determining the distance to the grate using said rear pair.

10. The apparatus as recited in claim 9 wherein said control circuit includes a RAM and wherein said grate distance determining means includes means for transmitting a 100 microsecond pulse from the rear transmitter and after a certain predetermined minimum number of measurements indicate the grate distance being between 7 inches and 13 inches, then storing the average grate distance in said RAM.

11. The apparatus as recited in claim 8 wherein said means for detecting a cup lip include means for transmitting a 100 microsecond pulse from the rear transmitter and for going on to the next step only after an object is detected by the rear receiver which is at least 3 inches above said grate, said detecting requiring a plurality of consecutive lip measurements within ±0.1 inch before going on to the next routine.

12. The apparatus as recited in claim 11 wherein said means for detecting the presence of a cup bottom include means for transmitting a 25 microsecond pulse from the front transmitter and for indicating a valid cup bottom only when an object is detected by the front cup receiver which is at least 0.1 inch above said grate.

13. The apparatus as recited in claim 12 including means for monitoring the presence of a cup lip during filling, using said rear pair, and means for monitoring the liquid level within the cup during filling using said front pair.

14. The apparatus as recited in claim 1 wherein said two pairs have different beam shapes and are aimed at different areas.

15. The apparatus as recited in claim 14 including two separate transmitter circuits, one for each of said transmitters, such that the transmit periods can be different for the two transmitters.

16. A method for automatically filling a container with a beverage comprising the steps of:
   (a) providing a beverage dispenser including a beverage dispensing nozzle located above a container supporting grate;
   (b) transmitting ultrasonic energy down from a pair of ultrasonic energy transmitters mounted on said dispenser toward said container supporting gate located below said beverage dispensing nozzle;
   (c) receiving ultrasonic energy with a pair of ultrasonic receivers, reflected back up form the direction of said grate, said receivers being separate from and spaced apart form said transmitters, and generating signals corresponding to the travel time the ultrasonic energy;
   (d) detecting, from said signals, the presence of a container when placed on said grate and below said nozzle; and
   (e) controlling, from said signals, the filling from and nozzle.

17. The method as recited in claim 16 including detecting the presence of a cup lip by transmitting ultrasonic energy form the rear transmitter and receiving ultrasonic energy by the rear receiver, and then if a cup presence is determined, then determining the presence of a cup bottom using a pulse transmitted from the front transmitter and received by the front receiver, and if a cup bottom is detected, then proceeding to fill the cup.

18. The method as recited in claim 17 including the step of monitoring the presence of cup lip during the filling step using the rear transmitter and receiver, and monitoring the level of beverage rising within the cup using the front transmitter and receiver.

19. The method as recited in claim 16 including aiming two differently shaped beams of energy at different target areas from said two transmitters.

20. The method as recited in claim 19 including using different transmit periods for said two beams.

21. An apparatus for automatically filling a container with a beverage comprising:
   a beverage dispenser including a beverage dispensing nozzle located above a container supporting grate;
   (b) an ultrasonic energy transmitter mounted on said dispenser transmitting ultrasonic energy down toward said container supporting grate located below said beverage dispensing nozzle;
   (c) an ultrasonic energy receiver mounted on said dispenser, separate from and spaced apart from said transmitter and positioned for receiving ultrasonic energy reflected back up form the direction of said grate and for generating signals corresponding to the travel time of the ultrasonic energy;
   (d) control circuit means for automatically using said generated signals for detecting the presence of any container placed on said grate and below said nozzle;
   (e) said control circuit means including means using said generated signals for controlling the filling of any container placed on said grate with beverage from said nozzle; and
   (f) said apparatus including two separate transmitter-receiver pairs.

22. The apparatus as recited in claim 98 wherein said two pairs have different beam shapes and are aimed at different areas.

23. The apparatus as recited in claim 99 including two separate transmitter circuits, one for each of said transmitters, such that the transmit periods can be different for the two transmitters.

24. A method for automatically filling a container with a beverage comprising the steps of:
   providing a beverage dispenser including a beverage dispensing nozzle located above a container supporting grate; back up from the direction of said grate with an ultrasonic receiver separate from and spaced apart from said transmitter and generating signals corresponding to the travel time of the ultrasonic energy;
   (d) detecting, from said signals, the presence of a container when placed on said grate and below said nozzle;
   (e) controlling, using said generated signals, the filling of said container with beverage from said nozzle; and
   (f) wherein said transmitting step comprises separately transmitting ultrasonic energy from a pair of separate transmitters.

25. The method as recited in claim 24 wherein said separately transmitting step includes aiming two differently shaped beams of energy at different target areas.

26. The method as recited in claim 25 including using different transmit periods for said two beams.

* * * * *

UNITED STATES PATENT AND TRADEMARK OFFICE
CERTIFICATE OF CORRECTION

PATENT NO. : 4,883,100

DATED : November 28, 1989

INVENTOR(S) : William F. Stembridge et al.

It is certified that error appears in the above-identified patent and that said Letters Patent is hereby corrected as shown below:

Column 73:
In claim 1, line 14, delete "from" and substitute therefor --for--.

Column 74:
In claim 16, line 8, delete "gate" and substitute therefor --grate--.

Column 74:
In claim 16, line 11, delete "form" and substitute therefor --from--.

Column 74:
In claim 16, line 13, delete "form" and substitute therefor --from--.

Column 74:
In claim 16, line 19, delete "and" and substitute therefor --said--.

UNITED STATES PATENT AND TRADEMARK OFFICE
CERTIFICATE OF CORRECTION

PATENT NO. : 4,883,100

DATED : November 28, 1989

INVENTOR(S) : William F. Stembridge et al.

It is certified that error appears in the above-identified patent and that said Letters Patent is hereby corrected as shown below:

Column 75:

In claim 21, line 3, insert at the beginning of the line --(a)--.

In claim 21, line 6, after "dispenser" insert --for--.

In claim 21, line 12, delete "form" and insert therefor --from--.

Column 76:
In claim 22, line 1, delete "98" and substitute therefor --21--.

Column 76:
In claim 23, line 1, delete "99" and substitute therefor --22--.

Column 76:
In claim 24, insert at the beginning of line 3 --(a)--.

In claim 24, line 5, after "grate;" insert --(b) transmitting ultrasonic energy down toward said container supporting grate located below said beverage dispensing nozzle from an ultrasonic transmitter mounted on said dispenser; (c) receiving ultrasonic energy reflected--.

UNITED STATES PATENT AND TRADEMARK OFFICE
CERTIFICATE OF CORRECTION

PATENT NO. : 4,883,100

DATED : November 28, 1989

INVENTOR(S) : William F. Stembridge et al.

It is certified that error appears in the above-identified patent and that said Letters Patent is hereby corrected as shown below:

Column 76:

In claim 24, line 6, after "receiver" insert --means--.

Signed and Sealed this

Eleventh Day of February, 1992

Attest:

HARRY F. MANBECK, JR.

*Attesting Officer*     *Commissioner of Patents and Trademarks*